US008234650B1

(12) United States Patent
Eppstein et al.

(10) Patent No.: US 8,234,650 B1
(45) **Date of Patent: *Jul. 31, 2012**

(54) APPROACH FOR ALLOCATING RESOURCES TO AN APPARATUS

(75) Inventors: Christopher M Eppstein, Mountain View, CA (US); Ashar Aziz, Fremont, CA (US); Thomas Markson, Palo Alto, CA (US); Martin Patterson, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1604 days.

This patent is subject to a terminal disclaimer.

(21) Appl. No.: 11/042,833

(22) Filed: Jan. 24, 2005

Related U.S. Application Data

(63) Continuation-in-part of application No. 09/818,424, filed on Mar. 26, 2001, now Pat. No. 7,103,647, and a continuation-in-part of application No. 09/502,170, filed on Feb. 11, 2000, now Pat. No. 6,779,016.

(60) Provisional application No. 60/212,925, filed on Jun. 20, 2000, provisional application No. 60/150,394, filed on Aug. 23, 1999.

(51) Int. Cl.
*G06F 9/46* (2006.01)
*G06F 15/177* (2006.01)
*G06F 15/173* (2006.01)

(52) U.S. Cl. ........ 718/104; 718/100; 718/105; 709/220; 709/221; 709/226

(58) Field of Classification Search .................. 718/104, 718/108; 714/6, 25; 713/100; 711/170, 711/165, 114; 710/8; 719/310
See application file for complete search history.

(56) References Cited

U.S. PATENT DOCUMENTS

| | | | | |
|---|---|---|---|---|
| 4,591,967 | A | 5/1986 | Mattes et al. | |
| 5,163,130 | A | 11/1992 | Hullot | |
| 5,193,171 | A * | 3/1993 | Shinmura et al. | 711/113 |
| 5,210,866 | A | 5/1993 | Milligan et al. | |
| 5,307,473 | A * | 4/1994 | Tsuboi et al. | 711/143 |
| 5,414,851 | A * | 5/1995 | Brice, Jr. et al. | 718/104 |
| 5,491,694 | A | 2/1996 | Oliver et al. | |

(Continued)

FOREIGN PATENT DOCUMENTS

EP 0262750 A2 4/1988

(Continued)

OTHER PUBLICATIONS

Rob Short, et al., "Windows NT Clusters for Availability and Scalability," 1997 IEEE, pp. 8-13.

(Continued)

*Primary Examiner* — H. S. Sough
*Assistant Examiner* — Kimberly Jordan
(74) *Attorney, Agent, or Firm* — Osha Liang LLP

(57) ABSTRACT

An approach for allocating resources to an apparatus generally involves a resource allocator receiving a request that specifies one or more characteristics for the apparatus. A resource allocator determines the logical devices to be included in the apparatus so that the apparatus has the specified characteristics. For at least one logical device, the resource allocator determines whether a physical device is available that corresponds to the logical device. If a physical device is available, the resource allocator allocates the physical device to the apparatus. If a physical device is not available, the resource allocator does not allocate the physical device to the apparatus.

39 Claims, 35 Drawing Sheets

U.S. PATENT DOCUMENTS

| | | | | | |
|---|---|---|---|---|---|
| 5,491,796 | A | | 2/1996 | Wanderer et al. | |
| 5,504,670 | A | | 4/1996 | Barth et al. | |
| 5,574,911 | A | * | 11/1996 | D'Angelo et al. | 707/1 |
| 5,574,914 | A | | 11/1996 | Hancock et al. | |
| 5,590,284 | A | | 12/1996 | Crosetto | |
| 5,659,786 | A | | 8/1997 | George et al. | |
| 5,751,967 | A | | 5/1998 | Raab et al. | |
| 5,793,979 | A | | 8/1998 | Lichtman et al. | |
| 5,819,042 | A | | 10/1998 | Hansen | |
| 5,821,937 | A | | 10/1998 | Tonelli et al. | |
| 5,832,529 | A | | 11/1998 | Wollrath et al. | |
| 5,878,232 | A | | 3/1999 | Marimuthu | |
| 5,897,661 | A | * | 4/1999 | Baranovsky et al. | 711/170 |
| 5,951,683 | A | | 9/1999 | Yuuki et al. | |
| 5,974,563 | A | | 10/1999 | Beeler, Jr. | |
| 5,999,911 | A | | 12/1999 | Berg et al. | |
| 6,038,673 | A | * | 3/2000 | Benn et al. | 713/323 |
| 6,182,121 | B1 | * | 1/2001 | Wlaschin | 709/215 |
| 6,182,139 | B1 | | 1/2001 | Brendel | |
| 6,212,559 | B1 | | 4/2001 | Bixler et al. | |
| 6,219,699 | B1 | | 4/2001 | McCloghrie et al. | |
| 6,223,218 | B1 | | 4/2001 | Iijima et al. | |
| 6,230,200 | B1 | | 5/2001 | Forecast et al. | |
| 6,330,639 | B1 | * | 12/2001 | Fanning et al. | 711/106 |
| 6,381,321 | B1 | | 4/2002 | Brown et al. | |
| 6,389,432 | B1 | | 5/2002 | Pothapragada et al. | |
| 6,446,141 | B1 | | 9/2002 | Nolan et al. | |
| 6,466,559 | B1 | | 10/2002 | Johansson et al. | |
| 6,505,229 | B1 | | 1/2003 | Turner et al. | |
| 6,597,956 | B1 | | 7/2003 | Aziz et al. | |
| 6,654,756 | B1 | | 11/2003 | Quernemoen et al. | |
| 6,779,016 | B1 | * | 8/2004 | Aziz et al. | 709/201 |
| 6,848,104 | B1 | * | 1/2005 | Van Ee et al. | 719/310 |
| 6,873,620 | B1 | * | 3/2005 | Coveley et al. | 370/395.31 |
| 6,915,382 | B2 | * | 7/2005 | Yamamoto et al. | 711/114 |
| 6,968,379 | B2 | | 11/2005 | Nielsen | |
| 7,051,092 | B2 | | 5/2006 | Lenz et al. | |
| 7,114,013 | B2 | * | 9/2006 | Bakke et al. | 710/5 |
| 7,463,648 | B1 | | 12/2008 | Eppstein et al. | |
| 2001/0042225 | A1 | * | 11/2001 | Cepulis et al. | 714/25 |
| 2002/0052941 | A1 | | 5/2002 | Patterson | |
| 2002/0120744 | A1 | | 8/2002 | Chellis et al. | |
| 2003/0074599 | A1 | * | 4/2003 | Golasky et al. | 714/6 |
| 2003/0079031 | A1 | | 4/2003 | Nagano | |
| 2004/0177244 | A1 | * | 9/2004 | Murphy et al. | 713/100 |
| 2005/0228850 | A1 | | 10/2005 | Zhu et al. | |
| 2005/0229182 | A1 | | 10/2005 | Grover et al. | |

FOREIGN PATENT DOCUMENTS

| | | | |
|---|---|---|---|
| EP | 0490624 | A2 | 6/1992 |
| EP | 0750256 | A2 | 12/1996 |
| EP | 0791881 | A1 | 8/1997 |
| EP | 0905621 | A1 | 3/1999 |
| EP | 0917056 | A2 | 5/1999 |
| EP | 0935200 | A1 | 8/1999 |
| WO | WO 97/49214 | A1 | 12/1997 |
| WO | WO 99/57957 | A2 | 11/1999 |
| WO | WO 00/29954 | A1 | 5/2000 |

OTHER PUBLICATIONS

Radek Vingralek, et al., "Snowball: Scalable Storage on Networks of Workstations with Balanced Load," pp. 117-156, Distributed and Parallel Databases, vol. 6, No. 2, Apr. 1998, XP-002162201.

Armando Fox, et al., "Cluster-Based Scalable Network Services," pp. 78-91, Operating Systems Review (SIGOPS), US, ACM Headquarter, New York, vol. 31, No. 5, Dec. 1, 1997, XP-000771023.

Elliotte Rusty Harold, "XML: Extensible Markup Language," 1998, pp. 1-431.

Microsoft Press Computer Dictionary, Third Edition, Microsoft Press Publishing, 1997, p. 197.

Eric Prud'hommeaux, "XML-based HTTP Server Configuration Language," http://www.w3.org/1999/07/9-http-server-conf.html, Sep. 7, 1999, XP-002152599, pp. 1-5.

Nathan J. Muller, "Design and Conquer," Oct. 1996, BYTE, vol. 21, No. 10, XP000683573, pp. 93-98.

U.S. Appl. No. 11/042,813, filed Jan. 24, 2005, Notice of Allowance, Aug. 27, 2008.

* cited by examiner

APPROACH FOR ALLOCATING RESOURCES TO AN APPARATUS

PRIORITY CLAIMS AND RELATED APPLICATIONS

This application claims domestic priority under 35 U.S.C. §120 as a continuation-in-part of prior application Ser. No. 09/818,424, now U.S. Pat. No. 7,103,647, filed Mar. 26, 2001, entitled "Symbolic Definition of a Computer System," naming ASHAR AZIZ as inventor, which in turn claims both (a) domestic priority under 35 U.S.C. §119(e) from prior U.S. provisional application Ser. No. 60/212,925, filed Jun. 20, 2000, entitled "Symbolic Definition of a Virtual Computer System," naming as inventors ASHAR AZIZ, THOMAS MARKSON, and MARTIN PATTERSON, and (b) domestic priority under 35 U.S.C. §120 as a continuation-in-part of prior application Ser. No. 09/502,170, now U.S. Pat. No. 6,779,016, filed Feb. 11, 2000, entitled "Extensible Computing System," naming ASHAR AZIZ, TOM MARKSON, and MARTIN PATTERSON as inventors, the latter of which in turn claims domestic priority under 35 U.S.C. §119(e) from prior U.S. provisional application Ser. No. 60/150,394, filed Aug. 23, 1999, entitled "Extensible Computing System," naming as inventors ASHAR AZIZ, TOM MARKSON, and MARTIN PATTERSON, the entire disclosures of all four of which are hereby incorporated by reference for all purposes as if fully set forth herein. As used herein, references to "Aziz et al." refer to non-provisional application Ser. No. 09/502,170 identified above and not to any of the other identified applications that include Ashar Aziz as an inventor.

This application is related to: (1) co-pending U.S. non-provisional application Ser. No. 11/042,963, filed Jan. 24, 2005, entitled "APPROACH FOR ALLOCATING RESOURCES TO AN APPARATUS BASED ON RESOURCE REQUIREMENTS," naming Christopher M. Eppstein, Ashar Aziz, Thomas Markson, and Martin Patterson as inventors; (2) co-pending U.S. non-provisional application Ser. No. 11/042,813, filed Jan. 24, 2005, entitled "APPROACH FOR ALLOCATING RESOURCES TO AN APPARATUS BASED ON OPTIONAL RESOURCE RQUIREMENTS," naming Christopher M. Eppstein, Ashar Aziz, Thomas Markson, and Martin Patterson as inventors; (3) co-pending U.S. non-provisional application Ser. No. 11/042,961, filed Jan. 24, 2005, entitled "APPROACH FOR ALLOCATING RESOURCES TO AN APPARATUS BASED ON ALTERNATIVE RESOURCE REQUIREMENTS," naming Christopher M. Eppstein, Ashar Aziz, Thomas Markson, and Martin Patterson as inventors; (4) co-pending U.S. non-provisional application Ser. No. 11/042,834, filed Jan. 24, 2005, entitled "APPROACH FOR ALLOCATING RESOURCES TO AN APPARATUS BASED ON SUSPENDABLE RESOURCE REQUIREMENTS," naming Christopher M. Eppstein, Ashar Aziz, Thomas Markson, and Martin Patterson as inventors; and (5) co-pending U.S. non-provisional application Ser. No. 11/042,812, filed Jan. 24, 2005, entitled "APPROACH FOR ALLOCATING RESOURCES TO AN APPARATUS BASED ON PREEMPTABLE RESOURCE REQUIREMENTS," naming Christopher M. Eppstein, Ashar Aziz, Thomas Markson, and Martin Patterson as inventors.

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Computer system administrators desire to have a flexible, extensible way to rapidly create and deploy complex computer systems and data centers that include a plurality of servers, one or more load balancers, firewalls, and other network elements. One method for creating such a system is described in Aziz et al., which discloses a method and apparatus for selecting, from within a large, extensible computing framework, elements for configuring a particular computer system. Accordingly, upon demand, a virtual server farm or other data center may be created, configured and brought on-line to carry out useful work, all over a global computer network, virtually instantaneously.

Although the methods and systems disclosed in Aziz et al. are powerful and flexible, users and administrators of the extensible computing framework, and the virtual server farms that are created using it, would benefit from improved methods for deploying virtual server farms. For example, an improvement upon Aziz et al. would be a way to allocate resources from the available resources to create a virtual server farm.

SUMMARY

An approach for allocating resources to an apparatus generally involves a resource allocator receiving a request that specifies one or more characteristics for the apparatus. A resource allocator determines the logical devices to be included in the apparatus so that the apparatus has the specified characteristics. For at least one logical device, the resource allocator determines whether a physical device is available that corresponds to the logical device. If a physical device is available, the resource allocator allocates the physical device to the apparatus. If a physical device is not available, the resource allocator does not allocate the physical device to the apparatus.

According to other aspects, the approaches described herein encompass a machine-readable medium, a carrier wave, an apparatus, and a system configured to carry out the foregoing functions.

DETAILED DESCRIPTION

Figure 1A:
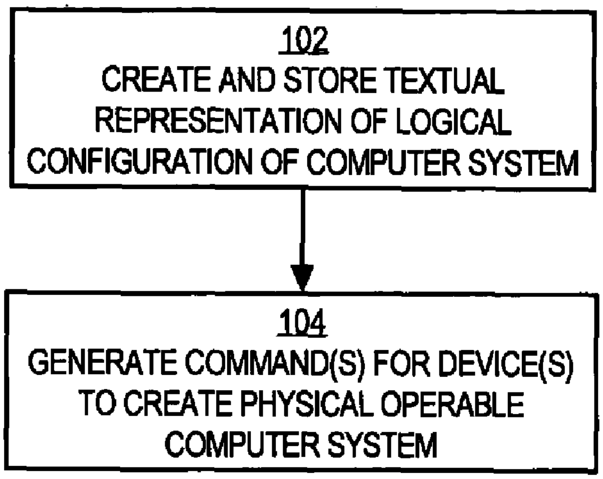
FIG. 1A is a block diagram illustrating a top-level view of a process of defining a networked computer system, according to an embodiment.

A method and apparatus for allocating resources to an apparatus is described. In the following description, for the purposes of explanation, numerous specific details are set forth in order to provide a thorough understanding of the approaches disclosed herein. It will be apparent, however, to one skilled in the art that the approaches herein may be practiced without these specific details. In other instances, well-known structures and devices are depicted in block diagram form in order to avoid unnecessarily obscuring the approaches disclosed herein.

In this document, the terms "virtual server farm," "VSF," "instant data center," "IDC," and "data center" are used interchangeably to refer to a networked computer system that comprises the combination of more than one processor, one or more storage devices, and one or more protective elements or management elements such as a firewall or load balancer, and that is created on demand from a large logical grid of generic computing elements and storage elements of the type described in Aziz et al. These terms explicitly exclude a single workstation or a personal computer.

In the following description, the various functions shall be discussed under topic headings that appear in the following order:

1.0 FUNCTIONAL OVERVIEW
2.0 BUILDING BLOCKS FOR INSTANT DATA CENTERS
3.0 EDITOR FOR CREATING INSTANT DATA CENTERS
4.0 FARM EDITOR MARKUP LANGUAGE OVERVIEW AND PROCESSING
5.0 SYMBOLIC DEFINITION LANGUAGE SPECIFICS
5.1 CONCEPTS
5.2 LANGUAGE DESCRIPTION
5.2.1 SUBNET DEFINITION
5.2.2 INTERFACE DEFINITION
5.2.3 DISK DEFINITION
5.2.4 SERVER ROLE DEFINITION
5.2.5 FIXED SERVER DEFINITION
5.2.6 SERVER TIER DEFINITION
5.2.7 LOAD BALANCER
5.2.8 FIREWALL DEFINITION
5.2.9 DEVICE DEFINITION
5.3 SERVER CLONING
5.4 EXAMPLE COMPLETE SERVER FARM DESCRIPTIONS
5.4.1 EXAMPLE TWO-TIER SERVER FARM
5.4.2 THREE-TIER SERVER FARM EXAMPLE
5.5 FARM MONITORING
5.6 FARM CLONING
5.7 EXAMPLE TEXTUAL REPRESENTATIONS OF DATA CENTERS OR SERVER FARMS
5.7.1 USE OF FIREWALL IN A SERVER FARM
5.7.2 SPECIFYING EXTRA LOCAL DRIVES
5.7.3 THREE-TIER DATA CENTER 6.0 DOCUMENT TYPE DEFINITIONS (DTD'S)
7.0 HARDWARE OVERVIEW
8.0 CLASS EXAMPLES
9.0 ALLOCATING RESOURCES TO AN APPARATUS
9.1 FUNCTIONAL OVERVIEW OF RESOURCE ALLOCATION
9.2 STRUCTURAL OVERVIEW OF RESOURCE ALLOCATION
9.3 LOGICAL DEVICES, PHYSICAL DEVICES, AND RESOURCES
9.4 AVAILABLE VERSUS NOT AVAILABLE RESOURCES
9.5 REQUESTS TO CREATE AND UPDATE AN IDC
9.6 ALLOCATING AN AVAILABLE RESOURCE TO AN IDC
9.7 IMPLEMENTING AN INSTANT DATA CENTER
9.9 OBTAINING PREVIOUSLY UNAVAILABLE RESOURCES
10.0 RESOURCE REQUIREMENTS
10.1 DEFINITION OF A RESOURCE REQUIREMENT
10.2 ALLOCATION STATES: NEW, PENDING, ALLOCATED, NOT ALLOCATED
10.3 IMPLEMENTATION MECHANISMS FOR ALLOCATING RESOURCES USING RESOURCE REQUIREMENTS
10.4 ALLOCATING RESOURCES USING RESOURCE REQUIREMENTS
11.0 DEPENDENT RESOURCE REQUIREMENTS
11.1 HIERARCHICAL RESOURCE REQUIREMENTS TREE
11.2 PARENT-CHILD DEPENDENT RESOURCE REQUIREMENTS
11.3 REFERENTIAL DEPENDENT RESOURCE REQUIREMENTS
11.4 DEPENDENCY INVOLVING SETS OF RESOURCE REQUIREMENTS
11.5 ALLOCATING RESOURCES USING DEPENDENT RESOURCE REQUIREMENTS
12.0 OPTIONAL RESOURCE REQUIREMENTS
12.1 IMPLEMENTING AN APPARATUS WITH OPTIONAL RESOURCE REQUIREMENTS
12.2 SPECIFYING THAT A RESOURCE REQUIREMENT IS OPTIONAL
12.3 USING DEPENDENT RESOURCE REQUIREMENTS WITH OPTIONAL RESOURCE REQUIREMENTS
13.0 ALTERNATIVE RESOURCE REQUIREMENTS
13.1 ALLOCATING RESOURCES BASED ON ALTERNATIVE RESOURCE REQUIREMENTS
13.2 SELECTION OF AN ALTERNATIVE RESOURCE REQUIREMENT
13.3 SPECIFYING ALTERNATIVE RESOURCE REQUIREMENTS
13.4 UPDATING ALLOCATION STATES WHEN USING ALTERNATIVE RESOURCE REQUIREMENTS
13.5 IMPLEMENTATION MECHANISMS FOR ALLOCATING RESOURCES USING ALTERNATIVE RESOURCE REQUIREMENTS
14.0 SUSPENDING RESOURCE REQUIREMENTS
14.1 ALLOCATING RESOURCES BASED ON SUSPENDING ALL RESOURCE REQUIREMENTS FOR ANOTHER APPARATUS
14.2 ALLOCATING RESOURCES BASED ON SUSPENDING SOME BUT NOT ALL RESOURCE REQUIREMENTS FOR ANOTHER APPARATUS
14.3 ALLOCATING A SUSPENDED RESOURCE REQUIREMENT
14.4 SPECIFYING THAT A RESOURCE REQUIREMENT IS SUSPENDABLE
14.5 ALLOCATION STATE: SUSPENDED
14.6 IMPLEMENTATION MECHANISMS FOR ALLOCATING RESOURCES USING SUSPENDABLE RESOURCE REQUIREMENTS
14.7 EXCHANGING RESOURCES BASED ON A SUSPENDABLE RESOURCE REQUIREMENT
15.0 PREEMPTING RESOURCE REQUIREMENTS
15.1 ALLOCATING RESOURCES BASED ON PREEMPTABLE RESOURCE REQUIREMENTS
15.2 PREEMPTION USING ALTERNATIVE RESOURCE REQUIREMENTS
15.3 PREEMPTION USING SUSPENDABLE RESOURCE REQUIREMENTS
15.4 SPECIFYING THAT A RESOURCE REQUIREMENT IS PREEMPTABLE
15.5 ALLOCATION STATE: PREEMPTED
15.6 IMPLEMENTATION MECHANISMS FOR ALLOCATING RESOURCES USING PREEMPTABLE RESOURCE REQUIREMENTS
16.0 EXAMPLE FML WITH RESOURCE REQUIREMENTS
17.0 EXTENSIONS AND ALTERNATIVES

1.0 Functional Overview

FIG. 1A is a block diagram illustrating an overview of a method of defining a networked computer system, according to an embodiment. A textual representation of a logical configuration of the computer system is created and stored, as stated in block 102. In block 104, one or more commands are generated, based on the textual representation, for one or more switch device(s). When the switch devices execute the commands, the networked computer system is created and activated by logically interconnecting computing elements. In one embodiment, the computing elements form a computing grid as disclosed in Aziz et al.

Figure 1B:
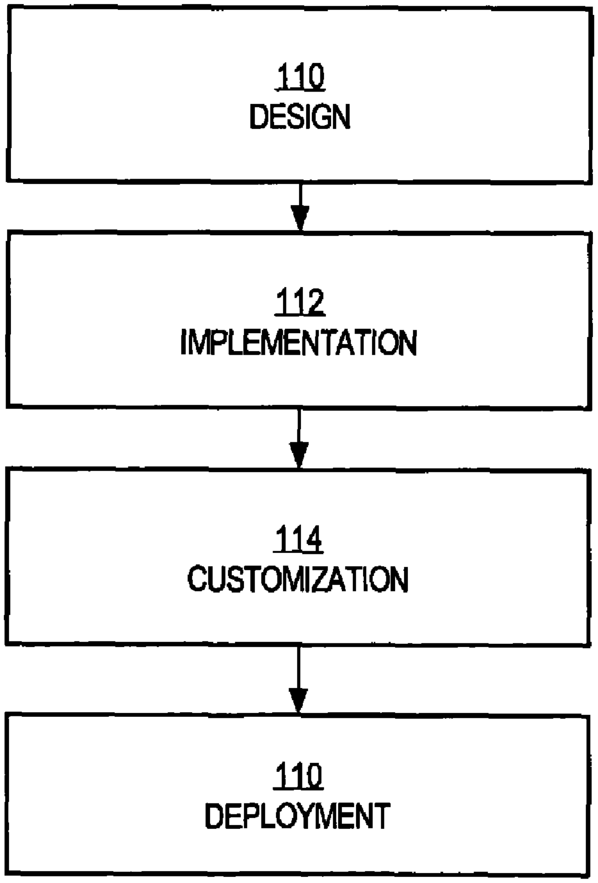
FIG. 1B is a block diagram illustrating another view of a process of defining a networked computer system, according to an embodiment.

FIG. 1B is a block diagram illustrating another view of a process of defining a networked computer system, according to an embodiment. Generally, a method of creating a representation of a data center involves a Design phase, an Implementation phase, a Customization phase, and a Deployment phase, as shown by blocks 110, 112, 114, 116, respectively.

In the Design phase of block 110, a logical description of a data center is created and stored. In one embodiment, the logical description is created and stored using a software element that generates a graphical user interface that can be displayed by, and receive input from, a standard browser computer program. In this context, "browser" means a computer application capable of viewing network resources, typically by interpreting pages represented in a markup language, such as Hypertext Markup Language (HTML), Extensible Markup Language (XML), or the equivalent. A browser typically can also support other languages, including but not limited to, JavaScript and dynamically generated markup language represented content, including but not limited to, Dynamic HTML, PHP, JSP, PERL, ActiveX, and other types of scripting languages. To create a data center configuration, a user executes the graphical user interface tool. The user selects one or more icons representing data center elements (such as servers, firewalls, load balancers, etc.) from a palette of available elements. The end user drags one or more icons from the palette into a workspace, and interconnects the icons into a desired logical configuration for the data center.

In the Implementation phase of block 112, the user may request and receive cost information from a service provider who will implement the data center. The cost information may include, e.g., a setup charge, monthly maintenance fee, etc. The user may manipulate the icons into other configurations in response to analysis of the cost information. In this way, the user can test out various configurations to find one that provides adequate computing power at an acceptable cost.

In Customization phase of block 114, after a data center is created, a configuration program is used to add content information, such as Web pages or database information, to one or more servers in the data center that was created using the graphical user interface tool. In the Customization phase, the user may save, copy, replicate, and otherwise edit and manipulate a data center design. Further, the user may apply one or more software images to servers in the data center. The selection of a software image and its application to a server may be carried out in accordance with a role that is associated with the servers. For example, if a first server has the role Web Server, then it is given a software image of an HTTP server program, a CGI script processor, Web pages, etc. If the server has the role Database Server, then it is given a software image that includes a database server program and basic data. Thus, the user has control over each computer that forms an element of a data center, and the characteristics of each computer, such as processing speed, storage capacity, brand, operating system, as are appropriate to the particular type of element. The user is not limited to use of a pre-determined site or computer.

In the Deployment phase of block 116, the data center that has been created by the user is instantiated in a computing grid, activated, and initiates processing according to the server roles.

Figure 1C:
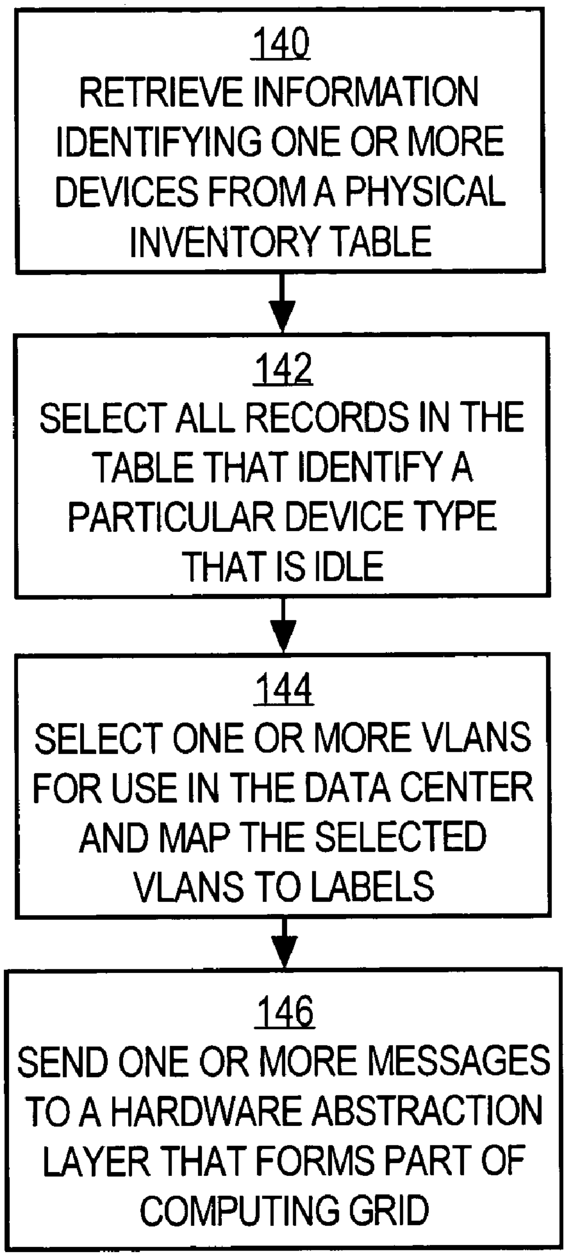
FIG. 1C is a flow diagram of a process of deploying a data center based on a textual representation, according to an embodiment.

FIG. 1C is a flow diagram of a process of deploying a data center based on a textual representation, according to an embodiment. The following discussion makes reference to elements of FIG. 1D that is discussed in more detail below.

In block 140 of FIG. 1C, the process retrieves, from a physical inventory table, information identifying one or more devices. The physical inventory table is a database table of devices, connectivity, wiring information, and status, and may be stored in, for example, control plane database 135 of FIG. 1D.

In block 142, the process selects all records in the table that identify a particular device type that is idle. Selection of such records may be done, for example, in an SQL database server using a particular type of query known as a star query statement of the type available in the SQL language, although other types of queries may be used. For example, control plane database 135 of FIG. 1D can also include a VLAN table that stores up to 4096 entries. Each entry represents a VLAN. The limit of 4096 entries reflects the limits of Layer 2 information.

In block 144, the process selects one or more VLANs for use in the data center, and maps the selected VLANs to labels. For example, VLAN value "11" is mapped to the label Outer_VLAN, and VLAN value "12" is mapped to the label Inner_VLAN.

In block 146, the process sends one or more messages to a hardware abstraction layer that forms part of computing grid 132. Details of the hardware abstraction layer are set forth in Aziz et al. The messages instruct the hardware abstraction layer how to place CPUs of the computing grid 132 of FIG. 1D in particular VLANs.

For example, a message might comprise the information, "Device ID=5," "Port (or Interface)=eth0," "vlan=v1." An internal mapping is maintained that associates port names (such as "eth0" in this example) with physical port and blade number values that are meaningful for a particular switch. In this example, assume that the mapping indicates that port "eth0" is port 1, blade 6 of switch device 5. Further, a table of VLANs stores a mapping that indicates that "v1" refers to actual VLAN "5". In response, the process would generate messages that would configure port 1, blade 6 to be on VLAN 5. Any method of a number of methods of implementing block 146 may be used so that the process sends information to computing grid 132 that is sufficient to enable the computing grid to select and logically interconnect one or more computing elements and associated storage devices to form a data center that corresponds to a particular textual representation of the data center.

Figure 1D:
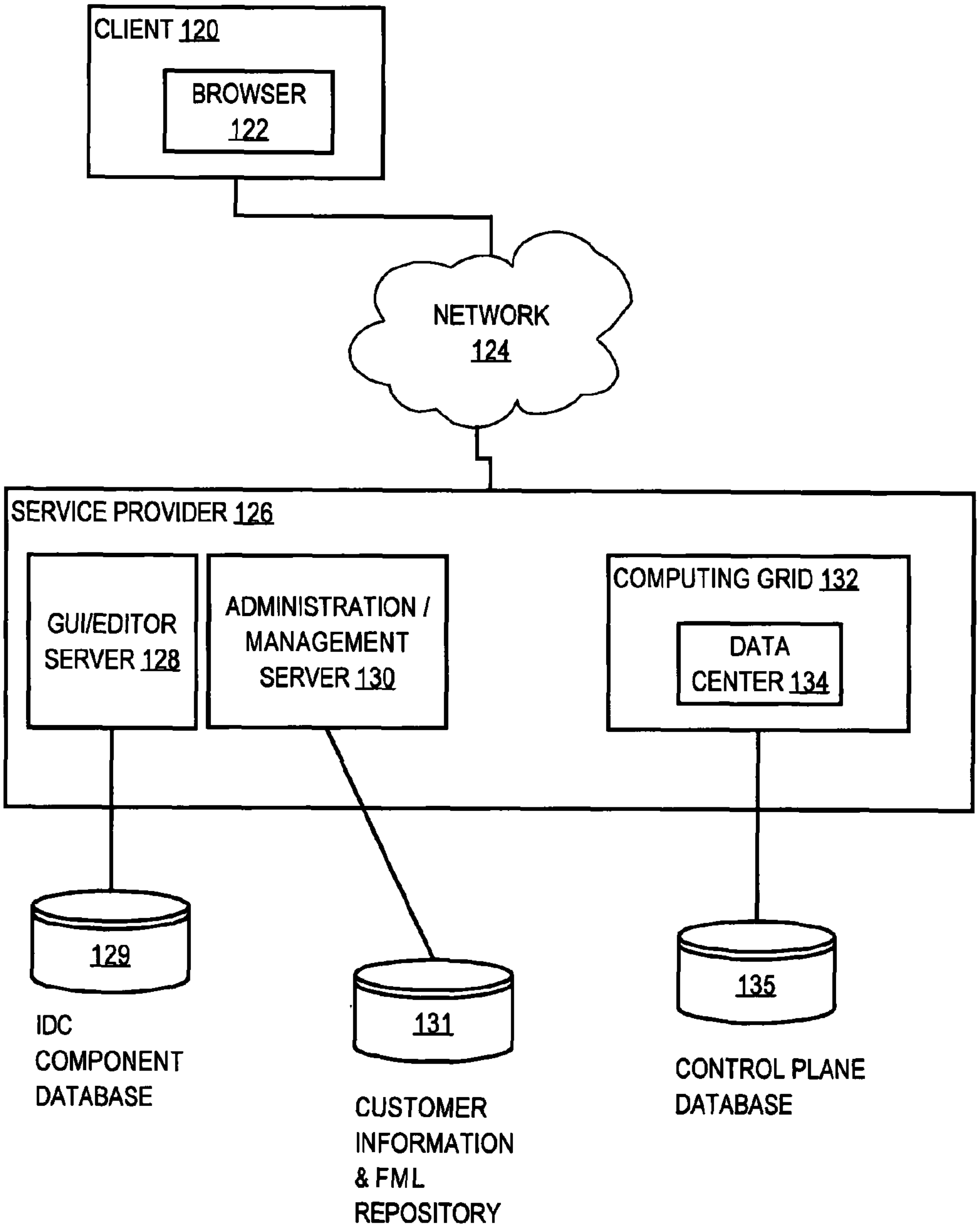
FIG. 1D is a block diagram showing a client and a service provider in a configuration that may be used to implement an embodiment.

FIG. 1D is a block diagram showing a client and a service provider in a configuration that may be used to implement an embodiment. Client 120 executes a browser 122. Client 120 communicates with service provider 126 through a network 124, which may be a local area network, wide area network, one or more internetworks, the Internet, etc.

Service provider 126 is associated with a computing grid 132 that has a large plurality of processor elements and storage elements, as described in Aziz et al. With appropriate instructions, service provider 126 can create and deploy one or more data centers 134 using elements of the computing grid 132. Service provider 126 also offers a graphical user interface editor server 128 that can access an DC component database 129 and an administration/management server 130 that can access customer information and FML repository 131, which interact with browser 122 to provide data center definition, management, re-configuration, etc. The administration/management server 130 may comprise one or more autonomous processes that each manage one or more data centers. Such processes are referred to herein as Farm Managers. Client 120 may be associated with an individual or business entity that is a customer of service provider 126.

2.0 Building Blocks for Instant Data Centers

As described in detail in Aziz et al., a data center may be defined in terms of a number of basic building blocks. By selecting one or more of the basic building blocks and specifying interconnections among the building blocks, a data center of any desired logical structure may be defined. The resulting logical structure may be named and treated as a blueprint ("DNA") for creating any number of other IDCs that have the same logical structure. Thus, creating a DNA for a data center facilitates the automation of many manual tasks involved in constructing server farms using prior technologies.

As defined herein, a data center DNA may specify roles of servers in a data center and the relationship of the various servers in the roles. A role may be defined once and then re-used within a data center definition. For example, a Web Server role may be defined in terms of the hardware, operating system, and associated applications of the server, e.g., a particular processor of a specified minimum clock rate and memory size, a particular operating system, a particular server application with specified plug-in components. This Web Server role then can be cloned many times to create an entire Web server tier. The role definition also specifies whether a role is for a machine that is statically assigned or dynamically added and removed from a data center.

One basic building block of a data center is a load balancing function. The load-balancing function may appear at more than one logical position in a data center. In one embodiment, the load-balancing function is implemented using the hardware load-balancing function of the L2-7 switching fabric. An example are ServerIron switches that are commercially available from Foundry Networks, Inc., San Jose, Calif., although other load balancing components may be utilized, which is capable of distributing a load across two or more devices. A single hardware load-balancing device, such as the Server Iron product that is commercially available from Foundry, can provide multiple logical load balancing functions. Accordingly, a specification of a logical load-balancing function generally comprises a virtual Internet Protocol (VIP) address value, and a load-balancing policy value (e.g., "least connections," "most available bandwidth," "round robin" or any other load balancing approach). A single device, such as Foundry ServerIron, can support multiple VIPs and different policies associated with each VIP. Therefore, a single Foundry Server Iron device can be used in multiple logical load balancing positions in a given IDC.

Figure 7:
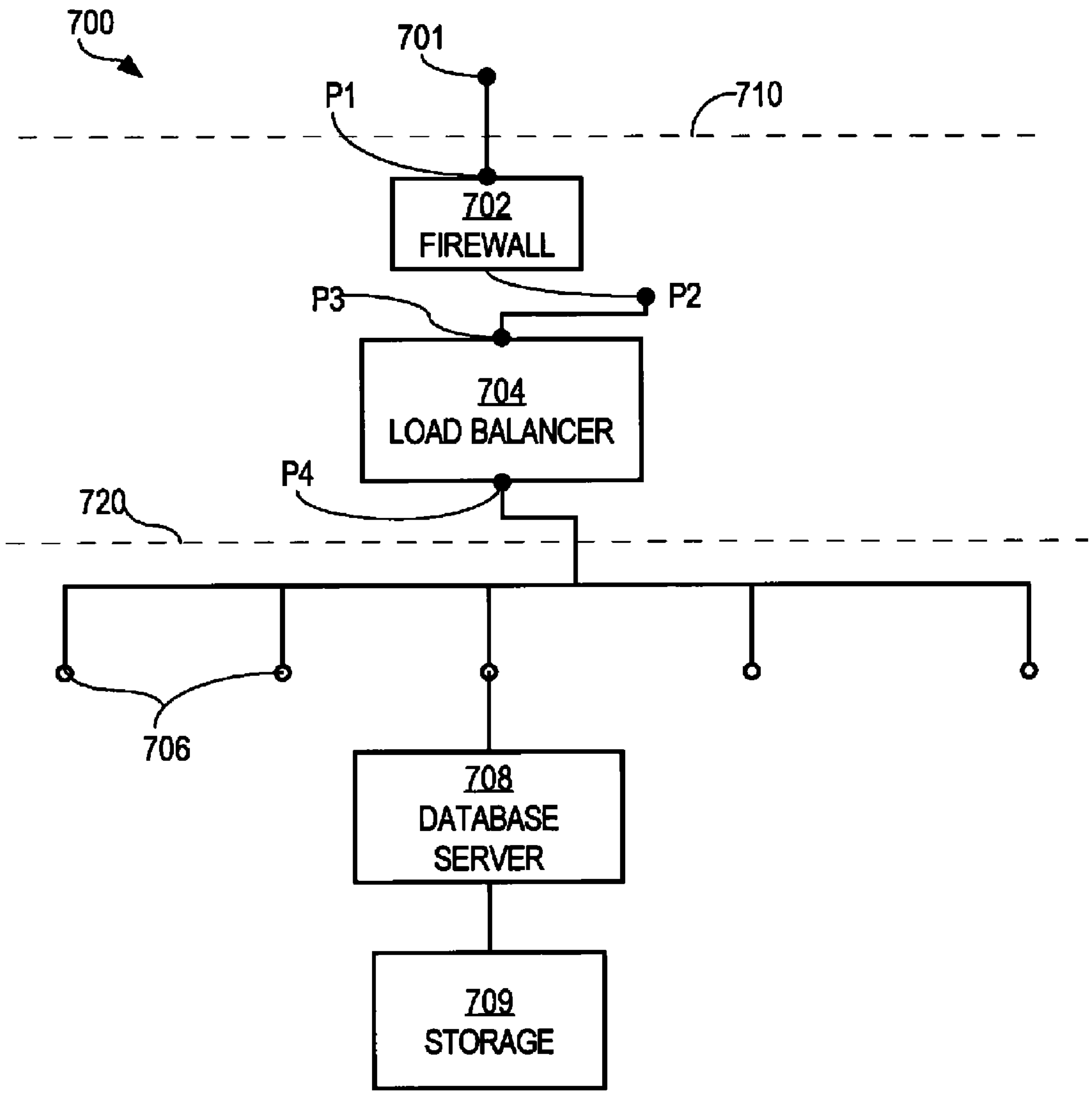
FIG. 7 is a block diagram of an exemplary two-tier server farm, according to an embodiment.

One exemplary use of a load-balancing function is to specify that a Web server tier is load balanced using a particular load-balancing function. FIG. 7, discussed further below, presents an example of a two-tier IDC having a Web server tier with a database server tier with load balancing of this type. When a tier is associated with a load balancer, automatic processes update the load balancer in response to a user adding or removing a server to or from the server tier. In an alternative embodiment, other devices are also automatically updated.

Another exemplary use of a load-balancing function is to specify a load-balancing function for a tier of application servers, which are logically situated behind the load-balanced Web server tier, in a 3-tier configuration. This permits clustering of the application server tier to occur using hardware load balancing, instead of application specific load balancing mechanisms. This approach may be combined with application-specific clustering mechanisms.

Other building blocks include firewalls, servers, storage, etc.

3.0 Editor for Creating Instant Data Centers

In an embodiment, a graphical user interface tool ("editor") is provided for use in defining one or more instant data centers (IDCs). In one embodiment, the editor enables a user to define a data center by selecting icons representing computing elements, firewalls, load balancers, etc., and connecting them in a desired logical structure. In one embodiment, the editor forms part of a customer control center application that provides numerous additional administration and management functions for defining and interacting with IDCs.

For example, an embodiment of a customer control center may provide: creation of customer accounts; presentation of a customer home page with information specific to a particular customer; design and creation of instant data centers; configuration management; an event viewer; monitoring of IDCs that are deployed and executing tasks; reports on the status and performance of IDCs; management of back-up and restore operations for IDCs; service and account administration; and customer support. Using these functions, the customer control center enables a user to visually design one or more IDCs and specify associated service parameters, such as backup policy. In conjunction with a sales process, the customer can request the validation of an IDC design for implementation. The user may activate approved, validated IDC designs, thereby creating an operational computing center that is remotely accessible and ready for customization and test prior to full-scale deployment. Additionally, there may be remote access to servers for customization (e.g., addition of content or applications), monitoring and management of operations, scaling through cloning and addition of servers, network and storage capability, and customer care functions through a service desk facility.

Creation of customer accounts may include: creation and management of customer accounts; providing a data entry template and fields for customer information; and creating and storing selected levels of access privileges for users. In one embodiment, creation of a customer account is one means by which a new customer is registered in the system. Creation of a customer account can be carried out by an employee of Service Provider 126 in the presence of a customer, or by telephone, or by a customer itself. In the registration process, customer identifying information is entered and stored, e.g., customer name, customer title, company name, company address, company phone number, customer contact information, customer email address, marketing information login password, etc. A customer is then designated as possessing one or more of the roles identified above. Creation of customer accounts may be carried out using application software from the Clarify eBusiness Applications unit of Nortel Networks, San Jose, Calif.

In one embodiment, each user is associated with a role (administrator, manager, service provider, customer, etc.), and each user role implicitly carries a particular permission level. In one embodiment, a privilege hierarchy is defined in which a master administrator is superior to one or more service providers, each service provider is superior to one or more customers of the service provider, and each customer is superior to one or more service level agreements entered into between the customer and its service provider. In this approach, each user's scope of authority is limited to subordinate nodes or users. For example, customers can see and manipulate only their own IDCs and services, and a particular service provider can see and manipulate only its customers. Other customer account functions may include integration into a customer database, addition and deletion of specific individuals or customers over the life of an account, and password management.

Based on this hierarchy, a plurality of privileges is defined, as illustrated in Table 1.

TABLE 1

| PRIVILEGE EXAMPLES | |
|---|---|
| 1. | A view-only privilege for management personnel. This level of access enables a customer to log into the customer control center and only view high-level monitoring and report data. Not all reports and monitoring data can be viewed by this privilege level, which is the lowest level. |
| 2. | A view-only privilege for operations personnel. This level of access is for IT operations team members who have personal responsibility for infrastructure management, and thus have the need to see detailed reports and monitoring data. |
| 3. | A management/design privilege. At this level, customers have access to all the tools that are provided for creation and maintenance of the infrastructure. |
| 4. | An approval privilege. Customers at this level are required to approve any changes to the infrastructure. These customers are likely to be in the management chain of the employees who hold the management privilege. Their electronic approval is required for any infrastructure changes. |
| 5. | A guest privilege. This level of access is used for sales, marketing, and demonstration purposes. |

Creation of a customer account may also involve entering a customer service profile that identifies the services to which the customer is subscribing.

The customer home page is the starting location for each customer upon login. It serves as a portal to the rest of the customer control center. Further, it serves as a place at which news, events or activities are highlighted. All classes of users can access the customer home page. Presentation of a customer home page may include: presentation of system-wide network status information; system wide alert information; system-wide maintenance schedule information; CERT advisories, system-wide environmental data; providing an online bulletin board for notification and availability of software updates; providing top level IDC status information; and providing marketing updates, e.g., availability of new services and competition updates.

Design and creation of Instant Data Centers generally involves providing a drag-and-drop graphical editor with which a user may draw server farm designs. In one embodiment, the editor includes a palette that features icons representing standard server farm elements. For example, icons may represent hardware elements such as: firewalls; load-balancers; servers (e.g., one or more icons for one or more brands of servers having various processor combinations, NT/IIS servers implemented using a particular platform); database servers (e.g., an icon for a server having various processor and RAM configurations); generic or general purpose servers (e.g., icons for various servers have a particular processor architecture and operating systems with various processor and RAM configurations); and Internet/network connectivity (e.g., an icon representing the Internet, icons representing simulated network loads for use in stress testing).

Other functions of the editor may include: defining tiers (i.e., a group of identical systems); automatic configuration and reconfiguration of load balancer(s) as an IDC scales in size; automatic configuration of firewalls; connect or wire-up discrete elements into a fully functional multi-tier network; copying or pasting server elements using server cloning; and deleting elements.

The editor may be implemented, for example, in the form of a software plug-in, such as a plug-in for Microsoft Visio or any other suitable drawing application such that a drawing may be saved in FML format. Alternatively, the editor may be implemented as a standalone software application program that can accept Visio format drawings as input. The editor may provide the ability to display a graphical representation of a virtual server farm in an alternative view format, e.g., a spreadsheet view having one row for each element in the virtual server farm. The view format also may be FML source text format, binary format, etc. Functions for converting from a view of one format to another may be provided.

The editor may also provide the ability to "submit" a design of a data center for review and approval by Service Provider 126 and the ability to save and organize designs in a folder-like structure, including naming different designs or IDCs. Another function may provide the ability to designate the status of designs, using various status values, e.g., UDC in design (under construction), IDC pending validation, Approved DC—inactive, Active IDC, Archived IDC. Yet another function may provide an ability to activate approved designs, including manual activation by the customer, when needed; designating a start date and time for activation; and designating a duration of activation (e.g., by start and end date)

Server farm element configuration is provided so that once a logical server farm architecture is created and stored, a customer can configure each element of the server farm with appropriate software, e.g., software other than the operating system or other basic server software. The customer is given access to each element to configure the machines with desired software. The server farm element configuration function may have numerous sub-functions. For example, in one embodiment, a sub-function enables a user to remotely and securely login into any individual element within an DC, using a security application, such as Secure Shell (SSH), a PCAnywhere client, or any other application that allows for remote secure login.

Another function provides information on the status and location of tapes or other media that customers have sent to Service Provider 126 for loading on to their IDC(s). For example, a customer can send in tapes of other media, and Service Provider 126 loads the media in a device in an online staging location that is accessible and viewable by the customer. The Service Provider 126 notifies the customer when the media is accessible at that location and provides the location. The customer then remotely loads a software image from the specified location to each machine that needs the image.

Still another function enables configuration of non-standard, customer configured server farm elements, for example, application servers, NFS servers, FTP servers, mail servers, etc. Yet another function may provide the ability to download software images via the Internet to any element of an IDC.

Using another sub-function, a user can view and modify detailed property values for any element within an DC, e.g., element type/role, tier identification, element name, hardware configuration (CPU, Memory, Disk), software configuration (installed software images, versions for those images, designation of maintenance ownership of each image (e.g., Service Provider 126 or customer)). Another sub-function provides software patch and upgrade management, including the ability to upgrade IDC elements with the latest patches and upgrades for software images. This may include providing a menu of all patches for all software packages that are supported for various server and platform types, although such functionality is not required. A customer may request the installation of patches, and the system can provide notification to customers about the availability of new patches or upgrades and how they can be installed onto their IDCs.

The Event Viewer function can be used to track changes in status for each IDC, by providing time stamping for events, information identifying the originator of an event, and event detail. Events may include addition or removal of one or more DC elements, generation of back-up logs, and generation of downtime logs. Thus, the Event Viewer provides a way to see a running log of IDC activity.

Monitoring is the real-time observation of an active IDC. Monitoring functions provide real-time status information about each IDC and its associated elements. Monitoring may result in creating one or more events in response to monitored conditions, including alerts or notifications. The Monitoring function may be implemented, for example, using a monitoring application, such as Hewlett-Packard OpenView. The function may provide monitoring information for other applications (e.g., database, transaction chains, FTP, email, URLs and URL transaction monitors), servers (e.g., CPU utilization, disk space, memory, network, server services, Web server monitors), network monitors (e.g., DNS, ping, port, and SNMP monitors), etc. Advanced monitors may include a composite monitor, directory monitor, file monitor, LDAP monitor, link check monitor, log file monitor, news monitor, NT Performance/Dialup/Event monitor, script monitor, URL list and content monitor, etc.

A related sub-function may provide customer configuration of alerts and notifications that they want to receive when monitored item reaches predefined thresholds or fails, and how they want to receive them (e.g., email, pager, telephone).

Another function may provide reports on the status and performance of IDCs. Reports are defined as statistical information that is collected over a specified period of time, or the ability to view such information for a specified time period. Whereas monitoring is provided in real time, reports are focused on creating logs and archives of data that interests a customer. For example, the system may generate the following reports: reports on any of the monitors described herein; traffic patterns; bandwidth usage; active IDCs; customer support history. In one embodiment, there is a customer report request interface that enables a user to view reports using a browser, send reports via email, export of report data for external processing, and access a menu of reports.

The reporting function may also enable customers to select the reports they want to access and may provide the ability to specify dates or ranges of dates for reports to cover. The reporting functionality may also enable a user to schedule automated generation of reports, e.g. weekly/monthly traffic reports and weekly/monthly billing reports.

In one embodiment, a back-up and restore management function provides a mechanism for customers to manage backup and restore activities. The back-up and restore management function may enable a user to schedule back-ups (e.g., daily incremental backup, weekly full backup, monthly off-line backup). In one embodiment, there is an interface to a separate customer care system for management of requests. An example of a customer care system is the Remedy trouble ticketing system or the Clarify customer relationship management system.

The service and account administration function deals with the ongoing administration of a customer's account. Using this function, customers may determine which services they wish to purchase and deploy from Service Provider 126. For example, a customer may have multiple IDC designs in their account, some active, some inactive. Not every IDC will utilize all of the same services. One IDC may have Instant Scaling Services turned on while another IDC may simply be a static IDC. Some IDCs may be utilizing the stress testing service, while others may not.

Accordingly, using the service and account administration function, a customer can display a menu or matrix of the DC designs a customer has created/had approved, the services applied to the IDCs, and the additional services available to the customer for each of those IDCs. Thus, the service and account administration function acts as an order form for a customer.

The service and account administration function may enable a user to display an online matrix of services to which the user subscribes and how they relate to IDC versions. It may provide billing reports, online viewing of service level agreements, and contract administration.

The customer support function may provide: an interface to a customer care system; case management; a communication hierarchy for different kinds of events and multiple media vehicles for customers to be notified of such events; online documentation; online help; a solutions database and lists of frequently asked questions; operational procedures documentation; and contact information for customer service representatives.

Figure 1E:
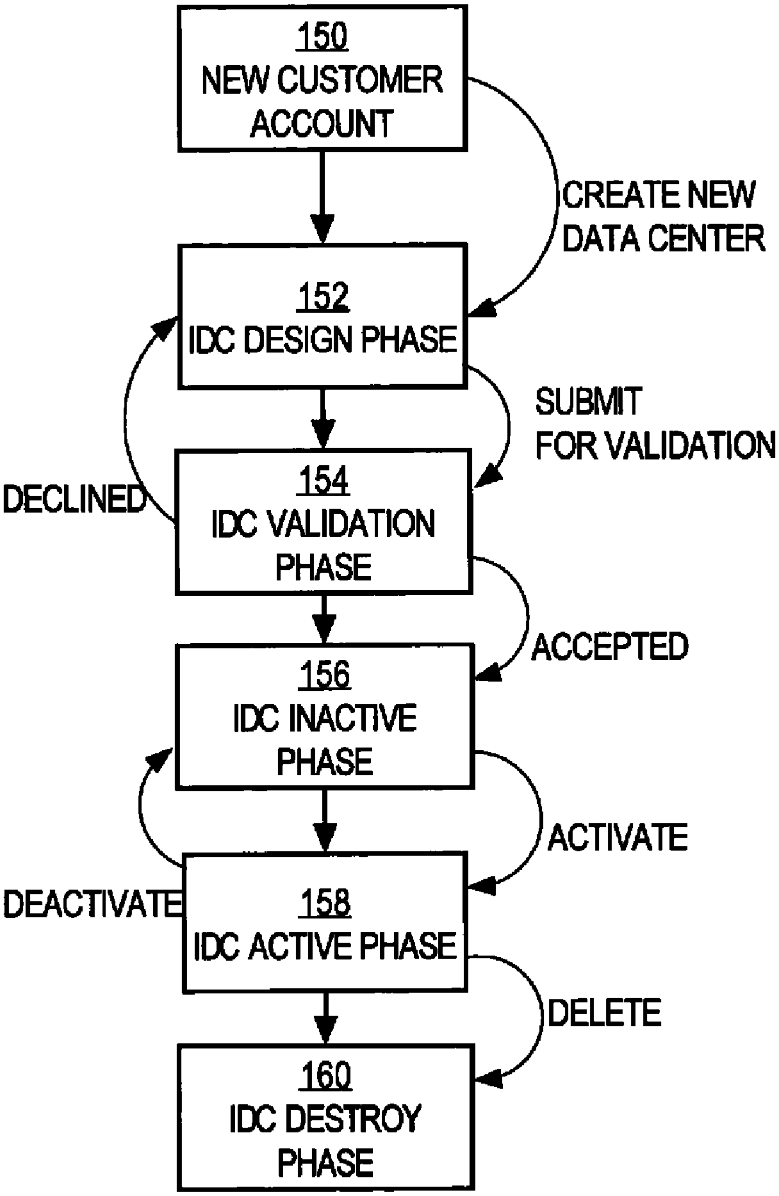
FIG. 1E is a block diagram illustrating stages in the creation and deletion of an instant data center, according to an embodiment.

FIG. 1E is a block diagram illustrating stages in the creation and deletion of an instant data center, according to an embodiment. The states of FIG. 1E are exemplary stages through which an instant data center may pass using a control center having the foregoing functions. In block 150, a new customer account is created using the control center. The customer creates a new instant data center during IDC design phase 152. In IDC validation phase 154, the customer submits the instant data center design to Service Provider 126 for review and validation. If Service Provider 126 declines to validate the DC, control returns to IDC design phase 152 for modification of the design. If the DC is accepted by Service Provider 126, it enters an Inactive state, as indicated by block 156. The DC is activated by the customer, entering an Active state, as represented by block 158.

If the MC is subsequently de-activated, it returns to the Inactive state of block 156. If the IDC is deleted permanently, DC destroy phase 160 is carried out, resulting in logical tear-down or destruction of the IDC. Tear-down or deletion of an DC makes its computing elements available for use in one or more other IDCs.

In one embodiment, an editor useful in creating textual representation of IDCs is implemented in an object-oriented computer programming language, including but not limited to, Java® or C++. The editor creates and stores information according to a pre-defined object model. As the user creates a graphical representation of a data center, the editor creates and stores a representation of the DC using objects of the object model.

An object broker is responsible for creating, removing and retrieving programmatic objects that are created according to a specified object model. The object broker may retrieve the model objects by loading them from a custom database, or by interacting with the databases of external systems such as billing system, customer care system, etc. A broker may also create proxies in place of concrete objects to allow lazy loading of model objects and to reduce the large one-time hit of initially loading an entire graph of model objects.

Figure 3A:
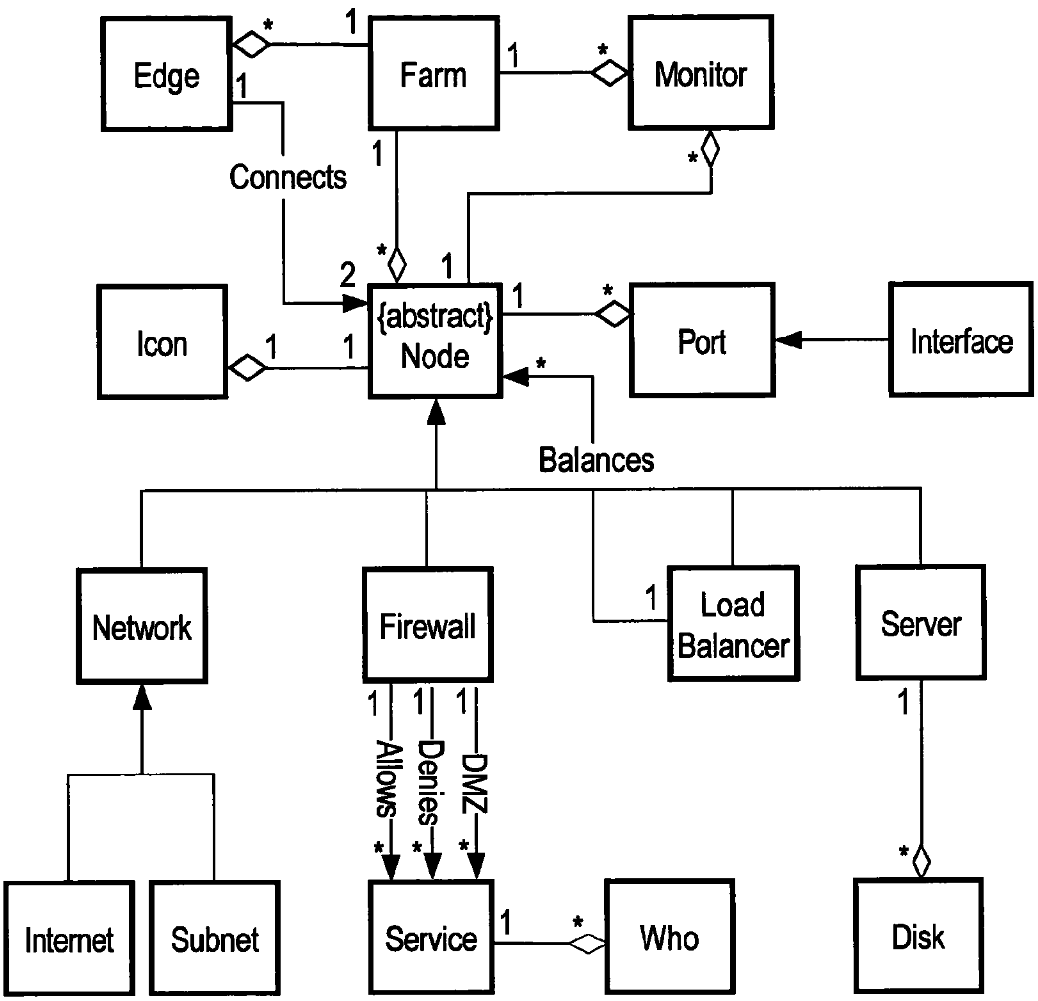
FIG. 3A is a block diagram of an exemplary object-oriented information model that may be used in an embodiment.

FIG. 3A is a block diagram of an exemplary object-oriented information model that may be used in an embodiment. The table in Section 8.0 entitled "CLASS EXAMPLES" herein describes the attributes for each class, the type, the description and the legal values for each of the attributes, and whether they are configurable when the DC is under design or active.

4.0 Farm Editor Markup Language Overview and Processing

In an embodiment, a textual representation of a data center is created and stored using statements expressed in a language that is based on Extensible Markup Language (XML). In one embodiment, a Farm Editor Markup Language (FEML) is used to describe the topology of a data center. The FEML is defined as a plurality of XML Document Type Definitions (DTDs), as set forth in Table 14 herein. FEML provides an intermediate representation that may be used to transfer information from the editor object model. In one embodiment, FEML is converted into a final representation, Farm Markup Language (FML), for use in implementing a data center.

Figure 3B:
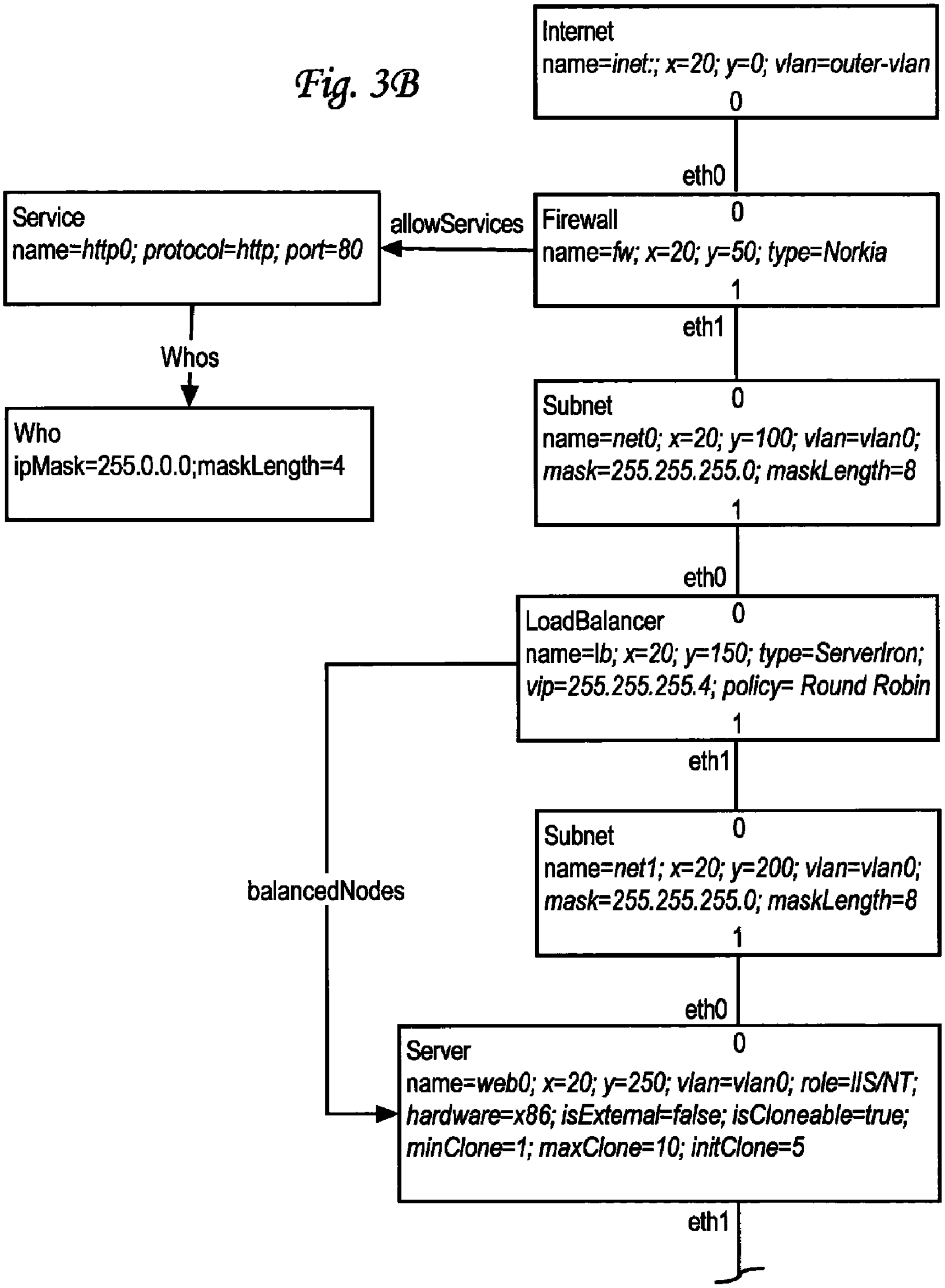
FIG. 3B and FIG. 3C is a block diagram of objects that may be instantiated to represent a particular exemplary data center.
Figure 3C:
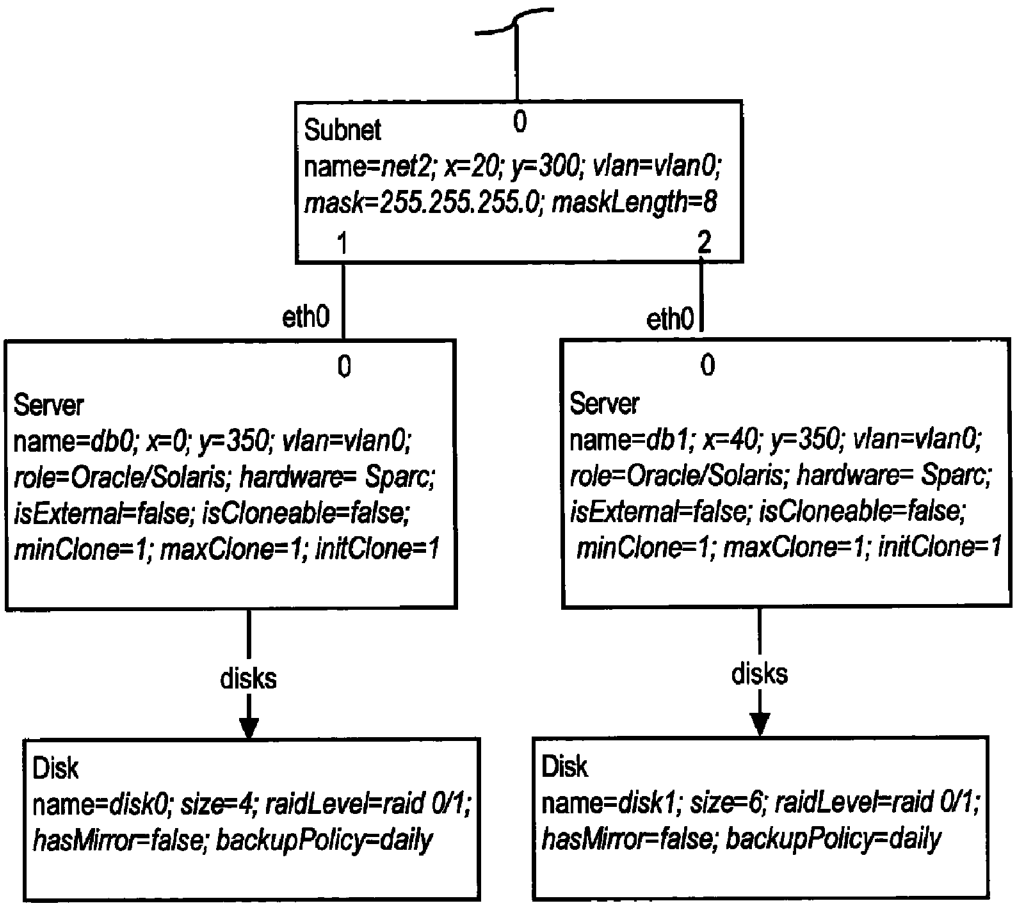

FIG. 3B and FIG. 3C is a block diagram of objects that may be instantiated to represent a particular exemplary data center, according to an embodiment. The data center illustrated in FIG. 3B and FIG. 3C may be defined in FEML as set forth in Table 2.

TABLE 2

TEXTUAL REPRESENTATION IN FEML OF THE DATA CENTER ILLUSTRATED IN FIG. 3B AND FIG. 3C

```
<?xml version="1.0"?>
<farm name="farm0">
<!-- Node definitions -->
<internet name="inet" x="20" y="0" vlan="outer-vlan"/>
```

TABLE 2-continued

TEXTUAL REPRESENTATION IN FEML OF THE DATA
CENTER ILLUSTRATED IN FIG. 3B AND FIG. 3C

```
<firewall name="fw" x="20" y="50" type="Nokia">
    <interface name="eth0" network="inet"/>
    <interface name="eth1" network="net0"/>
    <interface name="eth2"/>
    <allow-services>
        <service name="http0" protocol="http" port="80">
            <who ip-mask="255.0.0.0" mask-length="4"/>
        </service>
    </allow-services>
    <deny-services></deny-services>
    <dmz-services></dmz-services>
</firewall>
<subnet name="net0" x="20" y="100" vlan="vlan0" mask=
"255.255.255.0" mask-
        length="8"/>
<loadbalancer name="lb" x="20" y="150"type="Serverlron" vip=
"255.255.255.4"
    policy="Round Robin" balanced-nodes="web0">
    <interface name="eth0" network="net0"/>
    <interface name="eth1" network="net1"/>
</loadbalancer>
<subnet name="net1" x="20" y="200" vlan="vlan0" mask=
"255.255.255.0" mask-
        length="8"/>
<server name="web0" x="20" y="250" role="IIS/NT" hardware="x86"
        external="false"
    cloneable="true" min-clone="1" max-clone="10" init-clone="5">
    <interface name="eth0" network="net1"/>
    <interface name="eth1" network="net2"/>
</server>
<subnet name="net2" x="20" y="300" vlan="vlan0" mask=
"255.255.255.0" mask-
        length="8"/>
<server name="db0" x="0" y="350" role="Oracle/Solaris"
hardware="Sparc"
        external="false"
    cloneable="false" min-clone="1" max-clone="1" init-clone="1">
    <interface name="eth0" network="net2"/>
    <interface name="eth1"/>
</server>
<server name="db1" x="40" y="350" role="Oracle/Solaris"
hardware="Sparc"
        external="false"
    cloneable="false" min-clone="1" max-clone="1" init-clone="1">
    <interface name="eth0" network="net2"/>
    <interface name="eth1"/>
</server>
<!-- Edge definitions -->
    <edge begin-node="inet" begin-port="0" end-node="fw" end-port="0"/>
    <edge begin-node="fw" begin-port="1" end-node="net0" end-port="0"/>
    <edge begin-node="net0" begin-port="1" end-node="1b0" end-
port="0"/>
    <edge begin-node="lb" begin-port="1" end-node="net1" end-port="0"/>
    <edge begin-node="net1" begin-port="1" end-node="web0" end-
port="0"/>
    <edge begin-node="web0" begin-port="1" end-node="net2" end-
port="0"/>
    <edge begin-node="net2" begin-port="1" end-node="db0" end-
port="0"/>
    <edge begin-node="net2" begin-port="2" end-node="db1" end-
port="0"/>
<farm>
```

Based on the FEML text of Table 2, FML text is generated in the form set forth in Table 3.

TABLE 3

FML REPRESENTATION OF THE FEML TEXTUAL
REPRESENTATION OF TABLE 2

```
<?xml version="1.0"?>
<farm name="farm0">
    <fw name="fw" type="Nokia">
        <interface name="eth0" vlan="outer-vlan" subnet="inet"/>
        <interface name="eth1" vlan="vlan0" subnet="net0"/>
```

TABLE 3-continued

FML REPRESENTATION OF THE FEML TEXTUAL
REPRESENTATION OF TABLE 2

```
        <interface name="eth2"/>
        <allow-services>
            <service name="http0" protocol="http" port="80">
                <who ipmask="255.0.0.0" masklen="4"/>
            </service>
        </allow-services>
        <deny-services></deny-services>
        <dmz-services></dmz-services>
        <attribute name="x" value="20"/>
        <attribute name="y" value="50"/>
    </fw>
<lb name="lb" type="ServerIron">
    <interface name="eth0" vlan="vlan0" subnet="net0"/>
    <interface name="eth1" vlan="vlan0" subnet="net1"/>
    <vip>255.255.255.4</vip>
    <policy>Round Robin</policy>
    <tier-name>web0</tier-name>
    <attribute name="x" value="20"/>
    <attribute name="y" value="150"/>
</lb>
<tier name="web0">
    <interface name="eth0" vlan="vlan0" subnet="net1"/>
    <interface name="eth1" vlan="vlan0" subnet="net2"/>
    <role>web0</role>
    <min-servers>1</min-servers>
    <max-servers>10</max-servers>
    <init-servers>5</init-servers>
    <attribute name="x" value="20"/>
    <attribute name="y" value="250"/>
</tier>
<fixed-server name="db0">
    <interface name="eth0" vlan="vlan0" subnet="net2"/>
    <interface name="eth1"/>
    <role>db0</role>
    <attribute name="x" value="0"/>
    <attribute name="y" value="350"/>
</fixed-server>
<fixed-server name="db1">
    <interface name="eth0" vlan="vlan0" subnet="net2"/>
    <interface name="eth1"/>
    <role>db1</role>
    <attribute name="x" value="40"/>
    <attribute name="y" value="350"/>
</fixed-server>
<server-role name="web0">
    <diskimage>IIS/NT</diskimage>
    <ip>internal</ip>
    <hw>x86</hw>
</server-role>
<server-role name="db0">
    <diskimage>Oracle/Solaris</diskimage>
    <ip>internal</ip>
    <hw>Sparc</hw>
    <disk drivename="disk0" drivesize="4">
        <attribute name="raid-level" value="raid 0/1"/>
        <attribute name="remote-mirror" value="false"/>
        <attribute name="backup-policy" value="daily"/>
    </disk>
</server-role>
<server-role name="db1">
    <diskimage>Oracle/Solaris</diskimage>
    <ip>internal</ip>
    <hw>Sparc</hw>
    <disk drivename="disk1" drivesize="6">
        <attribute name="raid-level" value="raid 0/1"/>
        <attribute name="remote-mirror" value="false"/>
        <attribute name="backup-policy" value="daily"/>
    </disk>
</server-role>
<subnet name="net0" mask="255.255.255.0" masklen="8"
vlan="vlan0">
    <attribute name="x" value="20"/>
    <attribute name="y" value="100"/>
</subnet>
<subnet name="net1" mask="255.255.255.0" masklen="8"
vlan="vlan0">
    <attribute name="x"value="20"/>
```

TABLE 3-continued

FML REPRESENTATION OF THE FEML TEXTUAL REPRESENTATION OF TABLE 2

```
    <attribute name="y"value="200"/>
  </subnet>
  <subnet name="net2"mask="255.255.255.0"masklen="8"vlan="vlan0">
    <attribute name="x" value="20"/>
    <attribute name="y" value="300"/>
  </subnet>
  <attribute name="edge" value="inet 0 fw 0">
  <attribute name="edge" value="fw 1 net0 0">
  <attribute name="edge" value="net0 1 lb0 0">
  <attribute name="edge" value="lb 1 net1 0">
  <attribute name="edge" value="net1 1 web0 0">
  <attribute name="edge" value="web0 1 net2 0">
  <attribute name="edge" value="net2 1 db0 0">
  <attribute name="edge" value="net2 2 db1 0">
  <attribute name="internet-name" value="inet"/>
  <attribute name="internet-x" value="20"/>
  <attribute name="internet-y" value="0"/>
  <attribute name="internet-vlan" value="outer-vlan"/>
  <attribute name="internet-count" value="1"/>
</farm>
```

FIG. 4 is a two-part block diagram of a process of creating a text representation of a data center based on an object model representation of the data center, and the converse process, according to an embodiment. More specifically, FIG. 4 illustrates processes of generating FEML text and FML text based on a JavaScript object model, and the converse process of generating a JavaScript object model based on FML text. Note that JavaScript is used in FIG. 4 as an example, and other scripting languages may be used.

Figure 4A:
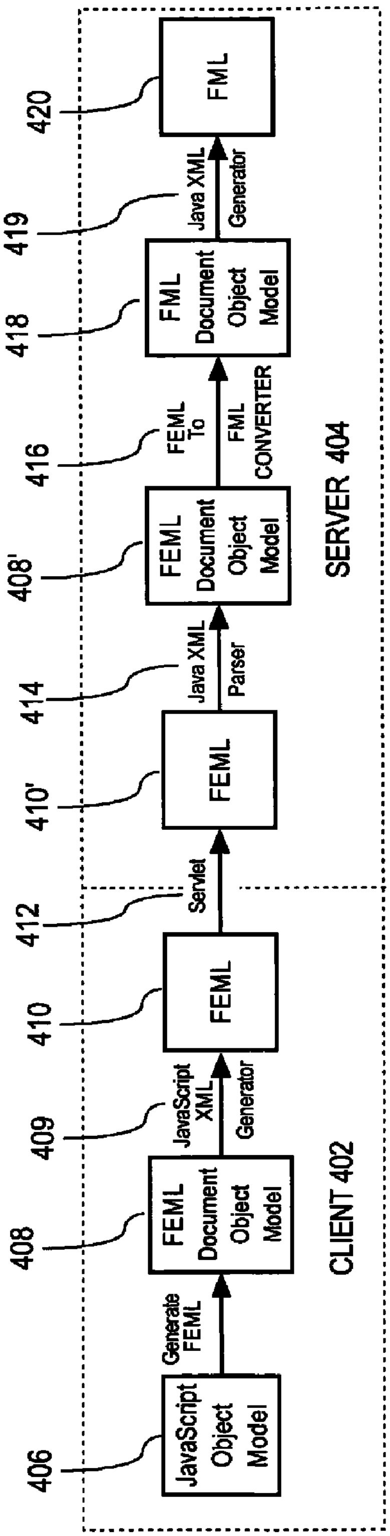
FIG. 4 is a two-part block diagram of a process of creating a text representation of a data center based on an object model representation of the data center, and the converse process, according to an embodiment.

Referring now to FIG. 4A, a process of generating FML text based on a JavaScript object model is described. At a client 402, a JavaScript object model 406 is created and stored. In one embodiment, client 402 is a browser executed at an end user computer. The JavaScript object model 406 comprises an object representation of a data center that is created and stored by the graphical user interface tool described herein.

Using a client process, which may form part of the graphical user interface tool such as GUI tool 407, text in Farm Editor Markup Language is generated, resulting in creating and storing an FEML document object model 408. A JavaScript XML Generator 409 is applied to the FEML document object model 408, resulting in creating and storing FEML text 410.

A servlet 412 transfers a copy of FEML text 410' to server 404. In one embodiment, server 404 is associated with a service provider that implements a computer system based on the FML text and using computing grid elements that are owned, operated, or managed by the service provider. Upon receiving FEML text 410', server 404 applies a Java XML parser 414 to the text, resulting in creating and storing an FEML document object model 408'. Normally FEML document object model 408' will be a copy of FEML document object model 408.

Server 404 then applies an FEML-to-FML converter 416 to the FEML document object model 408', resulting in creating and storing an FML object model 418. Server 404 applies a Java XML Generator 419 to the FML object model 418, resulting in creating and storing FML text 420.

Figure 4B:
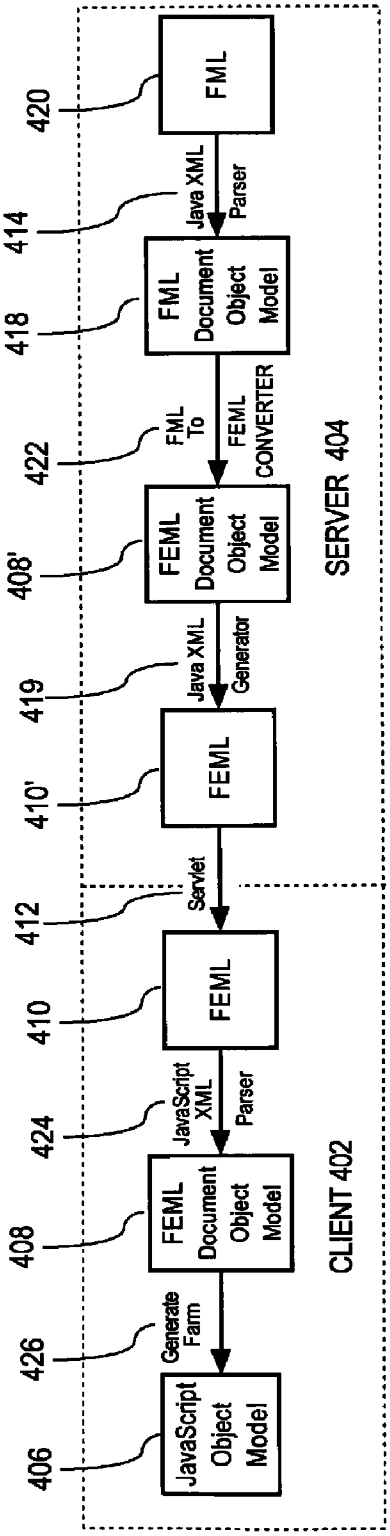

Referring now to FIG. 4B, the converse process of FIG. 4A is described, namely a process of generating a JavaScript object model based on FML text. In the converse process of FIG. 4B, the initial input is a set of FML text 420. The Java XML parser 414 is applied to the FML text 420, resulting in creating and storing FML object model 418. An FML to FEML converter 422 is applied to the FML object model 418, resulting in creating and storing FEML document object model 408'. The Java XML Generator 419 is applied to the object model, resulting in creating and storing FEML text 410'.

Servlet 412 passes FEML text 410' from server 404 to client 402, which stores FEML text 410. A JavaScript XML Parser 424 is applied to FEML text 410, resulting in creating and storing FEML document object model 408. Client 402 carries out a Generate-Farm process on FEML document object model 408, such as by using a Farm generator tool 426, resulting in creating and storing JavaScript object model 406, which may be imported into and manipulated by the client editor.

5.0 Symbolic Definition Language Specifics

5.1 Concepts

The approaches disclosed herein are related to use of a computer system for creating and storing a definition of a data center in a symbolic definition language. The language expresses the logical structure of a data center in a syntactically concise and consistent manner. The language may be used to describe a data center and the internal components of the data center, such as servers, load balancers, firewalls, etc. The symbolic definition language provides the ability to describe a data center at a high level of abstraction, in terms of its basic building blocks and their interconnectivity via virtual local area networks (VLANs).

In the symbolic definition language, a data center is defined in terms of the devices in the data center and the interconnections of those devices. Devices are defined in terms of connectivity to other devices, configuration of the devices, and roles of the devices. In some embodiments, the latter only applies to devices that are CPUs. Using the symbolic definition language disclosed herein, internal logical structures of a virtual server farm may be instantiated, modified, and duplicated or "cloned." In one embodiment, the symbolic definition language conforms to a grammar of XML and is defined according to XML DTDs.

Generally, the symbolic definition language presents a farm as a structure composed of devices or sets of devices that have both connectivity information as well as configuration related information. The connectivity information describes how the various devices are interconnected by describing how the device ports are connected to specific VLANs. Each VLAN is referenced using symbolic references that are mapped to specific VLANs when the data center is instantiated in a particular segment of a computing grid, e.g., the type of computing grid described by Aziz et al.

The symbolic definition language also provides the ability to describe roles that a server may occupy in a given data center by providing an abstract description of that server. This enables an administrator or a Farm Manager software application to create and deploy multiple instances or clones of that server role in a given data center. As a result, a common recurring task in creating a server farm, e.g., configuring a machine for a particular role, becomes highly automated. A particular configuration (e.g. a web server configuration) may be repeatedly performed on many different servers automatically. The ability to specify a server role once, and then automatically clone the server role as needed provides a much needed level of automation. Further, server roles facilitate duplicating or cloning entire server farms, which may be useful for creating site mirrors at different geographic locations or creating a staging area for a future version of a site.

5.2 Language Description

In general, entries in a textual representation that conforms to the symbolic definition language are identified by a unique name value inside a type value. Elements defined in the language are subnet, interface, disk, server-role, fixed-server, tier, load balancer, firewall, and device, each of which is now described.

5.2.1 Subnet Definition

A subnet is defined using an IP address type with an optional netmask value and a VLAN value. Multiple subnets may be part of the same VLAN. Elements inside a subnet definition can include one or more of the following: a name value, ip value, mask value, and VLAN value. The name value comprises a mandatory unique identifier of the subnet. The ip value is mandatory and may have one of two possible values. The value "internal" is used for any network address that is valid only inside a dataplane. The value "external" is used for any valid IP address visible on the Internet. The mask value is an optional netmask value on the subnet, and defines the maximum number of devices that can be connected on this subnet. The VLAN value is a mandatory name identifier.

As an example, the textual representation

<subnet name="inner" ip="internal" vlan="inner-vlan"> is defining an internal subnet bind to the inner VLAN. Further, the text

<subnet name="outer" ip="external" mask="255.255.255.252" vlan="outer-vlan"> is defining an external subnet bind on the outer VLAN with four reserved IP addresses.

5.2.2 Interface Definition

Interfaces are required parts of the definition of all devices attached to a subnet. In an embodiment, there are two ways to provide an interface definition, generic and specific. A generic definition binds the interface to a subnet, and a specific definition gives an IP address value, a netmask value, and a VLAN value.

In one embodiment, if there is only one Ethernet interface declared, it is always named "eth0."

Each generic interface definition comprises a name value and a subnet value. The name value is mandatory and provides a logical identifier of a real hardware interface associated with the device. Examples of logical identifiers are 'eth0' for the first Ethernet interface, 'eth1' for the second Ethernet interface. The subnet value provides the name of a defined subnet.

As an example, the text <interface name="eth0" subnet="sub1"/> defines the first interface of a device in the 'sub1' subnet.

A specific definition of a subnet includes a name value, ip value, mask value, and VLAN value. The name value has the same value specified above for the generic definition. The ip value is the host IP address for the interface. The mask value is the netmask associated to the IP address. The VLAN value is the name of the VLAN name where the interface must belong. For example, the text <interface name="eth1" ip="129.157.179.15" mask="255.255.255.0" vlan="test-vlan"/> defines the second interface of a device with IP address and netmask on test-VLAN.

When an IDC is instantiated using such a definition, a DNS entry is configured to map the defined IP address. The rule for DNS name of a device is as follows:

For interface eth0 of the device, the DNS name is <devicename>.<zonename>. For all other interfaces the DNS name is <devicename>-<interfacename>.<zonename>. For example, if a device name is myhttpserver and zone name is farm1.cnet.terraspring.com, then for interface eth0 DNS name will be myhttpserver.farm1.cnet.terraspring.com. For interface eth1, DNS name will be myhttpserver-eth1.farm1.cnet.terraspring.com, etc.

5.2.3 Disk Definition

A disk definition is part of the server-role definition. A disk definition comprises a drivename value, drivesize value, and drivetype value. The drivename value is a mandatory, unique name for the disk. The drivesize value is the size of the disk in Megabytes. The drivetype value is the mirroring type for the disk. For example, standard mirroring (specified using the value "std") may be specified.

As a usage example, the text <disk drivename="/test" drivesize=200 drivetype="std" /> defines a 200 Mb disk map on /test.

Automatic processing of storage requests in response to disk tags is described further herein in section 5.7.2.

5.2.4 Server Role Definition

According to an embodiment, a server role is part of the definition of a fixed server or and server tier. Each server role definition comprises a name value, a diskimage value, a hardware value, and optionally also may include a disk value. The name value is a mandatory value provided to uniquely identify the abstract role involved for servers having the definition. The diskimage value is a mandatory reference to a disk image that is always loaded on servers associated with the role. The hardware (or "hw") value is a mandatory value that provides a hardware type definition associated with the role. The disk value is optional and provides a disk definition for the role.

Table 4 provides an example of a server role definition expressed in the symbolic definition language. This server role definition may form one of the basic elements of a data center.

TABLE 4

SERVER ROLE DEFINITION

```
<server-role name="Solaris2">
        <diskimage> solaris27 </diskimage>
        <hw> cpu-x86 </hw>
</server-role>
```

The example set forth in Table 4 defines Web server role named "Solaris2" and specifies that each computer that is instantiated according to the server role shall have hardware type "cpu-x86" (e.g., a processor from the Intel x86 processor family) and shall use the disk image named "Solaris27." The disk image corresponding to "Solaris27" typically would comprise the Solaris operating system and one or more application programs. For example, the disk image could include a commerce server application, Web server, related scripts, etc. Examples of possible server roles include, but are not limited to: Netscape Enterprise Server/Solaris; Microsoft Internet Information Server/NT; Apache/Solaris; Apache/Red Hat Linux; and Oracle 8i/Solaris. Roles may be specified using a variety of mechanisms. Users or customers of the system can modify and change the contents of disk images over time, enabling instantiation of different kinds of servers. For example, an administrative user or customer of Service Provider 126 can allocate a server, log on to it, customize the server, and invoke a Save Disk Image command using the Customer Control Center to save the customized disk image as a customer-named role.

A role description is not tied to any particular instantiation of the role on a particular server in a data center. Various servers or sets of servers (i.e. tiers) may be instantiated using a single role definition. Use of server roles in duplicating server configurations ("cloning" servers) is described further herein in Section 5.3.

5.2.5 Fixed Server Definition

A fixed server definition in a Farm Editor Markup Language file defines a unique CPU device. Each fixed server definition comprises one or more interface values, a role value, and one or more specific attribute values. One or more interface values are mandatory and specify interface names for the device. The role value is a mandatory definition for the role carried out by fixed servers that correspond to the definition.

Table 5 presents an example of a fixed server definition.

TABLE 5

| FIXED SERVER ROLE DEFINITION |
|---|
| <fixed-server name="bebop"> |
| <interface name="eth0" subnet="sub1" /> |
| <role> Solaris2 </role> |
| </fixed-server> |

This definition specifies a fixed server device named "bebop" that has an interface named "eth0," that is located on subnet "sub1," and that is instantiated based on the server role Solaris2.

5.2.6 Server Tier Definition

A server tier definition is provided to define an extensible CPU device comprising a logical tier of one or more servers. Each tier definition comprises one or more interface values, a role value, a min-servers value, a max-servers value, and an init-servers value. The interface value is mandatory and specifies an interface name for the tier. The role value is mandatory and provides a definition of the role for the tier. The min-servers value is a mandatory value indicating the minimum number of actual servers for the tier that may exist at any given time. The max-servers value is a mandatory value indicating the maximum number of servers for the tier. The init-servers value is a mandatory value indicating then number of servers that are initialized when the tier is created.

Table 6 provides an example of a server tier definition.

TABLE 6

| SERVER TIER DEFINITION |
|---|
| <tier name="SolTier"> |
| <interface name="eth0" subnet="sub1" /> |
| <interface name="eth1" subnet="sub2" /> |
| <role> Solaris2 </role> |
| <min-servers> 5 </min-servers> |
| <max-servers> 10 </max-servers> |
| <init-servers> 6 </max-servers> |
| </tier> |

5.2.7 Load Balancer

A load balancer definition may be provided to define a load balancer device in a server farm or data center. Each load balancer definition includes a definition of a VIP and a list of devices that are to be bound to the VIP. In one embodiment, there is only one VIP entry, but alternative embodiments may comprise multiple VIP entries.

Each VIP definition comprises a name value, either a subnet value or both an IP address value and a mask value, a port value, and one or more bind entry values.

The name value is a mandatory, unique identifier of a VIP entry. The values for subnet or IP address and mask provide a mandatory IP definition for the VIP entry. The subnet value refers to an existing subnet definition, and in response, the Farm Manager allocates a unique IP address bind on the subnet. The port value is an optional port definition for the load balancer service. In an embodiment, the default port value is 80.

Each bind entry comprises a name value and an optional port value. The name value is a mandatory reference to a name of a tier, fixed server or device. The optional port value provides a port definition on the device of the load balancer service. In an embodiment, the default value is 80.

Table 7A provides an example of a load balancer definition using a subnet definition, and Table 7B provides an example of a definition using an IP value and a mask value.

TABLE 7A

| VIP ENTRY DEFINITION USING A SUBNET DEFINITION |
|---|
| <vip name="vip0" subnet="subnet0" port="8081"> |
| <bind name="WebTier" port="88" /> |
| <bind name="lb0:vip0" /> |
| </vip> |

TABLE 7B

| VIP ENTRY DEFINITION WITH IP VALUE AND MASK VALUE |
|---|
| <vip name="vip0" ip="203.135.82.141" mask="255.255.255.0" port="21"> |
| <bind name="ftptier" port="21" /> |
| </vip> |

In an embodiment, when either of the foregoing definitions are processed and to instantiate a load balancer, a DNS entry for the vip is added according to the format <lbname>-<vipname>.<zone>. For example, if the load balancer name is lb0, the vip name is vip0 and the zone name is farm1.cnet.terraspring.com, then a DNS name for the vip is lb0-vip0.farm1.cnet.terraspring.com.

A load balancer is then defined using a name value, a type value, an interface value, a policy value, and a VIP value. The name value is a mandatory unique device name identifier. The type value is a mandatory type of load balancer; in an embodiment, the value "lb" is used. At least one interface value is provided to define an interface name of the load balancer. The policy value provides a mandatory definition of the load balancer policy. Example values include round-robin, least-conn, weighted, etc. The VIP value specifies a virtual IP address for the load balance. In one embodiment, one VIP value is provided; in an alternative embodiment, multiple VIP values may be specified.

Table 7C provides an example of a load balancer definition.

TABLE 7C

LOAD BALANCER DEFINITION

```
<lb name="lb0" type="lb">
  <interface name="eth0" subnet="internet" />
  <interface name="eth1" subnet="sub1" />
  <policy>round-robin </policy>
  <vip name="vip0" subnet="internet" port="8081">
    <bind name="WebTier" />
      <bind name="bebop" port="8081" />
    </vip>
  </lb>
```

5.2.8 Firewall Definition

A FML document may comprise one or more firewall definitions that provide specifications for firewall devices. Each firewall definition comprises a name value, type value, out-interface value, in-interface value, and zero or more fw-interface values. The name value is mandatory and provides a unique device name identifier. The type value is mandatory and indicates the type of firewall. In one embodiment, "fw" is the type value. The out-interface value is mandatory and indicates an outside interface of the firewall. Similarly, the in-interface value specifies an inside interface of the firewall. The optional fw-interface value provides a reference to a separate firewall interface definition.

Each of the interface definitions within a firewall definition (out-interface, in-interface, and possibly fw-interface) comprises an interface value, zero or more allow values, and zero or more deny values. The interface value consists of a name of the interface. The allow value is a list of services to which access is allowed through the interface, and can contain zero or more service definitions. The in-interface is a list of denied services, and also can contain zero or more service definitions. Access to these services will be denied from this interface.

A service is defined by a sequence number value, name value, protocol value, port value, from value, and to value. The sequence number value gives the order in which the service is applied to the firewall interface, as illustrated by the example below. The name value provides the name of the service; examples include http, ftp, myhttp, etc. Alternatively, the name value "all" may be specified if all services are allowed or denied. The protocol value specifies the protocol of the service, e.g., tcp, udp, icmp, etc. If the service name is a standard service as specified in Table 8B herein or is specified as "all," then a protocol value need not be provided. The port value specifies the port for the service, e.g., 80, 21. If a service is not associated with a port value, e.g., ping or "all", then the port value may be omitted.

The "from" value provides a list of one or more IP values to which this service will be allowed or denied. A from element consists of either a name value, or an IP address and mask value. The name attribute can be used to allow or deny access to hosts on the in/dmz side. For example, 1. The value <from ip="192.0.0.0" mask="255.0.0.0"> will allow or deny a service to hosts coming from the domain 192.0.0.0/255.0.0.0.

2. The definition <from ip="0.0.0.0" mask="0.0.0.0"> will allow or deny a service request coming from any host.

3. The definition <from name="ftpServer:eth0"> will allow/deny a service request coming from host ftpServer's ip set on interface eth0.

4. The definition <from name="inside"I> definition will allow/deny a service to all hosts coming from the inside of the firewall, where "inside" is the name of the in-interface of the firewall.

5. The definition <from name="dmzl"/> will allow/deny a service to all hosts coming from the dmz side of the firewall, where "dmzl" is the name of the fw-interface of the firewall.

6. The definition <from name="all"/> definition will allow/deny a service coming from any host. The definitions <from name="all"> and <from ip="0.0.0.0" mask="0.0.0.0"> are equivalent.

The "to" value provides a list of one or more hosts for which a service is allowed or denied. A "to" element consists of either a name value, or an IP value and mask value. The to element in combination with an ip value and mask definition can be used to allow or deny internal hosts to some external ip domain. Some example definitions are given below:

1. The definition <to name="mylb:vip0"/> will allow or deny a service to load balancer mylb's vip vip0.

2. The definition <to ip="180.10.1.0" mask="255.255.255.0"/5 will allow/deny a service to ip domain 180.10.1.0/255.255.255.0.

3. The definition <to name="wsketh0"/> will allow or deny a service to host wsl's ip set on interface eth0.

4. The definition <to name="inside"I> will allow or deny a service to all hosts on the inside of the firewall, where "inside" is the name of the in-interface of the firewall.

5. The definition <to name="dmzl"/> definition allow or deny a service to all hosts on the dmz side of the firewall, where "dmzl" is the name of the fw-interface of the firewall.

6. The definition <to name="all/"> definition will allow or deny a service to all hosts on all side of the firewall.

Table 8A provides an example of a complete firewall definition according to the foregoing language definitions.

TABLE 8A

FIREWALL DEFINITION

```
<fw name="fw1" type="fw">
<out_interface name="outside">
      <interface name="eth0" subnet="Node0" />
      <allow>
        <service seq="2" name="http" >
          <from ip ="192.168.1.0"
          mask="255.255.255.0"/>
            <to name="ws1:eth0"/>
            <to name="lb1:vip0"/>
        </service>
        <service seq="3" name="ping" protocol="icmp">
          <from ip="0.0.0.0" mask="0.0.0.0"/>
          <to name="dmz1"/>
          <to name="inside"/>
        </service>
      </allow>
      <deny>
        <service seq="1" name="all">
          <from ip="all" mask="all"/>
            <to name="all"/>
        </service>
      </deny
    </out_interface>
    <in_interface name="inside">
      <interface name="eth1" subnet="Node1" />
      <allow>
        <service seq="1" name="smtp" >
          <from name="inside"/>
            <to name="mailServer:eth0"/> < --! This
    mailServer exists on dmz side -- >
        </service>
</allow>
    </in_interface>
    <fw_interface name="dmz1">
```

TABLE 8A-continued

| FIREWALL DEFINITION |
|---|
| <interface name="eth2" subnet="Node2" /> |
| </fw_interface> |
| </fw> |

In the service definition for a firewall device, the name of the service may be either a standard service or a user-defined service. According to an example embodiment, standard services having the names set forth in Table 8B are defined.

TABLE 8B

STANDARD SERVICE NAMES

| Name | Value | Description |
|---|---|---|
| bgp | 179 | Border Gateway Protocol as specified in RFC 1163 |
| biff | 512 | Used by mail system to notify users that new mail is received |
| bootpc | 68 | Bootstrap Protocol Client |
| bootps | 67 | Bootstrap Protocol Server |
| chargen | 19 | Character Generator |
| cmd | 514 | Similar to exec, but has automatic authentication |
| daytime | 13 | Day time as specified in RFC 867 |
| discard | 9 | Discard |
| domain | 53 | DNS (Domain Name System) |
| dnsix | 195 | DNSIX Session Management Module Audit Redirector |
| echo | 7 | Echo |
| exec | 512 | Remote process execution |
| finger | 79 | Finger |
| ftp | 21 | File Transfer Protocol (control port) |
| ftp-data | 20 | File Transfer Protocol (data port) |
| gopher | 70 | Gopher |
| hostname | 101 | NIC Host Name Server |
| nameserver | 42 | Host Name Server |
| ident | 113 | Ident authentication service |
| irc | 194 | Internet Relay Chat protocol |
| isakmp | 500 | ISAKMP |
| klogin | 543 | KLOGIN |
| kshell | 544 | Korn Shell |
| lpd | 515 | Line Printer Daemon - printer spooler |
| login | 513 | Remote login |
| mobile-ip | 434 | MobileIP-Agent |
| netbios-ns | 137 | NETBIOS Name Service |
| netbios-dgm | 138 | NETBIOS Datagram Service |
| nntp | 119 | Network News Transfer Protocol |
| ntp | 123 | Network Time Protocol |
| pim-auto-rp | 496 | Protocol Independent Multicast, reverse path flooding, dense mode |
| pop2 | 109 | Post Office Protocol - Version 2 |
| pop3 | 110 | Post Office Protocol - Version 3 |
| radius | 1645, 1646 | Remote Authentication Dial-In User Service |
| rip | 520 | Routing Information Protocol |
| smtp | 25 | Simple Mail Transport Protocol |
| snmp | 161 | Simple Network Management Protocol |
| snmptrap | 162 | Simple Network Management Protocol - Trap |
| sqlnet | 1521 | Structured Query Language Network |
| sunrpc | 111 | Sun RPC (Remote Procedure Call) |
| syslog | 514 | System Log |
| tacacs | 49 | TACACS+ (Terminal Access Controller Access Control System Plus) |
| talk | 517 | Talk |
| telnet | 23 | Telnet as specified in RFC 854 |
| Tftp | 69 | Trivial File Transfer Protocol |
| time | 37 | Time |
| uucp | 540 | UNIX-to-UNIX Copy Program |
| Who | 513 | Who |
| whois | 43 | Who Is |
| www | 80 | World Wide Web |

TABLE 8B-continued

STANDARD SERVICE NAMES

| Name | Value | Description |
|---|---|---|
| xdmcp | 177 | X Display Manager Control Protocol, used to communicate between X terminals and workstations running UNIX |

If a service is a standard service, a definition may provide only the name of the service. For example:

<service seq="1" name="ftp">

</service>

If a service is a user-defined service, then values for service name, protocol and port are required. For example:

<service seq="2" name="myhttp" protocol="tcp" port="8080">

</service>

The protocol value may be a literal value as specified in below, or it may be a valid protocol number from 0-255. Table 8C presents literal names that can be used, in one example embodiment, instead of numerical protocol values.

TABLE 8C

LITERAL NAMES AND PROTOCOL VALUES

| Literal | Value | Description |
|---|---|---|
| ah | 51 | Authentication Header for IPv6, as specified in RFC 1826 |
| eigrp | 88 | Enhanced Interior Gateway Routing Protocol |
| esp | 50 | Encapsulated Security Payload for IPv6, as specified in RFC 1827 |
| gre | 47 | General Routing Encapsulation |
| icmp | 1 | Internet Control Message Protocol, as specified in RFC 792 |
| igmp | 2 | Internet Group Management Protocol, as specified in RFC 1112 |
| igrp | 9 | Interior Gateway Routing Protocol |
| ipinip | 4 | IP-in-IP encapsulation |
| nos | 94 | Network Operating System (Novell's NetWare) |
| ospf | 89 | Open Shortest Path First routing protocol, as specified in RFC 1247 |
| pcp | 108 | Payload Compression Protocol |
| snp | 109 | Sitara Networks Protocol |
| tcp | 6 | Transmission Control Protocol, as specified in RFC 793 |
| udp | 17 | User Datagram Protocol, as specified in RFC 768 |

Other protocol numbers as specified by the Internet Assigned Numbers Authority, and corresponding names, can be supported.

5.2.9 Device Definition

A farm definition may include one or more device definitions. Each device definition is a generic definition for any type of device, and comprises a name value, a type value, one or more interface values, and one or more attribute values. The name value provides a unique identifier for the device definition. The type value provides a value indicating the type of the device. In an embodiment, one of the device type values defined in Wireless Markup Language (WML) is used. The interface value identifies an interface name for the device. For example, a device definition may comprise:

<device name="cam0" type="webcam">

<interface name="eth0" subnet="inner"/5

</device>

5.3 Server Cloning

A recurring task often encountered in creating a server farm is configuring a machine for a particular role. For example, a machine may be configured as a Web server, database server, etc. The configuration then is repeatedly performed on many different servers manually to build up tiers or arrays of servers. The ability to specify a server role once, and then automatically clone it as needed, as disclosed herein, provides a much-needed level of automation.

Role definitions have several aspects. For example, a role definition may include a description of the hardware, operating system, any patches for the operating system, and a set of applications to be loaded on a server. In addition, a role may also describe what kinds of network resources need to be accessible to a class of servers. Examples of this include having network file access (e.g. such as by using the NFS, CIFS, or other type of file system) to a set of network file servers, or database access to a set of database servers. Once a role is specified in these terms, a disk-to-disk copy, followed by any per-server customization, clones a server with the role.

In one embodiment, for dynamically cloned servers, DHCP is used for IP address assignment by default, so that no customization is needed for purposes of specifying the local IP address. Given this, the majority of role cloning can be accomplished simply by a disk-to-disk copy on the storage area network (SAN) associated with a given server farm.

Certain application-specific clustering mechanisms require the use of statically assigned IP addresses. These are supported by defining a tier of servers that has a range of IP addresses associated with it. Upon instantiation and at runtime, the Farm Manager brings servers into and out of the fixed range of IP addresses.

Table 4 above provides one example of a server role definition, and Table 9 below provides another example that will be more fully described herein.

TABLE 9

SERVER ROLE DEFINITION

```
<server-role name=”NTWebServer”>
  <diskimage> NT_IIS </diskimage>
  <hw> cpu-x86 </hw>
</server-role>
```

The example in Table 9 defines a server role named “NTWebServer.” Each server instantiated according to this server role will comprise a processor from the x86 processor family, with Windows NT as the operating system, and Microsoft Internet Information Server (IIS) as a Web server application, as indicated by the disk image specification of “NT_IIS.” The role name value refers to a predefined web server role that consists of an NT boot disk image, containing IIS 3.0 and an x86 Front End Processor as the hardware. These roles consist of a union of a predefined set that is present at Segment Installation time and a customer defined set that can grow over time for each customer. However, other roles can use other types of processors, operating systems, and server applications.

Server roles may be specified using a variety of mechanisms. The customer can allocate a server and log on to it. This server can be customized by the customer and that customized disk image can be saved as a customer named role.

A role description is not tied to any particular instantiation of the role on a particular server in a data center. Various servers or sets of servers (i.e. tiers) may be instantiated using a single role definition.

5.4 EXAMPLE COMPLETE SERVER FARM DESCRIPTIONS

A virtual server farm or instant data center may be defined by specifying that computing elements in the data center conform to one or more of the server roles that are defined as described above. A typical data center may comprise a load balancing device, and a tier of one or more web servers, one or more of which have access to a fixed file server or database server. Generally, a data center description first provides connectivity information, in terms of port to VLAN mappings for each device in the data center, and then provides device specific configuration information.

In each data center definition, a special logical VLAN, referred to as the “outer-vlan,” is defined. The “outer-vlan” is a symbolic reference to a VLAN that is associated with the outside of the data center for a specific instantiation of the data center at a Grid Segment. The “outer-vlan” is used as an anchor point for the data center description. The “outer-vlan” also is the point of entry VLAN for inbound IP traffic for a data center. Other VLANs are also referred to symbolically in the connectivity information. At a particular Grid Segment, the Administration/Management Server 130 will map each logical VLAN (including the “outer-vlan”) to specific VLANs that it allocates from among available VLANs of that Grid Segment. The “outer-elan” can be unique to each customer or end user.

Each VLAN identifier is always mapped to the same VLAN number of a given Grid Segment. Where the system of FIG. 1 serves multiple customers, each of whom has one or more server farms defined, the VLAN numbers are the same on a per customer basis. In particular, if the same VLAN string identifier is used in a single FML description, then it is mapped to the same VLAN number. However, if the same VLAN string identifier is used in multiple descriptions of different data centers, then the same VLAN string identifier is mapped to different VLAN numbers of the same switch fabric.

5.4.1 Example Two-Tier Server Farm

Table 10 illustrates a simplified example of a textual representation of a data center that defines only one class of Web servers, and the file and database server that is used by the Web servers.

TABLE 10

EXAMPLE DATA CENTER DEFINITION

```
<farm name=”My-2-Tier-Farm”, fmlversion=”1.0”>
<subnet name=”outer” ip=”external” vlan=”outer-vlan”>
</subnet>
<subnet name=”inner” ip=”internal” vlan=”inner-vlan”>
</subnet>
<!--
! put db on a separate vlan to hide traffic.
-->
<subnet name=”db” ip=”internal” vlan=”db-vlan”>
</subnet>
<lb name=”lb1” type=”lb”>
  <interface name=”eth0” subnet=”outer” />
  <interface name=”eth1” subnet=”inner” />
  <policy> round-robin </policy>
  <vip name=”vip0” subnet=”outer” port=”8080”>
    <bind name=”WebTier” port=”8080” />
  </vip>
</lb>
<server-role name=”WebServer”>
  <diskimage> NT_IIS </diskimage>
  <hw> cpu-x86 </hw>
</server-role>
<server-role name=”OracleServer”>
  <diskimage> Solaris_Oracle </diskimage>
  <hw> cpu-sun4u </hw>
  <disk drivename=”/oracle” drivesize=”4048” />
</server-role>
```

TABLE 10-continued

EXAMPLE DATA CENTER DEFINITION

```
<server-role name="FileServer">
   <diskimage> Solaris </diskimage>
   <hw> cpu-sun4u </hw>
   <disk drivename="/export" drivesize="1024" />
</server-role>
<tier name="WebTier">
   <interface name="eth0" subnet="inner" />
   <interface name="eth1" subnet="db" />
   <role> WebServer </role>
   <min-servers> 5 </min-servers>
   <max-servers> 20 </max-servers>
   <init-servers> 10 </init-servers>
</tier>
<fixed-server name="OracleServer">
   <interface name="eth0" subnet="db">
   <role> OracleServer </role>
</fixed-server>
<fixed-server name="bebop">
   <interface name="eth0" subnet="db" />
   <role> FileServer </role>
</fixed-server>
</farm>
```

Figure 5:
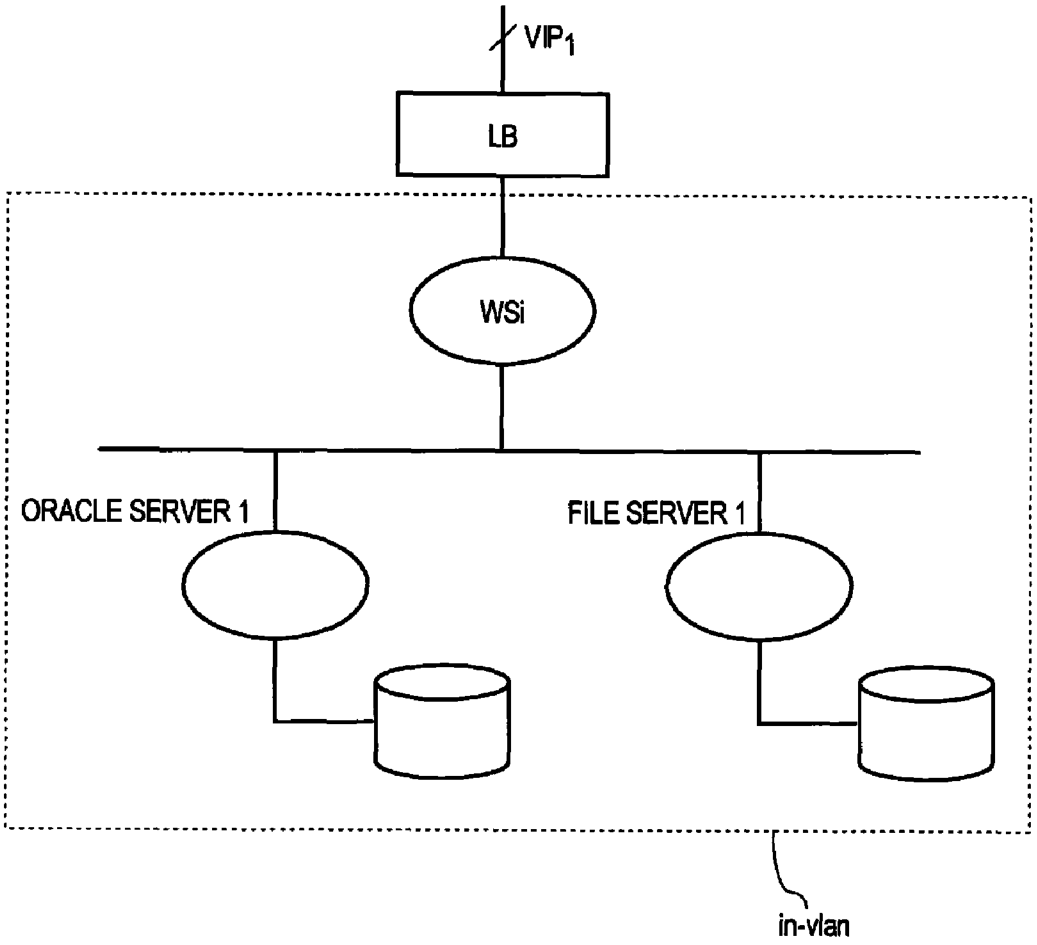
FIG. 5 is a block diagram of an exemplary two-tier server farm, according to an embodiment.

FIG. 5 is a block diagram of an exemplary two-tier server farm, according to an embodiment. The data center of FIG. 5 corresponds to the definition of Table 10. FIG. 5 and Table 10 present an example of a 2-tier server farm, with a dynamically scaled web server tier and a round robin load balancing policy that is implemented by load balancer LB. Block WSi represents a tier of one or more Web servers, each of which is a Windows NT/IIS machine. The data center contains two statically assigned servers, a file server called FileServer1 and a database server called OracleServer1. Note that Oracle Server is used as an example of a server application, and any server application can be used instead. There are two VLANs in this description, the "outer-vlan" as described above and the "in-vlan." All devices other than the load-balancer are on the "in-vlan."

In a manner similar to the way that the web server role is defined above, an application server role may be defined as follows:

```
<server-role name="weblogic appserver>
<role>"NT_WL"</role>
<hw>"cpu-x86"</hw>
</server-role>
```

In this case the application server is a WebLogic 4.5 server running on an x86 NT 4.0 platform, although any type of application server and platform can be used. It has access to the same network accessible files and databases as the Web server role defined earlier herein.

5.4.2 Three-Tier Server Farm Example

Using the role definition of an application server described above, a 3-tier server farm may be defined as set forth in Table 11:

TABLE 11

EXAMPLE THREE-TIER SERVER FARM

```
<farm name="My-3-Tier-Farm", fmlversion="1.0">
<subnet name="outer" ip="external" vlan="outer-vlan">
</subnet>
<subnet name="inner" ip="internal" vlan="iner-vlan">
</subnet>
<subnet name="db" ip="internal" vlan="db-vlan">
</subnet>
```

TABLE 11-continued

EXAMPLE THREE-TIER SERVER FARM

```
<server-role name="WebServer">
   <diskimage> NT_IIS </diskimage>
   <hw> cpu-x86 </hw>
</server-role>
<server-role name="WeblogicAppServer">
   <diskimage> NT_WL </diskimage>
   <hw> cpu-x86 </hw>
</server-role>
<server-role name="OracleServer">
   <diskimage> Solaris_Oracle </diskimage>
   <hw> cpu-sun4u </hw>
   <disk drivename="/oracle" drivesize="4048" />
</server-role>
<server-role name="FileServer">
   <diskimage> Solaris </diskimage>
   <hw> cpu-sun4u </hw>
   <disk drivename="/export" drivesize="1024" />
</server-role>
<lb name="lb1" type="lb">
   <interface name="eth0" subnet="outer" />
   <interface name="eth1" subnet="inner" />
   <policy> round-robin </policy>
   <vip name="vip0" ip="129.157.179.15"
   mask="255.255.255.0"
port="8080">
      <bind name="WebTier" port="8081" />
   </vip>
</lb>
<tier name="WebTier">
   <interface name="eth0" subnet="inner" />
   <role> WebServer </role>
   <min-servers> 5 </min-servers>
   <max-servers> 20 </max-servers>
   <init-servers> 10 </init-servers>
</tier>
<lb name="lb2" type="lb">
   <interface name="eth0" subnet="inner" />
   <interface name="eth1" subnet="inner" />
   <policy> round-robin </policy>
   <vip name="vip0" ip="129.157.179.16"
   mask="255.255.255.0"
port="8080">
      <bind name="AppTier" port="8081" />
   </vip>
</lb>
<tier name="AppTier">
   <interface name="eth0" subnet="inner" />
   <interface name="eth1" subnet="db" />
   <role> WeblogicAppServer </role>
   <min-servers> 8 </min-servers>
   <max-servers> 20 </max-servers>
   <init-servers> 10 </init-servers>
</tier>
<fixed-server name="OracleServer">
   <interface name="eth0" subnet="db">
   <role> OracleServer </role>
</fixed-server>
<fixed-server name="bebop">
   <interface name="eth0" subnet="db" />
   <role> FileServer </role>
</fixed-server>
</farm>
```

In the example of Table 11, in order to configure the web server, the application tier will need to be created first, so that its VIP can be configured as part of the WebLogic plug-in configuration on the web server.

Figure 6:
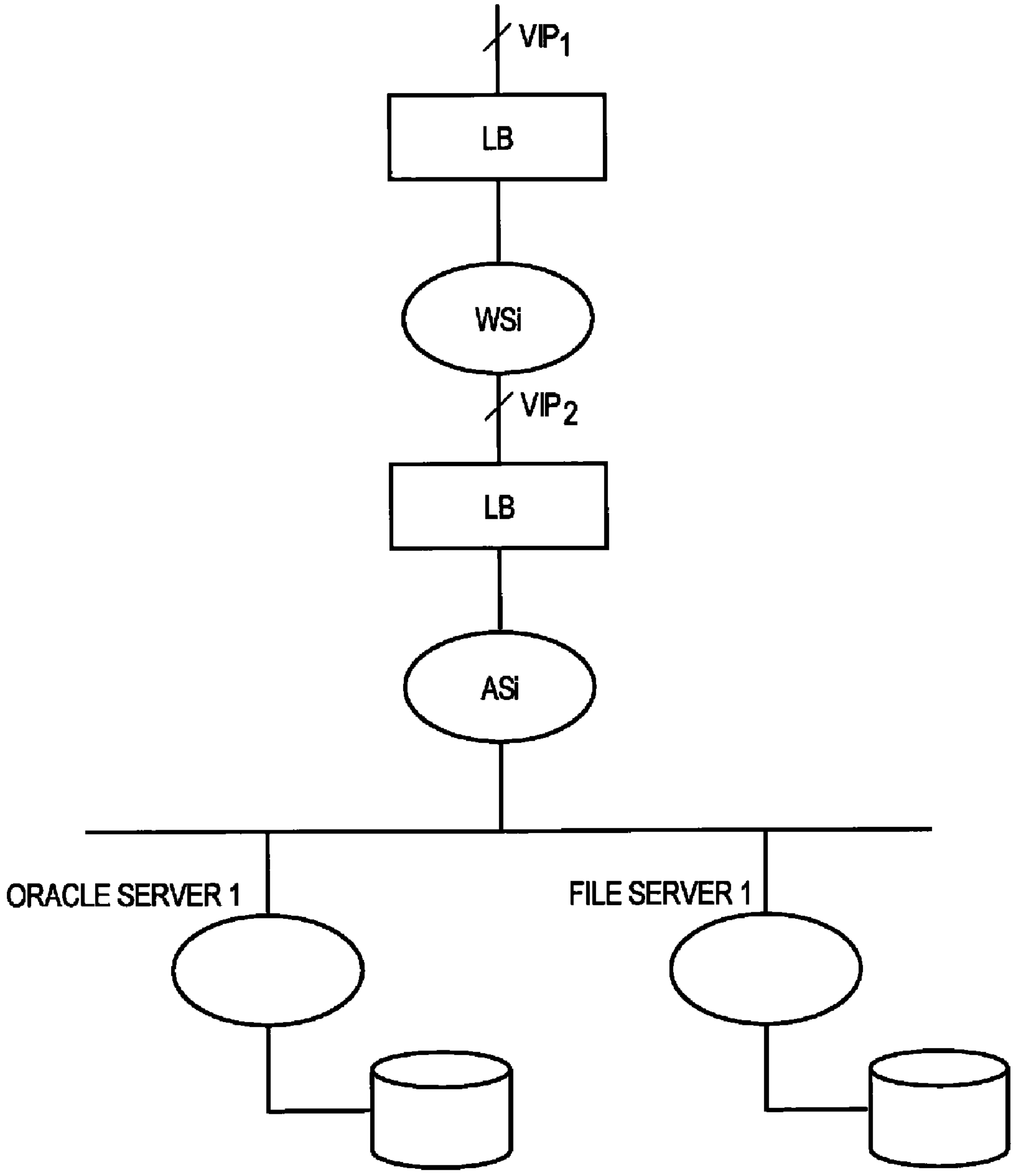
FIG. 6 is a block diagram of an exemplary three-tier server farm, according to an embodiment.

FIG. 6 is a block diagram of an exemplary three-tier server farm, according to an embodiment. The data center of FIG. 6 corresponds to the textual representation set forth in Table 11.

5.5 Farm Monitoring

In addition to the construction of farms, FML describes any monitoring of the elements in the farm that automatically take place. In one embodiment, this monitoring functionality is to provide for the automatic flexing of a farm. Alternatively, monitoring functions may be used only to alert operations personnel or a user or customer of conditions in the farm.

5.6 Farm Cloning

Since an entire server farm may be described logically, without any hard-coded reference to information that is specific to a Grid Segment, e.g., IP addresses, etc., an entire server farm definition can be cloned, resulting in creation and activation of one or more duplicate server farms in some embodiments. This allows the logical structure of a data center to be reused to create a farm clone or to use as a starting point for another data center.

Since each data center definition implies the use of IP addresses internal to the data center, cloning a data center requires the ability to abstract out such data center-specific information. In one approach, this is accomplished by referring to all data center-specific variables using external entity declarations, or using the "vfstab" approach described below. Each external entity declaration contains a reference to a file that contains the data center-specific information. Each Farm Manager that is responsible for a given DC creates IDC-specific files containing IP addresses for the File servers and database servers. This removes any dependencies in the XML notation from specific variable values, such as the IP addresses of the various fixed servers. Examples of the external entity references in the data center descriptions above are the references "&VIP1" and "&VIP2." In a real FML file, these references would refer to external files containing the segment specific IP addresses associated with the VIPs.

An alternative approach using "vfstab" files is also contemplated. In this alternative, relative DNS names are created and stored in the "vfstab" configuration file for all elements and applications that are defined as part of a virtual server farm. Further, the DNS server and DHCP server associated with the virtual server farm is provided with a default domain. As a result, the network addresses of cloned server farms can be automatically resolved in response to instructions from the Farm Manager to the DNS server and DHCP server.

Alternatively, IP addresses are left blank in FML files and assigned dynamically by the Farm Manager.

The cloning capability described herein may be used as part of the graphical user interface tool that is described herein. In particular, the graphical user interface tool may allow reuse of already defined data centers as input to other data centers that may be instantiated at different Grid Segments. For example, the graphical user interface tool may implement duplication of data centers by enable a user to drag an icon representing a data center from one location in a workspace and drop the icon in another location of the workspace.

5.7 Example Textual Representations of Data Centers or Server Farms

5.7.1 Use of Firewall in a Server Farm

FIG. 7 is a block diagram of an exemplary two-tier server farm, according to an embodiment. More specifically, FIG. 7 depicts a visual representation of a server farm that illustrates how the markup language may be used to establish a two-tier server farm featuring a firewall.

In addition to servers and load-balancers, server farms often include a firewall device, which selectively permits or denies access to services within the server farm, and can control access to VPNs provided through the firewall. In order to describe firewalls as components of various server farms, the Firewall DTD is provided as part of the FML. The firewall DTD permits simple specification of the firewall attributes, such as Firewall type, the services to permit and/or deny, De-Militarized Zone (DMZ) services, and any VPN associations that the firewall may need to be configured with.

Referring now to FIG. 7, an example of a firewall configured with a set of DMZ services is shown. A two-tier server farm 700 generally comprises a network connection 701, an outer virtual local area network (VLAN) 710 and an inner VLAN 720. Network connection 701 is coupled to one or more internetworks such as the global, packet-switched network of networks known as the Internet. Data arriving at server farm 700 from the network connection 701 is coupled to firewall 702, which provides security functions. Data from firewall 702 is coupled to a load balancer 704, which distributes service requests among one or more server nodes 706. In this example, assume that each of the server nodes 706 is a computer acting as a Web server. Ports P1, P2, P3, and P4 are on VLAN 710.

In addition, VLAN 720 may include one or more fixed server nodes. For example, one of the server nodes 706 may be coupled to a database server 708 and associated storage 709.

Table 12 presents an example of a symbolic representation of server farm 700.

TABLE 12

SYMBOLIC REPRESENTATION OF EXAMPLE SERVER FARM

```
<farm name="My-2-Tier-Farm", fmlversion="1.0">
<subnet name="outer" ip="external" vlan="outer-vlan">
</subnet>
<subnet name="inner" ip="internal" vlan="iner-vlan">
</subnet>
<subnet name="dmz" ip="internal" vlan="dmz-vlan">
</subnet>
<!--
  ! put db on a separate vlan to hide traffic.
-->
<subnet name="db" ip="internal" vlan="db-vlan">
</subnet>
<fw name="fw1" type="fw">
<out_interface name="outside">
    <interface name="eth0" subnet="outer" />
<allow>
                <service seq="1" name="http" >
                    <from ip="192.168.1.0"
                    mask="255.255.255.0"/>
                    <to name="ws1:eth0"/>
                <to name="lb1:vip0"/>
                    </service>
    </out_interface>
    <in_interface name="inside">
    <interface name="eth1" subnet="inner" />
    </in_interface>
    <fw_interface name="dmz1">
        <interface name="eth2" subnet="dmz" />
    </fw_interface>
</fw>
<lb name="lb1" type="lb">
    <interface name="eth0" subnet="inner" />
    <policy> round-robin </policy>
    <vip name="vip0" subnet="inner" port="8080">
        <bind name="WebTier" port="8080" />
    </vip>
</lb>
<server-role name="WebServer">
    <diskimage> NT_IIS </diskimage>
    <hw> cpu-x86 </hw>
</server-role>
<server-role name="OracleServer">
    <diskimage> Solaris_Oracle </diskimage>
```

TABLE 12-continued

```
SYMBOLIC REPRESENTATION OF EXAMPLE
SERVER FARM

    <hw> cpu-sun4u </hw>
    <disk drivename="/oracle" drivesize="4048" />
</server-role>
<server-role name="FileServer">
    <diskimage> Solaris </diskimage>
    <hw> cpu-sun4u </hw>
    <disk drivename="/export" drivesize="1024" />
</server-role>
    <tier name="WebTier">
    <interface name="eth0" subnet="inner" />
    <interface name="eth1" subnet="db" />
    <role> WebServer </role>
    <min-servers> 5 </min-servers>
    <max-servers> 20 </max-servers>
    <init-servers> 10 </init-servers>
</tier>
<fixed-server name="OracleServer">
    <interface name="eth0" subnet="db">
    <role> OracleServer </role>
</fixed-server>
<fixed-server name="bebop">
    <interface name="eth0" subnet="db" />
    <role> FileServer </role>
</fixed-server>
</farm>
```

5.7.2 Specifying Extra Local Drives

Another use of the language defined herein is to specify an extra local storage drive (e.g., a D: drive) as part of a Windows machine, a Solaris machine, or any other type of device with a particular operating system. This is done using the optional disk attribute of a server definition. For example, the following element in a server definition specifies a server with a local drive named d: with a capacity of 200 MB.

<disk drivename="D:", drivesize="200">

</disk>

Although the drive name "D:" is given in the foregoing definition, for the purpose of illustrating a specific example, use of such a name format is not required. The drivename value may specify a SCSI drive name value or a drive name in any other appropriate format. In a particular operating system environment, such as Solaris or Linux, the disk attribute can be used to specify, e.g. an extra locally mounted file system, such as /home, as follows:

<disk drivename="/home", drivesize="512">

</disk>

In carrying out this definition, the Farm Manager allocates the correct disk space on a SAN-attached device and maps the space to the right machine using the processes described herein. Multiple disk attributes can be used to specify additional drives (or partitions from the point of view of Unix operating environments).

The disk element may also include one or more optional attributes for specifying parameters such as RAID levels, and backup policies, using the attribute element. Examples of the attribute names and values are given below.

<disk drivename="/home", drivesize="512 MB">

<attribute name="raid-level", value="0+1">

<attribute name="backup-policy",value="level=0: nightly">

<attribute name="backup-policy",value="level=1: hourly">

</disk>

The above specifies that /home should be located on a RAID level 0+1 drive, with a level 0 backup occurring nightly and a level 1 backup occurring every hour. Over time, other attributes may be defined for the disk partition.

Figure 2A:
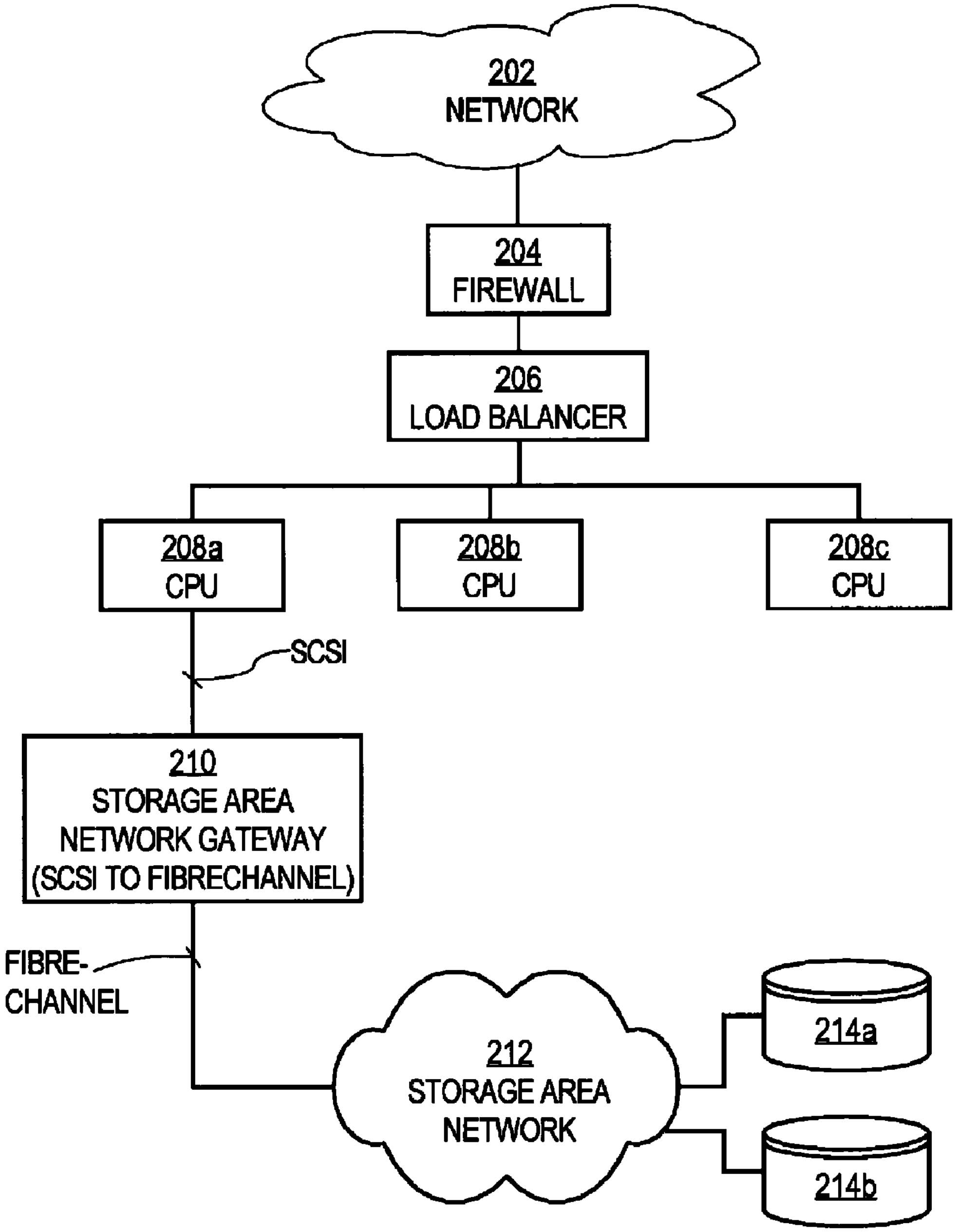
FIG. 2A is a block diagram illustrating a storage area network and related elements, according to an embodiment.

Embodiments can process disk tags as defined herein and automatically increase or decrease the amount of storage associated with a data center or server farm. FIG. 2A is a block diagram illustrating a storage area network and related elements, according to an embodiment. The exemplary server farm of FIG. 2A is used to illustrate an example of the context in which such embodiments may operate. Network 202 is communicatively coupled to firewall 204, which directs authorized traffic from the network to load balancer 206. One or more CPU devices 208*a*, 208*b*, 208*c* are coupled to load balancer 206 and receive client requests from network 202 according to an order or priority determined by the load balancer.

Each CPU in the data center or server farm is associated with storage. For purposes of illustrating a clear example, FIG. 2A shows certain storage elements in simplified form. CPU 208*a* is coupled by a small computer system interface (SCSI) link to a storage area network gateway 210, which provides an interface for CPUs with SCSI ports to storage devices or networks that use fibrechannel interfaces. In one embodiment, gateway 210 is a Pathlight gateway and can connect to 1-6 CPUs. The gateway 210 has an output port that uses fibrechannel signaling and is coupled to storage area network 212. One or more disk arrays 214*a*, 214*b* are coupled to storage area network 212. For example, EMC disk arrays are used, although any type of storage device can be used in a particular implementation.

Although FIG. 2A illustrates a connection of only CPU 208*a* to the gateway 210, in practice all CPUs of the data center or server farm are coupled by SCSI connections to the gateway, and the gateway thereby manages assignment of storage of storage area network 212 and disk arrays 214*a*, 214*b* for all the CPUs.

A system in this configuration may have storage automatically assigned and removed based on an automatic process that maps portions of storage in disk arrays 214*a*, 214*b* to one or more of the CPUs. In an embodiment, the process operates in conjunction with a stored data table that tracks disk volume information. For example, in one embodiment of a table, each row is associated with a logical unit of storage, and has columns that store the logical unit number, size of the logical unit, whether the logical unit is free or in use by a CPU, the disk array on which the logical unit is located, etc.

Figure 2B:
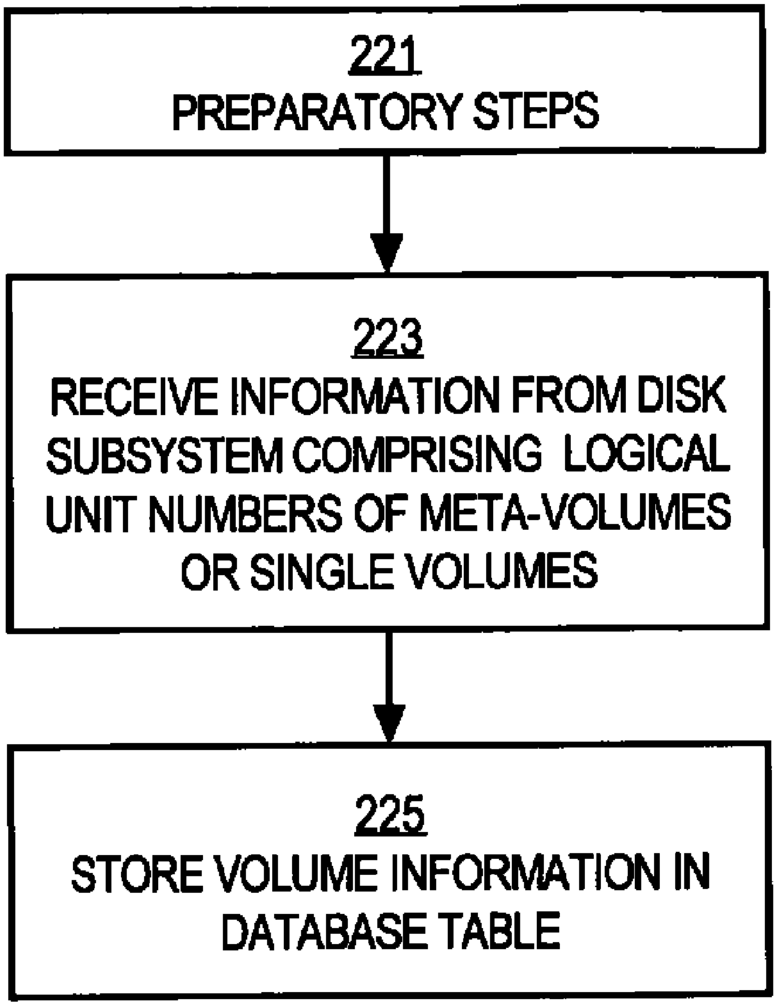
FIG. 2B is a flow diagram that illustrates steps involved in creating a stored data table, according to an embodiment.

FIG. 2B is a flow diagram that illustrates steps involved in creating a stored data table, according to an embodiment. As indicated by block 221, there are preparatory steps that are normally carried out before the process of FIG. 2C. In block 223, information is received from a disk subsystem, comprising one or more logical unit numbers of meta-volumes or single volumes of storage in the disk subsystem. Block 223 may involve receiving unit information from disk arrays 214*a*, 214*b*, or a controller that is associated with them. The information may be retrieved by sending appropriate queries to the controller or arrays. In block 225, the volume information is stored in a table in a database. For example, a particular type of database, such as an Oracle database, may contain appropriate tables.

The process of FIG. 2B may be carried out upon initialization of an instant data center, or continuously as one or more data centers are in operation. As a result, the process of FIG. 2C continuously has available to it a picture of the size of available storage in a storage subsystem that serves the CPUs of the server farm.

Figure 2C:
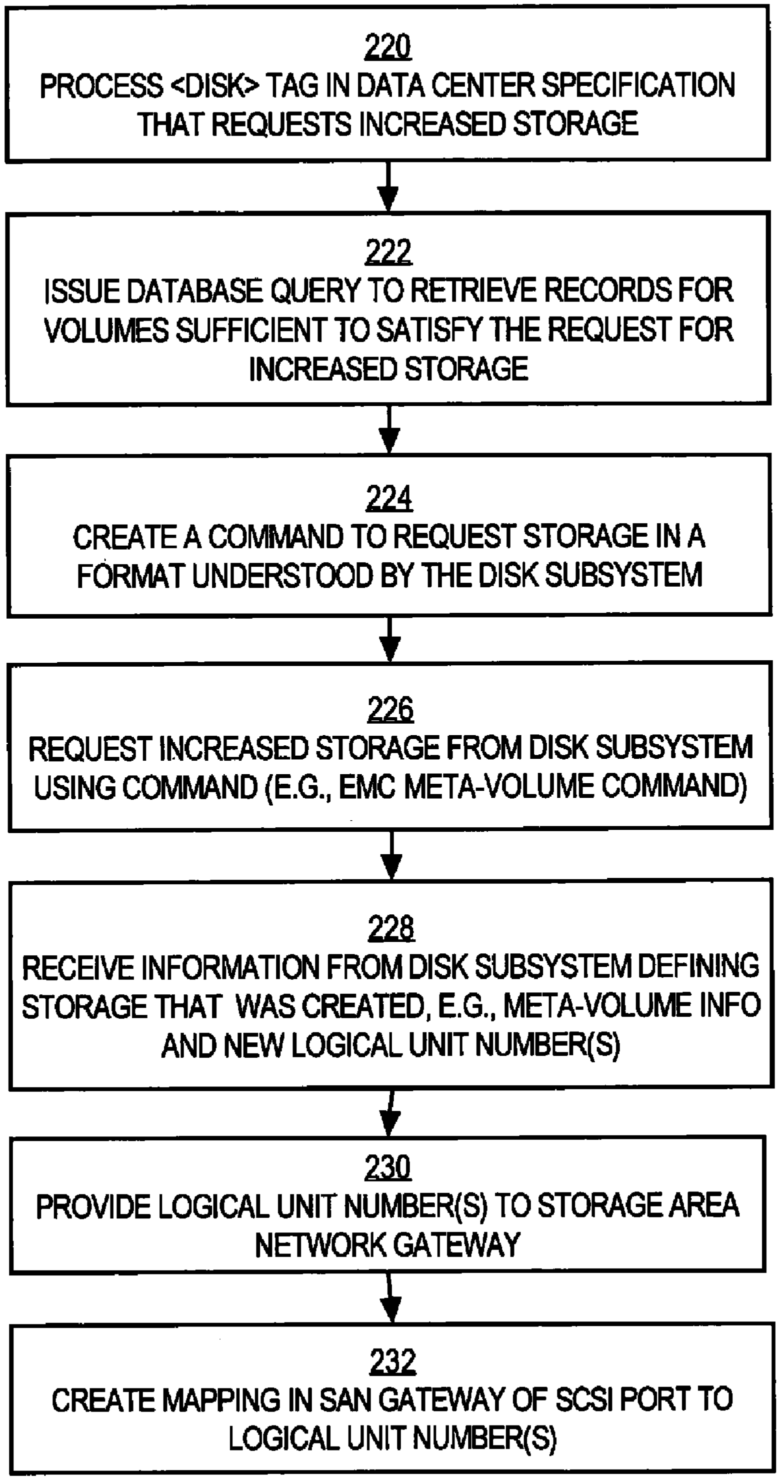
FIG. 2C is a block diagram illustrating a process of automatically modifying storage associated with an instant data center, according to an embodiment.

FIG. 2C is a block diagram illustrating a process of automatically modifying storage associated with an instant data center, according to an embodiment. For purposes of illustrating a clear example, the process of FIG. 2C is described in relation to the context of FIG. 2A, although the process may be used in any other appropriate context.

In block 220, a <disk> tag in a data center specification that requests increased storage is processed. Block 220 may involve parsing a file that specifies a data center or server farm in terms of the markup language described herein, and identifying a statement that requests a change in storage for a server farm.

In block 222, a database query is issued to retrieve records for free storage volume of an amount sufficient to satisfy the request for increased storage that is contained in the data center specification or disk tag. For example, where the disk tag specifies 30 Mb of disk storage, a SELECT query is issued to the database table described above to select and retrieve copies of all records of free volumes that add up to 30 Mb or more of storage. When a result set is received from the database, a command to request that amount of storage in the specified volumes is created, in a format understood by the disk subsystem, as shown by block 224. Where EMC disk storage is used, block 224 may involve formulating a meta-volume command that a particular amount of storage that can satisfy what is requested in the disk tag.

In block 226, a request for increased storage is made to the disk subsystem, using the command that was created in block 224. Thus, block 226 may involve sending a meta-volume command to disk arrays 214*a*, 214*b*. In block 228, the process receives information from the disk subsystem confirming and identifying the amount of storage that was allocated and its location in terms of logical unit numbers. Since meta-volumes may span more than one disk array or disk subsystem, the logical unit numbers may represent storage units in multiple hardware units.

In block 230, the received logical unit numbers are provided to storage area network gateway 210. In response, storage area network gateway 210 creates an internal mapping of one of its SCSI ports to the logical unit numbers that have been received, as illustrated in block 232. As a result, the gateway 210 can properly direct information storage and retrieval requests arriving on any of its SCSI ports to the correct disk array and logical unit within a disk subsystem. Further, allocation or assignment of storage to a particular CPU is accomplished automatically, and the amount of storage assigned to a CPU can increase or decrease over time, based on the textual representations that are set forth in a markup language file.

5.7.3 Three-Tier Data Center

Using the definition of an application server described above, a 3-tier data center may be defined as set forth in Table 13.

The examples above have used hardware load-balancing exclusively for defining tiers of web or application servers. Application servers such as WebLogic servers can be assembled into tiers without the use of hardware load-balancers. Instead, these servers have application plug-ins into the web server tier that manage load balancing. The plug-in typically consults a configuration file to determine which set of application servers should be considered a single cluster. To accommodate such application-specific mechanisms for adding or deleting nodes from a particular tier, the language defined herein provides the ability to specify custom defined tiers, where there is a provision for farm specific scripts to be invoked on the set of devices in the farm on server add/delete events. These custom defined tiers have special elements that describe the actions to take when a server is added or deleted from that tier.

TABLE 13

THREE-TIER DATA CENTER DEFINITION

```
<farm name="My-3-Tier-Farm", fmlversion="1.0">
<subnet name="outer" ip="external"
vlan="outer-vlan"></subnet>
<subnet name="inner" ip="internal"
vlan="iner-vlan"></subnet>
<subnet name="data" ip="internal"
vlan="inner-vlan"></subnet>
<lb name="lb1">
  <interface name="eth0" subnet="outer" />
  <interface name="eth1" subnet="inner" />
  <policy> round-robin </policy>
  <vip name="vip0" subnet="outer" port="8081">
    <bind name="WebTier" port="8080" />
  </vip>
</lb>
<server-role name="WebServer">
  <diskimage> Solaris_Apache </diskimage>
  <hw> cpu-sun4u </hw>
</server-role>
<server-role name="OracleServer">
  <diskimage> Solaris_Oracle </diskimage>
  <hw> cpu-sun4u </hw>
</server-role>
<server-role name="FileServer">
  <diskimage> Solaris </diskimage>
  <hw> cpu-sun4u </hw>
  <disk drivename="/export" drivesize="1024" />
</server-role>
<tier name="WebTier">
  <interface name="eth0" subnet="inner" />
  <interface name="eth1" subnet="data" />
  <role> WebServer </role>
  <min-servers> 4 </min-servers>
  <max-servers> 20 </max-servers>
  <init-servers> 10 </init-servers>
</tier>
<tier name="AppTier">
  <interface name="eth0" subnet="inner" />
  <interface name="eth1" subnet="data" />
  <add-action>
    <for-all-in> WebTier </for-all-in>
    <run>
      <name> add-wlserver </name>
      <dir> /Windows/System/IIS </dir>
    </run>
  </add-action>
  <del-action>
    <for-all-in> WebTier </for-all-in>
    <run>
      <name> del-wlserver </name>
      <dir> /Windows/System/IIS </dir>
    </run>
  </del-action>
  <min-servers> 4 </min-servers>
  <max-servers> 20 </max-servers>
  <init-servers> 10 </init-servers>
</tier>
<fixed-server name="OracleServer">
  <interface name="eth0" subnet="inner">
  <interface name="eth1" subnet="db">
  <role> OracleServer </role>
<fixed-server>
<fixed-server name="bebop">
  <interface name="eth0" subnet="inner" />
  <interface name="eth1" subnet="db" />
  <role> FileServer </role>
</fixed-server>
</farm>
```

In the example of Table 13, in order to configure the Web server, the application tier is created first, so that its VIP can be configured as part of the WebLogic plug-in configuration on the Web server, although other types of plug-ins can be used.

In the example above, the code for a tier named AppTier above is an example of a custom defined tier. The code includes specific actions to take when Application Servers are added or deleted from the AppTier. The elements <add-action> and <del-action> specify the actions to take when a server in the associated role is added to or deleted from a data center.

In an embodiment, each associated action is the name of a script that is invoked on the machines specified in the <for-all-in > tag. When a Farm Manager is invoking the scripts on each machine, it expands out the WebTier symbol contained in the <for-all-in > to mean every machine currently existing in the WebTier tier. Each script is invoked by the Farm Manager with the name and IP address of the machine that has just been added to or deleted from the server farm. The scripts can use this information to update any necessary configuration files associated with the addition or deletion of servers in the associated role.

Each script can be customized for each particular data center. For example, for a WebLogic Application Server Tier, the scripts can add/delete the names of the servers from the Internet Information Server WebLogic plug-in configuration files on all web servers that are part of the web server tier. Thus, the "<for-all-in >" tag essentially specifies what to do for an entire tier. It may be followed by a stored list of actions, or add-action specifications, and there may be multiple <for-all-in > tags and associated actions for a single tier.

6.0 Document Type Definitions (DTD'S)

Table 14 presents XML Document Type Definitions (DTD's) for an embodiment of a symbolic markup language that may be used to create and store one or more textual representations of networked computer systems such as the virtual server farms and data centers described herein.

TABLE 14

MARKUP LANGUAGE DEFINITION

```
<!ELEMENT farm (fw*, lb*, tier*, fixed-server*,
server-role*, device*, subnet*,
attribute*)>
<!ATTLIST farm name CDATA #IMPLIED>
<!ATTLIST farm fmlversion CDATA "1.0">
<!ELEMENT fw (out_interface, in_interface,
fw_interface*, attribute*)>
<!ATTLIST fw name CDATA #REQUIRED>
<!ATTLIST fw type CDATA #REQUIRED>
<!ELEMENT out_interface (interface, allow?, deny?)>
<!ATTLIST out interface name CDATA #REQUIRED>
<!ELEMENT in_interface (interface, allow?, deny?)>
<!ATTLIST in_interface name CDATA #REQUIRED>
<!ELEMENT fw_interface (interface, allow?, deny?)>
<!ATTLIST fw_interface name CDATA #REQUIRED>
<!ELEMENT allow (service*))>
<!ELEMENT deny (service*)>
<!ELEMENT service (from+, to+)>
<!ATTLIST service seq CDATA #REQUIRED>
<!ATTLIST service name CDATA #REQUIRED>
<!ATTLIST service protocol CDATA #IMPLIED>
<!ATTLIST service port CDATA #IMPLIED>
<!ELEMENT from EMPTY>
<!ATTLIST from name CDATA (PCDATA)*>
<!ATTLIST from ip CDATA (PCDATA)*>
<!ATTLIST from mask CDATA (PCDATA)*>
<!ELEMENT to EMPTY>
<!ATTLIST to name CDATA (PCDATA)*>
<!ATTLIST to ip CDATA (PCDATA)*>
```

TABLE 14-continued

MARKUP LANGUAGE DEFINITION

```
<!ATTLIST to mask CDATA (PCDATA)*>
<!ELEMENT lb (interface, interface+,
policy, vip, attribute*)>
<!ATTLIST lb name CDATA #REQUIRED>
<!ATTLIST lb type CDATA #REQUIRED>
<!ELEMENT policy (PCDATA)*>
<!ELEMENT vip (bind+)>
<!ATTLIST vip name CDATA #REQUIRED>
<!ATTLIST vip subnet CDATA (PCDATA)*>
<!ATTLIST vip ip CDATA (PCDATA)*>
<!ATTLIST vip mask CDATA (PCDATA)*>
<!ATTLIST vip port CDATA (PCDATA)*>
<!ELEMENT bind EMPTY>
<!ATTLIST bind name CDATA #REQUIRED>
<!ATTLIST bind port CDATA (PCDATA)*>
<!ELEMENT tier (interface+, role, add-action?,
del-action?, min-servers, max-
  servers, init-servers, attribute*)>
<!ATTLIST tier name CDATA #REQUIRED>
<!ELEMENT role (PCDATA)*>
<!ELEMENT add-action (for-all-in, run)>
<!ELEMENT del-action (for-all-in, run)>
<!ELEMENT min-servers (PCDATA)*>
<!ELEMENT max-servers (PCDATA)*>
<!ELEMENT init-servers (PCDATA)*>
<!ELEMENT for-all-in (PCDATA)*>
<!ELEMENT run (name, dir)>
<!ELEMENT name (PCDATA)*>
<!ELEMENT dir (PCDATA)*>
<!ELEMENT fixed-server (interface+, role, attribute*)>
<!ATTLIST fixed-server name CDATA #REQUIRED>
<!ELEMENT device (interface+, attribute*)>
<!ATTLIST device name CDATA #REQUIRED>
<!ATTLIST device type CDATA #REQUIRED>
<!ELEMENT subnet (attribute*)>
<!ATTLIST subnet name CDATA #REQUIRED>
<!ATTLIST subnet mask CDATA #REQUIRED>
<!ATTLIST subnet ip (internal | external | CDATA)
#REQUIRED>
<!ATTLIST subnet vlan CDATA #REQUIRED>
<!--
! The vlan is a duplicate with the subnet definition
! in order to define an interface not associated with
! a particular defined subnet.
-->
<!ELEMENT interface (attribute*)>
<!ATTLIST interface name CDATA #REQUIRED>
<!ATTLIST interface vlan CDATA #IMPLIED>
<!ATTLIST interface ip CDATA #IMPLIED>
<!ATTLIST interface subnet CDATA #IMPLIED>
<!ELEMENT server-role (diskimage, hw, disk*, attribute*)>
<!ATTLIST server-role name CDATA #REQUIRED>
<!ELEMENT diskimage (PCDATA)*>
<!ELEMENT hw (PCDATA)*>
<!ELEMENT disk (attribute)*>
<!ATTLIST disk drivename CDATA #REQUIRED>
<!ATTLIST disk drivesize CDATA #REQUIRED>
<!ATTLIST disk drivetype CDATA #REQUIRED>
```

7.0 Hardware Overview

Figure 8:
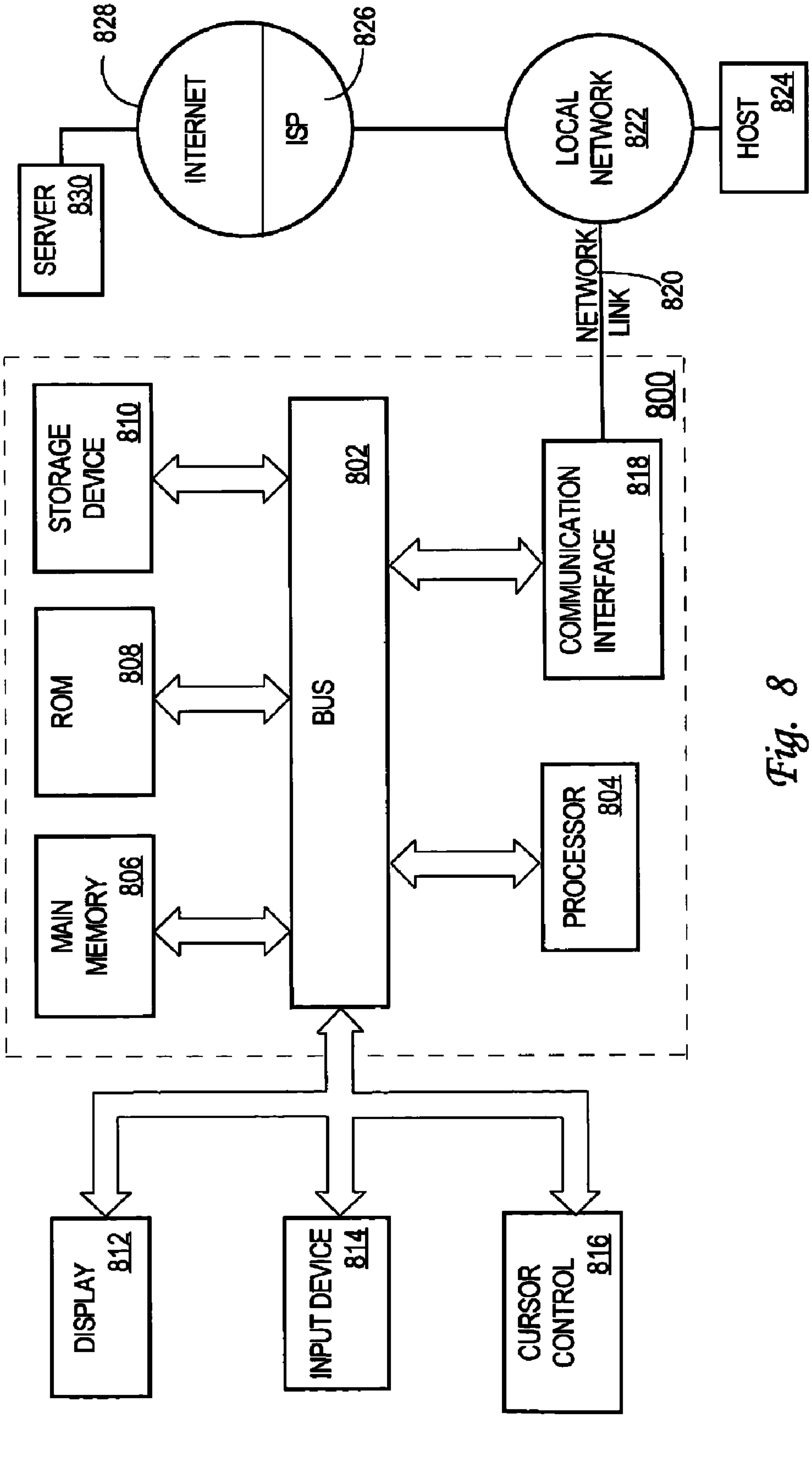
FIG. 8 is a block diagram of a computer system upon which an embodiment of the approaches disclosed herein may be implemented.

FIG. 8 is a block diagram of a computer system 800 upon which an embodiment of the approaches disclosed herein may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device may have two degrees of freedom in a first axis (e.g., x) and a second axis (e.g., y) that allows the device to specify positions in a plane.

In computer system 800, bus 802 may be any mechanism and/or medium that enables information, signals, data, etc., to be exchanged between the various components. For example, bus 802 may be a set of conductors that carries electrical signals. Bus 802 may also be a wireless medium (e.g. air) that carries wireless signals between one or more of the components. Bus 802 may also be a medium (e.g. air) that enables signals to be capacitively exchanged between one or more of the components. Bus 802 may further be a network connection that connects one or more of the components. Overall, any mechanism and/or medium that enables information, signals, data, etc., to be exchanged between the various components may be used as bus 802.

Bus 802 may also be a combination of these mechanisms/media. For example, processor 804 may communicate with storage device 810 wirelessly. In such a case, the bus 802, from the standpoint of processor 804 and storage device 810, would be a wireless medium, such as air. Further, processor 804 may communicate with ROM 808 capacitively. In this instance, the bus 802 would be the medium (such as air) that enables this capacitive communication to take place. Further, processor 804 may communicate with main memory 806 via a network connection. In this case, the bus 802 would be the network connection. Further, processor 804 may communicate with display 812 via a set of conductors. In this instance, the bus 802 would be the set of conductors. Thus, depending upon how the various components communicate with each other, bus 802 may take on different forms. Bus 802, as shown in FIG. 8, functionally represents all of the mechanisms and/or media that enable information, signals, data, etc., to be exchanged between the various components.

One embodiment of the invention is related to the use of computer system 800 for implementing the techniques described herein. According to one embodiment, the approaches are provided by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the approaches disclosed herein. Thus, embodiments of the approaches disclosed herein are not limited to any specific combination of hardware circuitry and software.

The term "machine-readable medium" as used herein refers to any medium that participates in providing data that causes a machine to operate in a specific fashion. In an embodiment implemented using computer system 800, various machine readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802.

Common forms of machine-readable media include, for example, a floppy disk, a flexible disk, hard disk, magnetic tape, or any other magnetic medium, a CD-ROM, any other optical medium punch cards, paper tape, any other physical medium with patterns of holes, a RAM, a PROM, an EPROM, a FLASH-EPROM, any other memory chip or cartridge, wave as described hereinafter, or any other medium from which a computer can be read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 is an ISDN card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

8.0 Class Examples

The table below describes the attributes for each class, the type, the description and the legal values for each of the attributes, and whether they are configurable when the farm is under design or active, according to an embodiment. Other embodiments may use fewer or more classes, or classes that are added as well as modified from those described below.

| Class | Attribute | Type | Description (Label) | Legal Values | Design Configurable | 0.0 Active Configurable |
|---|---|---|---|---|---|---|
| Farm | name | String | Name of this farm (Name) | Any string | Yes | No |
| | nodes | Node[ ] | Set of nodes of this farm | Determined by GUI | Yes | Yes if the node is non-cloneable; no otherwise |
| | edges | Edge[ ] | Set of edges of this farm | Determined by GUI | Yes | Yes only if it connects the non-cloneable node to the "Subnet" |
| Node | name | String | Name of this node (Name) | Any unique node name | Yes | No |
| | x | Integer | X-coordinate of this node | Any integer ≧ 0; determined by GUI | Yes | No |
| | y | Integer | Y-coordinate of this node | Any integer ≧ 0; determined by GUI | Yes | No |
| | width | Integer | Width of this node | Any integer > 0 | No | No |
| | height | Integer | Height of this node | Any integer > 0 | No | No |
| | icon | Icon | Icon of this node | System determined based on node's class | No | No |
| | ports | Port[ ] | Set of ports of this node | System determined based on node's class; i.e. "Firewall" has 3 ports, "LoadBalancer" has 2 ports, etc. | No | No |
| Edge | beginNode | Node | Node this edge begins | Determined by GUI | Yes | No |
| | beginPort | Integer | Port of the node this edge begins | Determined by GUI | Yes | No |
| | endNode | Node | Node this edge ends | Determined by GUI | Yes | No |
| | endPort | Integer | Port of the node this edge ends | Determined by GUI | Yes | No |
| Network | | | | all attributes of Node | | |
| | VLAN | String | Name of the VLAN of this network (VLAN) | "vlan0" for "Subnet" and "outer-vlan" for "Internet" | No | No |
| Internet | | | | all attributes of Network | | |
| Subnet | | | | all attributes of Network | | |
| | mask | String | Mask of this subnet (Subnet Mask) | | No; read only | No |
| | maskLength | Integer | Mask length of this subnet | | No; read only | No |
| Firewall | | | | all attributes of Node | | |
| | type | String | Type of this firewall (Type) | "Nokia Checkpoint" | Yes | No |
| | allowServices | Service[ ] | Services allowed by this firewall | | Yes | No |
| | denyServices | Service[ ] | Services denied by this firewall | | Yes | No |
| | dmzServices | Service[ ] | DMZ services allowed by this firewall | | Yes | No |
| LoadBalancer | | | | all attributes of Node | | |
| | type | String | Type of this load balancer (Type) | "Foundry ServerIron" | Yes | No |
| | vip | String | Virtual IP of this load balancer (Virtual IP) | | No; read only | No |
| | policy | String | Policy of this load balancer (Policy) | ? | Yes | No |
| | balancedNodes | Node[ ] | Nodes balanced by this load balancer (Load Balanced Servers) | Any node connected to the same Subnet | Yes | No |
| Server | | | | all attributes of Node | | |
| | role | String | Role of this tier (Software Image) | See table in Section 3 | Yes | No |
| | hardware | String | Hardware used in this server (Hardware) | See table in Section 3 | Yes but constrained by role | No |
| | isExternal | Boolean | Whether this server is internal or external (Automatically Assign IP Address) | true or false | Yes | No |
| | isCloneable | Boolean | Whether this server is cloneable | true or false; See table in Section 3 | No; determined based on role | No (always) |

-continued

| Class | Attribute | Type | Description (Label) | Legal Values | Design Configurable | 0.0 Active Configurable |
|---|---|---|---|---|---|---|
| | minClone | Integer | Max. no. of clones allowed by this tier (?) | Any integer > 0 | Yes only if cloneable | Yes only if cloneable |
| | maxClone | Integer | MM. no. of clones allowed by this tier (?) | Any integer ≧ minClone | Yes only if cloneable | Yes only if cloneable |
| | initClone | Integer | Initial no. of clones specified by the user (?) | Any integer ≧ minClone and ≦ maxClone | Yes only if cloneable | Yes only if cloneable |
| | disks | Disk[ ] | Set of disks of this server | | Yes | No |
| Disk | name | String | Drive name of this disk (Drive) | Any unique disk name | No | No |
| | size | Integer | Size of this disk (in GB) (Size) | Any integer > 0 | Yes | Yes |
| | raidLevel | String | Raid level of this disk (Raid Level) | ? | Yes | Yes?0 |
| | hasMirror | Boolean | Whether this disk has a mirror (Mirrored) | true or false | Yes | Yes? |
| | backupPolicy | String | Backup policy of this disk | ? | Yes | Yes? |
| Service | name | String | Name of this service | Any unique service name | Yes | No |
| | protocol | String | Protocol of this service | ? | Yes | No |
| | port | String | Port of this service | Any integer ≧ 0 | Yes | No |
| | whos | Who[ ] | IPs of this service | | Yes | No |
| Port | x | Integer | X-coordinate of this port | Any integer ≧ 0 | Yes; derived from GUI | No |
| | y | Integer | Y-coordinate of this port | Any integer ≧ 0 | Yes; derived from GUI | No |
| | direction | String | Direction of this port | "in" or "out" | No | No |
| Interface | | | | all attributes of Port | | |
| name | String | Name of this interface | Any unique port name of | Yes the node | No | |
| | logicalName | String | DNS name of this interface | Valid DNS name | Yes | No |
| | ip | String | IP address of this interface (IP Address) | | No; read only | No |
| Who | ipMask | String | IP mask of this network | Any valid mask value | Yes | No |
| | maskLength | Integer | Mask length of this network | ? | Yes | No |
| Icon | location | String | Path to the file containing this icon | Valid path to an image file | No; same for all users | No |
| | width | Integer | Width of this icon | Any integer > 0 | No; same for all users | No |
| | height | Integer | Height of this icon | Any integer > 0 | No; same for all users | No |

9.0 Allocating Resources to an Apparatus

The focus of this section is allocating resources to a networked computer system, or more generally, to an apparatus, such that physical resources can be allocated to an IDC such that the IDC can utilize such allocated resources. For example, such resource allocation can be included as part of deployment phase 116 illustrated in FIG. 1B. Furthermore, to the extent that user input can be used in allocating the resources, such user input can be provided in design phase 110 and/or implementation phase 112 of FIG. 1B.

In this section, a functional overview of resource allocation is provided, followed by a structural overview. A description of logical devices and physical devices is then presented, along with a description of available versus unavailable physical resources. Next, the implementation of an IDC is described, followed by a description of obtaining previously unavailable resources. The following sections cover: resource requirements and their use in allocating resources to an apparatus; dependent resource requirements; optional resource requirements; alternative resource requirements; suspendable resource requirements; and preemptable resource requirements.

As used herein, the term "apparatus" means two or more interconnected devices, including but not limited to, the following: a computer system, a networked computing system, a networked computer system, a farm, a server farm, a virtual server farm (VSF), a data center, and an instant data center (DC).

Finally, the following sections are discussed with reference to particular examples of equipment, devices, software, brands, etc., for ease of explanation and understanding. However, the particular examples are merely used for explanation purposes, and a particular implementation may use any type of the particular equipment, devices, software, brands, etc. In addition, the following examples are described in terms of exemplary values of certain characteristics, such as processor speed or storage capacity, and it is understood that the particular values provided are merely for illustrative purposes only, and a particular implementation may use any value and not just the values illustrated in the examples herein.

9.1 Functional Overview of Resource Allocation

Figure 9:
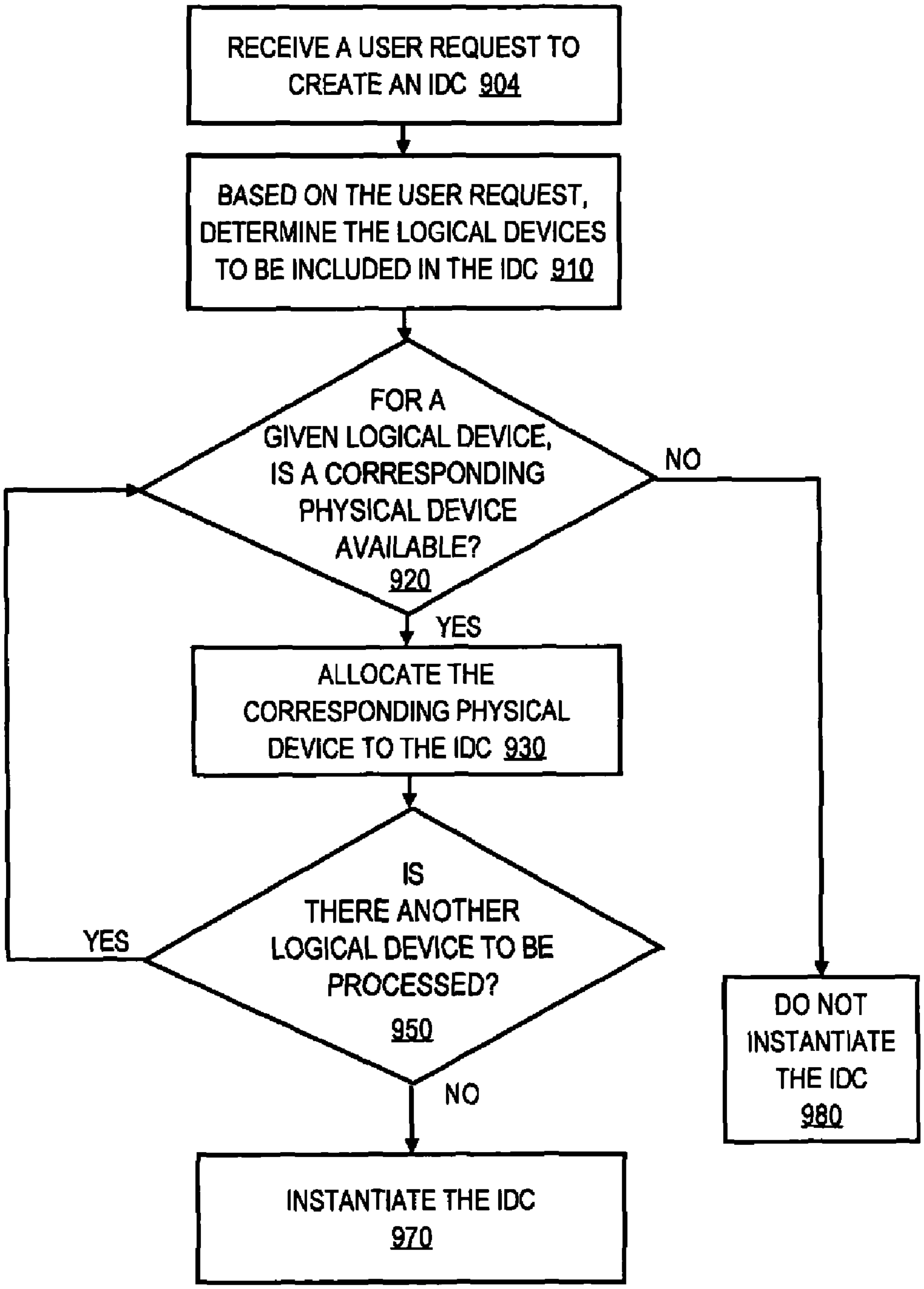
FIG. 9 is a flow diagram illustrating allocation of resources to an instant data center and subsequent instantiation of the instant data center if all the required resources are available, according to an embodiment.

FIG. 9 is a flow diagram illustrating allocation of resources to an instant data center and subsequent instantiation of the instant data center if all the required resources are available, according to an embodiment. For purposes of explanation, FIG. 9 is described with reference to an instant data center (IDC). However, in general, FIG. 9 applies to any apparatus, not just an DC.

In block 904, a user request to create an DC is received. For example, the user request can include a textual representation of the IDC that is created based on an object model representation of the DC, such as discussed previously with respect to FIG. 4.

In block 910, logical devices to be included in the DC are determined based on the user request. For example, if the user request specifies that the IDC is to include a 5 GHz processor based on "x86" architecture, a logical device including a 5 GHz x86 processor would be determined based on the user request. However, at this point in the process, neither a particular device nor even a particular type of device has necessarily been identified for inclusion in the IDC.

In block 920, a determination is made whether a physical device is available that corresponds to a given logical device. For example, if the logical device is a 5 GHz x86 processor, a determination is made whether the computing grid includes a processor of the desired speed and architecture. The determination can be performed by querying the control plane based on the description of the logical device to identify whether a physical device is available that matches the description of the logical device. If a corresponding physical device is available, the process continues to block 930, and if not, the process continues to block 980.

In block 930, the corresponding physical device is allocated to the DC. For example, the particular processor identified in block 920 can be allocated to the IDC from the idle pool, such that the particular processor is no longer available to be included in other IDCs. At this point, one or more logical connections to connect the particular processor to the DC can be determined. Processing continues with block 950.

In block 950, a determination is made whether there is another logical device to process as described above. For example, in block 910, a set including many logical devices may be determined, and the steps described with respect to blocks 920 and 930 can be performed for each logical device determined in block 910. If an additional logical device has not yet been processed, the process returns to block 920. If there are no more logical devices to be processed, the process continues to block 970.

In block 970, the IDC is instantiated. For example, as discussed previously, one or more switches in the computing grid can be used to connect a set of processors and a set of storage devices to form the IDC. The processors and storage devices selected are based on the user request as described above. In the case in which the user request is not to create an IDC but to modify or change an existing IDC, the modifications or changes are instantiated to the IDC.

In block 980, the DC is not instantiated. For example, if one or more physical devices corresponding to the logical devices are not available as determined in block 920, the IDC is not created, and any physical devices previously allocated to the DC can be released back to the idle pool to be available for use in other IDCs.

The approach of not instantiating the DC unless all corresponding physical devices are available, as illustrated in FIG. 9, can be referred to as the "all or nothing" approach: if all corresponding physical devices are available, the DC is instantiated, but if at least one corresponding physical device is not available, the IDC is not instantiated. The "all or nothing" approach therefore allows instantiation of IDCs that include all logical devices as determined based on the user request, as compared to alternative approaches (described below) in which IDCs are instantiated that include fewer than all of the logical devices as determined based on the user request. The "all or nothing" approach is suited for a computing grid with an idle pool that includes several devices for each type of device so that the idle pool is likely to have available a sufficient number of devices available to fulfill requests to instantiate new IDCs or modify existing IDCs.

Note that in the approach of FIG. 9, processing of logical devices ends when either a corresponding device is not available as determined in block 920 or when all the devices are processed (and thus all corresponding devices are available as determined in block 920). The approach illustrated in FIG. 9 conserves computing resources used in processing the user request to create an IDC. However, after the service provider frees up or adds physical devices so that corresponding physical devices will be determined to be available in block 920 in response to a subsequent user request to create the MC, other physical devices could have been allocated to other IDC's in the interval between the user requests for this particular IDC, which can again result in the DC not being instantiated.

However, in an alternative approach that is still based on the "all or nothing" concept of instantiating the IDC, processing of logical devices continues even if one or more corresponding physical devices are determined to not available in block 920. With the alternative approach, a check is made prior to instantiating the IDC to determine whether any corresponding physical devices were determined to be not available in block 920. If so, the IDC is not instantiated. However, if all corresponding physical devices are available, the IDC is instantiated. The alternative approach consumes more computing resources and keeps some physical devices allocated to the IDC in cases in which the IDC cannot be instantiated. However, by having the corresponding physical devices remain allocated to the IDC, those allocated resource cannot be allocated to other IDCs, so that a subsequent attempt to instantiate the particular IDC can succeed, such as after the service provider frees up the necessary physical devices.

9.2 Structural Overview of Resource Allocation

Figure 10:
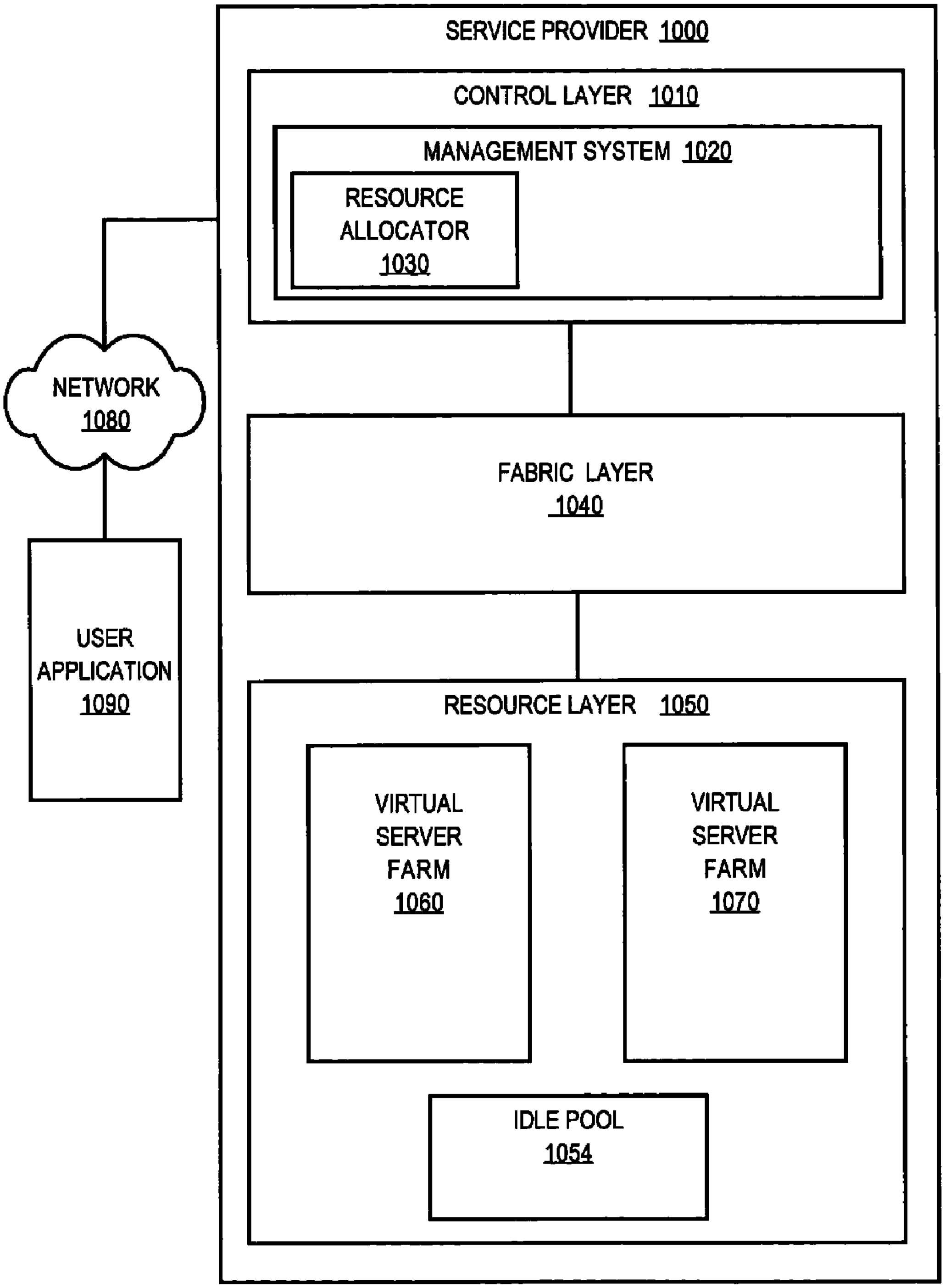
FIG. 10 is a block diagram illustrating a layer-based model of a service provider 1000 that includes a resource allocator, according to an embodiment.

FIG. 10 is a block diagram illustrating a layer-based model of a service provider 1000 that includes a resource allocator 1030, according to an embodiment. For example, service provider 1000 can be the same as service provider 126 of FIG. 1D.

The layer-based model of service provider 1000 includes three different layers: control layer 1010, fabric layer 1040, and resource layer 1050. Each layer can include additional elements, including but not limited to the elements as described below.

Control layer 1010 can reside on a private virtual local area network (VLAN) that provides server partitioning such that unauthorized servers cannot gain access to service provider 1000. Control layer 1010 provides out-of-band management of service provider 1000, such that control layer 1010 is not in the data path of any instantiated IDCs therefore does not affect the performance of the instantiated IDCs. For example, control layer 1010 straddles the entire software and hardware stack of service provider 1000 to enable system administration of the underlying resources of the computing grid.

Control layer 1010 includes management system 1020, which in turn includes resource allocator 1030. For example, management system may be referred to as a control plane that acts as the central management mechanism for configuring service provider 1000. Resource allocator 1030 allocates available resources to particular IDCs. For example, the process illustrated in FIG. 9 can be implemented in resource allocator 1030.

Note that in other embodiments, one or more functions, or even all the functions, of resource allocator 1030 can be included in other components other than management system 1020. For example, user application 1090 that is separate from service provider 1000 but communicatively coupled to service provider 1000 via a network 1080, can be used to perform some or all of the functions of resource allocator 1030. As another example, another portion of service provider 1000 can include a component, such as a low level application programming interface (API), that performs some or all of the functions of resource allocator 1030.

Fabric layer 1040 includes the networking infrastructure, such as the Ethernet and storage area networks, that weave together the devices in resource layer 1050. For example, fabric layer 1040 can include Ethernet switching components that provide network connectivity to devices within resource layer 1050. Control layer 1010 manages and configures the components of fabric layer 1040.

Resource layer 1050 includes all of the resources that can be provisioned and activated in an DC, such as servers, firewalls, load balancers, storage devices, etc. Resource layer 1050 can be configured virtually into one or more different logical structures, such as one or more virtual server farms or any other type of apparatus. For example, resource layer 1050 is illustrated in FIG. 10 as including virtual server farms 1060, 1070, each of which can include a set of processors and a set of storage devices. Resource layer 1050 also includes idle pool 1054, which includes devices that are not allocated to a virtual server farm and thus are available to be allocated.

In FIG. 10, service provider 1000 is connected to a network 1080, which in turn is connected to a user application 1090. For example, network 1080 can be the Internet or network 124 of FIG. 1D, and user application 1090 can be client 120 of FIG. 1D. User application 1090 can be used by an individual to generate a user request, such as that discussed with respect to FIG. 9 above. The user request is sent from user application 1090 to service provider 1000 via network 1080.

9.3 Logical Devices, Physical Devices, and Resources

As discussed in Aziz et al., a wide scale computing fabric called a "computing grid" is provided that includes a number of physical devices or elements, such as computing elements, networking elements, and storage elements. The computing grid is physically connected once and then logically divided up for various organizations on demand. Each logical portion of the computing grid that is allocated to an organization is referred to as an instant data center (or virtual server farm). A supervisory mechanism called the Control Plane is independent of the elements that are available to be assigned to the IDCs, and the elements on which the Control Plane runs are logically invisible to the computing elements in the computing grid. Only the Control Plane has physical connections to the control ports on devices in the computing grid, which allows the Control Plane to reconfigure VLAN switches and SAN Zones to thereby establish the IDCs from the computing elements in the control grid. For example, a particular physical VLAN switch and a particular physical SAN switch can be logically partitioned by the Control Plane among two or more VSFs.

As used herein, the term "device" refers to basic building block of an apparatus (as defined above). A device can also be referred to as an element, such as a computing element, a networking element, or a storage element. A device can be a physical device or a logical device.

The term "physical device" means a physical element of the computing grid, such as a server, a processor, a storage device, a firewall, a load balancer, etc., which can be physically connected by the Control Plane. A physical device may be characterized by one or more attributes that uniquely identify the physical device, such as an IP address or a serial number.

The term "logical device" means a logical element of an IDC, such as server, a processor, a storage device, a firewall, a load balancer, etc., which can be logically connected by the Control Plane. A logical device is characterized by one or more attributes that uniquely identify a type of device, but not necessarily a particular individual physical device. Also, there need not be a one to one correspondence between a logical device and a physical device. For example, a physical storage device can be logically partitioned into two or more logical storage devices, and conversely, two or more physical storage devices can be logically grouped into one logical storage device.

The term "resource" is used herein to refer to a capability or an attribute of an apparatus or portion of an apparatus. Thus, the term "resource" includes elements and devices, both physical devices and logical devices, but the term "resource" can also include capabilities or attributes of a system, such that the system contain a specified amount of storage capacity or a particular level of redundancy or reliability. Thus, the term "resource" includes one or more capabilities of at least a portion of an apparatus, one or more attributes of at least a portion of an apparatus, or one or more devices to be included in an apparatus.

9.4 Available Versus not Available Resources

Before a resource can be allocated to an DC, a determination is made as to whether a resource is available, such as in block 920 of FIG. 9. As used herein, a resource is "available" if the resource can be allocated to a particular IDC without impacting any other IDCs, and a resource is "not available" if the resource cannot be allocated to a particular IDC without impacting another IDC. The terms "available" and "not available" apply equally to resources, logical devices, physical devices, elements of a network, etc.

For example, a logical grouping of available resources can be established that includes resources not already allocated to IDCs, and therefore the resources in such a logical grouping are available since such resources can be allocated to IDCs. As a more specific example, the logical grouping can be referred to as an idle pool that includes resources that are currently "idle" because such resources are not allocated to any IDCs.

As another example, a resource that is not already allocated to an IDC, whether or not in an idle pool, is available since such a resource can be allocated to an DC.

Conversely, a resource that is already allocated to one DC is not available because when a request to create or update another IDC is received, the resource cannot be removed from the first IDC without impacting the first DC.

Note that a resource can be considered to be unavailable if the resource is not capable of being allocated to an IDC, even if the resource is not already allocated to another DC. For example, a resource can be physically defective or damaged such that the resource cannot function, or a portion of the computing grid can be inoperable (e.g., due to a switch malfunction) such that an otherwise operable resource cannot be connected to an DC.

9.5 Requests to Create and Update an IDC

As described above with reference to block 904 of FIG. 9, a user request is received to create an DC. For example, the user request can specify the attributes that the user wishes the IDC to include, such as the number and capacity of a set of servers, the available storage to include in the IDC, etc. However, other implementations can be used. For example, in one embodiment, the user request is a description of the IDC that is comprised of a list of the devices to include in the DC and how such devices should be configured. In another embodiment, the user request includes a plurality of resource requirements that describe the IDC, as discussed more fully below.

While block 904 is described in terms of a user request to create an DC, other types of requests can also be accommodated within the approaches described herein. For example, the user request can be to change or update an existing IDC.

The request to update an IDC may be identified as an "UPDATE" request for an existing DC as compared to a "CREATE" request for a new IDC. Alternatively, the request to update an DC can be indistinguishable from a request to create an DC, but processing the request includes a step to check to see of the current request applies to an existing DC, and if so, changes can be identified by comparing the current request to the existing IDC with such changes then being processed.

As a specific example, a database can include a description of implemented IDCs, and when a new request is received that is determined to be an update to one of the implemented IDCs, the Unix "diff" functionality can be used to identify changes from the description of the DC in the database, although any application or function capable of comparing different versions can be used. When the changes from the update request are implemented, the database can be updated to reflect the changes to the IDC.

When a service provider processes the request for the IDC, the service provider can itself determine the manner in which to satisfy the user's requirements specified in the request. For example, if the user wants a storage device with a capacity of 50 GB, the service provider does not necessarily provide a storage device with exactly 50 GB. Rather, the service provider can provide a storage device with a larger or smaller capacity, such as by specifying a rule that considers a device that is within 5% of the requested value to be acceptable to satisfy the user's request.

Furthermore, requests to implement an apparatus can take any of a number of forms. For example, many of the embodiments, implementations, and examples described herein are based on the use of farm mark-up language (FML) requests or farm editor mark-up language (FEML) requests. However, any symbolic definition language can be used, not just FML or FEML, and more generally, any other equivalent data structure can be used, such as Java objects.

In addition, requests can be generated in one or more of a number of approaches. For example, many of the embodiments, implementations, and examples described herein are based on a user application that generates a request based on input from a user. However, a user also can manually edit a text file to generate an FML request. As another example, a user can use an XML editor that contains input specified in a document type definition (DTD), as described above, or any other applicable schema. As yet another example, a proprietary editor, such as one with a GUI, which allows the user to work with objects visually depicted on a monitor can be used to generate a request. In general, any form of an input that specifies "containers" and relationships among the containers (e.g., that subnets have IP address, such as by specifying that a subnet object "owns" an IP address object) can be used to generate a request to implement an apparatus.

In addition, XML name spaces can be used to allow for requests in the form compound XML documents that have a mix of FML and HTML. For example, a different structure can be used in the request to implement the apparatus for specific requests to the physical layer (e.g., in the form of HTML) versus specific requests to the logical layer (e.g., in the form of FML). The specific requests can use the same name tags for each layer (e.g., in both HTML and FML), but the specific requests are processed differently depending on the document space (e.g., HTML or FML).

As another example, the use of different name spaces allows for coordination among other different types of layers. As a specific example, a computing grid can include an allocation layer and a configuration layer, with FML associated with the allocation layer (e.g., the user requests that an apparatus include a firewall) and HTML associated with the configuration layer (e.g., configure the firewall according to a specified list of parameters).

9.6 Allocating an Available Resource to an IDC

Once a resource is determined to be available, the resource can be allocated to an DC. As used herein, the term "allocate" means that a resource is assigned for use in an IDC such that the resource is not available for use in another IDC that is independent of the DC to which the resource is assigned. Also, as used herein, the term "de-allocate" means that a resource that is currently assigned for use in an IDC is no longer assigned for use in the IDC, such that the resource is potentially available for use in another IDC that is independent of the IDC to which the resource was originally assigned.

For example, in block 920 of FIG. 9, one or more types of devices are identified that correspond to the logical device, such as that the computing grid includes HP processors and Sun processors of the desired speed and architecture. If the computing grid does include such a device, a determination is made as to whether such a device is available to be included in the DC, such as by being in an idle pool of resources that have not yet been included in any other IDCs. If so, a particular device is identified, such as by identifying a particular Sun processor by an IP address in the computing grid.

Next, in control plane database 135 of FIG. 1D, a physical inventory table of devices can include an indicator for one or more of the devices as to the status of the device with respect to being allocated to an IDC. For example, the status indicator can be "IDLE" if the device is in an idle pool and therefore available to be allocated to an IDC, or the status indicator can be a unique identifier of the IDC to which the device has been allocated, thereby signifying that the device is not available.

One of several approaches for performing the actual allocation can be used. For example, with a "random" approach, the first resource found that satisfies the request is selected. As another example, a more sophisticated approach for improved reliability is to select resources based on one or more policies. As a specific example, to provide for high reliability for an IDC, resources can be selected such that the failure of a single network blade on a switch affects one or a limited number of resources in the IDC, such as by selecting a set of servers that are each on different blades. As another specific example, a policy specifies that backup resources are allocated such that the failure of a primary resource results in swapping over to the backup resource.

The policies to be employed during allocation can be specified by the service provider, the user, or a combination of both. Further, the policies may vary based on the customer's identify, the type of customer, or cost/price information.

9.7 Implementing an Instant Data Center

After a set of available resources for an IDC is determined, the available resources can be allocated to the IDC and then the IDC can be implemented. As used herein, the term "implemented" is used to describe the configuration of an IDC such that the resources that comprise the IDC are configured to work together. The term implemented encompasses the terms "create," "update," and "instantiate" when used to refer to both the initial setting up of an IDC and the updating/modifying an existing IDC.

In the context of logical devices, an IDC can be said to be implemented when the appropriate logical connections between the logical devices are established. Similarly, in the context of physical devices, an IDC can be said to be implemented when the appropriate physical connections between the physical devices are established.

Implementing an IDC does not necessarily entail activation of the IDC. For example, in the example illustrated in FIG. 1E, the IDC can be said to be implemented in IDC inactive phase 156, even though the IDC is not activated until IDC active phase 158.

9.8 Obtaining Previously Unavailable Resources

In the "all or nothing" approach described above, an IDC is implemented if all the necessary resources are available, but if one or more resources are not available, the IDC is not implemented. In the latter situation, implementation of the IDC is described as "failing" whereas in the former situation, implementation of the IDC is described as "succeeding."

In the case in which implementing an DC fails, the service provider will typically undertake efforts to identify the reason for the failure and take corrective steps such that a subsequent attempt to implement the IDC succeeds. For example, if an implementation of an IDC fails because the IDC requires a firewall and no firewall is available, the service provider can remove a previously allocated firewall from another IDC, such that the firewall is returned to the idle pool and thereby made available for allocation to another IDC. As another example, the service provider can add another firewall to the computing grid. In either example, when the service provider makes another attempt to implement the IDC that had previously failed, the IDC implementation can succeed by identifying the newly added firewall in the idle pool and allocating the firewall to the IDC.

However, with this approach of adding resources to the idle pool, the implementation may again fail due to a new problem. For example, in the first attempt to implement the IDC, a load balancer that is required for the IDC could have been identified as available, but by the time that the second attempt to implement the IDC is made, that load balancer could have already been allocated to yet another IDC that was implemented between the first failed implementation attempt and the subsequent implementation attempt. If another load balancer is not available, the second implementation attempt can fail, but this time the failure is due to the lack of an available load balancer instead of the lack of an available firewall.

Additional alternatives for increasing the likelihood that an IDC will be successfully implemented include the use of optional resource requirements, alternative resource requirements, suspendable resource requirements, and preemptable resource requirements, all of which as described in detail below.

10.0 Resource Requirements

In the preceding section, the approaches disclosed that an IDC is established based upon a textual representation of the IDC, determining which of the specified resources are available, and then if all the specified resources are available, implementing the DC. In other words, the preceding approach can be characterized as describing the IDC as a list of devices to be included in the IDC. According to another embodiment, an IDC is viewed as a collection of resource requirements, each of which can either be fulfilled or not fulfilled, as described below.

10.1 Definition of a Resource Requirement

As used herein, the term "resource requirement" means a desired attribute of at least a portion of an apparatus. For example, a resource requirement can specify one or more attributes of the IDC as a whole, such as a minimum amount of storage capacity for the DC or that the IDC provide for a specified level of redundancy.

As another example, a resource requirement can specify one or more attributes of a type of device to be included in an IDC, such as that all servers use a particular operating system and that all servers be based on a specific type of processor architecture, or that one or more storage devices be of a particular type or from a particular manufacturer. As yet another example, a resource requirement can specify one or more attributes of a particular device, such as that a server is capable of handling a specified number of users or that the server runs at a particular clock speed.

Specific examples of resource requirements include, but are not limited to, the following: a processor clock speed, a processor architecture, an operating system, a type of storage device, a storage capacity, a supportable user capacity, a reliability indicator, a device type, a processor type, a storage type, a server type, a firewall type, and a load balancer type. Another example of resource requirement is the specification of a particular physical device to be included in the DC, in which a unique identifier, such as an IP address or a serial number, specifies the particular physical device.

In general, a resource requirement can include one or more criteria of any kind, including but not limited to, the following: a particular value of an attribute; a type of device; a range of attribute values such as from X to Y, that a value satisfy a minimum value, a maximum value, an average value, or a summation of values; or a negative attribute such as that a device type can be any type except one or more particular types.

One or more resource requirements for an apparatus can be satisfied by one or more resources that are available to be allocated to an apparatus. For example, if the resource requirement is for a minimum amount of storage capacity, a set of storage devices whose total storage capacity meets or exceeds the minimum amount of storage capacity satisfies the resource requirement. As another example, one resource requirement can be that a processor has a specified clock speed and another resource requirement can be that the processor is from a particular manufacturer, and therefore a particular processor having the specified clock speed from the particular manufacturer satisfies both resource requirements.

10.2 Allocation States: New, Pending, Allocated, not Allocated

According to an embodiment, an allocation state is associated with a resource requirement. The allocation state indicates the status of the resource requirement with respect to allocation of a resource that satisfies the resource requirement. More generally, the allocation state is a value that indicates the processing status for a resource requirement.

Figure 11:
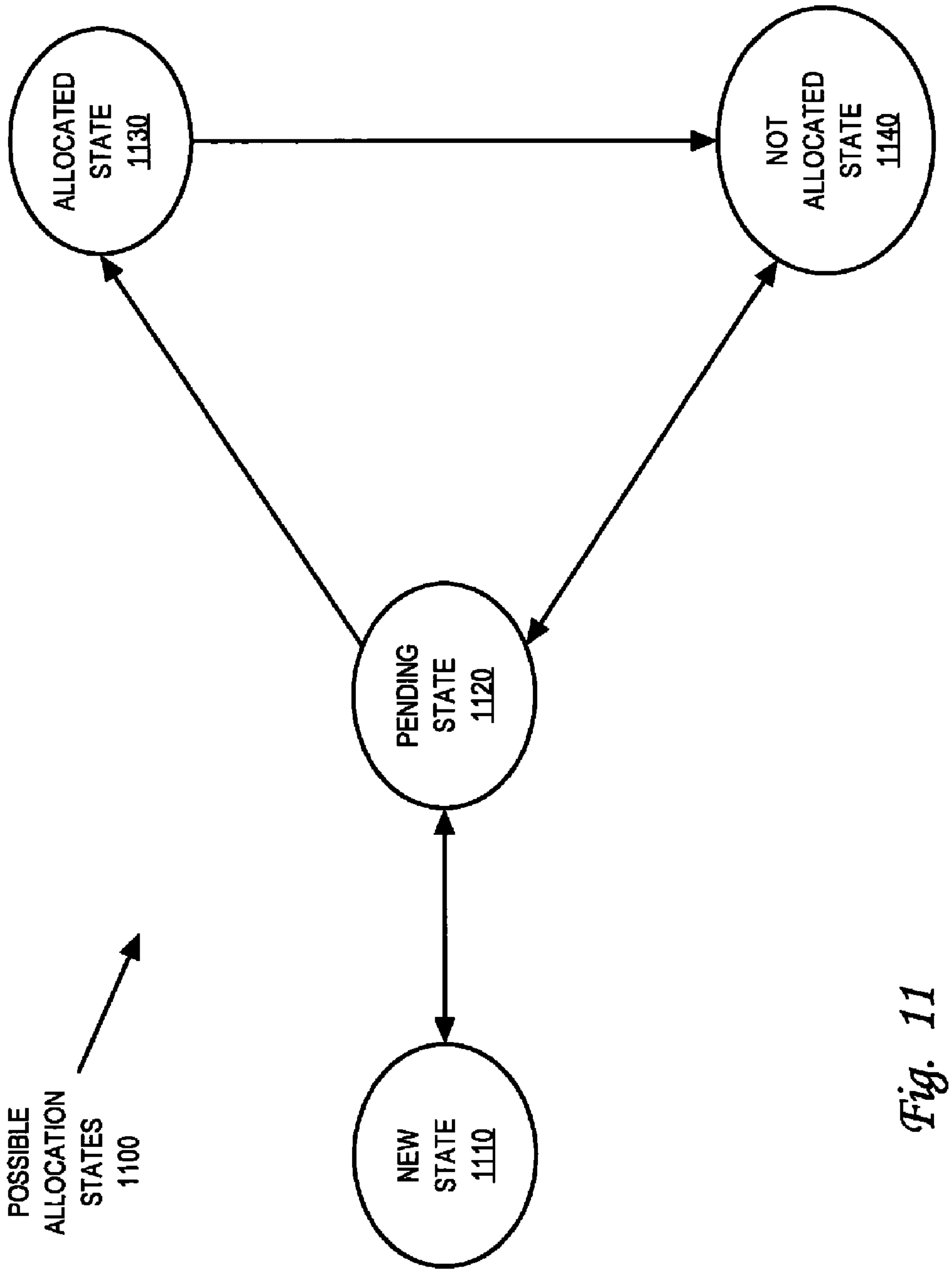
FIG. 11 is a block diagram of possible allocation states for a resource requirement, according to an embodiment.

FIG. 11 is a block diagram of possible allocation states 1100 for a resource requirement, according to an embodiment. Possible allocation states 1100 include a new state 1110, a pending state 1120, an allocated state 1130, and a not allocated state 1140. While FIG. 11 is described in terms of the four illustrated allocation states, fewer or more states may be used, and different state names may be used than those illustrated in FIG. 11.

New state 1110 indicates that processing of a resource requirement has not begun to determine if one or more resources are available to be allocated that satisfy the resource requirement.

Pending state 1120 indicates that processing of a resource requirement has begun, but is not yet complete.

Allocated state 1130 indicates that one or more resources have been allocated that satisfy the resource requirement, thereby fulfilling the resource requirement.

Not allocated state 1140 indicates that one or more resources have not been allocated that satisfy the resource requirement, thereby not fulfilling the resource requirement.

The directions of the arrows in FIG. 11 indicate which of possible allocation states 1100 can change from one to another. For example, new state 1110 can change to pending state 1120, which occurs when processing of the resource requirement begins. Pending state 1120 can change back to new state 1110 if processing is interrupted or cancelled.

Pending state 1120 can change to either allocated state 1130 or not allocated state 1140, depending on whether the resource requirement can be fulfilled by allocating one or more resources that satisfy the resource requirement.

Allocated state 1130 can change to not allocated state 1140, which occurs if a previously allocated resource for the resource requirement is de-allocated from the apparatus, such as when the resource requirement is suspended or preempted, as described more fully below.

Not allocated state 1140 can change to pending state 1120 if subsequent processing is begun to make another attempt to allocate a resource that satisfies the resource requirement.

10.3 Implementation Mechanisms for Allocating Resources Using Resource Requirements In one embodiment, a resource allocator is used to allocate resources to an apparatus, such as an instant data center or a virtual server farm. For example, resource allocator 1030 in FIG. 10 can be the part of management system 1020 that is responsible for allocating resources from an idle pool to particular IDCs.

Figure 12:
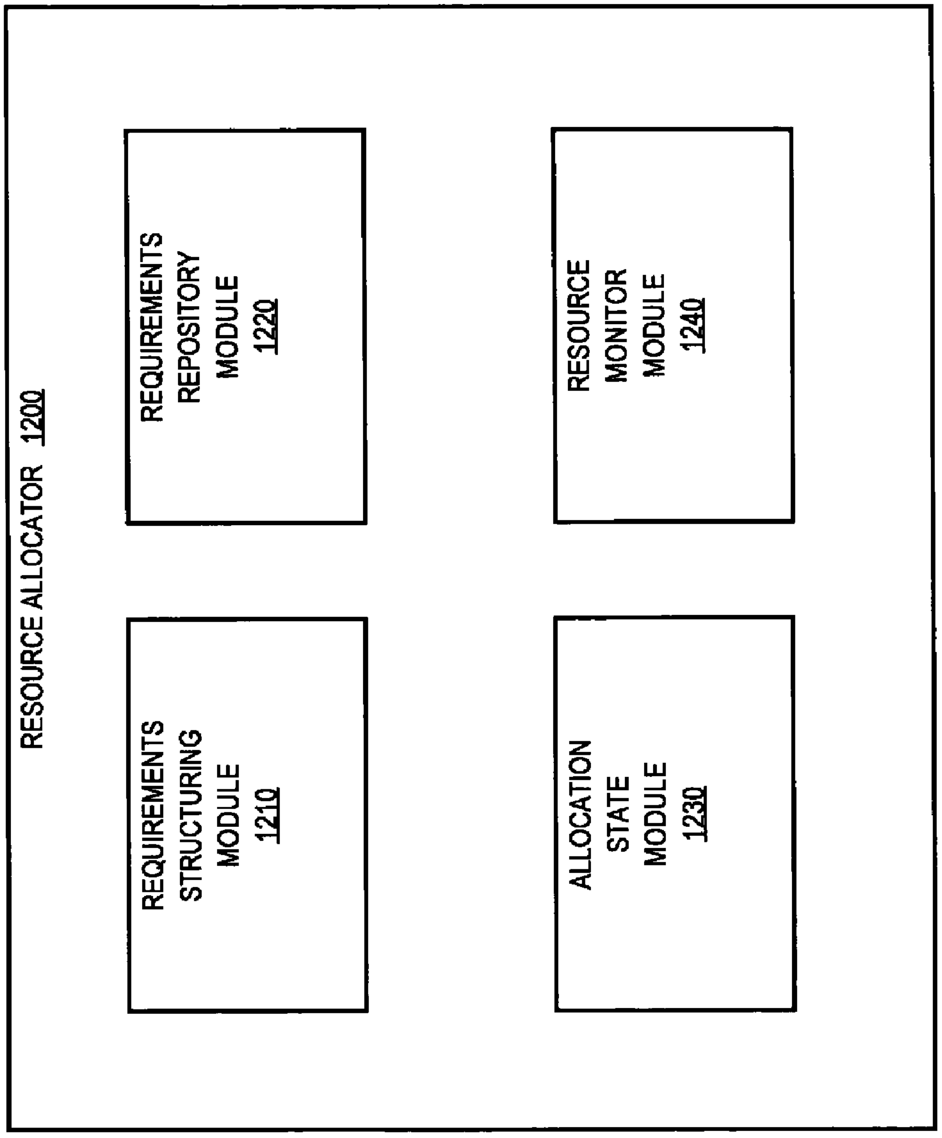
FIG. 12 is a block diagram of a resource allocator, according to an embodiment.

FIG. 12 is a block diagram of a resource allocator 1200, according to an embodiment. Resource allocator 1200 is comprised of a requirements structuring module 1210, a requirements repository module 1220, an allocation state module 1230, and a resource monitor module 1240. While specific functions of each module of resource allocator 1200 are described herein, more or fewer functions may be performed by any of the modules, and a resource allocator may be established that has more or fewer modules with a different distribution of functions among the modules.

Requirements structuring module 1210 receives and processes the resource requirements and maps the resource requirements to resources to be included in the IDC. For example, requirements structuring module 1210 can generate a hierarchical resource requirements tree based on the resource requirements, which is discussed more fully below with respect to dependent resource requirements. Requirements structuring module 1210 can then traverse the hierarchical resource requirements tree by recursively invoking allocation logic at each node of the hierarchical resource requirements and mapping resources to resource requirements.

Requirements structuring module 1210 can be implemented using a directory and file structure, such that the hierarchical arrangement of the directory and files corresponds to the hierarchical resource requirements tree. For example, each node of the directory can correspond to a node in the hierarchical resource requirements tree, and each directory node can have corresponding sub-nodes or leafs that are logically associated with resources in the IDC. The directory nodes can be created as part of a lookup or a read directory operation to access the IDC. A particular node in the directory can correspond to a root node of the hierarchical resource requirements tree, with the particular node created during a boot operation when resource allocator 1200 first accesses resources for the IDC. The remaining directory nodes can be created on demand, such as in response to requests from a user application.

Requirements repository module 1220 can perform a number of functions. For example, requirements repository module 1220 can track the progress of requirements structuring module 1210 in mapping resources to the resource requirements. As another example, requirements repository module 1220 can identify existing content, based on a requested resource name as provided by a user application, thereby providing a resource specific lookup function. As another example, requirements repository module 1220 can perform device specific searches for a requested device based on the device name or based on directories, files, or a database that holds the device information. Such functions are broadly described as "publishing" functions because the availability of resources is communicated, or published, to user level applications through application interfaces of resource allocator 1200.

As yet another example, requirements repository module 1220 can help in generating additional requirements nodes in a hierarchical tree that is described more fully below. As another example, requirements repository module 1220 can logically map resources to IDCs, thereby allowing resources configured in the IDC after a system boot to be allocated based on a request by resource allocator 1200.

Allocation state module 1230 designates possible fulfillment states for the resource requirements. For example, the fulfillment states can be the allocation states illustrated in FIG. 11 as discussed above.

Resource monitor module 1240 tracks resource requirements as they are processed, thereby allowing the resource requirements to be marked fulfilled or unfulfilled, as well as monitoring the availability of resources.

Although the embodiments, implementations, and examples described herein treat the resource allocator as a part of the control plane of the service provider, the resource allocator, or even one or more modules of the resource allocator, can be implemented in user applications or as part of lower level API's that are communicatively coupled with the control plane. For example, as described above with respect to FIG. 10, user application 1090 can incorporate a resource allocator such as resource allocator 1200 or any of the other resource allocators described herein, or one or more modules of such resource allocators. As a result, a user application can perform some or all of the functions of a resource allocator, and the service provider can act in response to the user application.

10.4 Allocating Resources Using Resource Requirements

Figure 13:
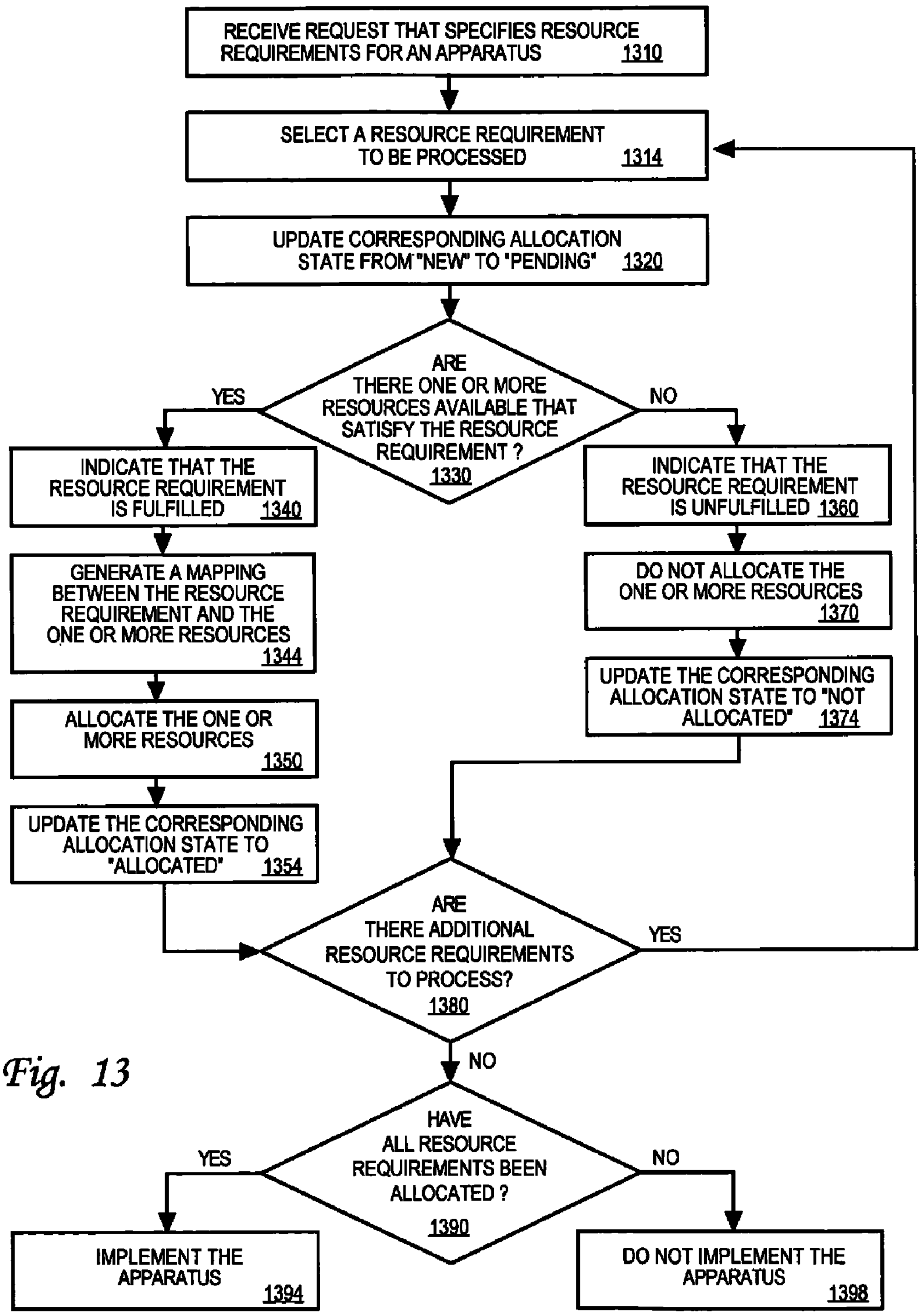
FIG. 13 is a flow diagram of allocating resources to an apparatus based on resource requirements, according to an embodiment.

FIG. 13 is a flow diagram of allocating resources to an apparatus based on resource requirements, according to an embodiment. For purposes of explanation, FIG. 13 is described in terms of allocating resources, such as from an idle pool of a computing grid, to an apparatus, such as an IDC. The functions illustrated in FIG. 13 are described as being performed by a resource allocator, such as resource allocator 1200 of FIG. 12, although one or more of the functions or even all of the functions can be performed by another suitable mechanism capable of performing the functions, such as a control plane. FIG. 13 is also described in terms of possible allocation states 1100 of FIG. 11, although other approaches can be used to indicate the processing status of the resource requirements.

In block 1310, the resource allocator receives a request that specifies the resource requirements for an apparatus. For example, the request can be from a user application that is operated by a customer of a service provider, and the request is to establish a virtual server farm that has a number of attributes that are represented by the resource requirements.

In block 1314, the resource allocator selects one of the resource requirements to be processed. For example, if a hierarchical resource requirements tree has been created in response to the request, the resource allocator can begin processing at the top of the tree.

In block 1320, the resource allocator updates the allocation state that corresponds to the selected resource requirement from "NEW" to "PENDING."

In block 1330, the resource allocator determines whether one or more resources are available that satisfy the resource requirement. For example, if the resource requirement specifies a particular attribute of a specific type of resource, such as the storage capacity of a storage device, the resource allocator can identify a type of storage device included in the computing grid that has the specified storage capacity, or the resource allocator can identify two particular storage devices whose combined storage capacity is the specified storage capacity. Depending on the implementation, if one or more resources cannot be identified that satisfy the resource requirement, the closest matching resource or resources to the resource requirement can be identified.

If one or more resources are available that satisfy the resource requirement, the process continues to block 1340, and if not, the process continues to block 1360.

In block 1340, the resource allocator indicates that the resource requirement is fulfilled. As used herein, the term "fulfilled" means that one or more resources are available that satisfy the resource requirement. For example, the resource allocator can store a data value that corresponds to the resource requirement, and the data value signifies that the resource requirement is fulfilled.

In block 1344, the resource allocator creates a mapping of the resource requirement to the one or more resources that have been determined to be available and that satisfy the resource requirement. For example, a data table can be used to associate a resource requirement with one or more identifiers of the one or more resources that fulfill the resource requirement. As more specific examples, the identifiers can identify one or more logical devices that satisfy the resource requirement, or the identifiers can identify one or more physical devices that satisfy the resource requirement.

In block 1350, the resource allocator allocates the one or more resources to the apparatus. For example, the resource allocator can cause an update to the control plane database to indicate that the one or more resources are allocated to the particular virtual server farm that the user has requested in block 1310.

In block 1354, the resource allocator updates the corresponding allocation state of the resource requirement from "PENDING" to "ALLOCATED," and then the process continues to block 1380, as described below.

As noted above, if in block 1330 the resource allocator determined that the one or more resources were not available, the process continues to block 1360 where the resource allocator indicates that the resource requirement is unfulfilled. As used herein, the term "unfulfilled" means that one or more resources are not available that satisfy the resource requirement. For example, the resource allocator can store a data value that corresponds to the resource requirement, and the data value signifies that the resource requirement is unfulfilled.

In block 1370, the resource allocator does not allocate the one or more resources to the apparatus, and in block 1374, the resource allocator updates the corresponding allocation state of the resource requirement from "PENDING" to "NOT ALLOCATED." The process continues to block 1380.

In block 1380, the resource allocator determines if there are additional resource requirements to be processed. If so, the process returns to block 1314 where another resource requirement with an allocation state of "NEW" is selected. If not, the process continues to block 1390.

In block 1390, the resource allocator determines if all the resource requirements specified by the request in block 1310 have been allocated. In the example illustrated in FIG. 13, the previously described "all or nothing" approach for implementing an apparatus is used. For example, the resource allocator can query the allocation state of the resource requirements to determine if all the allocation states are "ALLOCATED," or conversely, whether any allocation states are "NOT ALLOCATED."

If all the resource requirements have been allocated, the process continues from block 1390 to block 1394 where the apparatus is implemented, such as by the control plane establishing the necessary connections among the allocated resources.

If all the resource requirements have not been allocated, the process continues from block 1390 to block 1398 where the apparatus is not implemented, and thus the request to implement the apparatus as requested in block 1310 fails.

In the approach illustrated in FIG. 13, all resource requirements are processed, even if for one or more resource requirements, one or more resources are not available as determined in block 1330, resulting in the allocation states for such one or more resource requirements being changed to "NOT ALLOCATED" in block 1374. The approach of FIG. 13 can provide a more complete list of resource requirements for which resources need to be made available by the service provided, although at the expense of processing all the resource requirements even though the apparatus cannot be implemented. If the service provider allows any resources that have been allocated in block 1350 to remain allocated to the apparatus, even though the apparatus cannot be implemented, such resources can be reserved for the particular apparatus, say for a set period of time, so that such resources can be used to implement the particular apparatus when a subsequent attempt to implement the apparatus is made.

In an alternative approach, processing of the resource requirements can stop the first time that block 1360 is reached from block 1330, meaning the first time one or more resources are not available. With the alternative approach, resource requirements most likely would not be processed, thereby saving processing resources for an apparatus that cannot be implemented. Furthermore, any resources allocated to the apparatus up to the point at which an unavailable resource is found can be de-allocated and returned to the idle pool to be available to be allocated to other apparatuses. Of course, with the alternative approach, some resources that were available in an earlier failed attempt to allocate an apparatus may be allocated to other apparatuses in the meantime, and therefore such resources would not be available to the particular apparatus later when a subsequent attempt to implement the apparatus is made.

In the approach illustrated in FIG. 13, resource requirements are processed in a linear or serial fashion, one at a time. In an alternative approach, resource requirements can be processed in parallel, such as through the use of multiple processors or through the use of a single processor having multiple threads. Depending on the particular implementation, when the allocation state for a resource requirement is changed to "NOT ALLOCATED," processing by the other processors or threads can be halted. Alternatively, processing can continue by the other processors or threads for the resource requirements being processed, or even for additional resource requirements waiting to be processed, even though the apparatus cannot be implemented due to the unavailable resources for the resource requirement with the "NOT ALLOCATED" allocation state.

11.0 Dependent Resource Requirements

Resource requirements can be independent of each other, such that whether or not one resource requirement is fulfilled does not affect the ability of another resource requirement to be fulfilled. For example, a resource requirement that specifies an apparatus to include a load balancer is typically independent of another resource requirement that specifies that an apparatus include a firewall.

However, two or more resource requirements can be related such that the ability to fulfill one of the resource requirements impacts whether another resource requirement can be fulfilled. The relationships between the resource requirements can be represented in a hierarchical manner, such as through a hierarchical resource requirements tree as described below. If one resource requirement cannot be fulfilled, then any other resource requirements that depend on the unfulfilled resource requirement are also not fulfilled, even if separately such resource requirements could be fulfilled if independent of the unfulfilled resource requirement.

For example, consider a request to implement an apparatus includes the following three resource requirements: the first resource requirement specifies that the apparatus is to include a web server, the second specifies that the processor of the server have a stated minimum clock speed, and the third specifies that the processor be of a particular architecture. If one or more of the three resource requirements cannot be fulfilled, even if the other resource requirements could otherwise be satisfied, overall the three resource requirements cannot be fulfilled because a web server having the stated minimum clock speed and particular architecture is not available.

In this example, the three resource requirements are dependent upon one another, with the dependencies capable of being expressed in a number of ways. For example, the first resource requirement can be designated as a parent resource requirement and the other two resource requirements designated as child resource requirements with respect to the parent resource requirement and as sibling resource requirements to each other. This example and other examples are covered more fully below.

During processing of a set of resource requirements for an apparatus that are arranged in a hierarchical manner, processing can proceed from the highest level node of the hierarchy. If any resource requirements depend upon an unfulfilled resource requirement, the processing of the dependent resource requirements can be skipped and the dependent resource requirements considered to be unfulfilled based on the dependency relationship between the resource requirements.

11.1 Hierarchical Resource Requirements Tree

According to an embodiment, resource requirements are logically organized according to a hierarchical resource requirements tree. The resource requirements are logically organized into different levels of nodes that branch off of nodes at higher levels. For example, the top of the tree, or the root node, can be a resource requirement that represents the apparatus itself (e.g., the MC or VSF). The next level of nodes, which can be referred to as sub-nodes or branch nodes, represent resource requirements of the basic building blocks of the apparatus, such as a set of servers and a loadbalancer for the servers. The next level of nodes represents resource requirements for various components of the basic building blocks, such as that each server include a disk and/or central processing unit (CPU). Finally, the last level of nodes, which can be referred to as leaf nodes, represents resource requirements for attributes of the components of the basic building blocks, such as that the CPU have a particular clock speed or that that disk have a specified storage capacity.

Because the hierarchical resource requirements tree is generated based on parent child dependencies, a document object model (DOM) can be used to generate the tree, such as the DOMs described above with respect to FIG. 4. Also, while the examples herein are generally of FML representations of the apparatus to be implemented, non-XML input in the form of a hierarchical tree of related resources and attributes can be used as the starting point for a translation into XML or FML.

Figure 14:
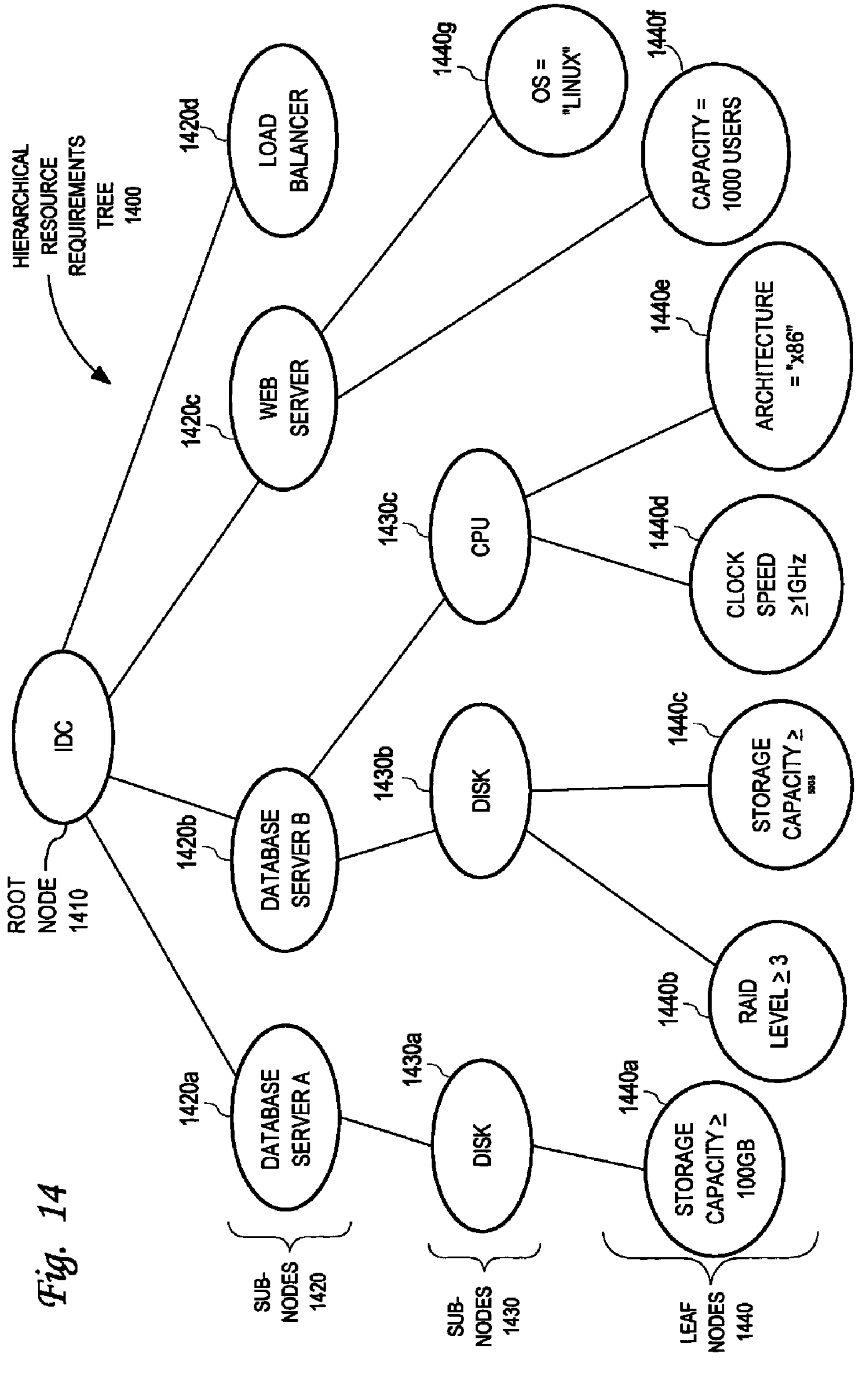
FIG. 14 is a block diagram of a hierarchical resource requirements tree, according to an embodiment

FIG. 14 is a block diagram of a hierarchical resource requirements tree 1400, according to an embodiment. While FIG. 14 is illustrated with four levels of nodes, sub-nodes, and leaf nodes, any number of levels with any number of nodes can be accommodated by the approaches described herein. In addition, other types of nodes, sub-nodes, and leaf nodes can be used besides those illustrated in FIG. 14. Also, while FIG. 14 illustrates a top-down organization, other organizations of nodes can be used, such as bottom-up, horizontally, a circular arrangement of hubs and spokes, etc.

Hierarchical resource requirements tree includes a root node 1410, sub-nodes 1420, sub-nodes 1430, and leaf nodes 1440.

Root node 1410 represents a resource requirement for the IDC. Thus, in this formulation, an apparatus can be represented as a single resource requirement that can either be fulfilled or unfulfilled.

Branching off of root node 1410 are sub-nodes 1420*a*-1420*d*, which correspond to resource requirements that represent a database server A, a database server B, a web server, and a load balancer, respectively. For example, the web server of sub-node 1420*c* may support a web site, and the services provided by the web site include accessing information stored on database server A as represented by sub-node 1420*a* and database server B as represented by sub-node 1420*b*. Sub-node 1420*d* represents a resource requirement that the IDC of root node 1410 include a load balancer to evenly distribute database transactions between database server A and database server B.

Branching off of sub-nodes 1420 are sub-nodes 1430. Specifically, from sub-node 1420*a* for database server A, sub-node 1430*a* represents a resource requirement that database server A include a disk. Similarly, branching from sub-node 1420*b* are sub-nodes 1430*b* and 1430*c* which represent resource requirements that specify that database server B include a disk and a CPU, respectively. Note that there are no sub-nodes in sub-nodes 1430 branching from either sub-node 1420*c* or sub-node 1420*d*. For example, for sub-node 1420*d* that represents the resource requirement that the IDC include a load balancer, the user may not care what attributes the load balancer has so long as it is configured to balance the database processing from the web server between database servers A and B.

Branching off of sub-nodes 1430 are leaf nodes 1440. Specifically, leaf node 1440*a* represents a resource requirement that the disk requested by the resource requirement represented by sub-node 1430*a* have a storage capacity of at least 100 GB. Likewise, leaf nodes 1440*b* and 1440*c* branch from sub-node 1430*b* and represent resource requirements that the disk specified by the resource requirement represented by sub-node 1430*b* include a raid level of at least 3 and a storage capacity of greater than 50 GB, respectively. Similarly, leaf nodes 1440*d* and 1440*e* branch from sub-node 1430*c* and represent resource requirements that the CPU specified by the resource requirement represented by sub-node 1430*c* have a clock speed of greater than 1 GHz and an "x86" architecture. Finally, leaf nodes 1440*f* and 1440*g* branch from sub-node 1420*c* and represent resource requirements that the web server specified by the resource requirement represented by sub-node 1420*c* have a capacity of 500 GB and use the "Linux" operating system (OS), respectively.

Hierarchical resource requirements tree 1400 can be generated by requirements structuring module 1210 of resource allocator 1200 illustrated in FIG. 12, although other modules or devices capable of generating an appropriate hierarchical structure can be used. In addition, the generation of hierarchical resource requirements tree 1440 by resource allocator 1200 can take place after block 1310 and before block 1314 in FIG. 13, although hierarchical resource requirements tree 1440 can be generated at other positions in the resource allocation process.

11.2 Parent-Child Dependent Resource Requirements

In one embodiment, dependent resource requirements are based on a parent-child relationship. For example, in FIG. 14, if the resource requirement to include a web server, as represented by sub-node 1420*c*, cannot be fulfilled, then the resource requirements that the web server have a capacity of 500 GB and that the OS be "Linux," as represented by leaf nodes 1440*f* and 1440*g* respectively, also cannot be fulfilled. Thus, the web server resource requirement is the parent resource requirement, and the resource requirements that the web server have a capacity of 500 GB and that the OS be "Linux" are each a child resource requirement of the parent resource requirement. The child resource requirements depend on the parent resource requirement because if the latter cannot be fulfilled, neither can the former.

In addition, the child resource requirement that the web server have a capacity of 500 GB and that the OS be "Linux" can be described as sibling resource requirements because each depends on the same parent resource requirement.

Note also that a particular resource requirement can be both a parent resource requirement with respect to some nodes, and a child resource requirement with respect to other nodes. For example, in FIG. 14, the resource requirement that database server A include a disk, as represented by sub-node 1430*a*, is a parent resource requirement with respect to the resource requirement that the disk have a storage capacity of at least 100 GB, as represented by leaf node 1440*a*. In addition, the resource requirement that database server A include a disk is a child resource requirement with respect to the resource requirement that the IDC include database server A, as represented by sub-node 1420*a*.

11.3 Referential Dependent Resource Requirements

In one embodiment, dependent resource requirements are based on a referential relationship such that if one resource requirement is unfulfilled, then the dependent resource requirement is also unfulfilled, regardless of whether the resource requirements are logically or physically related. Therefore, in general, a resource requirement can depend on another resource requirement.

As an example, a resource requirement specifies a server that has a network interface that refers to an IP address, and another resource requirement specifies a subnet. If the subnet cannot be allocated, the server also cannot be allocated because the server's IP address must be put on a subnet.

As another example, in FIG. 14, the resource requirement that the IDC include a load balancer, as represented by sub-node 1420*d*, can be referentially related to the resource requirements that the IDC include database servers A and B, as represented by sub-nodes 1420*a* and 1420*b*. If one of the resource requirements specifying the inclusion of database servers A and B cannot be fulfilled, then there is no need to include a load balancer if there is one database server in the IDC. In this situation, the resource requirement for the load balancer can be referentially related to both the resource requirements for database servers A and B such that if either of the latter is unfulfilled, the former will also be unfulfilled.

11.4 Dependency Involving Sets of Resource Requirements

Dependent resource requirements can apply between individual resource requirements or sets of resource requirements. For example, one resource requirement can depend on another resource requirement, such as in FIG. 14 in which the resource requirement that the disk of database server A have a storage capacity of at least 100 GB. As another example, a resource requirement can depend on a set of resource requirements, as in the referential example above in which the load balancer resource requirement depends on both the database server resource requirements.

As yet another example, a set of resource requirements can depend on one resource requirement, such as the resource requirements that the web server have a capacity of 500 GB and an OS of "Linux." As another example, a set of resource requirements can depend on another set of resource requirements, such as in FIG. 14 in which the resource requirements represented by leaf nodes 1440*b*, 1440*c*, 1440*d*, and 1440*e* depend upon the resource requirements represented by sub-nodes 1420*b*, 1430*b*, and 1430*c*.

Similar to these parent-child types of examples of dependent resource requirements involving sets of resource requirements, referential resource requirements can involve sets of resources requirements.

In general, one or more resource requirements can depend upon another one or more resource requirements such that if any resource requirement in the latter is unfulfilled, all of the resource requirements in the former are unfulfilled.

11.5 Allocating Resources Using Dependent Resource Requirements

Figure 15:
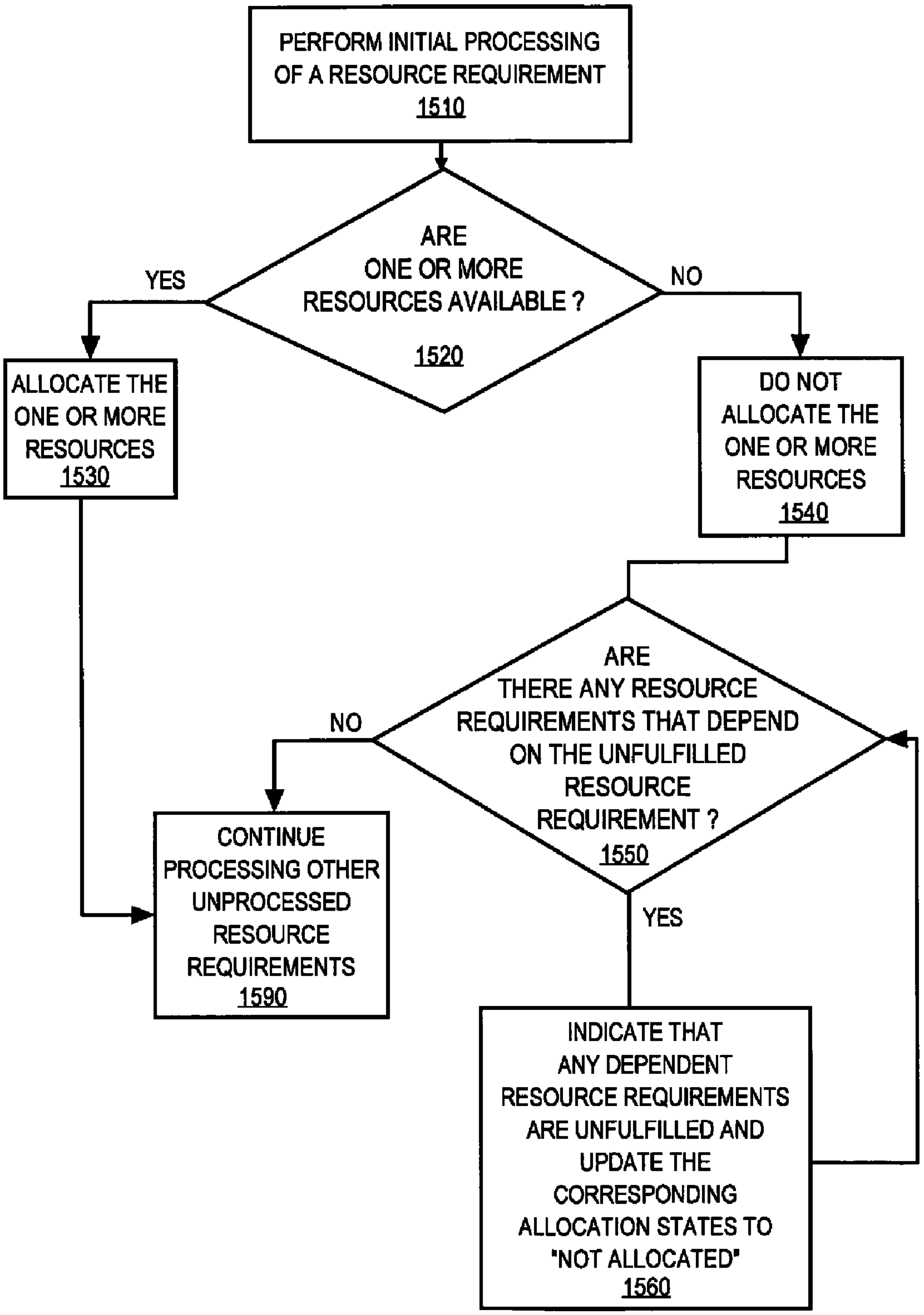
FIG. 15 is a flow diagram illustrating allocation of resources to an apparatus based on dependent resource requirements, according to an embodiment.

FIG. 15 is a flow diagram illustrating allocation of resources to an apparatus based on dependent resource requirements, according to an embodiment. FIG. 15 is a simplified version of the approach illustrated in FIG. 13, and therefore for clarity some steps illustrated in FIG. 13 are omitted in FIG. 15, although such steps can be included.

In block 1510, the resource allocator performs initial processing of a resource requirement. For example, block 1510 can correspond to blocks 1310, 1314, 1320, and 1330 of FIG.

13. The output of block 1510 is that one or more resources are identified that satisfy the resource requirement selected for processing.

In block 1520, the resource allocator determines whether one or more resources are available that satisfy the resource requirement. If so, the process continues to block 1530, where the resource allocator allocates the one or more resources to the apparatus. Block 1530 also can include additional functions, such as those from blocks 1340, 1344, and 1354 of FIG. 13. From block 1530, the process continues to block 1590.

If in block 1520, the one or more resources are not available, then the process continues to block 1540, where the one or more resources are not allocated to the apparatus. Block 1540 also can include additional functions, such as those from blocks 1360 and 1374 of FIG. 13.

From block 1540, the process continues to block 1550, where the resource allocator determines whether there are any resource requirements that depend on the unfulfilled resource requirement currently being processed. For example, the resource allocator can determine whether there are any child resource requirements that depend on the unfulfilled parent resource requirement. If there are no dependent resource requirements, the process continues to block 1590. If there are dependent resource requirements, the process continues to block 1560.

In block 1560, the resource allocator indicates that any dependent resource requirements determined in block 1550 are unfulfilled, and the resource allocator updates the corresponding allocation states for such dependent resource requirements to "NOT ALLOCATED." Note that for the dependent resource requirements, no determination is made as to whether one or more resources are available that satisfy the dependent resource requirements. For example, the processing of child dependent resource requirements need not be performed because the failure to fulfill the parent resource requirement means that the child resource requirements also will be unfulfilled.

From block 1560, the process returns to block 1550, where the resource allocator determines whether there are any resource requirements that depend on the unfulfilled resource requirements that were indicated as unfulfilled in block 1560. For example, a child resource requirement indicated as unfulfilled in block 1560 may be a parent resource requirement to yet another resource requirement. Note that processing through blocks 1550 and 1560 continues until no more dependent resource requirements are determined based on previous unfulfilled resource requirements that can be traced back via dependent relationships to the original resource requirement for which processing begun in block 1510.

In block 1590, the resource allocator continues processing other unprocessed resource requirements. For example, block 1590 can correspond to blocks 1380, et seq., in FIG. 13.

12.0 Optional Resource Requirements

In one embodiment, resource requirements are either optional or necessary, and the apparatus is implemented even though one or more resources that satisfy one or more resource requirements are unavailable if the unavailable resources satisfy resource requirements that are optional. For example, a user can determine which resources are really needed in a particular apparatus and which resources that the user would like to have, but is willing to forgo when the apparatus is implemented. As a specific example, the user may specify that a firewall is necessary, because of security concerns, so that the apparatus is not implemented without a firewall. However, the user may desire to have three servers, but the user can accept an apparatus with two servers, and thus the user can specify two servers as necessary but the third as optional.

Recall that in the "all or nothing" approach described previously, the apparatus is implemented if all the resources that satisfy the resource requirements are available, but if one or more resources are not available, then the apparatus is not implemented. The "all or nothing" approach is suited for computing grids with idle pools that contain a sufficient number of devices to accommodate the received requests to implement IDCs without running out of available resources.

In contrast, the use of optional resource requirements and necessary resource requirements allows the apparatus to be implemented despite some resources being unavailable, provided that those resources correspond to optional resource requirements. Nevertheless, if one or more resources are not available that correspond to necessary resource requirements, then the apparatus is not implemented. The use of optional resource requirements can allow for the use of a smaller idle pool than with the "all or nothing" approach because the service provider need not maintain as large of an inventory of devices that are likely to be specified as optional in requests to implement IDCs.

For example, consider the apparatus that corresponds to the hierarchical resource requirements tree 1400 of FIG. 14. In the "all or nothing" approach, all resources that satisfy the resource requirements represented by sub-nodes 1420, sub-nodes 1430, and leaf nodes 1440 must be determined to be available in order to implement IDC. If even one resource is not available for one of the resource requirements, implementation of the IDC fails.

In contrast, with the use of optional resource requirements, one or more of the resource requirements represented by a node in FIG. 14 can be specified as optional, with the remaining resource requirements specified as necessary. If any of the one or more optional resource requirements are unavailable, the IDC is still implemented.

For example, the resource requirement for the load balancer represented by sub-node 1420*d* can be specified as optional. If a load balancer is not available that satisfies the resource requirement represented by sub-node 1420*d*, the DC is still implemented, albeit without the load balancer.

As another example, one or more of leaf nodes 1440 can be specified as optional, say the resource requirement that the disk for database server B have a RAID level of three or greater, as represented by leaf node 1440*b*. If a disk is available with RAID level 2, but otherwise satisfies the resource requirements represented by sub-node 1430*b* and leaf node 1440*c*, the IDC can still be implemented. However, if a disk is available with RAID level 2 but has a storage capacity of 25 GB, the implementation of the IDC will fail because the resource requirement that the storage capacity be greater than 50 GB, as represented by leaf node 1440*c*, is not satisfied and that same resource requirement is necessary, not optional.

Optional resource requirements can be used to identify resource requirements that a user or organization would like to have included in an apparatus, but which are not required because the user or organization is willing to accept an IDC without such resource requirements. Optional resource requirements also can be used to specify preferences and more details about different resources than might otherwise be specified with the "all or nothing" approach due to concern that the entire IDC will fail to be implemented because one resource requirement is not satisfied.

A resource allocation approach that includes the use of optional resource requirements may be characterized as robust because failures to implement apparatuses are generally less common if optional resource requirements are used as compared to the "all or nothing" approach described previously.

Note that while the terms "optional" and "necessary" are used herein, other appropriate terminology can be used. For example, resource requirements can be classified as either "desired" or "required," or as either "elective" or "mandatory."

12.1 Implementing an Apparatus with Optional Resource Requirements

Figure 16:
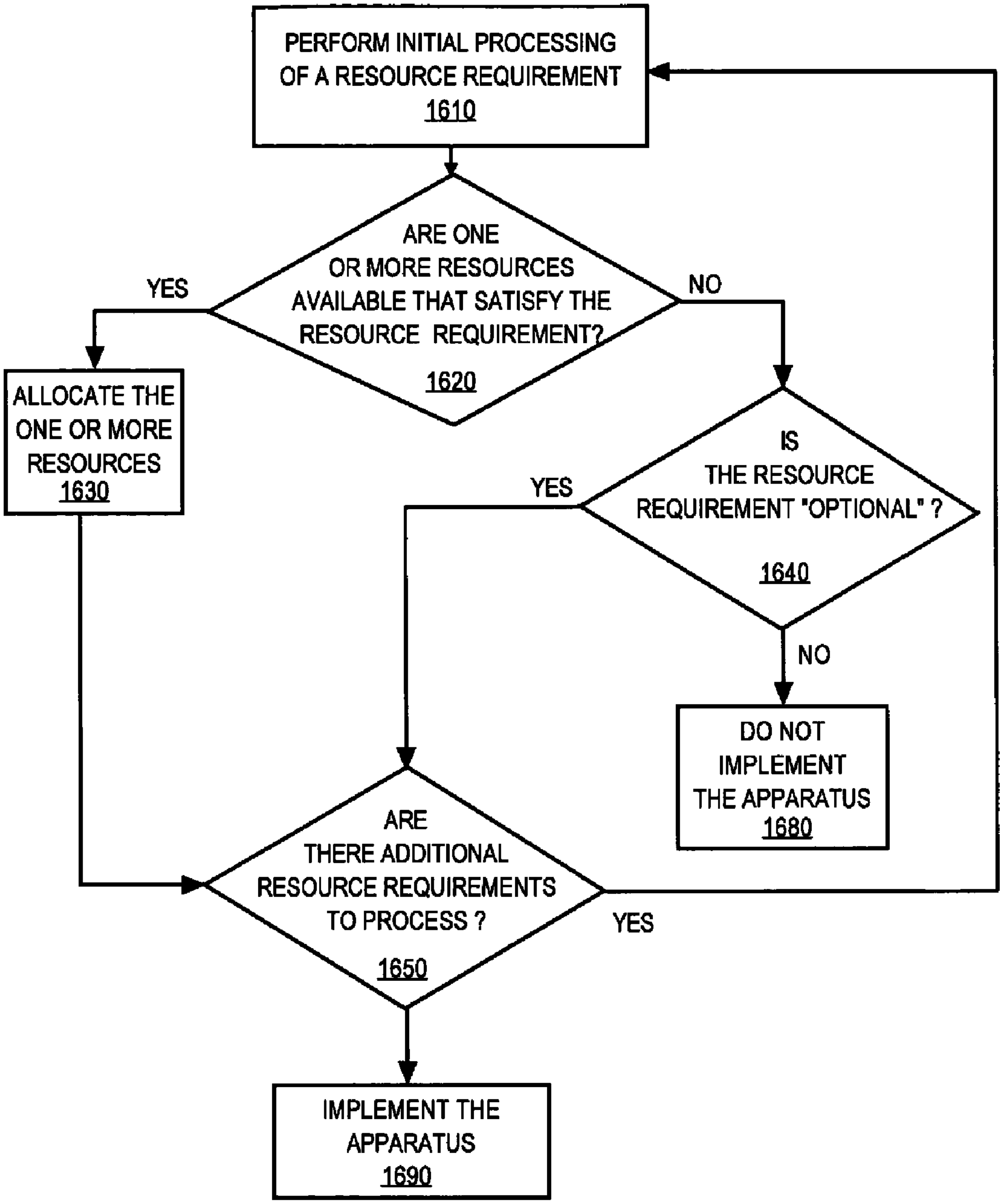
FIG. 16 is a flow diagram illustrating allocation of resources to an apparatus based on optional resource requirements, according to an embodiment.

FIG. 16 is a flow diagram illustrating allocation of resources to an apparatus based on optional resource requirements, according to an embodiment. FIG. 16 is a simplified version of the approach illustrated in FIG. 13, and therefore for clarity some steps illustrated in FIG. 13 are omitted in FIG. 15, although such steps can be included.

FIG. 16 is described with reference to the processing of resource requirements that are specified to be "OPTIONAL" or "NECESSARY", and thus FIG. 16 does not include the possibility of adding one or more additional features as described herein or elsewhere, including but not limited to, features such as resource requirements, dependent resource requirements, alternative resource requirements, suspendable resource requirements, and preemptable resource requirements. However, in a particular implementation, any number of such features as described herein may be included along with additional features not described herein.

In block 1610, the resource allocator performs initial processing of a resource requirement. For example, block 1610 can correspond to blocks 1310, 1314, 1320, and 1330 of FIG. 13. The output of block 1610 is that one or more resources are identified that satisfy the resource requirement selected for processing.

In block 1620, the resource allocator determines whether the one or more resources are available that satisfy the resource requirement. If so, the process continues to block 1630, where the resource allocator allocates the one or more resources to the apparatus. Block 1630 also can include additional functions, such as those from blocks 1340, 1344, and 1354 of FIG. 13. From block 1630, the process continues to block 1650.

If in block 1620, the one or more resources are not available, then the process continues to block 1640, where the resource allocator determines whether the resource requirement being processed is "OPTIONAL." For example, the resource allocator can inspect a flag that is associated with the "NOT ALLOCATED" resource requirement to determine if the value of the flag is "OPTIONAL" or whether the value is a default value of "NECESSARY." Block 1640 also can include additional functions, such as those from blocks 1360 and 1374 of FIG. 13.

If in block 1640, the resource requirement being process is determined to be "OPTIONAL," the process continues to block 1650, but if not, the process continues to block 1680, where the apparatus is not implemented.

In block 1650, the resource allocator determines if there are additional resource requirements to be processed. If so, the process returns to block 1610 where another resource requirement with an allocation state of "NEW" undergoes initial processing. If not, the process continues to block 1690, where the apparatus is implemented, such as by the control plane establishing the necessary connections among the allocated resources.

In the approach illustrated in FIG. 16, the processing of resource requirements stops at the first resource requirement that is "NECESSARY" and for which the one or more resources are not available. If one or more resources are not available for an "OPTIONAL" resource requirement, processing continues with the next resource requirement, and if all resources are available, or if all resources that are not available correspond to "OPTIONAL" resource requirements, not "NECESSARY" resource requirements, the apparatus is implemented.

With the approach of FIG. 16, computational resources in processing the resource requirements is minimized by stopping the process upon the identification of a "NECESSARY" resource requirement for which the one or more resources are not available. In such a situation, the service provider can undergo efforts to make the necessary resources available such that a subsequent request to implement the apparatus will not fail. However, when a subsequent request to implement the apparatus is processed, implementation of the apparatus may yet again fail due to other resources not being available, including perhaps resources that were available in the previous attempt, but which have subsequently been allocated to other apparatuses between the earlier attempt and the most recent attempt to implement the apparatus.

In a second approach, processing does not stop if in block 1640 the resource requirement is not "OPTIONAL" (e.g., the one or more resources that are not available correspond to a "NECESSARY" resource requirement). Instead, the allocation state for the "NECESSARY" resource requirement is changed to "NOT ALLOCATED," and then processing continues to block 1650. Once the processing of all the resource requirements is complete, a check is made to determine if any "NECESSARY" resource requirements are "NOT ALLOCATED," and if so, the apparatus is not implemented, as illustrated by block 1680. However, if all the resource requirements with the allocation state of "NOT ALLOCATED" are "OPTIONAL" resource requirements, the apparatus is implemented, as illustrated by block 1690.

With the second approach, all resource requirements are processed, even if one or more resources are not available for one or more "NECESSARY" resource requirements. While the second approach consumes more processing resources since more work is done even if the apparatus cannot be implemented for situations in which "NECESSARY" resource requirements cannot be fulfilled, the results of the processing can provide a more complete list of the needed but unavailable resources. The service provider can then obtain or add all the devices that need to be allocated to the apparatus so that a subsequent attempt to implement the apparatus is more likely to succeed.

In addition, the second approach can be implemented such that allocated resources from a failed attempt to implement an apparatus are not returned to the idle pool for a set period of time, hence reserving the allocated resources to prevent them from being allocated to other apparatuses before another attempt to implement the particular apparatus is made. This avoids the situation in which the service provider makes available a previously unavailable resource, but the subsequent attempt to implement the apparatus again fails due to a previously available resource being allocated to another apparatus between the earlier and subsequent attempts to implement the particular apparatus, such as in the approach illustrated in FIG. 16.

12.2 Specifying that a Resource Requirement is Optional

The specification that a resource requirement is optional or necessary can be based on one or more of a number of approaches. For example, the request for an IDC that includes the resource requirements can include a variable, such as a tag, for each resource requirement, with the variable having one of two possible values. One value indicates that the resource requirement must be included in the apparatus, meaning that the resource requirement is necessary so that the apparatus cannot be implemented without the resource requirement being satisfied. The other value indicates that the resource requirement does not have to be included in the apparatus, meaning that the resource requirement is optional so that the resource requirement is not required to be included in the apparatus. More generally, the data indicating the optional nature of the resource requirements can be received outside of the request for the IDC, whether from the user that desires the IDC or from another entity, such as the service provider or a third party.

As another example, data can be received by the resource allocator and used to determine whether a resource requirement is optional or necessary. For example, instead of the user specifying the optional or necessary nature of the resource requirements, the service provider can maintain a database in which different types of resource requirements are identified as optional or necessary, and the resource allocator can access the database and retrieve data to determine whether any resource requirements that are unfulfilled (e.g., with a state of "NOT ALLOCATED") are to be treated as optional. More generally, the resource allocator can retrieve a rule and/or data that can be used to determine whether a resource requirement is optional.

As yet another example, instead of specifying resource requirements as either optional or necessary, a default classification approach can be used with exceptions identified based on one of the approaches described above. For example, the default can be that resource requirements are "NECESSARY," with the user identifying resource requirements as "OPTIONAL" in the request for the IDC. Alternatively, the default can be that all resource requirements are "OPTIONAL" unless specified to be "NECESSARY."

12.3 Using Dependent Resource Requirements with Optional Resource Requirements In one embodiment, optional resource requirements are used with dependent resource requirements when implementing an apparatus. For example, consider database server B of FIG. 14, which is associated with resource requirements specifying that database server B include a CPU having both a clock speed of greater than 1 GHz and an "x86" architecture. As described previously, the resource requirement for the CPU of database server B, as represented by sub-node 1430*c*, is a parent resource requirement with respect to leaf nodes 1440*d* and 1440*e*, which are child resource requirements of the CPU resource requirement, and sibling resource requirements of each other.

In the "all or nothing" approach, if either resource requirement represented by leaf nodes 1440*d* or 1440*e* cannot be satisfied, then implementation of the IDC fails because both resource requirements must be satisfied (e.g., essentially both resource requirements are treated as "NECESSARY", as are all resource requirements in the "all or nothing" approach). However, if one or both of the resource requirements represented by leaf nodes 1440*d* and 1440*e* are determined to be "OPTIONAL," and if either or both are "NOT ALLOCATED" because a CPU is not available that satisfies one or more resource requirements, implementation of the IDC does not fail due to one or more both resource requirements represented by leaf nodes 1440*d* and 1440*e* are "NOT ALLOCATED." Thus, a resource requirement that is "OPTIONAL" can be fulfilled or unfulfilled independently of any sibling resource requirements.

In general, the use of dependent resource requirements with optional resource requirements allows for a set of resource requirements to be interdependent, yet the set itself is optional. Therefore, if any member of the set cannot be fulfilled, then none of the requirements in the set are fulfilled. However, because the set itself is optional, the failure to fulfill the set of interdependent resource requirements does not preclude implementation of the apparatus.

13.0 Alternative Resource Requirements

In one embodiment, if one or more resources that satisfy one resource requirement are not available, one or more other resources that satisfy another resource requirement are allocated to an apparatus. For example, a user can specify two or more resource requirements that represent alternatives, and the apparatus is implemented using resources that satisfy one resource requirement of the two or more resource requirements. As a specific example, the user may specify that a virtual server farm include either one large server or a set of three smaller servers fronted by a load balancer. As long as either the large server or the set of three smaller servers plus the load balancer can be allocated to the virtual server farm, the virtual server farm can be instantiated, depending on the allocation states of other resource requirements for the virtual server farm. If neither alternative can be satisfied, then instantiation of the virtual server farm may fail, depending on other factors, such as whether having either of the alternatives is necessary or optional.

When two or more alternatives are specified, the resource allocator selects one of the alternatives based on one or more criteria, such as preference information that indicates which alternative is most desirable. The resource allocator determines whether resources are available that satisfy the first selected resource requirement, and if so, the resources are allocated to the apparatus. However, if the available resources cannot satisfy the selected resource requirement, the resource allocator selects another of the alternative resource requirements and again determines whether one or more resources are available that satisfy the currently selected resource requirement. The process continues until the resource allocator identifies an alternative for which one or more resources are available that satisfy the resource requirement or until there are no further alternatives to process.

As used herein, the term "alternative resource requirement" means a resource requirement that is in a set of two or more resource requirements in which some resource requirements in the set, but not necessarily all of the resource requirements in the set, are to be satisfied by the available resources. For example, a user can specify a set of three alternative resource requirements and that two of the three alternative resource requirements are to be satisfied for a virtual server farm. If the first two alternative resource requirements can be allocated, the resources that satisfy the first two alternative resource requirements are allocated to the virtual server farm, and the resource allocator does not need to process the third alternative resource requirement. Similarly, if the first and third alternative resource requirements can be allocated, but not the second alternative resource requirement, the virtual server farm can be instantiated, depending on the result of processing any other resource requirements. Likewise, if the second and third alternative resource requirements can be allocated, the virtual server farm can be instantiated. However, if just one of the three alternative resource requirements can be allocated, then instantiation of the virtual server farm fails.

The use of alternative resource requirements allows a user to specify different alternatives that, as far as the user is concerned, are equally acceptable. As in the example of the large server and the three smaller servers with the load balancer, the resources that satisfy the alternative resource requirements do not necessarily have a one to one equivalence. However, in that example, if the user's main concern is supporting a certain server load, the three smaller servers with the load balancer is an adequate substitute for one large server. Typically, the alternatives have some relation to each other, such as providing a similar function or capacity, and the alternatives are considered to be equivalent, at least in the sense that the alternatives provide what the user, the service provider, or some third party considers to be an equivalent function, capacity, or some other characteristic of at least part of the apparatus.

For example, the alternatives can be very similar, as in a case in which the alternatives specify the same physical device, but each alternative reflects a different operating system installed on the device. However, in other situations, the alternatives can also be very dissimilar or even completely unrelated, such as specifying that an apparatus include either a tape-based backup device or a firewall. Even though there is no commonality between the backup device and the firewall, the user may specify them as alternatives, so as to keep the overall cost of the apparatus below a certain amount. Thus, in the context of the cost of the apparatus, the backup device and the firewall are considered by the user to be equivalent.

In general, for a set of "n" alternative resource requirements, where "n" has a value of two or greater, "m" alternative resource requirements are selected, where "m" has a value that is less than the value of "n." For example, a user can specify a set of five resource requirements as alternative resource requirements and that three of the alternative resource requirements are to be fulfilled for an apparatus. The resource allocator can use the order of the five resource requirements as the preference information, and the resource allocator can begin processing the set of resource requirements with the first preferred resource requirement and continue processing the resource requirements according to the preference information until either three are determined to be satisfied by available resources or until there are no more resource requirements in the set to process.

As a result, many different and potentially complex allocation policies can be developed and implemented by a user, the service provider, or another party without programmatic access to the allocation process. Because of the declarative nature of the alternatives, resource allocators can be configured to determine optimal allocation of resources based on factors that are outside the scope of a particular apparatus while satisfying complex requirements of the apparatus.

The use of alternative resource requirements allows a user to specify specific devices to be allocated to an apparatus as one alternative resource requirement, along with a more general alternative resource requirement that the user finds acceptable if the specific device is not available. Such an approach lowers the fungibility of devices because similar devices cannot be exchanged or switched and therefore if devices that are substantially the same are not available, implementation of an apparatus is more likely to fail. However, by specifying the one particular device as the most desired alternative, along with another less desirable but acceptable alternative that is based on one or more characteristics of the type of device, the user can attempt to obtain the particular device for the apparatus without the increased risk of the implementation of the apparatus failing due to the more general alternative.

For example, the user may have accessed a list of devices in the computing grid and identified one particular firewall that the user would very much like to use in the user's apparatus because the particular apparatus provides some very desirable feature for the user's particular endeavors, although such features are not required. Because the particular firewall may not be available when the user makes the request for the apparatus, the user also specifies a set of features for a firewall to be used in the event the particular firewall is not available. Thus, one alternative resource requirement simply identifies the particular firewall, while the other alternative resource requirement includes the list of firewall features that the user wants to be satisfied by a firewall in general. The user also specifies that the first alternative resource requirement for the particular firewall is preferred over the other alternative resource requirement. When the user's request to implement the apparatus is processed, the particular firewall will be allocated if available, and if not, another firewall that satisfies the specified features will be allocated if available.

13.1 Allocating Resources Based on Alternative Resource Requirements

Figure 17:
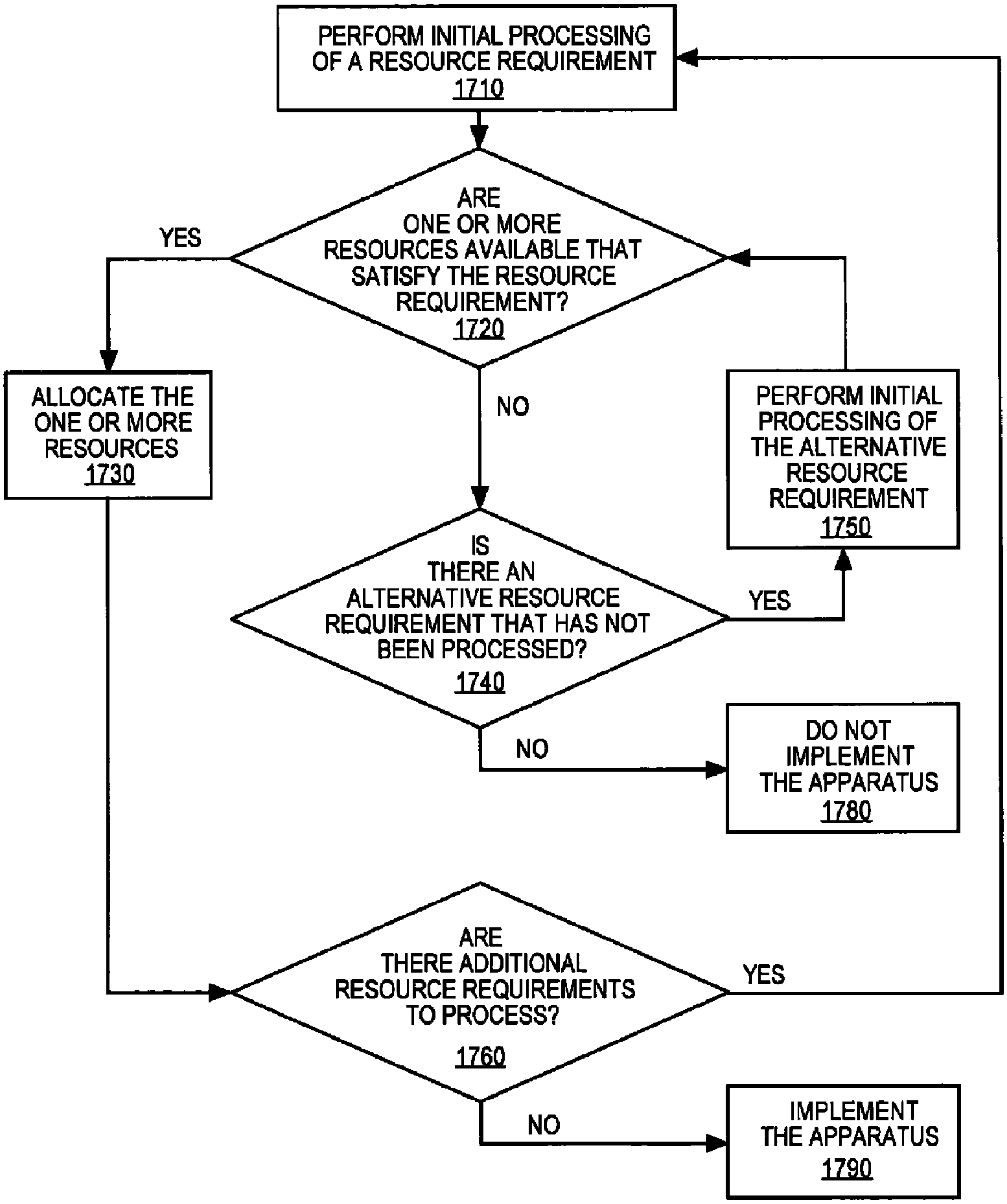
FIG. 17 is a flow diagram illustrating allocation of resources to an apparatus based on alternative resource requirements, according to an embodiment.

FIG. 17 is a flow diagram illustrating allocation of resources to an apparatus based on alternative resource requirements, according to an embodiment. FIG. 17 is a simplified version of the approach illustrated in FIG. 13, and therefore for clarity some steps illustrated in FIG. 13 are omitted in FIG. 17, although such steps can be included.

For purposes of explanation, FIG. 17 is described as if there is one set of alternative resource requirements that includes two alternative resource requirements, but in other implementations, any number of alternative resource requirements in a set of resource requirements may be used, and multiple sets of alternative resource requirements can be used for a given apparatus. Also, FIG. 17 is described with reference to the processing of alternative resource requirements, and thus FIG. 17 does not include the possibility of adding one or more additional features as described herein or elsewhere, including but not limited to, features such as resource requirements, dependent resource requirements, optional resource requirements, suspendable resource requirements, and preemptable resource requirements. However, in a particular implementation, any number of such features as described herein may be included along with additional features not described herein.

In block 1710, the resource allocator performs initial processing of a resource requirement. For example, block 1710 can correspond to blocks 1310, 1314, 1320, and 1330 of FIG. 13. The output of block 1710 is that one or more resources are identified that satisfy the resource requirement selected for processing.

In block 1720, the resource allocator determines whether one or more resources are available that satisfy the resource requirement. If so, the process continues to block 1730, where the resource allocator allocates the one or more resources to the apparatus. Block 1730 also can include additional functions, such as those from blocks 1340, 1344, and 1354 of FIG. 13. From block 1730, the process continues to block 1760.

If in block 1720, the one or more resources are not available, then the process continues to block 1740, where the resource allocator determines whether there is an alternative resource requirement that has not been processed. For example, the resource allocator can identify two or more resource requirements as being alternatives by identifying an "ALTERNATIVE" or "CHOICE" flag that is associated with the set alternative resource requirements. Block 1740 also can include additional functions, such as those from blocks 1360, 1370, and 1374 of FIG. 13.

If in block 1740, the resource allocator determines that there is an alternative resource requirement that has not been processed, the process continues to block 1750, where the resource allocator performs initial processing of the alternative resource requirement, and then the process returns to block 1720.

If in block 1740, the resource allocator determines that there is no alternative resource requirement that has not been processed, the process continues to block 1780, where the apparatus is not implemented. For example, in the case where neither of the two alternative resource requirements can be satisfied by available resources, the apparatus cannot be implemented, as represented by block 1780.

If the process reaches block 1760 after allocating one or more resources in block 1730, the resource allocator determines if there are additional resource requirements to be processed. If so, the process returns to block 1710 where another resource requirement with an allocation state of "NEW" undergoes initial processing. If not, the process continues to block 1790, where the apparatus is implemented, such as by the control plane establishing the necessary connections among the allocated resources.

As a more specific example in the context of the embodiment illustrated in FIG. 17, consider a set of two alternative resource requirements that are part of a user request that includes other resource requirements, and further assume that all other resource requirements besides the two alternative resource requirements can be allocated. At some point during processing of the user request, the resource allocator reaches the set of two alternative resource requirements. Then in block 1710, the resource allocator selects the first alternative resource requirement, based on preference information, such as that the first alternative resource requirement occurs before the second alternative resource requirement in the user request.

If in block 1720, the resource allocator cannot find any resources that satisfy the first alternative resource requirement, the process continues to block 1740, where the resource allocator determines that the second alternative resource requirement has not been processed. The process then continues to block 1750 based on the second alternative resource requirement, and then returns to block 1720.

If in block 1720, the resource allocator determines that one or more resources are available that satisfy, the second alternative resource requirement, the process continues to block 1730, where the one or more resources are allocated to the apparatus. Eventually, given the assumption that all other resource requirements can be allocated, the process reaches block 1790, where the apparatus is implemented.

However, if in block 1720, the resource allocator determines that one or more resources are not available that satisfy the second alternative resource requirement, the process continues to block 1740. Because there are two alternative resource requirements and both have been processed, from block 1740 the process continues to block 1780, and the apparatus is not implemented due to the failure to allocate either of the alternative resource requirements.

As noted above, FIG. 17 is described based on one set of alternative resource requirements that includes two alternative resource requirements, but any number of alternative resource requirements in a set of alternative resource requirements can be used. Therefore, in the approach illustrated in FIG. 17, if a set of alternative resource requirements included three alternative resource requirements, of which one is to be fulfilled, the process loops through blocks 1720, 1740, and 1750 until either one of the three alternative resource requirements can be satisfied, after which the process continues to block 1730, or until the resource allocator determines that none of the three alternative resource requirements can be satisfied, after which the process continues to block 1780.

Also, in a set of alternative resource requirements, any number of the alternatives can be specified to be fulfilled out of the set, so long as the number of alternatives to be fulfilled is less than the total number of alternatives in the set. Therefore, in the approach of FIG. 17, if two alternative resource requirements are to be satisfied in a set of three alternative resource requirements, the process loops through blocks 1720, 1740, and 1750 until either two of the three alternative resource requirements can be satisfied, after which the process continues to block 1730, or until the resource allocator determines that either one or none of the alternative resource requirements can be satisfied, after which the process continues to block 1780.

Furthermore, multiple sets of alternative resource requirements can be used in the approach illustrated in FIG. 17. For example, if there are two sets of alternative resource requirements, each set is processed as discussed above. Thus, the processing of the first set results in reaching either block 1730 if the specified number of alternative resource requirements of the first set can be satisfied or block 1780 if the specified number cannot be satisfied. If the first set of alternative resource requirements is successfully allocated, the process reaches block 1760, where the resource allocator determines that there are additional resource requirements to be processed, such as the second set of alternative resource requirements. The process then returns to block 1710 where the resource allocator performs initial processing of the next resource requirement, which may be the second set of alternative resource requirements or another resource requirement. At some point, barring the process otherwise reaching block 1780, the second set of alternative resource requirements is processed in the same manner as the first set.

In the approach illustrated in FIG. 17, the processing of resource requirements stops at the first set of alternative resource requirements for which one or more resources are not available for the specified number of alternatives. However, as long as "m" alternative resource requirements of a set of "n" alternative resource requirements can be allocated for each set of alternative resource requirements, and as long as any other resource requirements that are to be allocated are in fact allocated, the apparatus is implemented.

As discussed above with reference to FIG. 16, with the approach of FIG. 17 in which processing stops when a resource requirement cannot be fulfilled that needs to be fulfilled, computational resources in processing the resource requirements are minimized. However, when a subsequent request to implement the apparatus is made, some resources previously determined to be available may no longer be free due to being allocated to other apparatuses.

As discussed with respect to FIG. 16, a second approach can be taken than that of FIG. 17 in which processing does not stop in block 1740 if there is no alternative resource requirement that has not been processed. Instead, the allocation states for the alternative resource requirements are changed to "NOT ALLOCATED," and then processing continues to block 1760. Once the processing of all the resource requirements is complete, a check is made to determine if any resource requirements that are specified to be included are "NOT ALLOCATED." This step includes a check for each set of alternative resource requirements to determine if the specified number of alternative resource requirements have allocation states of "ALLOCATED." If so, the apparatus is implemented as illustrated by block 1790, and if not, the apparatus is not implemented as illustrated by block 1780.

As in the discussion of the second approach to FIG. 16, the second approach to FIG. 17 results in all resource requirements being processed, even if the apparatus cannot be implemented due to one or more de-allocated resource requirements. While this second approach consumes more processing resources, the results of the processing can provide a more complete list of the needed but unavailable resources. The service provider can then obtain or add all the devices that need to be allocated to the apparatus so that a subsequent attempt to implement the apparatus is more likely to succeed.

13.2 Selection of an Alternative Resource Requirement

Selection of an alternative resource requirement from a set of alternative resource requirements can be based on one or more of a number of approaches that employ one or more criteria. For example, preference information can be provided that indicates which alternative resource requirement of a set of alternative resource requirements is most desired, then the next most desired, and so on for the set of alternative resource requirements, thereby establishing a prioritized list of the alternatives. As another example, the resource allocator can select which alternative resource requirement to process from the set of alternative resource requirements based on one or more criteria, such as a set of rules. As yet another example, the resource allocator can select the alternative resource requirement from the set of alternative resource requirements in a random manner, such as by using a random number generator, to determine which alternative resource requirement is to be selected.

Whatever approach is used, the resource allocator generally tracks which alternative resource requirements have already been selected, so that a previously processed alternative resource requirement is not selected for processing again. However, in some implementations, it is possible that an alternative resource requirement that has already been processed, such as one that was unfulfilled, may be successfully processed during the same attempt to implement the apparatus, and thus, previously processed alternative resource requirements can be reselected in some implementations.

As a specific example of one or more criteria that can be used for selecting alternative resource requirements, the order that the alternative resource requirements are listed, such as in a request from a user, is used to select alternative resource requirements for processing. In one implementation, the first listed alternative resource requirement is the most desired, the second listed is the next most desired, and so on with the last listed alternative resource requirement being the least desirable. Alternatively, in another implementation, the order can be listed in reverse such that the first listed is the least desired and the last listed is the most desired.

As another specific example of selection criteria, each alternative resource requirement in a set of alternative resource requirements includes an indicator, such as a preference value, that indicates the order that the resource allocator follows in selecting alternative resource requirements. For example, a simple numerical scale can be used that has a value of "1" to a value of "N," where "N" is equal to the number of alternative resource requirements. The lowest value, "1," is the most desired alternative resource requirement, and the highest value, "N," is the least desired alternative resource requirement. The order that the alternative resource requirements are listed does not affect the selection when the resource allocator uses the numerical values to determine the order by which to select the alternative resource requirements for processing.

As yet another specific example, the resource allocator's selection of a particular alternative resource requirement from a set of alternative resource requirements can be based on rules that are specified by the service provider. For example, the user can identify two alternative resource requirements, and the resource allocator can select which one to attempt to fulfill first based on a rule defined by the service provider. For example, the rule can specify to try the alternative that corresponds to the least expensive alternative or that corresponds to the most prevalent type of device in the computing grid.

In other implementations, other numerical scales or even non-numerical scales can be selected. In some implementations, the value of the chosen type of indicator is unique for each alternative resource requirement, while in other implementations, two or more alternative resource requirements can have the same indicator, and the resource allocator then selects from among those alternative resource requirements having that same indicator based one or more of the approaches described above (e.g., the first listed alternative resource requirement is the most desirable or a random selection approach is used to select the particular alternative resource requirement to be processed next).

13.3 Specifying Alternative Resource Requirements

The specification that a resource requirement is an alternative resource requirement can be based on one or more of a number of approaches. For example, the request for an apparatus that includes the resource requirements can include one or more variables, such as a pair of tags (e.g., "<CHOICE>" and "</CHOICE>") that indicates the start and end of a set of alternative resource requirements, with two or more resource requirements listed between the start flag and the end flag treated as alternative resource requirements. As another example, each resource requirement can include one or more variables that indicate whether or not the resource requirement is an alternative resource requirement. The one or more variables also can indicate the set of alternative resource requirements to which a given alternative resource requirement belongs.

In addition, the data indicating that a resource requirement is an alternative resource requirement can be received outside of the request for the apparatus, whether from the user that desires the apparatus or from another entity, such as the service provider or a third party. For example, even if a request from a user does not specify any resource requirements to be alternative resource requirements, the service provider can use a set of standard alternatives to be used if any of a user's resource requirements cannot be fulfilled. As a specific example, assume that the user specifies a storage device with a capacity equal to 10 GB, but the service provider has available storage devices with 5 GB, 15G GB, and 25 GB. The service provider can have a default alternative resource requirement for storage devices that specifies that if a storage device with the user's requested capacity is not available, an acceptable substitute is a storage device with up to 50% more storage capacity. As a result of the alternative resource requirement specified by the service provider and assuming that a 15 GB storage device is available, the resource allocator allocates one of the storage devices that have a storage capacity of 15 GB to the apparatus requested by the user. However, if 5 GB and 25 GB storage devices are available (e.g., the idle pool does not contain any 15 GB storage devices), the service provider's alternative resource requirement will not be allocated, and the implementation of the apparatus may fail.

As another example, data can be received by the resource allocator and used to determine whether a resource requirement is an alternative resource requirement or is not an alternative resource requirement. For example, instead of the user specifying resource requirements to be alternative, the service provider can maintain a database in which different types of resource requirements are identified as alternative resource requirements, and the resource allocator can access the database and retrieve data to determine whether any resource requirements that are unfulfilled (e.g., with a state of "NOT ALLOCATED") are to be treated as alternative, and optionally the database can provide alternative resource requirements to be used in place of the unfulfilled resource requirement. More generally, the resource allocator can retrieve a rule and/or data that can be used to determine whether a resource requirement is an alternative resource requirement.

As yet another example, instead of specifying resource requirements as alternative resource requirements, a default classification approach can be used with exceptions identified based on one of the approaches described above. For example, the default can be that resource requirements are not alternative resource requirements, with the user identifying resource requirements as "ALTERNATIVE" in the request for the apparatus. Alternatively, the default can be that all resource requirements are "ALTERNATIVE" unless specified to be "NOT ALTERNATIVE."

Alternative resource requirements can be used to specify that a set of devices are equivalent alternatives, such as the previous example of a large web server versus a set of three smaller web servers fronted by a firewall. In addition, alternative resource requirements can be used to specify alternative characteristics of a particular device. For example, for the large web server, a set of alternative resource requirements can specify that the operating system is preferred to be Linux but an equally acceptable operating system is Windows NT, so that implementation of the apparatus does not fail in the event that a large Linux based web server is not available but a large Windows NT server is available. Similarly, groups of devices can be specified to be alternatives, such as the group of three smaller web servers fronted by the firewall. Furthermore, alternative resource requirements can specify characteristics of the apparatus as a whole, such as the level of redundancy. In general, any number of resource requirements can be specified as an alternative to any other number of resource requirements, regardless of the type of characteristic the resource requirements describe.

13.4 Updating Allocation States when Using Alternative Resource Requirements After the resource allocator processes an alternative resource requirement, the allocation state is updated based on whether the resource allocator is able to allocate a resource that satisfies the alternative resource requirement. For example, if a resource is available that satisfies the alternative resource requirement, the allocation state is changed to "ALLOCATED," and if not, the allocation state is changed to "NOT ALLOCATED."

In the general case, for a given set of "n" alternative resource requirements, "m" alternative resource requirements are to be selected. As each alternative resource requirement is selected and processed, the allocation state is changed to reflect the outcome of processing the alternative resource requirement by the resource allocator. If the resource allocator selects "m" alternative resource requirements without having to process all "n" alternative resource requirements, any unprocessed alternative resource requirements have their allocation states changed to "NOT ALLOCATED" to reflect that no resources are allocated that satisfy the unprocessed alternative resource requirements.

Figure 18:
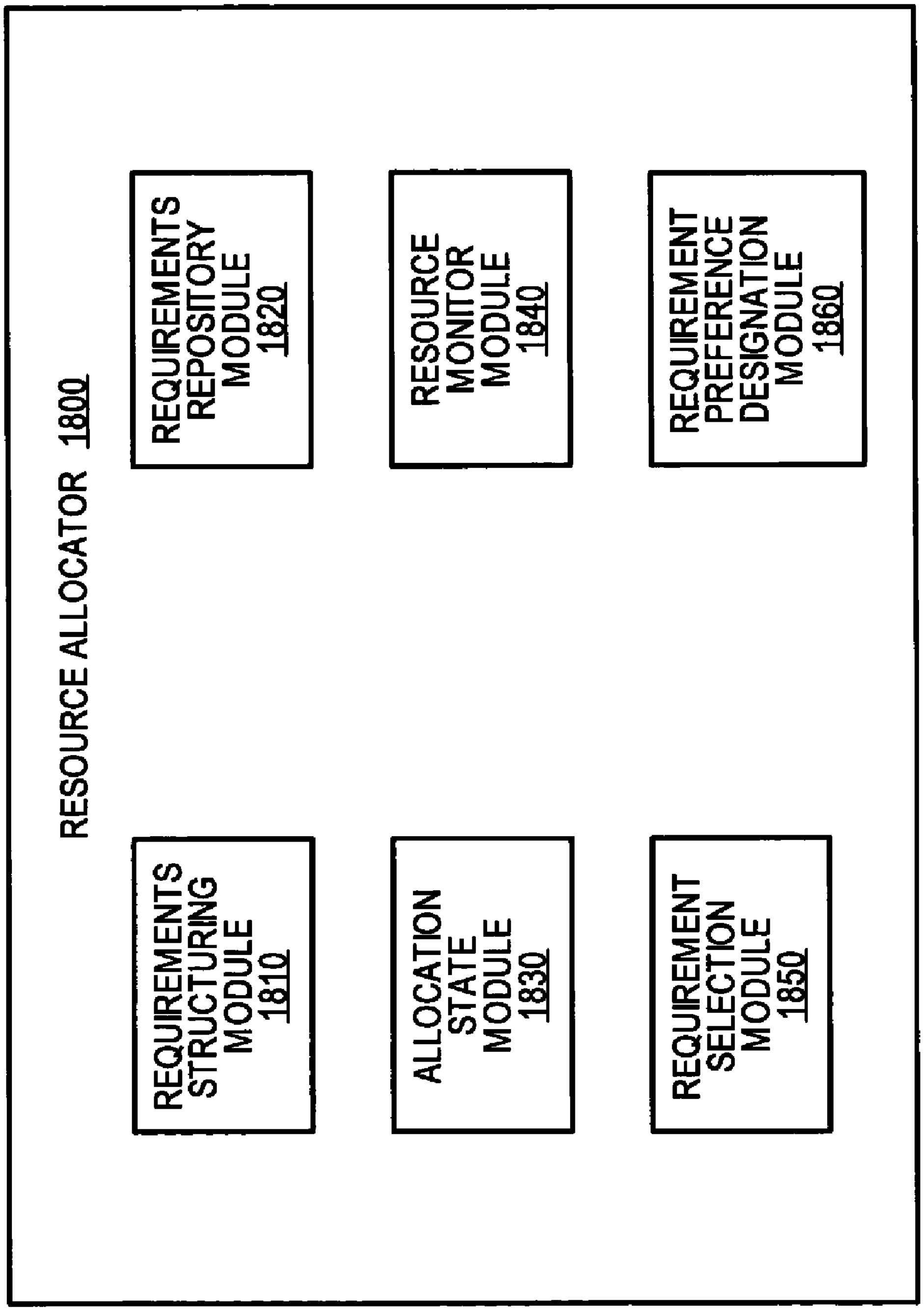
FIG. 18 is a block diagram of a resource allocator that processes alternative resource requirements, according to an embodiment.

13.5 Implementation Mechanisms for Allocating Resources Using Alternative Resource Requirements FIG. 18 is a block diagram of a resource allocator 1800 that processes alternative resource requirements, according to an embodiment. Resource allocator 1800 can be a modified resource allocator based on resource allocator 1030 of FIG. 10 or based on resource allocator 1200 of FIG. 12.

Resource allocator 1800 is comprised of a requirements structuring module 1810, a requirements repository module 1820, an allocation state module 1830, a resource monitor module 1840, a requirement selection module 1850, and a requirement preference designation module 1860. Requirements structuring module 1810, requirements repository module 1820, allocation state module 1830, and resource monitor module 1840 correspond to requirements structuring module 1210, requirements repository module 1220, allocation state module 1230, and resource monitor module 1240 of FIG. 12, respectively, and are not described further herein.

Requirement selection module 1850 selects an alternative resource requirement from among a set of alternative resource requirements. For example, requirement selection module 1850 can employ one or more of the selection approaches described above to decide which alternative resource requirement is to be processed by the resource allocator based on the available preference information.

Requirement preference designation module 1860 determines the preference information for a set of alternative resource requirements, thereby enabling requirement selection module 1850 to select an alternative resource requirement from a set of alternative resource requirements. For example, requirement preference designation module 1860 can examine each alternative resource requirement to determine a preference value and thereby an ordering of the alternatives from most desired to least desired. Requirement selection module 1850 then selects the first alternative resource requirement in the ordering determined by requirement preference designation module 1860, and then the second alternative requirement in the ordering, and so on. As another example, requirement preference designation module 1860 can apply one or more rules that are defined by the service provider to determine an order for requirement selection module 1850 to use when selecting alternative resource requirements for processing.

As a specific example, consider the embodiment illustrated in FIG. 14 and assume that database server A, represented by sub-node 1420*a*, and database server B, represented by sub-node 1420*b*, are the two alternative resource requirements in a set of two alternative resource requirements. Requirement preference designation module 1860 determines a preference value for each of the alternatives, such as that the alternative resource requirement for database server A is preferable to the alternative resource requirement for database server B based on the fact that the alternative resource requirement for database server A is listed before the alternative resource requirement for database server B in a request from the user for the apparatus.

Based on the preference values, requirement selection module 1850 selects the alternative resource requirement for database server A to be processed first. If a database server that satisfies the child resource requirements for database server A is available, the identified database server is allocated to the DC (e.g., allocation state module 1830 changes the allocation state for the alternative resource requirement for database server A to "ALLOCATED"), and the alternative resource requirement for database server B is not processed (e.g., allocation state module 1830 changes the allocation state for the alternative resource requirement for database server B to "NOT ALLOCATED").

However, if a database server is not available that satisfies the alternative resource requirement for database server A, then the alternative resource requirement for database server A is not fulfilled (e.g., allocation state module 1830 changes the allocation state to "NOT ALLOCATED"), and the requirement selection module 1850 selects the alternative resource requirement for database server B to be processed. If a database server that satisfies the child resource requirements for database server B is available, the identified database server is allocated to the IDC (e.g., allocation state module 1830 changes the allocation state for the alternative resource requirement for database server B to "ALLOCATED").

However, if a database server is not available, then the alternative resource requirement for database server B is also not fulfilled (e.g., allocation state module 1830 changes the allocation state for the alternative resource requirement for database server B to "NOT ALLOCATED"). As a result, the instantiation of the apparatus will fail because neither of the two alternatives are fulfilled, unless other features are used to try to avoid such a failure, such as specifying the set of the two alternative resource requirements as "OPTIONAL" through the use of optional resource requirements as described above, or through the use of suspendable resource requirements or preemptable resource requirements, as described below.

In the example of the large server versus the three smaller servers fronted by the load balancer, the user's request can specify a place holder IP address, which may also be referred to as a reference IP address, for the server function. The reference IP address therefore does not depend on which alternative is allocated to the apparatus. The reference IP address is not an actual IP address, but rather acts as a variable that is replaced by the resource allocator with an actual IP address prior to implementing the apparatus. If the large server is allocated to the apparatus, then the IP address is assigned to the large server. If the three smaller servers fronted by the load balancer are allocated to the apparatus, then the IP address is assigned to the load balancer.

14.0 Suspending Resource Requirements

In one embodiment, if a resource requirement is to no longer be satisfied, one or more resources that are allocated to an apparatus to satisfy that resource requirement are de-allocated from the apparatus. For example, the service provider may need to perform maintenance on a device, but the work to perform the maintenance may render the device incapable of properly performing the function for which the user has included the device in the apparatus. The user that specified the resource requirement for the apparatus can indicate that the resource requirement can, under certain conditions specified by the user, be de-allocated from the apparatus. As a result, the service provider can determine if the conditions are met, and if so, de-allocate the resource from the apparatus to perform the maintenance. Later, when the maintenance is complete, the resource can be re-allocated to the apparatus, or in some situations, a different resource can be allocated to the apparatus that satisfies the resource requirement that was specified to no longer be satisfied.

After a resource is de-allocated from an apparatus, there can a significant period of time during which the resource requirement is not satisfied, such as several hours or days. The end of such a period is dictated by a subsequent action, such as when the original resource or a different resource is subsequently available to satisfy the resource requirement.

A user can request an apparatus and specify that one of the resource requirements for the apparatus is suspendable, meaning that the one or more resources that satisfy the suspendable resource requirement need not be satisfied under some circumstances and thus can be de-allocated by the service provider. Because the user that requested the apparatus has already specified the resource requirement to be suspendable, the user has accepted the possibility that subsequent to the implementation of the apparatus, any resources that satisfy the suspendable resource requirement may be taken away. Ideally, the user will have planned for such an occurrence to ensure that any resources that get de-allocated do not cause unacceptable problems for the apparatus.

The resources can be suspended for any of a number of reasons, including but not limited to: de-allocating the resources from one apparatus for subsequent allocation to another apparatus (as described more fully below in the "Preempting Resource Requirements" section); de-allocating the resources at the request of the service provider, such as to perform maintenance, install upgrades, or remove the resources from the computing grid; de-allocating the resources at the request of the user of the apparatus, such as to reduce the cost of the user's apparatus by returning the resources for use to the service provider; or de-allocating the resources at the request of another entity, such as an application.

In some embodiments, when a resource requirement is suspended, the resource allocator obtains and stores state information for the one or more resources to be de-allocated, such that at a subsequent time, the suspendable resource requirement can be fulfilled based on the original state information. The suspendable resource requirement can be fulfilled by allocating either the same one or more resources that were de-allocated originally (e.g., when such resources are not longer being used by the first apparatus), one or more other resources that otherwise satisfy the suspendable resource requirement are available, or a combination of original and other resources. When the suspendable resource requirement is subsequently allocated, the state information from the one or more de-allocated resources is used to configure the state of the newly allocated one or more resources. The new state need not be the same as the old state. However, by using the state information from the one or more de-allocated resources, the apparatus can be returned to a state that approximates that of the apparatus before the de-allocation of the one or more resources, or at least is close enough such that the loss of state is minimized to an extent that the user would consider, and typically has specified, to be acceptable.

As used herein, the term "suspendable resource requirement" means a resource requirement that is specified to be capable of being no longer satisfied such that the one or more resources that satisfy the suspendable resource requirement can be de-allocated from an apparatus and that can be, but need not necessarily be, re-allocated at a subsequent time. The subsequent allocation of a suspendable resource requirement can include, but need not necessarily include, configuring the one or more resources that are subsequently allocated based on state information for the de-allocated one or more resources. The suspension of the resource requirement can be based on, but need not necessarily be based on, one or more conditions that are typically specified by the user of the apparatus. Note that with a suspendable resource requirement, the de-allocated resources need not necessarily be allocated to another apparatus, and in general, the de-allocated resources could be suspended for any purpose, including but not limited to, performing maintenance, making upgrades, retiring older equipment from the computing grid, or testing.

The use of suspendable resource requirements can provide flexibility for both users and for the service provider. For example, the user may be able to obtain a discounted price for an apparatus if the user is willing to specify suspendable resource requirements for an apparatus. Because the user can specify which resource requirements are suspendable, the user can plan accordingly for a time when resources for the suspendable resource requirements are suspended. As a specific example, if the user has a set of five web servers fronted by a load balancer, the user can specify that the resource requirement that is satisfied by one of the five web servers is suspendable. By specifying a suspendable resource requirement, the user accepts that the load on the other servers will increase. However, the user considers that to be a fair exchange for the service provider charging half price for the fifth web server.

As another specific example, the user may consider the lack of a firewall in the user's apparatus to be unacceptable, and as a result, the user would not specify the resource requirement that the apparatus include a firewall to be a suspendable resource requirement. In general, both the user and service provider benefit from the use of suspendable resource requirements when resources need to be de-allocated for whatever reason that the resources need to be de-allocated since the suspendable resource requirements allow both the user and service provider to plan and prepare for the de-allocation of some resources before the need to de-allocate the resources arises.

As another specific example, the suspension of a resource requirement can be performed for the purpose of re-allocating the one or more resources to another apparatus, which is an example of preemption based on suspension that is discussed more fully below in the "Preempting Resource Requirements" section.

14.1 Allocating Resources Based on Suspending all Resource Requirements for Another Apparatus In one embodiment, all resource requirements for an apparatus are suspended. For example, a user can specify that the entire apparatus is suspendable between 8 PM and 4 AM. As a specific example, if the user desires to save money when the apparatus is not needed, the user can allow all of the resources allocated to the user's apparatus to be returned to the idle pool between the specified hours. Typically, the understanding of the user is that the apparatus will be implemented again by 4 AM based on state information stored by the service provider prior to suspending the apparatus, although such is not necessarily the case in all implementations. While suspending all of the resources for an entire apparatus may not be an ideal situation for some users, the service provider may nevertheless provide a sufficient economic incentive to the users to be willing to allow for suspension of the entire apparatus under certain conditions or during specified scheduled times.

In addition, the service provider may, under some circumstances, suspend all of the resources for an entire apparatus without the user's prior consent or knowledge. For example, if the user fails to pay a bill from the service provider on time, the service provider can suspend all resources for the user's apparatus until the bill is paid. As another example, if the service provider needs to perform an upgrade on a particular resource in a user's apparatus, the service provider can suspend all resources for the apparatus so that the upgrade on the particular resource can be performed, and once the upgrade is complete, the service provider can reallocate all the suspended resources to the apparatus. Of course, suspending all resources from an apparatus without the user's prior consent or knowledge can create customer service issues, but the use of suspendable resource requirements can help to minimize or eliminate such concerns.

14.2 Allocating Resources Based on Suspending Some but not all Resource Requirements for Another Apparatus In another embodiment, at least one resource requirement for an apparatus, but not all the resource requirements for the apparatus, are suspended. For example, if a particular apparatus includes a set of servers, the user can specify that some of the resource requirements for the servers are to be suspended according to a specified schedule, but that not all of the resource requirements for the servers can be suspended. As a specific example, the user's request for the apparatus can include a separate resource requirement for each server in the set of servers, with some of the resource requirements specified to be suspendable resource requirements and the others specified to not be suspendable resource requirements. Alternatively, the user can provide two resource requirements, one of which is not a suspendable resource requirement and specifies half of the desired servers, and the other resource requirement is a suspendable resource requirement and specifies the other half of the desired servers.

After the user's apparatus is implemented, the servers that satisfy the suspendable resource requirement are suspended according to the conditions specified by the user, but the user's apparatus retains the servers that satisfy the resource requirements that are not specified to be suspendable. This approach allows the user to determine which resources the user wants or at least is willing to have removed from the apparatus and which resources the user does not to be removed. The resources that satisfy the suspendable resource requirements are de-allocated from the user's apparatus for any of a number of reasons besides the stated desire of the user to suspend the resources at times specified by the user, including but not limited to, removing the resources to perform maintenance or upgrades that otherwise could not be performed if the resources were part of the user's apparatus, retiring the resources from service, or allocating one or more of the suspended resources to satisfy the re resource requirements of another apparatus (as described more fully in the "Preempting Resource Requirements" section below). In general, resources that satisfy suspendable resource requirements can be de-allocated from an apparatus for any reason.

When one or more resources that satisfy a suspendable resource requirement are suspended from an apparatus, state information for the one or more resources can be obtained and stored so that the suspended resource requirement can be allocated at a later time based on the stored state information. For example, if a database server is suspended, the runtime state of the database server can be obtained and stored prior to suspending the database server to the apparatus. Later, when either the suspended database server is available, when another database server is available that satisfies the suspendable resource requirement, or when there is another database server available that satisfies other applicable resource requirements other than the suspended resource requirement, the state information is retrieved and used to configure the database server that is to be allocated to the apparatus, thereby taking the place of the suspended database server.

Figure 19:
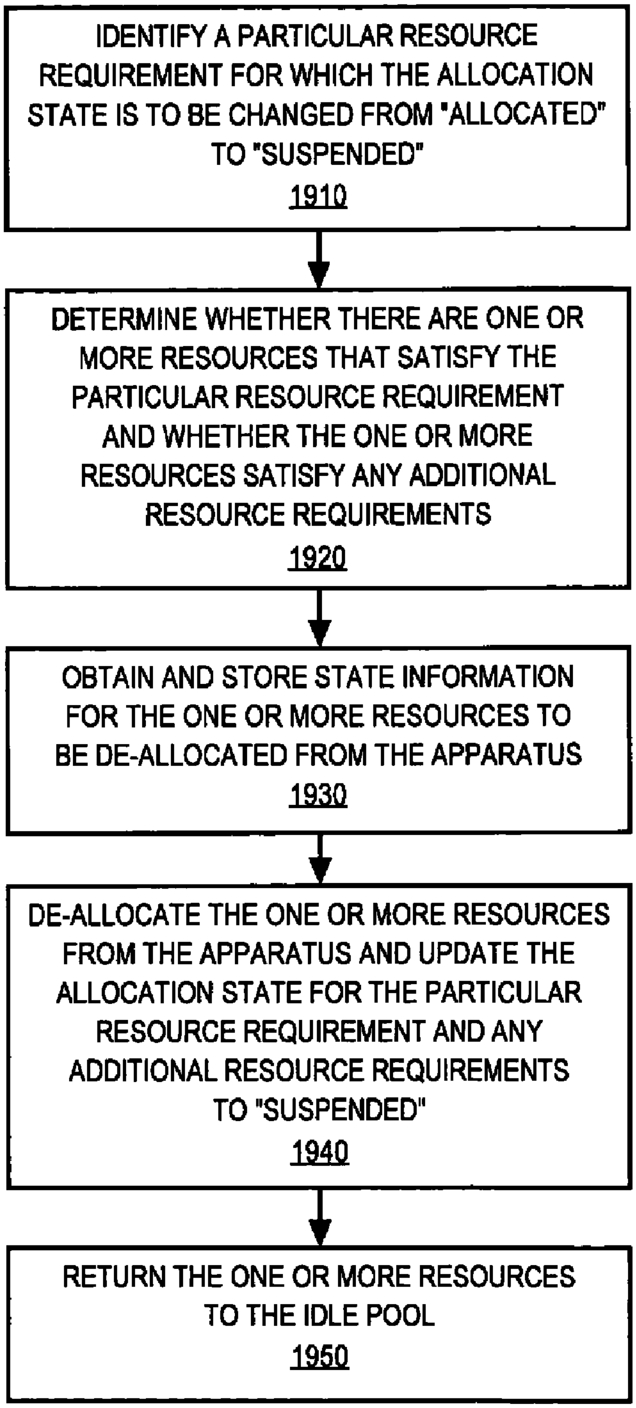
FIG. 19 is a flow diagram illustrating de-allocation of resources from an apparatus based on suspendable resource requirements, according to an embodiment.

FIG. 19 is a flow diagram illustrating de-allocation of resources from an apparatus based on suspendable resource requirements, according to an embodiment. For purposes of explanation, FIG. 19 is described as if there is one suspendable resource requirement, but in other implementations, any number of suspendable resource requirements may be used. Also, FIG. 19 is described with reference to the processing of suspendable resource requirements, and thus FIG. 19 does not include the possibility of adding one or more additional features as described herein or elsewhere, including but not limited to features such as resource requirements, dependent resource requirements, optional resource requirements, alternative resource requirements, and preemptable resource requirements. However, in a particular implementation, any number of such features as described herein may be included along with additional features not described herein. Finally, FIG. 19 includes the storing of state information, the suspension of a resource requirement when one or more conditions are satisfied, and the allowance resources allocation using resources that satisfy other resource requirements but not the suspended resource requirement. However, in other implementations, one, some, or all of these features can be omitted.

In block 1910, the resource allocator identifies a particular resource requirement for which the allocation state is to be changed from "ALLOCATED" to "SUSPENDED." For example, data can be received by the resource allocator in response to manual input from a user to suspend the particular resource requirement, the data can be from a proxy for the user, such as a scheduler that the user has used to specify the times during which a resource requirement is to be suspended, the data can originate from the user's request to the service provider to implement the apparatus in which the particular resource requirement is specified by the user to be a suspendable resource requirement, or the data can originate from the resource allocator itself. However, in general, the approach of FIG. 19 can be applied to any resource requirements that are determined to be no longer satisfied, whether such a determination is based on data from the user, the service provider, or any other entity. The specification or determination that a resource requirement can be suspended can be based one or more conditions being satisfied, such as conditions specified by the user for the suspendable resource requirement or default conditions specified by the service provider for the particular type of device. From block 1910, the process continues to block 1920.

In block 1920, the resource allocator determines whether there are one or more resources that satisfy the particular resource requirement and whether the one or more resources satisfy any other resource requirements. For example, the particular resource requirement that the user desires to be suspended may specify a database server that can be returned from the user's apparatus to the idle pool during the hours from 11 PM to 7 AM. In addition, the database server may satisfy one or more additional resource requirements, such as that any database servers in the user's apparatus use a particular software company's database server software. If the database server is suspended, both the particular resource requirement the database server and the additional resource requirement that any database servers use the particular database software will no longer be satisfied. As a result, the resource allocator checks ensure that the additional resource requirement is suspendable, or possibly that the additional resource requirement has already been suspended, before the process continues to block 1930.

If the resource allocator determines that the additional resource requirement is not suspendable, an error condition occurs, which can be handled in any of a number of ways, including but not limited to, refusing to suspend the particular resource requirement or contacting either the user or the service provider for additional instructions on whether or not to suspend the set of database servers.

In block 1930, the resource allocator obtains and stores state information for the one or more resources that are to be de-allocated from the apparatus. For example, the resource allocator queries a database server that is to be de-allocated to obtain runtime state information about the database server, and then the resource allocator stores the runtime state information in a database that is part of the control plane for the computing grid. Also, the resource allocator can update the allocation state for the particular suspendable resource requirement satisfied by the database server from "ALLOCATED" to "PENDING" to reflect that the suspendable resource requirement is being processed. If in block 1920, the resource allocator identified any additional resource requirements affected by the suspension that are not already suspended, the allocation states for any such additional resource requirements are updated from "ALLOCATED" to "PENDING."

From block 1930, the process continues to block 1940, where the resource allocator de-allocates the one or more resources from the apparatus and updates the allocation state for particular the suspendable resource requirement and any additional resource requirements from "PENDING" to "SUSPENDED." For example, the resource allocator removes the mapping between the database server and the suspendable resource requirement, thereby de-allocating the database server from the other apparatus. If in block 1920, the resource allocator identified any additional resource requirements affected by the suspension that are not already suspended, the allocation states for any such additional resource requirements are updated from "PENDING" to "SUSPENDED."

Although not illustrated in FIG. 19, the resource allocator can provide a notification, such as an alert message, to the user of the apparatus that includes the suspendable resource requirement that the resources that satisfy the suspendable resource requirement will in fact be de-allocated from the user's apparatus. As a specific example, the user of the apparatus that includes a suspendable resource requirement can be informed that the suspendable resource requirement will be suspended prior to the resource allocator suspending the suspendable resource requirement. The notification can allow the user of the apparatus to take any actions that the user wants in preparation for the suspension of the suspendable resource requirement. The notification can be provided with as little advance notice as a few seconds to several days or more, although a typical time frame is 24 hours.

From block 1940, the process continues to block 1950, where the resource allocator returns the one or more resources to the idle pool. Once the one or more resources are in the idle pool, the one or more resources can be used for any one of a number of uses, as determined by the service provider, including but not limited to, allocation to another apparatus (as described more fully below in the "Preempting Resource Requirements" section), performing maintenance, installing upgrades, removing the resource(s) from the computing grid.

14.3 Allocating a Suspended Resource Requirement

In one embodiment, a suspended resource requirement is allocated by determining that one or more resources that satisfy the suspended resource requirement are available and then allocating those one or more resources to an apparatus. For example, the service provider can perform regular checks for suspended resource requirements to determine if any can be satisfied by one or more resources in the idle pool, and then allocate the one or more resources from the idle pool to the apparatus.

As another example, after a suspendable resource requirement is suspended, the service provider does not necessarily have to wait to check for additional resources that are available and can satisfy the suspended resource requirement. Thus, the resource allocator, after de-allocating the one or more resources, can process the suspendable resource requirement, such as by attempting to allocate other resources that are available in the idle pool.

As yet another example, if the suspended resource requirement includes a condition, such as that the suspendable resource requirement can be suspended between the hours of 8 PM and 4 AM, the service provider can initiate the allocation process to allocate one or more resources to the suspended resource requirement such that the suspended resource requirement is allocated prior to 4 AM. As yet another example, the service provider can allocate a suspended resource requirement when the one or more resources that were de-allocated from the apparatus are returned to the idle pool, such as after the service provider has completed performing maintenance on the resources that were de-allocated.

When a suspended resource requirement is allocated, the one or more resources that are allocated to the apparatus may include all, some, or none of the one or more resources that were taken away from the apparatus. For example, if a database server that satisfied a suspendable resource requirement were de-allocated from a particular apparatus, the same physical database server can be allocated to the original apparatus after becoming available (e.g., after the database server is returned to the idle pool after the reason for the database server being de-allocated no longer applies, such as that the desired maintenance on the database server is complete). As another example, a different database server that satisfies the suspendable resource requirement can be allocated from the idle pool or another apparatus to the original apparatus. As yet another example, if the suspendable resource requirement were satisfied by a set of three database servers, the suspended resource requirement can be allocated by allocating one of the original three database servers back to the original apparatus, along with a database server that satisfies the suspendable resource requirement that is in the idle pool, and along with a database server that is de-allocated from a third apparatus where that includes an appropriate suspendable resource requirement.

When a suspended resource requirement is allocated, whether or not the re-allocation is achieved with the same or different resources than those de-allocated, the state information obtained and stored when the one or more resources were suspended is used to configure the one or more resources being allocated. As a result, the loss of state between the one or more resources that were de-allocated and the one or more resources that are allocated is within a specified amount. If the re-allocation of the one or more resources would result in an unacceptable loss of state, the service provider may elect to not allocate the one or more resources and instead determine if other resources are available that can be used to achieve an acceptable loss of state. The acceptable amount of the loss of state can be specified by the user, the service provider, or a third party.

In some cases, additional resource requirements may be imposed as part of allocating a suspended resource requirement. For example, assume that the suspended resource requirement was for a server, but the suspended resource requirement did not specify a storage capacity for the server. The stored state information for the suspended resource requirement can impose a new resource requirement for a specified storage capacity in order to accommodate the information that was stored on the server before the server was suspended. As a result, the resource allocator can ensure that all the old information from the suspended server can be stored on the server that is be allocated based on the stored state information.

Figure 20:
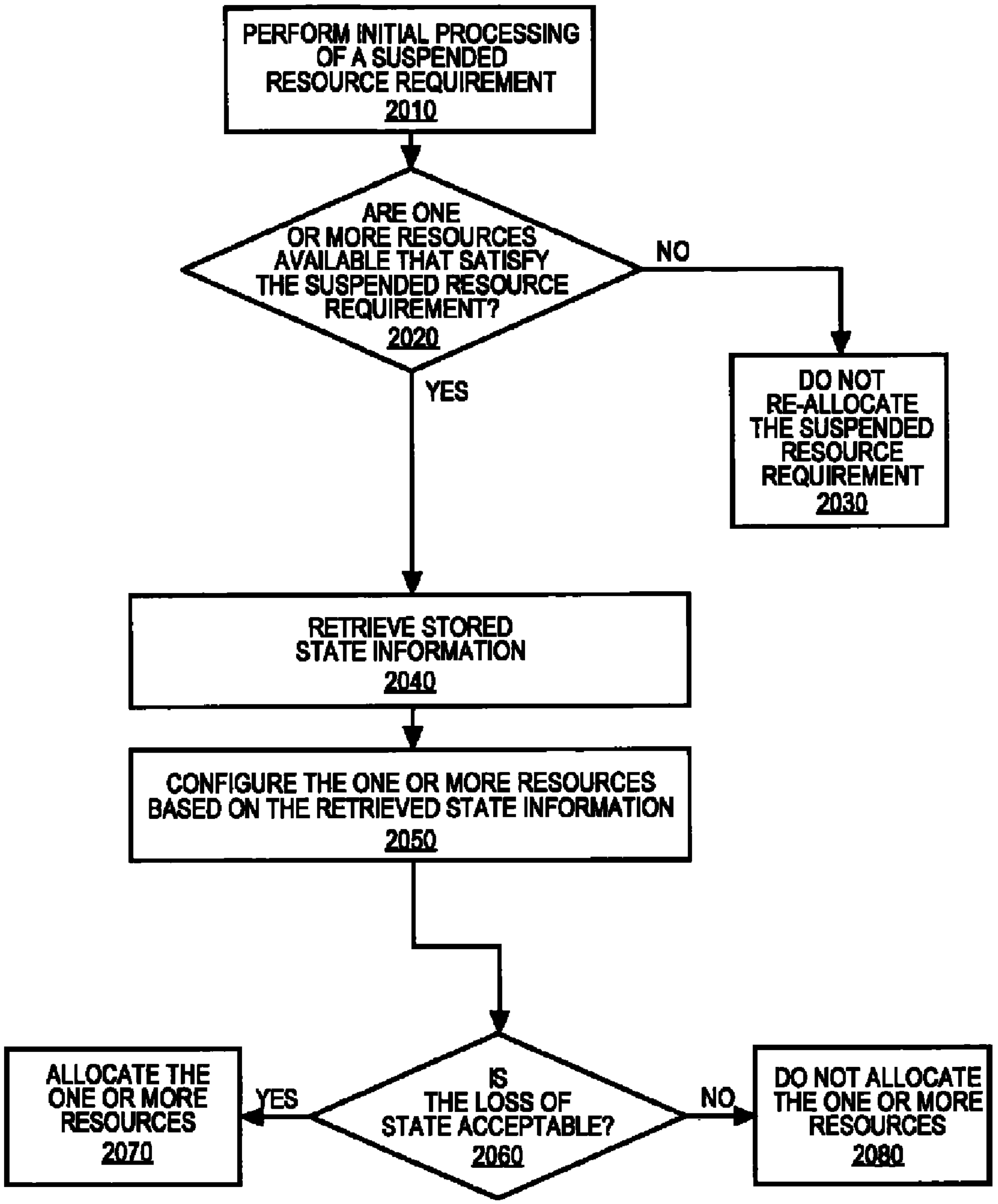
FIG. 20 is a flow diagram illustrating allocation of resources to an apparatus based on re-allocating a suspended resource requirement, according to an embodiment.

FIG. 20 is a flow diagram illustrating allocation of resources to an apparatus based on allocating a suspended resource requirement, according to an embodiment. FIG. 20 is a simplified version of the approach illustrated in FIG. 13, and therefore for clarity some steps illustrated in FIG. 13 are omitted in FIG. 20, although such steps can be included.

For purposes of explanation, FIG. 20 is described as if there is one suspendable resource requirement, but in other implementations, any number of suspendable resource requirements may be used. Furthermore, FIG. 20 is described with reference to the database server example used in the description of FIG. 19. Finally, FIG. 20 is described with reference to the processing of suspendable resource requirements, and thus FIG. 20 does not include the possibility of adding one or more additional features as described herein or elsewhere, including but not limited to, features such as resource requirements, dependent resource requirements, optional resource requirements, alternative resource requirements, and preemptable resource requirements. However, in a particular implementation, any number of such features as described herein may be included along with additional features not described herein.

In block 2010, the resource allocator performs initial processing of a resource requirement. For example, block 2010 can correspond to blocks 1310, 1314, 1320, and 1330 of FIG. 13. The output of block 2010 is that one or more resources are identified that satisfy the resource requirement selected for processing. Also, the resource allocator can update the allocation state for the suspended resource requirement from "SUSPENDED" to "PENDING."

In block 2020, the resource allocator determines whether one or more resources are available that satisfy the suspended resource requirement. For example, the resource allocator determines that another database server is available in the idle pool that satisfies the suspendable resource requirement that was suspended in block 1980 of FIG. 19. The identified database server may or may not be the same database server that was de-allocated in block 1980.

If in block 2020, the resource allocator determines that one or more resources are available that satisfy the suspended resource requirement, the process continues to block 2040. If not, the process continues to block 2030, where the resource allocator does not allocate the suspended resource requirement.

In block 2040, the resource allocator retrieves the stored state information. For example, if the database server in the example of FIG. 19 that satisfied the suspendable resource were de-allocated in the process of FIG. 19, the state information obtained and stored in block 1970 for the de-allocated database server is retrieved by the resource allocator, such as by running a query for the state information against a database in the control plane in which the state information was stored.

From block 2040, the process continues to block 2050, where the resource allocator configures the one or more resources based on the retrieved state information from block 2040. For example, the state information for the de-allocated database server is used to configure the database server identified in block 2020 to approximate the state of the database server that was de-allocated in block 1980.

From block 2050, the process continues to block 2060, where the resource allocator determines whether the loss of state is acceptable. For example, the resource allocator can compare the state information stored in block 1970 to the state information for the database server configured in block 2050 to determine whether the difference in states is within an amount specified by the service provider.

If the loss of state is determined to be acceptable in block 2060, the process continues to block 2070, where the resource allocator allocates the one or more resources to the apparatus. Block 2070 also can include additional functions, such as those from blocks 1340, 1344, and 1354 of FIG. 13. For simplicity, nothing is illustrated in FIG. 20 following from block 2080. However, block 2070 is typically followed by other functions, such as those illustrated by blocks 1380 et seq. in FIG. 13 (e.g., determining whether there are additional resource requirements to process and implementing the apparatus, if appropriate). The resource allocator can update the allocation state for the suspendable resource requirement from "PENDING" to "ALLOCATED."

If the loss of state is determined to not be acceptable in block 2060, the process continues to block 2080, where the resource allocator does not allocate the one or more resources to the apparatus.

In situations in which the stored state information imposes new resource requirements, one of several approaches can be taken. For example, when state information is retrieved in block 2040, the resource allocator can determine whether any new resource requirements should be imposed, and then verify that any such resource requirements are satisfied by the one or more resources that are determined to be available in block 2010. If the available resources do not satisfy the newly imposed resource requirement, the process returns to block 2020 to identify whether one or more resources are available that satisfy both the suspended resource requirement and any resource requirements that are to be imposed based on the stored state information.

As an alternative, the stored state information can be retrieved and any addition resource requirements determined prior to identifying available resources in block 2020. As yet another alternative, the identification of additional resource requirements to be imposed based on the stored state information can wait until block 2080, when the loss of state is determined to be unacceptable. The resource allocator can determine if there are one or more additional resource requirements that can be imposed that, if satisfied, would result in an acceptable loss of state, and then the process returns to block 2020 to identify whether any resources are available that satisfy both the suspended resource requirement and the newly determined resource requirements that are determined in order to provide an acceptable loss of state.

14.4 Specifying that a Resource Requirement is Suspendable

That a resource requirement can be suspended can be implemented in any of a number of ways. For example, one or more resource requirements can be specified to be suspendable in the request for an apparatus, as discussed in detail below. As another example, the request for an apparatus need not include any specifications that any resource requirements are suspendable; rather, the user can, after the apparatus is implemented, specify one or more resource requirements to be suspended, which can be acted upon as soon as input from the user is received or can be acted upon according to one or more conditions specified by the user, such as through a scheduling application. As yet another example, the user can specify one or more resource requirements to be suspended either temporarily, so that the service provider later returns resources to the apparatus to satisfy the suspended resource requirement based on save state information when the one or more resources are suspended, or permanently, so that state information need not be saved when the one or more resources are returned to the idle pool.

The specification that a resource requirement is a suspendable resource requirement in the request for an apparatus can be based on one or more of a number of approaches. For example, the request for an apparatus that includes the resource requirements can include one or more variables, such as a pair of tags (e.g., "<SUSPENDABLE>" and "</SUSPENDABLE>") that indicate the start and end of a set of suspendable resource requirements. Any resource requirements listed between the start tag and the end tag are treated as suspendable resource requirements. As another example, each resource requirement can include one or more variables that indicate whether or not the resource requirement is a suspendable resource requirement, plus any conditions under which the suspendable resource requirement can be suspended (e.g., between certain hours of the day), as described more fully below.

In addition, the data indicating that a resource requirement is a suspendable resource requirement can be received outside of the request for the apparatus, whether from the user that desires the apparatus, either via direct input from the user or through a proxy for the user such as a scheduler, or from another entity, such as the service provider or a third party, or from a software application. For example, even if a request from a user does not specify any resource requirements to be suspendable resource requirements, the service provider can specify that certain types of resource requirements are suspendable, such as that the resource requirements for two servers out of any group of five or more servers are suspendable.

As another example, data can be received by the resource allocator and used to determine whether a resource requirement is a suspendable resource requirement or is not a suspendable resource requirement. For example, instead of the user specifying resource requirements to be suspendable, the service provider can maintain a database in which different types of resource requirements are identified as suspendable resource requirements, and the resource allocator can access the database and retrieve the data to determine whether any resource requirements are to be treated as suspendable. More generally, the resource allocator can retrieve a rule and/or data that can be used to determine whether a resource requirement is a suspendable resource requirement.

As yet another example, instead of specifying resource requirements as suspendable resource requirements, a default classification approach can be used with exceptions identified based on one of the approaches described above. For example, the default can be that resource requirements are not suspendable resource requirements, with the user identifying resource requirements as "SUSPENDABLE" in the request for the apparatus. Alternatively, the default can be that all resource requirements are "SUSPENDABLE" unless the user specifies a resource requirement to be "NOT SUSPENDABLE."

In addition to specifying that a resource requirement is a suspendable resource requirement, additional data can be used to determine whether any criteria must be satisfied in order for the suspendable resource requirement to be suspended. For example, the suspendable resource requirement can include a "CONDITION" tag that specifies the value of one or more variables. As a specific example, the suspendable resource requirement can have one variable to specify a start time (e.g., STARTTIME=8 PM) and another variable to specify a stop time (e.g., ENDTIME=4 AM), thereby specifying that the suspendable resource requirement is suspendable between 8 PM and 4 AM. As another example, the condition can be that at least a specified number of similar resources remain allocated to the apparatus, such that in a group of five servers, the servers satisfy suspendable resource requirements that specify that at least three of the five servers remain allocated to the apparatus. As a result, any one or two of the servers can be suspended, so long as three of the five servers remain allocated to the apparatus.

14.5 Allocation State: Suspended

According to an embodiment, an allocation state is associated with a resource requirement, and the allocation state represents that the resource requirement is suspended. As discussed above with respect to FIG. 11, the allocation state indicates the status of the resource requirement with respect to allocation of one or more resources that satisfy the resource requirement, such as "NEW," "PENDING," "ALLOCATED," and "NOT ALLOCATED." In implementations that include suspendable resource requirements, an additional allocation state, which may be identified as "SUSPENDED," indicates that a resource requirement is suspended.

Figure 21:
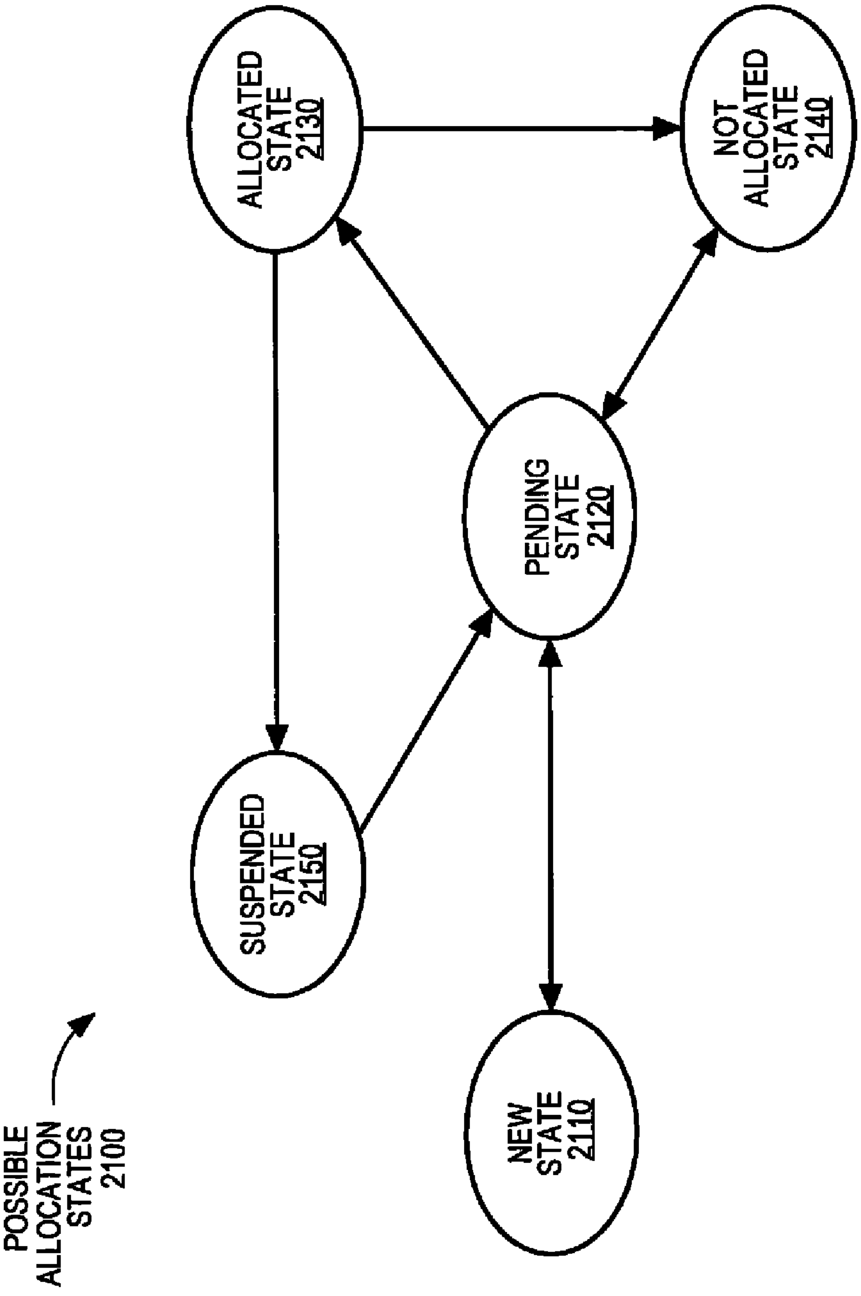
FIG. 21 is block diagram of possible allocation states for a suspendable resource requirement, according to an embodiment.

FIG. 21 is block diagram of possible allocation states 2100 for a suspendable resource requirement, according to an embodiment. Possible allocation states 2100 include a new state 2110, a pending state 2120, an allocated state 2130, a not allocated state 2140, and a suspended state 2150. While FIG. 21 is described in terms of the five illustrated allocation states, fewer or more states may be used, and different state names may be used than those illustrated in FIG. 21.

New state 2110, pending state 2120, allocated state 2130, and not allocated state 2140 correspond to new state 1110, pending state 1120, allocated state 1130, and not allocated state 1140 of FIG. 11, respectively, and are not described further herein.

Suspended state 2150 indicates that one or more resources that were previously allocated and that satisfied the resource requirement have been de-allocated based on a suspendable resource requirement, thereby leaving the resource requirement unfulfilled.

As in FIG. 11, the directions of the arrows in FIG. 21 indicate which of possible allocation states 2100 can change from one to another. The direction of the arrows and meanings shown in FIG. 21 between new state 2110, pending state 2120, allocated state 2130, and not allocated state 2140 correspond to those of FIG. 11 and are not described further herein.

As illustrated by the arrows in FIG. 21, suspended state 2150 is reached from allocated state 2130, which occurs when the one or more resources that satisfy the resource requirement are de-allocated. Hence, the resource requirement that was previously allocated is now suspended, as represented by suspended state 2150.

Suspended state 2150 can change to pending state 2120. For example, if processing of the suspended resource requirement begins to determine if one or more resources are available that satisfy the suspended resource requirement, suspended state 2150 changes to pending state 2120.

Figure 22:
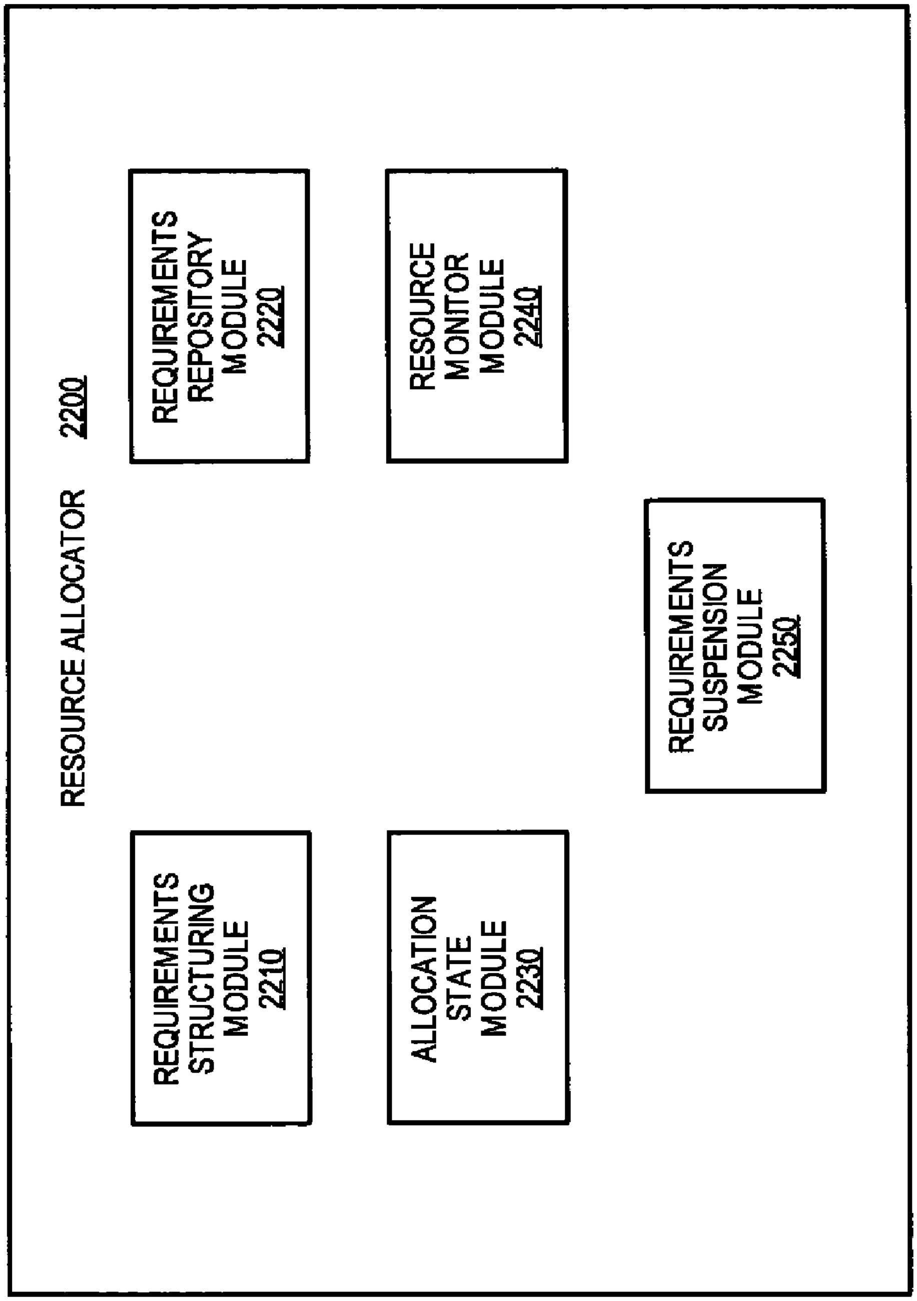
FIG. 22 is a block diagram of a resource allocator that processes suspendable resource requirements, according to an embodiment.

14.6 Implementation Mechanisms for Allocating Resources Using Suspendable Resource Requirements FIG. 22 is a block diagram of a resource allocator 2200 that processes suspendable resource requirements, according to an embodiment. Resource allocator 2200 can be a modified resource allocator based on resource allocator 1030 of FIG. 10, based on resource allocator 1200 of FIG. 12, or based on resource allocator 1800 of FIG. 18.

Resource allocator 2200 is comprised of a requirements structuring module 2210, a requirements repository module 2220, an allocation state module 2230, a resource monitor module 2240, and a requirements suspension module 2250. Requirements structuring module 2210, requirements repository module 2220, allocation state module 2230, and resource monitor module 2240 correspond to requirements structuring module 1210, requirements repository module 1220, allocation state module 1230, and resource monitor module 1240 of FIG. 12, respectively, and are not described further herein.

Requirements suspension module 2250 processes suspend requests, whether from any of a number of sources, including but not limited to, resource allocator 2200, another resource allocator, the service provider, third party, or a software application. Requirements suspension module 2250 obtains and stores state information for one or more resources that are to be suspended and de-allocates the one or more resources, thereby allowing the one or more resources to be allocated to another apparatus. Requirements suspension module 2250 also handles re-allocation of suspended resource requirements, such as by following the approach illustrated in FIG. 21, which includes retrieving the stored state information and ensuring that the one or more resources to be allocated are configured based on the retrieved state information with an acceptable loss of state.

Suspendable resource requirements can be used with dependent resource requirements such that when a suspendable resource requirement is suspended, any other resource requirements that depend on the suspendable resource requirement are suspended. For example, a parent resource requirement can be a suspendable resource requirement. When the suspendable parent resource requirement is suspended, then any child resource requirements of the suspendable parent resource requirement are suspended, even if the child resource requirements are not specified to be suspendable resource requirements.

14.7 Exchanging Resources Based on a Suspendable Resource Requirement

In some situations, a resource requirement that is specified to no longer be satisfied can be re-allocated in a shorter period of time, including an automated attempt to reallocate one or more resources for the de-allocated resources based on one or more other resource requirements that were satisfied by the de-allocated resources, but without satisfying the suspended resource requirement. For example, if a resource requirement specifies just a part of a device (such as one device characteristics instead of an entire device), then the device that is de-allocated can be replaced by another device that meets a reduced set of device characteristics. As a result, the originally allocated device that satisfied all the original resource requirements is exchanged for another device that satisfies less than all the original resource requirements (except for the suspended resource requirement). As a result of the exchange, the original device is returned to the idle pool, and the other device that was in the idle pool is allocated to the apparatus.

As a more specific example, assume that the resource requirement that is to no longer be specified describes one characteristic of a resource, such as that the processing speed of the CPU must be at least 4 GHz, whereas other resource requirements specify other characteristics of the CPU, such as that the processor architecture be an Intel Pentium 4 and that the operating system is Linux. When the particular CPU that satisfies all the resource requirements for the CPU is de-allocated from the apparatus, assume that there is no other available CPU that satisfies all the resource requirements. However, assume further that there is one CPU that satisfies all the resource requirements except the CPU processor speed (e.g., a CPU with a processor speed of 3 GHz and that also is of the specified Intel Pentium 4 architecture running the Linux operating system). Instead of leaving all the resource requirements for the CPU unsatisfied, the service provider can allocate another CPU that satisfies all the resource requirements except for the processor speed, such as by allocating a 3 GHz Intel Pentium 4 processor with Linux. At a later time, when a CPU becomes available that satisfies all the resource requirements for the CPU (e.g., either the original CPU that was de-allocated or another CPU), the slower 3 GHz CPU can be de-allocated and the now available CPU with a processor speed of at least 4 GHz is allocated to the apparatus.

Returning to the approach illustrated in FIG. 19, if the resource requirement that is no longer to be satisfied (e.g., the suspendable resource requirement) specifies less than all the characteristics of the resource to be de-allocated, the process can continue to determine whether or not one or more other resources are available that satisfy the remaining characteristics of the resource, without satisfying the characteristic specified by the suspendable resource requirement.

For example, the resource allocator can use the approach illustrated in FIG. 20 based on satisfying the other resource requirements that were satisfied by the de-allocated one or more resources, but not the suspended resource requirement. As a specific example, if the suspendable resource requirement specifies a minimum 4 GHz processor speed and other resource requirements specify an Intel Pentium 4 architecture and the Linux operating system, the resource allocator can allocate a 3 GHz Intel Pentium 4 CPU running the Linux operating system instead. Depending on the availability of resources in the future, the resource allocator can attempt to allocate a resource that satisfies all the resource requirements for the CPU, including the suspended resource requirement that specifies a minimum processor speed of 4 GHz, and if such a resource is available, the currently allocate resource can be de-allocated and the newly identified resource allocated to the apparatus.

15.0 Preempting Resource Requirements

In one embodiment, if a resource requirement for a first apparatus cannot be fulfilled, one or more other resources that are allocated to another apparatus and that satisfy another resource requirement for the other apparatus, which is characterized such that the resources that currently satisfy the other resource requirement may be de-allocated, are de-allocated from the other apparatus and allocated to the first apparatus. For example, when a user requests the implementation of a first apparatus, assume that the resource allocator cannot allocate a resource requirement because there are no resources available that satisfy the resource requirement. However, there may be another apparatus that is already implemented that includes one or more resources that satisfy the resource requirement, and the user that requested the other apparatus may not object to having the other one or more resources taken away (e.g., to get a discounted price on the other apparatus). As a result, the first apparatus can be implemented after de-allocating the one or more resources from the other apparatus and then allocating the one or more resources to the first apparatus.

From the perspective of the user that requests the first apparatus and that receives the benefit of the one or more resources taken away from the other apparatus, the use of a preemptable resource requirement can be similar to the use of a suspendable resource requirement for freeing up resources for other apparatuses, as described in some of the example above in the “Suspending Resource Requirements” section. The user receiving the one or more resources that are de-allocated typically does not know where the one or more resources are coming from, whether the one or more resources were in the idle pool or allocated to another apparatus. The user generally does not know what happens with the other implemented apparatus if the one or more resources are de-allocated instead of being taken from the idle pool.

Note that while there is overlap between suspending resource requirements and preempting resource requirements in the situation in which resources are de-allocated from one apparatus for allocation to another apparatus, the scope of each includes other situations and implementations than the other. Specifically, resource requirements can be suspended for any reason, including making the resources available to other apparatuses, which is the typical reason for using preemptable resource requirements. However, suspendable resource requirements can be used in other situations in which the resources are made available for other reasons, such as to perform maintenance, install upgrades, or to retire the resources for removal from the computing grid. Likewise, while preemptable resource requirements can be implemented based on suspendable resource requirements, preemptable resource requirements can be implemented in other ways, such as by using alternative resource requirements, as described below.

From the perspective of the user of the other apparatus that loses the one or more resources, the use of a preemptable resource requirement can be similar to the use of suspendable resource requirements in some implementations. For example, the user of the other apparatus can specify that the preemptable resource requirement is to be handled in the same manner as a suspendable resource requirement, so that state information is stored to be used to configure one or more other resources that may be allocated later to fulfill the preempted resource requirement.

However, from the perspective of the user of the other apparatus that loses the one or more resources, the use of a preemptable resource requirement can be different from the use of a suspendable resource requirement. For example, the user of the other apparatus can specify that the preemptable resource requirement be handled using alternative resource requirements so that the preempted resource requirement that is currently fulfilled based on one alternative resource requirement may be fulfilled using another alternative resource requirement. Typically, when one alternative takes the place of another alternative, no attempt is subsequently made to return back to the previously fulfilled and currently not allocated alternative resource requirement. However, in some implementations, the resource allocator can determine whether the alternative resource requirement that was originally fulfilled can be satisfied again, and if so, the alternatives can be switched back.

As a specific example, the user can specify as part of the preemptable resource requirement that, in order to de-allocate the resources that currently satisfy one alternative of the set of alternative resource requirements that are part of the preemptable resource requirement, another alternative resource requirement must be capable of being fulfilled. Thus, the user is willing to let the service provider swap one alternative for another alternative when the service provider needs the resources that fulfill the first alternative.

As another specific example, the user can specify that another alternative resource requirement should, but does not need to be, capable of being fulfilled in order to de-allocate the resources that currently satisfy the preemptable resource requirement. Thus, the user is willing to let the service provider de-allocate the resources for one alternative if the service provider needs such resources, and the service provider should try to fulfill another alternative instead, but fulfillment of the other alternative resource requirement is not required in order for the service provider to de-allocate the resources for the first alternative.

As yet another specific example, the user can specify that another alternative resource requirement should not be fulfilled, even if another alternative is available that could be fulfilled.

As used herein, the term “preemptable resource requirement” means a resource requirement that is characterized in that the resources that currently satisfy the resource requirement may be de-allocated. A preemptable resource requirement can include the use of other types of resource requirements, including but not limited to, suspendable resource requirements and alternative resource requirements. Note that with a preemptable resource requirement, the de-allocated resources need not necessarily be allocated to another apparatus.

The use of preemptable resource requirements can provide flexibility for both users and for the service provider. As with suspendable resource requirements, the user can specify which resource requirements are preemptable and perhaps receive a reduction in cost from the service provider for the requested apparatus. Such a situation would be somewhat analogous to some electrical utility customers that are willing to be removed from the power grid at times of peak summer demand in exchange for lower power rates during the year. Also, as with suspendable resource requirements, a preemptable resource requirement can include one or more criteria, such that the user can specify one or more conditions, as to when the resource requirement can be preempted. Resource requirements can be preempted at the direction of not just the user, but also the service provider, a third party, or a software application, with or without permission or foreknowledge of the preemption by the user of the apparatus.

Preemptable resource requirements can be implemented using suspendable resource requirements, alternative resource requirements, other types of resource requirements, or a combination thereof. As a result, a preemptable resource requirement can provide greater flexibility than that of a suspendable resource requirement. For example, a preemptable resource requirement can be implemented based on a set of alternative resource requirements with the user specifying that the preemptable resource requirement cannot be preempted unless another alternative resource requirement can be fulfilled. Thus, the user will have at least one alternative resource requirement fulfilled and can avoid having none of the alternative resource requirements fulfilled.

As a specific example, a preemptable resource requirement can be based on two alternative resource requirements, and the user can specify that in order to be preempted, the unfulfilled alternative must be fulfilled. The alternative resource requirement that is currently fulfilled can specify a large web server, and the other alternative resource requirement that is not fulfilled can specify a set of four small web servers fronted by a load balancer. If the service provider needs to preempt the resource requirement so that the large web server can be allocated to another apparatus, the service provider first determines whether the unfulfilled alternative resource requirement for the four small web servers fronted by the load balancer can be fulfilled. If so, the web server can allocate the four small web servers and the load balancer, de-allocate the large web server from that apparatus, and then allocate the large web server to the other apparatus.

As another specific example, a preemptable resource requirement can be based on a suspendable resource requirement to allow for the shuffling of resources among different apparatuses, as in the following example. Consider a first apparatus that includes a resource requirement for a 50 GB storage device. After determining that just 40 GB storage devices are available, the resource allocator identifies a 50 GB storage device that is allocated to a second apparatus and that satisfies a preemptable resource requirement. The resource allocator de-allocates the 50 GB storage device from the second apparatus, and then the resource allocator allocates the 50 GB storage device to the first apparatus. The resource allocator can then immediately attempt to fulfill the preempted resource requirement for the second apparatus. Assume that the second apparatus’ preemptable resource requirement specified a storage device of at least 40 GB, which was satisfied by the service provider allocating the 50 GB storage device. In that case, the resource allocator can allocate one of the available 40 GB storage devices from the idle pool and configure the 40 GB storage device based on state information obtained before the original 50 GB storage device was de-allocated.

To avoid a cascade or chain of preempted resource requirements among apparatuses that results in a shuffling of resources among a set of apparatuses when resources are de-allocated for use in other apparatuses, the service provider can follow one or more approaches. For example, the service provider can follow a policy that specifies that resources should not be taken from another apparatus to allocate a preempted resource requirement. As another example, the service provider can limit the number of subsequent preemptions of resources to a specified number to allow for some reshuffling of resources, but not so much that the service provider spends too much effort in shuffling resources around among the apparatuses.

The use of preemptable resource requirements can provide flexibility for both users and for the service provider. For example, the user may be able to obtain a discounted price for an apparatus if the user is willing to specify preemptable resource requirements for an apparatus. Because the user can specify which resource requirements are preemptable, the user can plan accordingly for a time when resources for the preemptable resource requirements are suspended. As a specific example, if the user has a set of five web servers fronted by a load balancer, the user can specify that the resource requirement that is satisfied by one of the five web servers is preemptable. By specifying a preemptable resource requirement, the user accepts that the load on the other servers will increase. However, the user considers that to be a fair exchange for the service provider charging half price for the fifth web server. As another specific example, the user may consider the lack of a firewall in the user’s apparatus to be unacceptable, and as a result, the user would not specify the resource requirement that the apparatus include a firewall to be a preemptable resource requirement. In general, both the user and service provider benefit from the use of preemptable resource requirements when resources need to be de-allocated for whatever reason that the resources need to be de-allocated since the preemptable resource requirements allow both the user and service provider to plan and prepare for the de-allocation of some resources before the need to de-allocate the resources arises.

As another specific example, the preemption of a resource requirement can be performed for the purpose of re-allocating the one or more resources to another apparatus. In this example, the service provider can reduce the number of devices that need to be included in the computing grid if some resources can be suspended from existing apparatuses such that they can be re-allocated to other apparatuses. For example, consider a user that needs maximum processing resources during normal business hours (e.g., to support employees that process transaction from 8 AM to 5 PM) and much less processing resources overnight when few employees are working. Such a user can be considered to be a daytime heavy user. Another user needs maximum processing resources during the nighttime hours (e.g., to run billing invoices from 1 AM to 5 AM), but otherwise needs much less processing resources during the day. Such a user can be considered to be a nighttime heavy user.

Without preemptable resources, the service provider would need to allocate to processing resources to meet both the daytime heavy user's resource requirements and the nighttime heavy user's resource requirements. However, each user's resource requirements are typically are based on the peak processing loads, even though the processing resources are largely unused during significant parts of each day.

However, with preemptable resources, each user can specify that some of the resource requirements for the processing resources are preemptable, for example half the requested servers, during non-peak times. As a result, the service provider can suspend half of the daytime heavy user's processing resources at night, since there is little processing occurring then, and allocate them to the nighttime heavy user, who needs more processing reasons at night for billing. During the day, the service provider returns the processing resources that were de-allocated from the nighttime heavy user to the daytime heavy user. In addition, during the day, the service provider de-allocates some of the nighttime heavy user's processing resources, which are largely being underutilized, for use by the daytime heavy user whose processing load is heaviest during the day.

Thus, each of the two users has some servers that are never de-allocated, and then each user effectively shares the other processing resources at different times of the day, which means that the service provider can use a fewer number of processing resources in the computing grid to keep both users happy with the overall service being provided. The service provider can lower the costs by including fewer processing resources overall in the computing grid. In exchange for specifying some processing resources as preemptable, the users obtain a discount on the apparatus and other services provided by the service provider.

In some situations, the one or more resources that are pre-empted can be replaced by different resources that satisfy the same resource requirement. For example, assume that the resource requirement that is specified to no longer be satisfied describes a particular type of CPU having a processor speed of at least 4 GHz. The current resource is a CPU of the specified type of CPU with a processor speed of 4 GHz, and the CPU is one of a set of CPU's included in the apparatus. Assume further that the service provider is phasing out such CPU's with processor speeds of less than 5 GHz. Because the resource requirement is specified to be capable of no longer being satisfied, the service provider can de-allocate the 4 GHz CPU so that the CPU can be removed from the grid. The service provider can then allocate another CPU, for example a CPU of the same type but with a processor speed of 6 Hz, to later satisfy the resource requirement.

15.1 Allocating Resources Based on Preemptable Resource Requirements

Figure 23:
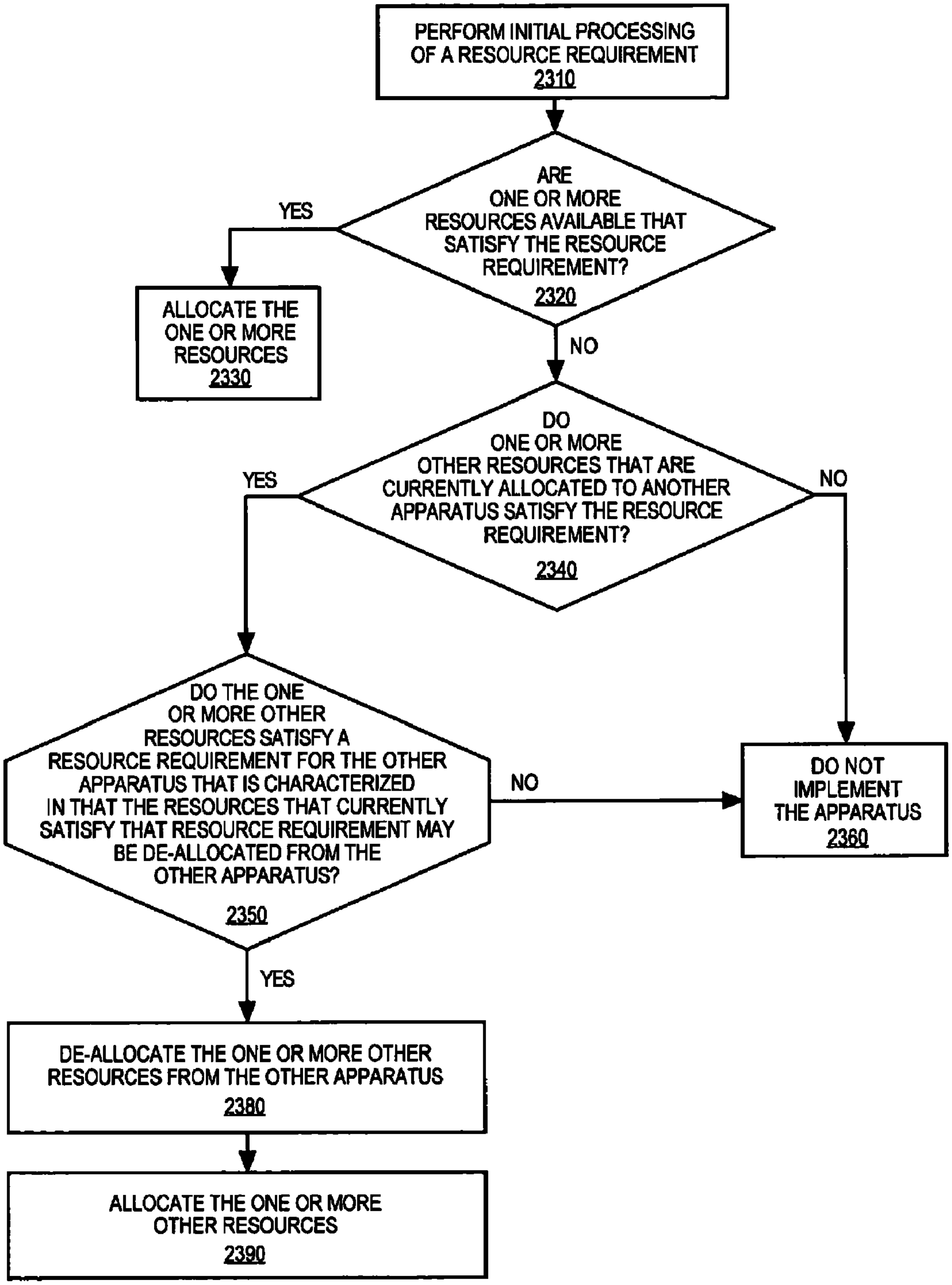
FIG. 23 is a flow diagram illustrating allocation of resources to an apparatus based on preemptable resource requirements, according to an embodiment.

FIG. 23 is a flow diagram illustrating allocation of resources to an apparatus based on preemptable resource requirements, according to an embodiment. FIG. 23 is a simplified version of the approach illustrated in FIG. 13, and therefore for clarity some steps illustrated in FIG. 13 are omitted in FIG. 23, although such steps can be included.

For purposes of explanation, FIG. 23 is described as if there is one resource requirement that is characterized in that the resources that currently satisfy that resource requirement may be de-allocated from the other apparatus, such as a preemptable resource requirement, although any number of preemptable resource requirements can be used. Also, FIG. 23 is described with reference to the processing of preemptable resource requirements, and thus FIG. 23 does not include the possibility of adding one or more additional features as described herein or elsewhere, including but not limited to features such as resource requirements, dependent resource requirements, optional resource requirements, alternative resource requirements, and suspendable resource requirements. However, in a particular implementation, any number of such features as described herein may be included along with additional features not described herein.

In block 2310, the resource allocator performs initial processing of a resource requirement. For example, block 2310 can correspond to blocks 1310, 1314, 1320, and 1330 of FIG. 13. The output of block 2310 is that one or more resources are identified that satisfy the resource requirement selected for processing.

In block 2320, the resource allocator determines whether one or more resources are available that satisfy the resource requirement. If so, the process continues to block 2330, where the resource allocator allocates the one or more resources to the apparatus. Block 2330 also can include additional functions, such as those from blocks 1340, 1344, and 1354 of FIG. 13.

Note that for clarity, no additional blocks are illustrated in FIG. 23 following from block 2330. However, block 2330 is typically followed by other functions, such as those illustrated by blocks 1380 et seq. in FIG. 13 (e.g., determining whether there are additional resource requirements to process and implementing the apparatus, if appropriate).

If in block 2320, the resource allocator determines that one or more resources are not available, then the process continues to block 2340, where the resource allocator determines whether there are one or more other resources that are currently allocated to another apparatus and that satisfy the resource requirement. For example, consider that the resource requirement specifies a large web server with a set of specified parameters, and the resource allocator determines that a large web server that includes the specified parameters (e.g., that satisfies the resource requirement) is allocated to another apparatus.

If there are one or more other resources that satisfy the resource requirement but that are allocated to another resource, the process continues to block 2350. If not, the process continues to block 2360, where the apparatus is not implemented. Block 2340 also can include additional functions, such as those from blocks 1360, 1370, and 1374 of FIG. 13.

In block 2350, the resource allocator determines whether the one or more other resources that are currently allocated to the other apparatus that is characterized in that the resources that currently satisfy that resource requirement may be de-allocated from the other apparatus. For example, the large web server that is currently allocated to the other apparatus that the resource allocator identifies in block 2340 can satisfy a resource requirement that another user has specified is preemptable in the other user's request for the other apparatus. The resource allocator can identify the resource requirement of the other apparatus as being preemptable by identifying a "PREEMPTABLE" tag that is part of the syntax for the resource requirement.

The user of the other apparatus, when specifying the preemptable resource requirement, may have included conditions under which preemption of the resource requirement is permissible (e.g., the time of day). Also, the user of the other apparatus may not have specified any conditions with the preemptable resource requirement, but merely that some resources in a group of resources can be preempted (e.g., there is a set of five similar database servers in which two database servers satisfy a preemptable resource requirement while the other three database servers satisfy a non-preemptable resource requirement).

Block 2340 and/or block 2350 also can include additional functions, such as those from blocks 1360 and 1374 of FIG. 13. If in block 2340 the resource allocator determines that the other one or more resources satisfy the resource requirement, which is characterized as described above, for the other apparatus, the process continues to block 2380. If not, then the process continues to block 2360, where the apparatus is not implemented.

In block 2380, the resource allocator de-allocates the one or more other resources from the other apparatus. For example, the resource allocator removes the mapping between the database server and the preemptable resource requirement, thereby de-allocating the large web server from the other apparatus. The resource allocator also can update the allocation state for the preemptable resource requirement to "PREEMPTED."

Although not illustrated in FIG. 23, the resource allocator can provide a notification, such as an alert message, to the user of the other apparatus that includes the resource requirement that is characterized in that the resources that currently satisfy that resource requirement may be de-allocated will in fact be de-allocated. As a specific example, the user of the apparatus that includes a preemptable resource requirement can be informed that the preemptable resource requirement will be preempted prior to the resource allocator preempting the preemptable resource requirement. The notification can allow the user of the apparatus to take any actions that the user wants in preparation for the preemption of the preemptable resource requirement. The notification can be provided with as little advance notice as a few seconds to several days or more, although a typical time frame is 24 hours.

From block 2380, the process continues to block 2390, where the resource allocator allocates the one or more other resources to the apparatus. For example, the large web server that was de-allocated from the other apparatus is allocated to the apparatus that is associated with resource requirement being processed starting in block 2310. Note that as far as the user of the apparatus is concerned, the resource requirement has been fulfilled and the large web server that satisfies the resource requirement is allocated to the user's apparatus. Typically, the user has no information that the large web server was preempted from another apparatus instead of being allocated from an idle pool of available resources.

Although not illustrated in FIG. 23, additional functions can be included following block 2380, such as those of blocks 1380 et seq. of FIG. 13. However, for simplicity, checking for additional resource requirements to be processed and implementing the apparatus are not illustrated in FIG. 23.

As discussed above with reference to FIG. 16, FIG. 17, and FIG. 19, with the approach of FIG. 23 in which processing stops when a resource requirement cannot be fulfilled that needs to be fulfilled, computational resources in processing the resource requirements are minimized. As discussed with respect to FIG. 16, FIG. 17, and FIG. 19, a second approach can be taken than that of FIG. 23 in which processing does not stop in block 2340 or in block 2350 if there are no one or more other resources that satisfy a preemptable resource requirement for another apparatus. Instead, the allocation states for the resource requirement being processed is changed to "NOT ALLOCATED," and then processing continues of other resource requirements. Once the processing of all the resource requirements is complete, a check is made to determine if any resource requirements that are specified to be included are "NOT ALLOCATED," and the apparatus is implemented or not as appropriate.

15.2 Preemption Using Alternative Resource Requirements

Figure 24:
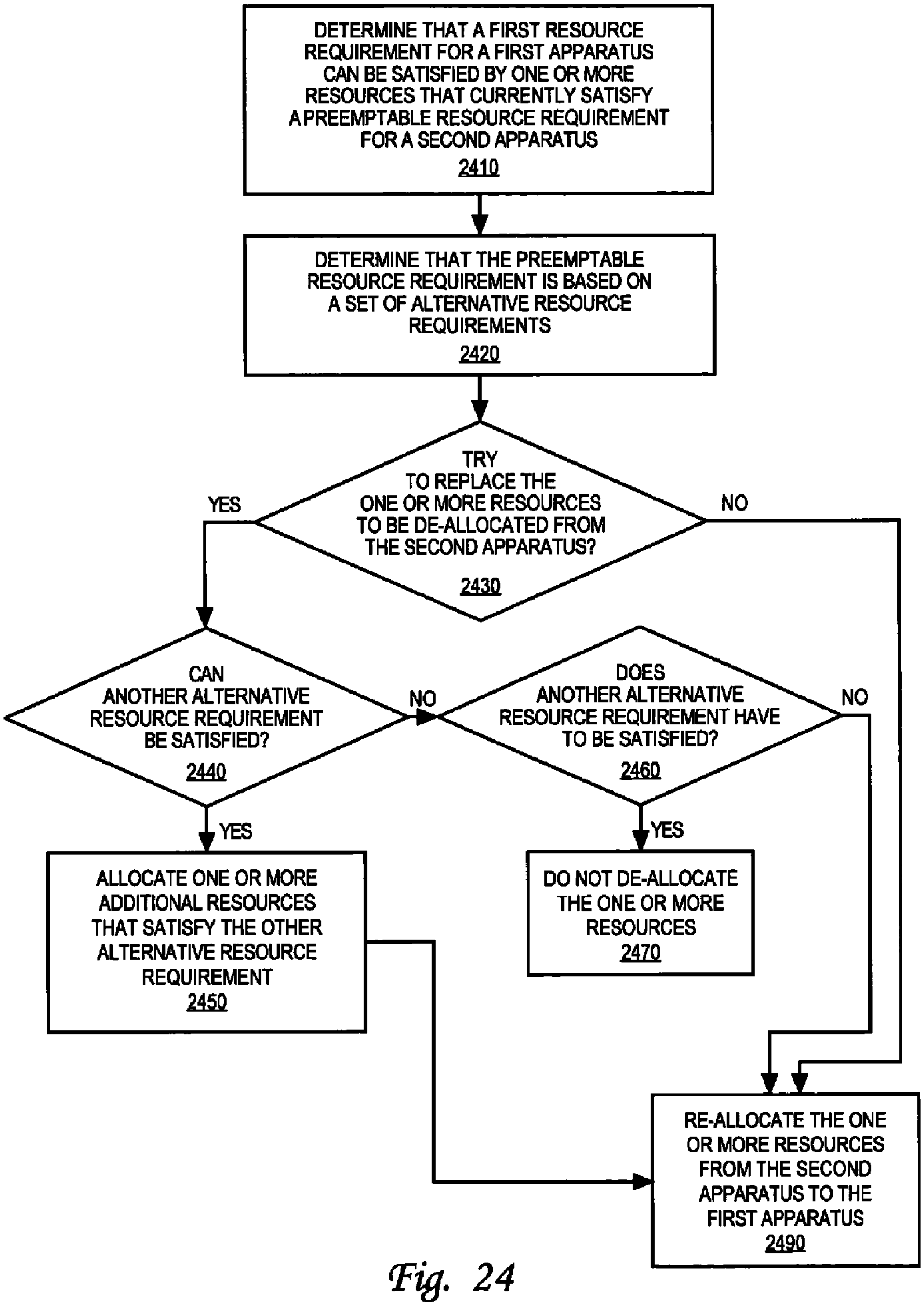
FIG. 24 is a flow diagram illustrating preemption of resource requirements based on alternative resource requirements, according to an embodiment.

FIG. 24 is a flow diagram illustrating preemption of resource requirements based on alternative resource requirements, according to an embodiment. FIG. 24 is based on a simplified version of the approach illustrated in FIG. 13, and therefore for clarity some steps illustrated in FIG. 13 are omitted in FIG. 24, although such steps can be included. Also, FIG. 24 is described as if there is one preemptable resource requirement, although a particular implementation can use any number of resource requirements that are characterized in that the resources that currently satisfy the resource requirement may be de-allocated. Finally, FIG. 24 does not include the possibility of adding one or more additional features as described herein or elsewhere, including but not limited to features such as resource requirements, dependent resource requirements, optional resource requirements, alternative resource requirements, suspendable resource requirements, and preemptable resource requirements based on suspendable resource requirements, although one or more such features can be included in a given implementation.

In block 2410, the resource allocator determines that a first resource requirement for a first apparatus can be satisfied by one or more resources that currently satisfy a preemptable resource requirement for a second apparatus. For example, block 2410 can correspond to the "YES" output of block 2350 of FIG. 23, and thus block 2410 can include the functions illustrated for blocks 2310, 2320, 2330, 2340, and 2360 of FIG. 23, although for purposes of explanation, such functions are not described further herein.

As a specific example, assume that the resource requirement being processed specifies a large web server, but there are no large web servers available in the idle pool. However, the resource allocator determines that another apparatus includes a large web server and that the resource requirement for the other apparatus that is satisfied by the large web server is specified to be preemptable.

From block 2410, the process continues to block 2420, where the resource allocator determines that the preemptable resource requirement is based on a set of alternative resource requirements. For example, the resource allocator identifies that the particular preemptable resource requirement for the second apparatus includes two or more alternative resource requirements, as opposed to the preemptable resource requirement being based on a suspendable resource requirement, which is described more fully below. Although not illustrated, another function for determining whether the preemptable resource requirement is based on either alternative resource requirements or suspendable resource requirements can be used in between blocks 2410 and 2420.

For example, assume that the preemptable resource requirement for the second apparatus includes two alternative resource requirements, one that specifies a large web server and another that specifies a set of four small web servers fronted by a load balancer. Further assume that when the second apparatus was implemented, the preferred alternative resource requirement for the large web server was fulfilled based on the last large web server that was in the idle pool and that the resource allocator allocated the large web server to the second apparatus, which left the second alternative resource requirement unfulfilled. The resource allocator can update the allocation states, with the allocation state for the alternative resource requirement that is satisfied by the large web server being changed to "ALLOCATED" and the allocation state for the alternative resource requirement that is satisfied by the set of four small web servers and the load balancer being changed to "NOT ALLOCATED."

In block 2430, the resource allocator determines whether to try to replace the one or more resources that are to be de-allocated from the second apparatus. For example, the preemptable resource requirement can include a "REPLACEMENT" variable that has one value of three possible values: "REQUIRED," "DESIRED," and "NONE." The value "REQUIRED" means that as a condition for de-allocating the one or more resources that currently satisfy the preemptable resource requirement, one of the other alternative resource requirements in the set of alternative resource requirements is to be satisfied. The value "DESIRED" means that one of the other alternative resource requirements should be satisfied, if possible, but if none of the other alternative resource requirements can be satisfied, the one or more resources can still be de-allocated. The value "NONE" means that the one or more resources satisfying the preemptable resource requirement are to be de-allocated without the resource allocator trying to determine if another alternative resource requirement can be satisfied.

If in block 2430, the resource allocator determines that an attempt to replace the one or more resources to be de-allocated is not to be made, the process continues to block 2490. For example, if the value for the "REPLACEMENT" variable is "NONE," then the resource allocator would not try to replace the large web server with a set of four small web servers fronted by a load balancer as specified in the other alternative resource requirement.

Note that specifying not to attempt to obtain a replacement leads to a result that is similar to the outcome when using a preemptable resource requirement based on a suspendable resource requirement, namely that the currently allocated resources for the preemptable resource requirement are de-allocated from the second apparatus without anything being allocated to the second apparatus to take the place of the de-allocated resources. However, in the approach illustrated in FIG. 24, state information is not obtained and stored for the one or more resources that are to be de-allocated, whereas with a suspendable resource requirement, such state information is generally, but not always, obtained and stored.

If in block 2430, the resource allocator determines that an attempt to replace the one or more resources to be de-allocated is to be made, the process continues to block 2440. For example, if the "REPLACEMENT" variable has a value of either "REQUIRED" or "DESIRED," the process continues to block 2440.

In block 2440, the resource allocator determines whether another alternative resource requirement can be satisfied. For example, the alternative resource requirement that specifies the set of four small web servers fronted by the load balancer would be processed by the resource allocator to determine whether four small web servers and a load balancer are available that satisfy the second alternative resource requirement. The allocation state for the alternative resource requirement for the set of four small web servers and the load balancer is updated from "NOT ALLOCATED" to "PENDING" to reflect that the alternative that was originally not fulfilled is currently being processed.

If in block 2440, the resource allocator determines that another alternative resource requirement can be satisfied, the process continues to block 2450 where the resource allocator allocates one or more additional resources that satisfy the other alternative resource requirement. For example, if four small web servers and a load balancer are available from the idle pool, the resource allocator allocates the four small web servers and the load balancer to the apparatus. The allocation state for the alternative resource requirement for the four small web servers and the load balancer is updated from "PENDING" to "ALLOCATED." The process then continues to block 2490.

If in block 2440, the resource allocator determines that another alternative resource requirement cannot be satisfied, the process continues to block 2460, where the resource allocator determines whether another alternative resource requirement have to be satisfied. For example, if in block 2440 the "REPLACEMENT" variable has a value of "DESIRED," then another alternative resource requirement does not need to be satisfied and the process continues to block 2490. As a specific example, in the case of the large web server, if the other alternative for the four small web servers fronted by the load balancer cannot be satisfied, then the large web server can still be de-allocated from the apparatus.

However, if in block 2460 the "REPLACEMENT" variable has a value of "REQUIRED," then the process continues to block 2470, where the resource allocator does not de-allocate the one or more resources. As a specific example, in the case of the large web server, if the other alternative for the four small web servers fronted by the load balancer cannot be satisfied, then the large web server is not de-allocated from the apparatus.

In block 2490, the resource allocator re-allocates the one or more resources that from the second apparatus to the first apparatus. Also, the allocation state for the alternative resource requirement for the large web server is updated from "ALLOCATED" to "NOT ALLOCATED."

Recall that block 2490 is reached under three situations: when the one or more resources that satisfy the preemptable resource requirement do not need to be replaced (e.g., from block 2430), when the one or more resources are to be replaced and can be replaced (e.g., from block 2450), and when the one or more resources cannot be replaced and such replacement is merely desired (e.g., from block 2460). The only situation in FIG. 24 in which the one or more resources are not re-allocated is when the one or more resources need to be replaced but cannot be replaced (e.g., when block 2470 is reached from block 2460).

As an example of the re-allocation of block 2490, the resource allocator can de-allocate the one or more resources that satisfy the preemptable resource requirement from the second apparatus, and then the resource allocator can allocate the one or more resources to the first apparatus. As a specific example, the resource allocator de-allocates the large web server from the second apparatus, placing the large web server into the idle pool, and then the resource allocator allocates the large web server from the idle pool to the first apparatus.

In the embodiment illustrated in FIG. 24, the one or more additional resources that satisfy the second alternative resource requirement are allocated before the one or more resources that currently satisfy the preemptable resource requirement are de-allocated (e.g., block 2450 occurs before block 2490). This approach ensures that at least one of the alternatives specified in the set of alternative resource requirements is allocated without a period in which none of the alternatives is allocated.

In another embodiment, the one or more resources that satisfy the preemptable resource requirement can be de-allocated first. For example, between block 2440 and block 2450, the resource allocator can de-allocate the one or more resources that currently satisfy the preemptable resource requirement. Then the resource allocator allocates the one or more additional resources that satisfy the other alternative resource requirement. This approach ensures that the resources satisfying the preemptable resource requirement are de-allocated first instead of waiting for another alternative resource requirement to be fulfilled.

Also, in the embodiment illustrated in FIG. 24, no state information is obtained and stored prior to de-allocating the one or more resources that currently satisfy the preemptable resource requirement. However, in another embodiment, state information is obtained and stored based on the current state of the resources to be de-allocated. The stored state information can be used when allocating the resources for the other alternative resource requirement, which may be desirable when the alternatives are very similar. But even when the alternatives are not very similar, some state information from the de-allocated resources may be helpful in configuring the resources to be allocated for the other alternative resource requirement.

Also, in the situation in which another alternative resource requirement is not fulfilled and the preemptable resource requirement is left for some period of time with an allocation state of "PREEMPTED" (e.g., when the "REPLACEMENT" variable is "NONE" or when it is "DESIRED" but no alternative can be fulfilled), the state information can be used to fulfill the preempted resource requirement when other resources or the de-allocated resources are made available to be allocated to the second apparatus.

15.3 Preemption Using Suspendable Resource Requirements

Figure 25:
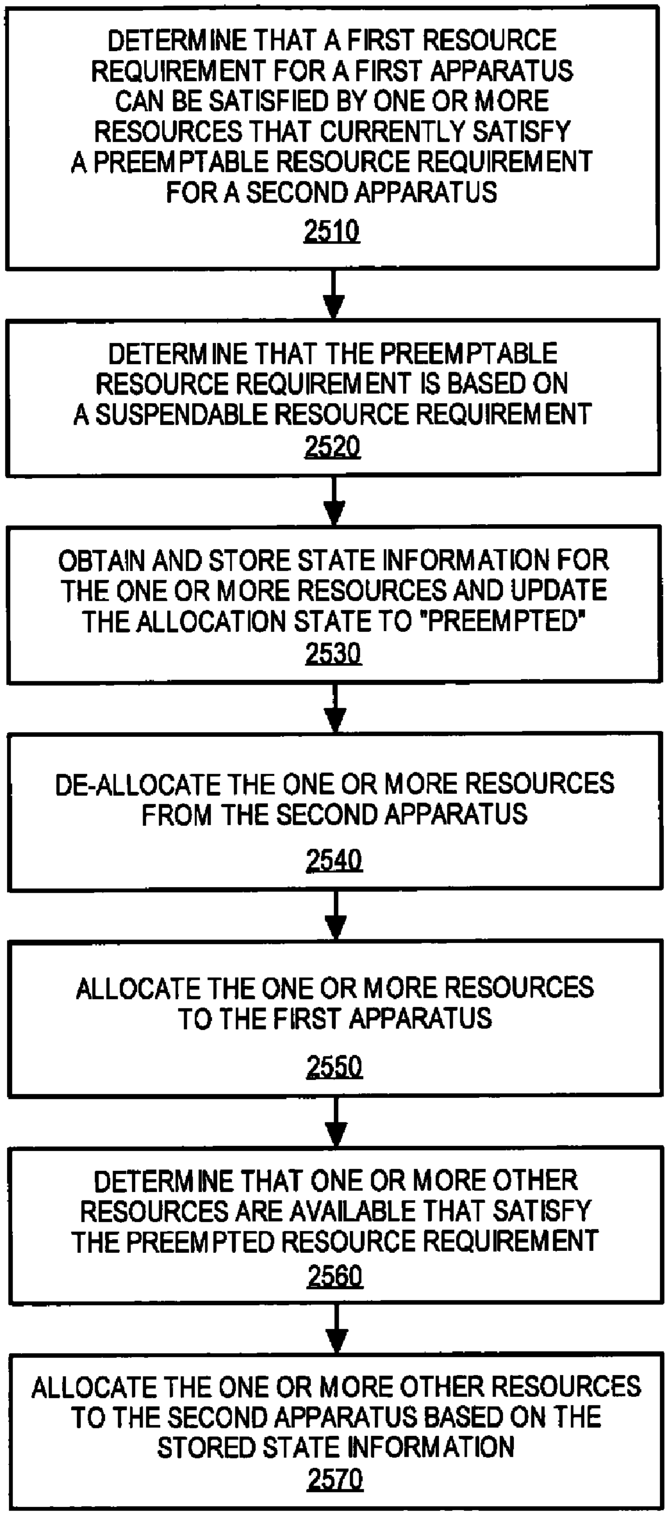
FIG. 25 is a flow diagram illustrating preemption of resource requirements based on suspendable resource requirements, according to an embodiment.

FIG. 25 is a flow diagram illustrating preemption of resource requirements based on suspendable resource requirements, according to an embodiment. FIG. 25 is based on a simplified version of the approach illustrated in FIG. 13, and therefore for clarity some steps illustrated in FIG. 13 are omitted in FIG. 25, although such steps can be included. Also, FIG. 25 is described as if there is one preemptable resource requirement, although a particular implementation can use any number of resource requirements that are characterized in that the resources that currently satisfy the resource requirement may be de-allocated. Finally, FIG. 25 does not include the possibility of adding one or more additional features as described herein or elsewhere, including but not limited to features such as resource requirements, dependent resource requirements, optional resource requirements, alternative resource requirements, suspendable resource requirements, and preemptable resource requirements based on a set of alternative resource requirements, although one or more such features can be included in a given implementation.

In block 2510, the resource allocator determines that a first resource requirement for a first apparatus can be satisfied by one or more resources that currently satisfy a preemptable resource requirement for a second apparatus. For example, block 2510 can correspond to the "YES" output of block 2350 of FIG. 23, and thus block 2510 can include the functions illustrated for blocks 2310, 2320, 2330, 2340, and 2360 of FIG. 23, although for purposes of explanation, such functions are not described further herein.

As a specific example, assume that the resource requirement being processed specifies a large database server, but there are no large database servers available in the idle pool. However, the resource allocator has determined that another apparatus includes a large database server and that the resource requirement for the other apparatus that is satisfied by the large database server is specified to be preemptable.

From block 2510, the process continues to block 2520, where the resource allocator determines that the preemptable resource requirement is based on a suspendable resource requirement. For example, the resource allocator identifies that the particular preemptable resource requirement for the second apparatus includes a suspendable resource requirement, as opposed to the preemptable resource requirement being based on a set of alternative resource requirements, which is described more fully above. Although not illustrated, another function for determining whether the preemptable resource requirement is based on either alternative resource requirements or suspendable resource requirements can be used in between blocks 2410 and 2420.

From block 2520, the process continues to block 2530, where the resource allocator obtains and stores state information about the one or more other resources to be de-allocated, and the resource allocator updates the allocation state for the preemptable resource requirement to "PREEMPTED." For example, the resource allocator queries the large database server that is to be de-allocated to obtain runtime state information about the large database server, and then the resource allocator stores the runtime state information in a database that is part of the control plane for the computing grid.

From block 2530, the process continues to block 2540, where the resource allocator de-allocates the one or more other resources from the second apparatus. For example, the resource allocator removes the mapping between the large database server and the preemptable resource requirement, thereby de-allocating the database server from the second apparatus.

From block 2540, the process continues to block 2550, where the resource allocator allocates the one or more other resources to the first apparatus. For example, the large database server that was de-allocated from the second apparatus is allocated to the first apparatus that is associated with resource requirement being processed starting in block 2510. Note that as far as the user of the first apparatus is concerned, the resource requirement has been fulfilled and the large database server that satisfies the resource requirement is allocated to the first apparatus. Typically, the user has no information that the large database server was preempted, little less preempted based on suspension, from another apparatus instead of being allocated from an idle pool of available resources.

From block 2550, the process continues to block 2560, where the resource allocator determines that one or more other resources are available that satisfy the preempted resource requirement. Block 2560 can correspond to the functions of blocks 2010 and 2020 of FIG. 20. The resource allocator can perform the function illustrated by block 2550 at any of a number of times, including but not limited to, just after the de-allocation of the resources in block 2550, after a specified time has elapsed following the de-allocation of the resources in block 2550, or until the resource allocator is notified that additional resources are available that may satisfy the preempted resource requirement. Also, the allocation state of the preemptable resource requirement is changed from “PREEMPTED” to “PENDING” when the resource allocator begins to process the preempted resource requirement.

Furthermore, the one or more other resources determined by the resource allocator to satisfy the preempted resource requirement in block 2560 can include all, some, or none of the one or more resources de-allocated in block 2540. For example, the resource allocator may identify another large database server in the idle pool that satisfies the preempted resource requirement, although the large database server identified by the resource allocator is not the same large database server that was de-allocated in block 2540.

From block 2560, the process continues to block 2570, where the resource allocator allocates the one or more other resources to the second apparatus based on the stored state information. Block 2570 can correspond to the functions of blocks 2040, 2050, 2060, 2070, and 2080 of FIG. 20. For example, the resource allocator can retrieve the state information that was stored for the large database server in block 2530 and then configure the other large database server based on the stored state information. If the loss of state is acceptable, the resource allocator allocates the other large database server to the second apparatus. The resource allocator also can update the allocation state for the preemptable resource requirement from “PENDING” to “ALLOCATED.”

15.4 Specifying that a Resource Requirement is Preemptable

The specification that a resource requirement is a preemptable resource requirement can be based on one or more of a number of approaches. For example, the request for an apparatus that includes the resource requirements can include one or more variables, such as a pair of tags (e.g., “<PREEMPTABLE>” and “</PREEMPTABLE>”) that indicate the start and end of a set of preemptable resource requirements. Any resource requirements listed between the start tag and the end tag are treated as suspendable resource requirements. As another example, each resource requirement can include one or more variables that indicate whether or not the resource requirement is a preemptable resource requirement, plus any conditions under which the preemptable resource requirement can be preempted (e.g., between certain hours of the day), as described above with respect to conditions for suspendable resource requirements.

In addition, the data indicating that a resource requirement is a preemptable resource requirement can be received outside of the request for the apparatus, whether from the user that desires the apparatus or from another entity, such as the service provider or a third party, or from a software application. For example, even if a request from a user does not specify any resource requirements to be preemptable resource requirements, the service provider can specify that certain types of resource requirements are preemptable. As a specific example, the service provider can specify that the resource requirements for two servers out of any group of five or more servers are preemptable. As another specific example, the service provider can decide that a certain class of users, such as those uses that engage in a significant amount of business with the service provider, are able to preempt resources from another class of users, such as those that engage in very little business with the service provider, even if the latter class of users have not specified any preemptable resource requirements.

As another example, data can be received by the resource allocator and used to determine whether a resource requirement is a preemptable resource requirement or is not a preemptable resource requirement. For example, instead of the user specifying resource requirements to be preemptable, the service provider can maintain a database in which different types of resource requirements are identified as preemptable resource requirements, and the resource allocator can access the database and retrieve the data to determine whether any resource requirements are to be treated as preemptable. More generally, the resource allocator can retrieve a rule and/or data that can be used to determine whether a resource requirement is a preemptable resource requirement.

As yet another example, instead of specifying resource requirements as preemptable resource requirements, a default classification approach can be used with exceptions identified based on one of the approaches described above. For example, the default can be that resource requirements are not preemptable resource requirements, with the user identifying resource requirements as “PREEMPTABLE” in the request for the apparatus. Alternatively, the default can be that all resource requirements are “PREEMPTABLE” unless the user specifies a resource requirement to be “NOT PREEMPTABLE.”

In addition to specifying that a resource requirement is a preemptable resource requirement, additional data can be used to determine whether any criteria must be satisfied in order for the preemptable resource requirement to be preempted. For example, the preemptable resource requirement can include a “CONDITION” tag that specifies the value of one or more variables. As a specific example, the preemptable resource requirement can have one variable to specify a start time (e.g., STARTTIME=8 PM) and another variable to specify a stop time (e.g., ENDTIME=4 AM), thereby specifying that the preemptable resource requirement is preemptable between 8 PM and 4 AM. As another example, the condition can be that at least a specified number of similar resources remain allocated to the apparatus, such that in a group of five servers, the servers satisfy preemptable resource requirements that specify that at least three of the five servers remain allocated to the apparatus. As a result, any one or two of the servers can be preempted, so long as three of the five servers remain allocated to the apparatus.

15.5 Allocation State: Preempted

According to an embodiment, an allocation state is associated with a resource requirement, and the allocation state represents that the resource requirement is preempted. As discussed above with respect to FIG. 11, the allocation state indicates the status of the resource requirement with respect to allocation of one or more resources that satisfy the resource requirement, such as “NEW,” “PENDING,” “ALLOCATED,” and “NOT ALLOCATED.” In implementations that include preemptable resource requirements, an additional allocation state, which may be identified as "PREEMPTED," indicates that a resource requirement is preempted.

Figure 26:
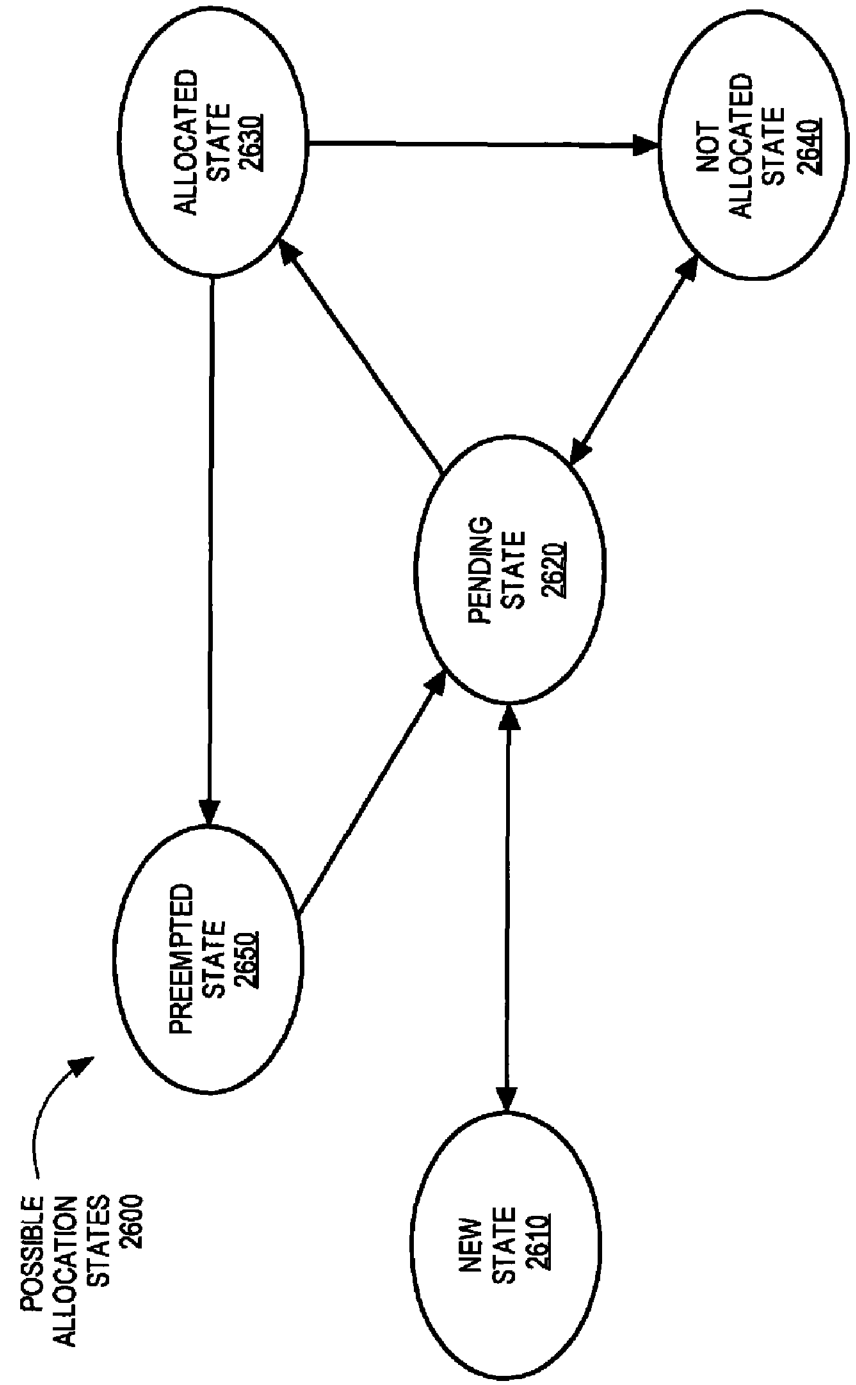
FIG. 26 is block diagram of possible allocation states for a preemptable resource requirement, according to an embodiment.

FIG. 26 is block diagram of possible allocation states 2600 for a preemptable resource requirement, according to an embodiment. Possible allocation states 2600 include a new state 2610, a pending state 2620, an allocated state 2630, a not allocated state 2640, and a preempted state 2650. While FIG. 26 is described in terms of the five illustrated allocation states, fewer or more states may be used, and different state names may be used than those illustrated in FIG. 26.

New state 2610, pending state 2620, allocated state 2630, and not allocated state 2640 correspond to new state 1110, pending state 1120, allocated state 1130, and not allocated state 1140 of FIG. 11, respectively, and are not described further herein.

Preempted state 2650 indicates that one or more resources that were previously allocated and that satisfied the resource requirement have been de-allocated based on a preemptable resource requirement, thereby leaving the resource requirement unfulfilled.

As in FIG. 11, the directions of the arrows in FIG. 26 indicate which of possible allocation states 2600 can change from one to another. The direction of the arrows and meanings shown in FIG. 26 between new state 2610, pending state 2620, allocated state 2630, and not allocated state 2640 correspond to those of FIG. 11 and are not described further herein.

As illustrated by the arrows in FIG. 26, preempted state 2650 is reached from allocated state 2630, which occurs when the one or more resources that satisfy the resource requirement are de-allocated. Hence, the resource requirement that was previously allocated is now preempted, as represented by preempted state 2650.

Preempted state 2650 can change to pending state 2620. For example, if processing of the suspended resource requirement begins to determine if one or more resources are available that satisfy the preempted resource requirement, preempted state 2650 changes to pending state 2620.

Figure 27:
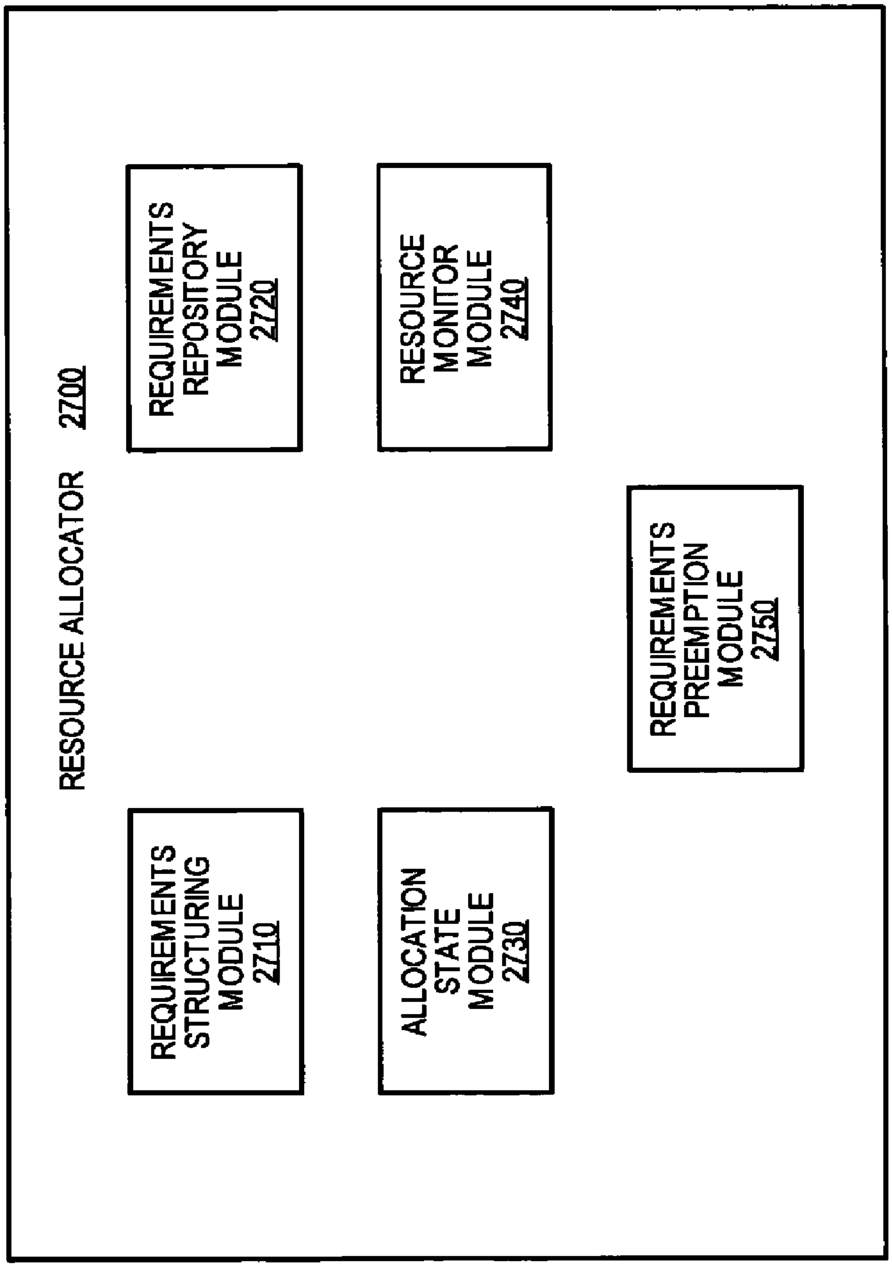
FIG. 27 is a block diagram of a resource allocator that processes preemptable resource requirements, according to an embodiment.

15.6 Implementation Mechanisms for Allocating Resources Using Preemptable Resource Requirements FIG. 27 is a block diagram of a resource allocator 2700 that processes preemptable resource requirements, according to an embodiment. Resource allocator 2700 can be a modified resource allocator based on resource allocator 1030 of FIG. 10, based on resource allocator 1200 of FIG. 12, based on resource allocator 1800 of FIG. 18, or based on resource allocator 2200 of FIG. 22.

Resource allocator 2700 is comprised of a requirements structuring module 2710, a requirements repository module 2720, an allocation state module 2730, a resource monitor module 2740, and a requirements preemption module 2750. Requirements structuring module 2710, requirements repository module 2720, allocation state module 2730, and resource monitor module 2740 correspond to requirements structuring module 1210, requirements repository module 1220, allocation state module 1230, and resource monitor module 1240 of FIG. 12, respectively, and are not described further herein.

Requirements preemption module 2750 processes preempt requests, whether from any of a number of sources, including but not limited to, resource allocator 2700, another resource allocator, the service provider, a third party, or a software application. Requirements preemption module 2750 de-allocates the one or more resources, thereby allowing the one or more resources to be allocated to another apparatus.

Requirements preemption module 2750 can include additional modules. For example, to support preempting resource requirements based on using suspendable resource requirements, requirements preemption module 2750 can include a requirements suspension module, such as requirements suspension module 2250 of FIG. 22. As another example, resource allocator 2700 can include a requirements suspension module that interacts with requirements preemption module 2750 for suspending resource requirements as part of preemption a preemptable resource requirement.

As another example, to support preempting resource requirements based on using alternative resource requirements, requirements preemption module 2750 can include a requirement selection module, such as requirement selection module 1850 of FIG. 18, and/or a requirement preference designation module, such as requirement preference designation module 1860 of FIG. 18. As another example, resource allocator 2700 can include a requirement selection module and/or a requirement preference designation module that interact with requirements preemption module 2750 for using alternative resource requirements as part of preemption a preemptable resource requirement.

Preemptable resource requirements can be used with dependent resource requirements such that when a preemptable resource requirement is preempted, any other resource requirements that depend on the preemptable resource requirement are preempted. For example, a parent resource requirement can be a preemptable resource requirement. When the preemptable parent resource requirement is preempted, then any child resource requirements of the preemptable parent resource requirement are suspended, even if the child resource requirements are not specified to be preemptable resource requirements.

16.0 Example FML with Resource Requirements

Figure 28:
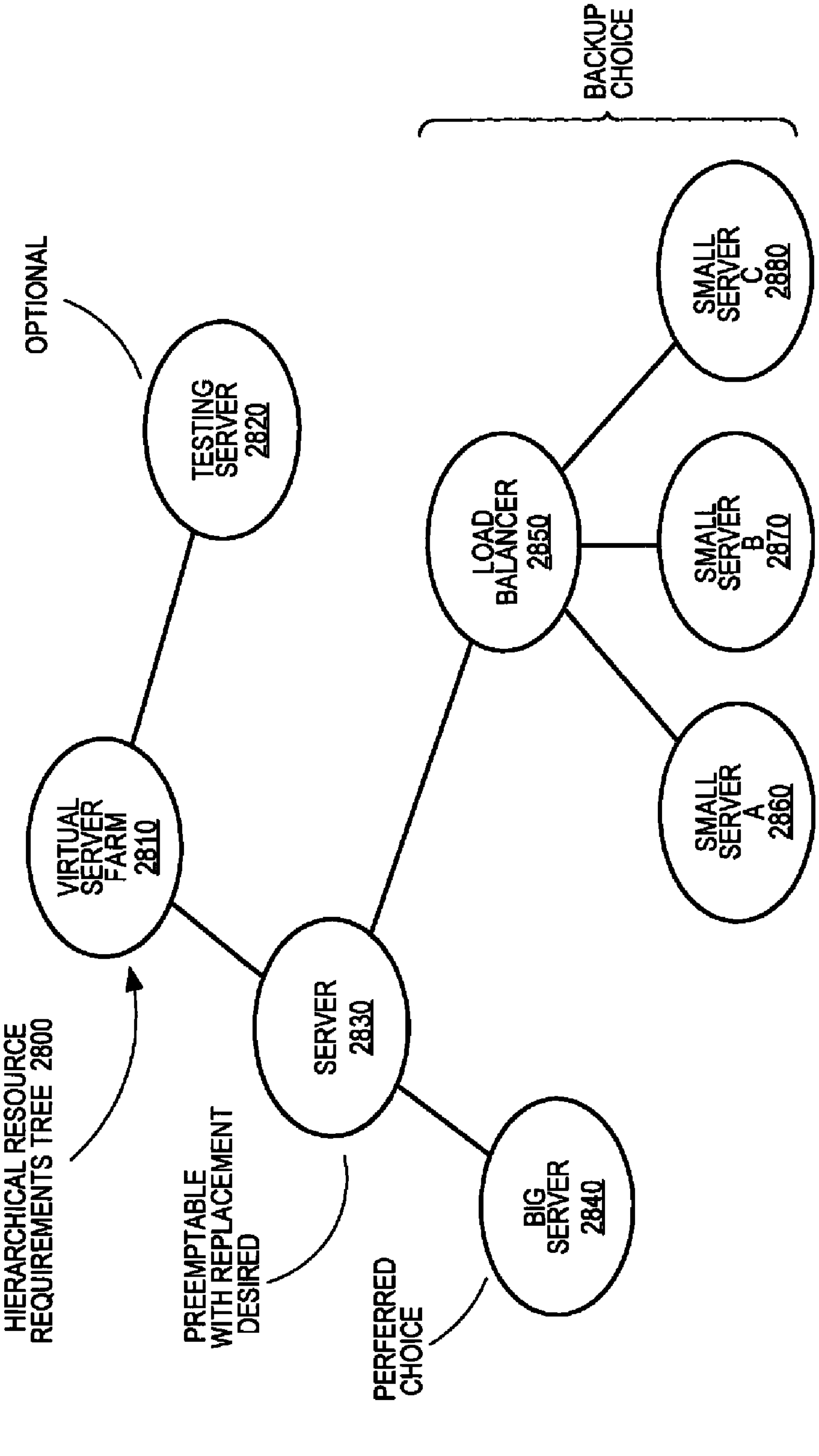
FIG. 28 is a block diagram of a hierarchical resource requirements tree of a virtual server farm based on the FML request of Table 15, according to an embodiment.

Table 15 presents an example FML with resource requirements, according to an embodiment. FIG. 28 is a block diagram of a hierarchical resource requirements tree of a virtual server farm based on the FML request of Table 15, according to an embodiment. For clarity, FIG. 28 does not include identification of the root node, sub-nodes, and leaf nodes, as in FIG. 14, and FIG. 28 is described in terms of the device that satisfies the resource requirement represented by each node. Also, the example FML of Table 15 illustrates a few basic examples of the features described herein. In other implementations, any number of any or all of the features described herein, including but not limited to, dependent resource requirements, optional resource requirements, suspendable resource requirements, and preemptable resource requirements, can be used separately or in combination with each other.

Hierarchical resource requirements tree 2800 includes a virtual server farm 2810, a testing server 2820, a server 2830, a big server 2840, a load balancer 2850, a small server A 2860, a small server B 2870, and a small server C 2880.

As illustrated in FIG. 28, testing server 2820 is optional, meaning that the resource requirement that specifies the testing server is an optional resource requirement. For example, the user requesting the virtual resource farm may want to include a server for testing applications that are being developed, but since the user does not need to have such a testing server as part of the overall apparatus, the testing server is specified to be optional. As a result, if a server is not available that satisfies the optional resource requirements for the testing server, the implementation of the virtual server farm will not fail.

Recall that with the “all or nothing” approach to resource allocation, if at least one resource that is specified cannot be allocated, the implementation of the apparatus fails. Thus, a user would be reluctant to include such an optional testing server as illustrated in FIG. 28 and Table 15 because the user would probably not want to risk failure of the apparatus to include a testing server that the user would like to have, but does not need to have. However, in the example of FIG. 28 and Table 15, the use of an optional resource requirement allows the user to try to obtain the desired testing server, if possible, but if not, the virtual server farm is still instantiated, provided the other resources that are necessary to be included in the virtual server farm are available.

As illustrated in FIG. 28, server 2830 is preemptable with a replacement being desired, meaning that the resource requirement that specifies the server is a preemptable resource requirement and that if the preemptable resource requirement is preempted, the resource allocator will attempt to allocate resources for another alternative, although the failure to do so does not prevent the allocated alternative from being preempted.

The preemptable resource requirement for server 2830 is based on a set of two alternative resource requirements. As illustrated in FIG. 28, big server 2840 is the preferred choice of the preemptable resource requirement for server 2830, meaning that the big server is the preferred alternative resource requirement. Load balancer 2850 fronts small server A 2860, small server B 2870, and small server C 2880, which collectively are the backup choice for the preemptable resource requirement for server 2830, meaning that the load balancer and three small servers are the least preferred alternative resource requirement.

TABLE 15

EXAMPLE FML WITH RESOURCE REQUIREMENTS

```
  <?xml version=“1.0” ?>
- <farm name=“farm0”>
  - <vlan id=“vlan0” name=“outer-vlan” type=“external”>
    - <subnet id=“subnet0” name=“external” ip=“10.0.0.0”
          mask=“255.0.0.0”>
          <ip-address id=“ip0” />
          <ip-address id=“ip1” />
      </subnet>
    </vlan>
  - <optional>
    - <server id=“server0”>
        <requirement name=“arch” value=“x86” />
        <requirement name=“clock-speed” min-value=“2GHz” />
        <requirement name=“memory” min-value=“1GB” />
    - <disk id=“disk0”>
          <requirement name=“seek-time” max-value=“5ms” />
          <requirement name=“size” min-value=“9GB” max-
            value=“18GB” />
        </disk>
    - <network-interface id=“nic0”
    name=“eth0” type=“ethernet”>
            <ip-address ref=“ip1” />
          </network-interface>
        </server>
    </optional>
  - <choice preemptable=“true” replacement=“desired”>
    - <server id=“server1”>
          <requirement name=“arch” value=“sun4u” />
          <requirement name=“clock-speed”
          min-value=“1.5GHz” />
          <requirement name=“memory” min-value=“4GB” />
      - <disk id=“disk1”>
            <requirement name=“type” value=“scsi” />
```

TABLE 15-continued

EXAMPLE FML WITH RESOURCE REQUIREMENTS

```
            <requirement name=“seek-time” max-value=“3ms” />
            <requirement name=“size” min-value=“50GB” max-
              value=“150GB” />
          </disk>
      - <network-interface id=“nic1”
      name=“eth0” type=“ethernet”=
            <ip-address ref=“ip0” />
          </network-interface>
        </server>
    - <optional>
      - <vlan id=“vlan1” name=“lblan” type=“internal”>
        - <subnet id=“subnet1” name=“loadnet” ip=“10.0.0.1”
            mask=“255.0.0.0”>
            <ip-address id=“ip2” />
            <ip-address id=“ip3” />
            <ip-address id=“ip4” />
            <ip-address id=“ip5” />
          </subnet>
        </vlan>
    - <loadbalancer id=“lb0” name=“lb”>
      - <virtual-interface id=“vip0” name=“vip0” ip=“ip0”>
        - <balanced-port port=“80”>
            <ip-address ref=“ip3” port=“8080” />
            <ip-address ref=“ip4” port=“8080” />
            <ip-address ref=“ip5” port=“8080” />
          </balanced-port>
      - <balanced-port port=“443”>
            <ip-address ref=“ip3” port=“8443” />
            <ip-address ref=“ip4” port=“8443” />
            <ip-address ref=“ip5” port=“8443” />
          </balanced-port>
        </virtual-interface>
    - <network-interface id=“nic2” name=“eth0”>
          <ip-address ref=“ip0” />
        </network-interface>
    - <network-interface id=“nic3” name=“eth1”>
          <ip-address ref=“ip2” />
        </network-interface>
      </loadbalancer>
  - <requirements id=“req0” name=“serverTierRequirements”>
        <requirement name=“arch” value=“x86” />
        <requirement name=“clock-speed” min-value=“2GHz” />
        <requirement name=“memory” min-value=“1GB” />
      </requirements>
  - <requirements id=“req1”
  name=“serverTierDiskRequirements”>
        <requirement name=“seek-time” max-value=“5ms” />
        <requirement name=“size” min-value=“9GB” max-
            value=“18GB” />
      </requirements>
  - <server id=“server2” requirements=“req0”>
        <disk id=“disk2” requirements=“req1” />
      - <network-interface id=“nic4” name=“eth0”
            type=“ethernet”>
            <ip-address ref=“ip3” />
          </network-interface>
        </server>
    - <server id=“server3” requirements=“req0”>
          <disk id=“disk3” requirements=“req1” />
      - <network-interface id=“nic5” name=“eth0”
            type=“ethernet”>
            <ip-address ref=“ip4” />
          </network-interface>
        </server>
    - <server id=“server4” requirements=“req0”>
          <disk id=“disk4” requirements=“req1” />
      - <network-interface id=“nic6” name=“eth0”
            type=“ethernet>
            <ip-address ref=“ip5” />
          </network-interface>
        </server>
      </optional>
    </choice>
</farm>
```

At the start of the example FML in Table 15, the XML version is specified as version “1.0,” followed by the farm declaration that includes the name “farm0” to identify the virtual server farm being requested. Next, the VLAN declaration for the farm, which starts with the "<VLAN . . . >" tag and ends with the "</VLAN>" tag, specifies details for the network, including that the VLAN is external so that IP addresses for the farm are accessible to the majority of the Internet. The VLAN includes a subnet, as defined between the "<subnet . . . " and "</subnet>" tags. The subnet identifier is "subnet0," and the subnet is specified to be external and have the given IP address and subnet mask. As part of the subnet declaration, two IP address identifiers are declared, namely "ip0" and "ip1," that are used on "subnet0," with the specific IP addresses for each identifier being determined by the subnet.

Next in the example FML is the optional server, represented by testing server 2820 in FIG. 28, which is defined between the "<optional>" and "</optional>" tags. The option server includes a number of parameters, such as three resource requirements that specify "x86" architecture, that the clock speed be at least 2 GHZ, and that the memory have at least 1 GB. In addition, two resource requirements are specified for the disk for the optional server, namely that the seek time be no larger than 5 ms and that the size be between 9 GB and 18 GB. Finally, the optional server is specified to have an ethernet network interface card that uses the "ip1" IP address for "subnet0."

Note that none of the resource requirements that specify the characteristics of the optional testing server are specified to be optional, and thus by default, all such resource requirements are treated as necessary resource requirements. As a result, all the resource requirements specifying the characteristics of the optional testing server must be satisfied for a server to be allocated to the virtual server farm. If at least one of the resource requirements cannot be satisfied, then a server is not allocated to the virtual server farm to fulfill the optional resource requirement for testing server 2820.

Although not included in the example FML of Table 15, the optional server could be specified as either suspendable or preemptable (e.g., by using a "SUSPENDABLE" or "PREEMPTABLE" tag following the "<OPTIONAL>" tag). With the use of one of these two tags, if a server is allocated to the virtual server farm, the allocated server could be suspended or preempted by the service provider, if necessary. Also, the user could specify one or more conditions on when the optional testing server could be de-allocated from the virtual server farm through the use of one or more variables that follow the "SUSPENDABLE" or "PREEMPTABLE" tag.

Following the declaration for the optional server, there is a preemptable resource requirement corresponding to server 2830 of FIG. 28 as indicated by "preemptable=true", which is based on a set of two alternative resource requirements as indicated by the "<choice . . . >" and "</choice>" tags (e.g., the latter tag occurs near the end of the example FML). The preemptable resource requirement indicates that a replacement is "desired" (instead of "required" or "none", as described above), so that if the preemptable resource requirement is preempted, the resource allocator will attempt to fulfill the other alternative resource requirement, but doing so is not required in order for preemption to occur.

The first choice for the preemptable resource requirement is represented by big server 2840 in FIG. 28 and is specified between the "<server . . . >" and "</server>" tags. In the example FML of Table 15, the listing of the choice for the big server first indicates that the big server is the preferred choice over the other choice of the three small servers fronted by the load balancer. As a result, the resource allocator first attempts to satisfy the first choice (e.g., the big server), and if the first choice cannot be satisfied, then the resource allocator attempts to satisfy the second choice (e.g., the three small servers fronted by the load balancer). Regardless of which choice is allocated when the request is processed, the service provider can later preempt the choice that was allocated and then attempt to replace the preempted choice with the other choice, if possible (e.g., the replacement is specified to be "desired").

The attributes of the big server are specified by the resource requirements listed between the "<server . . . >" and "</server>" tags, namely that the server use a "sun4u" architecture, have a clock speed of at least 1.5 GHz, and a memory of at least 4 GB. The big server also is specified to include a "scsi" type of disk with a seek time of no greater than 3 ms and a storage capacity of between 50 GB and 150 GB. Finally, the big server is specified to have an ethernet network interface card that uses the "ip0" IP address for "subnet0."

The second choice for the preemptable resource requirement is represented by load balancer 2850, small server A 2860, small server B 2870, and small server C 2880 in FIG. 28 and is specified between the "<optional>" and "</optional>" tags (e.g., the latter tag occurs near the end of the example FML). By using the optional tags, the user is specifying that the set of the load balancer and three small servers is to be allocated as a unit, as compared to not using the optional tags which could result in the resource allocator allocating some but not all of the four devices if some devices are not available.

The second choice starts with a second VLAN, called "vlan1," which is specified to be internal so that the traffic on "vlan1" is isolated from the Internet. The internal VLAN includes one subnet, "subnet1," for internal traffic between the load balancer and the three small servers, and the load balancer acts as a bridge between the two networks (e.g., between "subnet0" of "vlan0" and "subnet1" of "vlan1"). "Subnet1" includes the specified IP address and subnet mask, along with four IP address identifiers (e.g., "ip2", "ip3", "ip4", and "ip5") to be used with the load balancer and the three small servers.

Following the declaration for "vlan1", the example FML includes the resource requirements for the load balancer. The load balancer has an identifier of "lb0" and a name of "lb," along with a virtual interface with identifier "vip0" that does not actually exist, but acts as the load balancing interface. The virtual interface includes two balanced ports, port "80" and port "443," and the load balancer balances the "ip3," "ip4," and "ip5" IP addresses, which are used for the three small servers, on each of ports "80" and "443."

In addition to the virtual network interface "vip0," the load balancer includes two real network interfaces, one for "ip0" and one for "ip2." Note that the first network interface for the external side of the load balancer specifies "ip0", which is the same as was specified for the big server for the first choice. However, because only one choice of the set of two choices can be fulfilled, there is no conflict in specifying a network interface for "ip0" for each of the two choices. Also, the network interface for "ip2" is on the internal side of the load balancer for the internal "vlan1" and is used to communicate with the three small servers.

Following the resource requirements for the load balancer are the resource requirements for the three small servers represented by small server A 2860, small server B 2870, and small server C 2880 in FIG. 28. Before the resource requirements for each of the three small servers are given, two different groups of resource requirements are specified, one identified as "req0" and the other as "regi." The two groups of resource requirements are used to define attributes of the servers and the disks for the servers, respectively, and are named "serverTierRequirements" and "serverTierDiskRequirements," respectively. The grouping two or more resource requirements together into a group of resource requirements helps to minimize repetition of the resource requirements among a group of resources that are specified to have the same parameters and to provide some level of consistency among a set of similar devices.

In this example, the user desires three small servers that are basically the same, and thus this example FML request for a virtual server farm is amenable to the use of groups of resource requirements to help ensure consistency among the group of servers and to simplify the FML input by using the resource requirement groups as a form of shorthand notation. Specifically, the "serverTierRequirements" group specifies the general server parameters, such as that each server be based on "x86" architecture, have a minimum clock speed of 2 GHz, and have at least 1 GB of memory, and the "serverTierDiskRequirements" specify that the disk for each server have a maximum seek time of 5 ms and a storage capacity between 9 GB and 18 GB.

Following the two resource requirements groups are the declarations for each of the three small servers. For example, for the first small server identified as "server2", the requirements for the server are specified as "req0" and for the server's disk as "regi." "Server2" also is specified to include an ethernet network interface that uses the "ip3" IP address. The second and third small servers are declared in a similar manner, each having a unique server identifier and a different IF address.

The elements that are declared in the example FML can each have an allocation state, including but not limited to, the specific attributes for each device, the devices themselves, portions of a device (e.g., the disk for a server), the network interfaces, and the IP addresses. After processing the request for the virtual server farm, the resource allocator indicates the allocation state for each element (e.g., "ALLOCATED" or "NOT ALLOCATED"), and each element can be specified to be optional, suspendable, preemptable, or as one alternative among a set of alternatives.

Note that while Table 15 includes a set of alternative resource requirements that is specified to be preemptable, a set of alternative resource requirements can be specified to be suspendable instead, or the alternative resource requirements can be specified without being either preemptable or suspendable. Note also that any resource requirement in the example FML can be specified to be suspendable, preemptable, or optional, or that different types of resource requirements can be nested within each other (e.g., some alternatives can be specified as suspendable while others are not). Generally, there is no limit or restriction on the use of one or more of any or all of the different types of resource requirements.

For example, assume that a user wants a storage device with at least 5 GB of storage for a particular apparatus, but would prefer 10 GB of storage. The user can specify any of the following examples to achieve that goal: a necessary resource requirement for a 5 GB server; a necessary resource requirement for a server with at least 5 GB of storage capacity; a set of alternative resource requirements in which one alternative is for a 5 GB server and a second and preferred alternative is for a 10 GB server that is preemptable with a replacement specified as required, so that the user gets and keeps at least 5 GB of storage, but hopefully gets 10 GB; and a necessary resource requirement for a first 5 GB server and an optional and suspendable resource requirement for another 5 GB server.

17.0 Extensions and Alternatives

In the foregoing specification, the approaches disclosed herein have been described with reference to specific embodiments and details that may vary from implementation to implementation. It will, however, be evident that various modifications and changes may be made thereto without departing from the broader spirit and scope of the approaches described herein. Thus, the sole and exclusive indicator of what is the invention, and is intended by the applicants to be the invention, is the set as recited in Claims that issue from this application, in the specific form in which such claims issue, including any subsequent correction. Any express definitions set forth herein for terms contained in such claims that govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative sense rather than a restrictive sense. The approaches described herein include other contexts and applications in which the mechanisms and processes described herein are available to other mechanisms, methods, programs, and processes.

Embodiments, implementations, and examples herein have illustrated the use of a resource allocator for processing resource requirements and allocating resources to an apparatus. However, the resource allocators described herein are used for explanation purposes only and embodiments of the approaches disclosed herein are not limited to any particular type of mechanism for processing resource requirements and allocating resources to an apparatus. In addition, one or more of the functions or capabilities of the resource allocators described herein can be performed by any suitable mechanism or group of mechanisms.

Embodiments, implementation, and examples herein are described in terms of a user making a request for an apparatus, and the request includes one or more resource requirements as specified by the user. However, in general, a resource requirement can be specified by any entity, not just a user that requests an apparatus, including but not limited to, the service provider, a third party, or a software application. For example, the service provider can specify a resource requirement for an apparatus, such as that any processors for the apparatus use the "Linux" OS, which can be useful for satisfying the needs of the service provider, such as to simplify maintenance and support by standardizing the operating systems based on a particular OS. In the event that the resource requirements specified by the user conflict with those of the resource requirements specified by another entity, the service provider can decide which resource requirements are to be given priority.

In addition, in this disclosure, certain process steps are set forth in a particular order, and alphabetic and alphanumeric labels are used to identify certain steps. Unless specifically stated in the disclosure, embodiments of the approaches disclosed herein are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A machine-implemented method for allocating devices to an apparatus, comprising:

receiving a textual representation of a logical configuration of the apparatus that includes a plurality of physical devices, wherein the textual representation is based on a structured markup language; and determining, based on the textual representation, a plurality of logical devices to be included in said apparatus, wherein each of the plurality of logical devices comprises a logical representation of one of the plurality of physical devices;

determining whether each physical device of the plurality of physical devices is available, wherein each physical device corresponds to at least one of the plurality of logical devices; and allocating each physical device to the apparatus when the physical device is available;

upon allocating each physical device to the apparatus when the physical device is available, instantiating the apparatus, by:

generating at least one command for at least one switch device that is not included in the plurality of physical devices, wherein the at least one switch device is interconnected to at least one computing element of the plurality of physical devices and at least one storage device of the plurality of physical devices, and wherein the at least one command instructs the at least one switch device to logically connect the at least one computing element and the at least one storage device into an operable system that conforms to the logical configuration.

2. The method as recited in claim 1, further comprising:

for each logical device of the plurality of logical devices corresponding to at least one of the plurality of physical devices, implementing the apparatus.

3. The method as recited in claim 2, further comprising:

receiving a request that describes at least one attribute of the apparatus;

wherein the apparatus is not implemented prior to receiving said request.

4. The method as recited in claim 2, further comprising:

receiving a request that describes at least one attribute of the apparatus;

wherein the apparatus is implemented prior to receiving said request; and wherein the request indicates at least one change that is to be applied to the apparatus.

5. The method as recited in claim 2, wherein implementing the apparatus further comprises:

establishing a plurality of logical connections between at least two logical devices of the plurality of logical devices.

6. The method as recited in claim 2, wherein the plurality of physical devices is a first plurality of physical devices, and wherein implementing the apparatus further comprises:

establishing a plurality of physical connections between at least two physical devices of a second plurality of logical devices that is included in the first plurality of physical devices.

7. The method as recited in claim 1, wherein the apparatus is a first apparatus, and wherein allocating the physical device to said first apparatus further comprises:

assigning the physical device to the first apparatus such that the physical device cannot be assigned to a second apparatus that is independent of the first apparatus.

8. The method as recited in claim 1, wherein the apparatus is a first apparatus, wherein the plurality of physical devices is a plurality of idle physical devices, and wherein allocating the physical device to the first apparatus further comprises:

removing the physical device from the plurality of idle physical devices such that the physical device cannot be allocated to a second apparatus that is independent of the first apparatus.

9. The method as recited in claim 1, wherein the apparatus is a first apparatus, and wherein determining whether the physical device of the plurality of physical devices is available further comprises:

determining whether the physical device is allocated to a second apparatus that is independent of the first apparatus;

identifying that the physical device is not available when the physical device is allocated to the second apparatus; and identifying that the physical device is available when the physical device is not allocated to the second apparatus.

10. The method as recited in claim 1, wherein determining whether the physical device of the plurality of physical devices is available further comprises:

determining whether the physical device is included in a plurality of idle physical devices;

identifying that said physical device is available when the physical device is included in the plurality of idle physical devices; and identifying that said physical device is not available when the physical device is not included in the plurality of idle physical devices.

11. The method as recited in claim 10, wherein the plurality of idle physical devices is included in an idle pool of physical devices.

12. The method as recited in claim 1, wherein the apparatus comprises at least two physical devices, and wherein the apparatus is one selected from a group consisting of a computer system, a networked computing system, a virtual server farm, and an instant data center.

13. The method as recited in claim 1, further comprising:

selecting, from among a set of processors of the plurality of physical devices, a first subset of processors;

generating instructions that cause a first switching system to logically couple together each processor in the first subset of processors, wherein the first switching system is not included in the plurality of physical devices;

selecting, from among a set of storage devices of the plurality of physical devices, a second subset of storage devices;

generating instructions that cause a second switching system to logically couple together each storage device in the second subset of storage devices to one another and to the first subset of processors, wherein the second switching system is not included in the plurality of physical devices.

14. A machine-readable storage medium for allocating devices to an apparatus, the machine readable medium carrying instructions which, when executed by at least one processor, cause performance of the steps of:

receiving a textual representation of a logical configuration of the apparatus that includes a plurality of physical devices, wherein the textual representation is based on a structured markup language; and determining, based on the textual representation, a plurality of logical devices to be included in said apparatus, wherein each of the plurality of logical devices comprises a logical representation of one of the plurality of physical devices;

determining whether each physical device of the plurality of physical devices is available, wherein each physical device corresponds to at least one of the plurality of logical devices; and allocating each physical device to the apparatus when the physical device is available;

upon allocating each physical device to the apparatus when the physical device is available, instantiating the apparatus, by:

generating at least one command for at least one switch device that is not included in the plurality of physical devices, wherein the at least one switch device is interconnected to at least one computing element of the plurality of physical devices and at least one storage device of the plurality of physical devices, and wherein the at least one command instructs the at least one switch device to logically connect the at least one computing element and the at least one storage device into an operable system that conforms to the logical configuration.

15. The machine-readable storage medium as recited in claim 14, further comprising instructions which, when executed by the at least one processor, cause performance of the steps of:

for each logical device of the plurality of logical devices corresponding to at least one of the plurality of physical devices, implementing the apparatus.

16. The machine-readable storage medium as recited in claim 15, further comprising instructions which, when executed by the at least one processor, cause performance of the steps of:

receiving a request that describes at least one attribute of the apparatus;

wherein the apparatus is not implemented prior to receiving said request.

17. The machine-readable storage medium in claim 15, further comprising instructions which, when executed by the at least one processor, cause performance of the steps of:

receiving a request that describes at least one attribute of the apparatus;

wherein the apparatus is implemented prior to receiving said request; and wherein the request indicates at least one change to be applied to the apparatus.

18. The machine-readable storage medium as recited in claim 15, wherein the step of implementing the apparatus further includes the step of:

establishing a plurality of logical connections between at least two logical devices of the plurality of logical devices.

19. The machine-readable storage medium as recited in claim 15, wherein the plurality of physical devices is a first plurality of physical devices, and wherein the step of implementing the apparatus further includes the step of:

establishing a plurality of physical connections between at least two physical devices of a second plurality of logical devices that is included in the first plurality of physical devices.

20. The machine-readable storage medium as recited in claim 14, wherein the apparatus is a first apparatus, and wherein the step of allocating the physical device to the first apparatus further includes the step of:

assigning the physical device to the first apparatus such that the physical device cannot be assigned to a second apparatus that is independent of the first apparatus.

21. The machine-readable storage medium as recited in claim 14, wherein the apparatus is a first apparatus, wherein the plurality of physical devices is a plurality of idle physical devices, and wherein the step of allocating said physical device to the first apparatus further includes the step of:

removing the physical device from the plurality of idle physical devices such that the physical device cannot be allocated to a second apparatus that is independent of the first apparatus.

22. The machine-readable storage medium as recited in claim 14, wherein the apparatus is a first apparatus, and wherein the step of determining whether said physical device of the plurality of physical devices is available further includes the steps of:

determining whether the physical device is allocated to a second apparatus that is independent of the first apparatus;

identifying that the physical device is not available when the physical device is allocated to the second apparatus; and identifying that the physical device is available when the physical device is not allocated to the second apparatus.

23. The machine-readable storage medium as recited in claim 14, wherein the step of determining whether the physical device of the plurality of physical devices is available further includes the steps of:

determining whether the physical device is included in a plurality of idle physical devices;

identifying that said physical device is available when the physical device is included in the plurality of idle physical devices; and identifying that said physical device is not available when the physical device is not included in the plurality of idle physical devices.

24. The machine-readable storage medium as recited in claim 23, wherein the plurality of idle physical devices is included in an idle pool of physical devices.

25. The machine-readable storage medium as recited in claim 14, wherein the apparatus comprises at least two physical devices, and wherein the apparatus is one selected from the group consisting of: a computer system, a networked computing system, a virtual server farm, and an instant data center.

26. The machine-readable storage medium as recited in claim 14, further comprising instructions which, when executed by the at least one processor, cause performance of the steps of:

selecting, from among a set of processors of the plurality of physical devices, a first subset of processors;

generating instructions that cause a first switching system to logically couple together each processor in the first subset of processors, wherein the first switching system is not included in the plurality of physical devices;

selecting, from among a set of storage devices of the plurality of physical devices, a second subset of storage devices;

generating instructions that cause a second switching system to logically couple together each storage device in the second subset of storage devices to one another and to the first subset of processors, wherein the second switching system is not included in the plurality of physical devices.

27. A mechanism for allocating devices to an apparatus, the mechanism comprising a memory storing instructions which, when executed by at least one processors, cause performance of the steps of:

receiving a textual representation of a logical configuration of the apparatus that includes a plurality of physical devices, wherein the textual representation is based on a structured markup language; and determining, based on the textual representation, a plurality of logical devices to be included in said apparatus, wherein each of the plurality of logical devices comprises a logical representation of one of the plurality of physical devices;

determining whether each physical device of the plurality of physical devices is available, wherein each physical device corresponds to at least one of the plurality of logical devices; and allocating each physical device to the apparatus when the physical device is available;

upon allocating each physical device to the apparatus when the physical device is available, instantiating the apparatus, by:

generating at least one command for at least one switch device that is not included in the plurality of physical devices, wherein the at least one switch device is interconnected to at least one computing element of the plurality of physical devices and at least one storage device of the plurality of physical devices, and wherein the at least one command instructs the at least one switch device to logically connect the at least one computing element and the at least one storage device into an operable system that conforms to the logical configuration.

28. The mechanism as recited in claim 27, wherein the memory further comprises one or more instructions which, when executed by the at least one processors, cause performance of the steps of:

for each logical device of the plurality of logical devices corresponding to at least one of the plurality of physical devices, implementing the apparatus.

29. The mechanism as recited in claim 28, wherein the memory further comprises one or more instructions which, when executed by the at least one processors, cause performance of the steps of:

receiving a request that describes at least one attribute of the apparatus;

wherein the apparatus is not implemented prior to receiving said request.

30. The mechanism as recited in claim 28, wherein the memory further comprises one or more instructions which, when executed by the at least one processors, cause performance of the steps of:

receiving a request that describes at least one attribute of the apparatus;

wherein the apparatus is implemented prior to receiving said request; and wherein the request indicates at least one change that is to be applied to the apparatus.

31. The mechanism as recited in claim 28, wherein the step of implementing said apparatus further includes the step of:

establishing a plurality of logical connections between at least two logical devices of the plurality of logical devices.

32. The mechanism as recited in claim 28, wherein said plurality of physical devices is a first plurality of physical devices, and wherein the step of implementing said apparatus further includes the step of:

establishing a plurality of physical connections between at least two physical devices of a second plurality of logical devices that is included in the first plurality of physical devices.

33. The mechanism as recited in claim 27, wherein said apparatus is a first apparatus, and wherein the step of allocating said physical device to said first apparatus further includes the step of:

assigning the physical device to the first apparatus such that the physical device cannot be assigned to a second apparatus that is independent of the first apparatus.

34. The mechanism as recited in claim 27, wherein said apparatus is a first apparatus, wherein said plurality of physical devices is a plurality of idle physical devices, and wherein the step of allocating said physical device to said first apparatus further includes the step of:

removing the physical device from the plurality of idle physical devices such that the physical device cannot be allocated to a second apparatus that is independent of the first apparatus.

35. The mechanism as recited in claim 27, wherein said apparatus is a first apparatus, and wherein the step of determining whether said physical device of said plurality of physical devices is available further includes the steps of:

determining whether the physical device is allocated to a second apparatus that is independent of the first apparatus;

identifying that the physical device is not available when the physical device is allocated to the second apparatus; and identifying that the physical device is available when the physical device is not allocated to the second apparatus.

36. The mechanism as recited in claim 27, wherein the step of determining whether said physical device of said plurality of physical devices is available further includes the steps of:

determining whether the physical device is included in a plurality of idle physical devices;

identifying that said physical device is available when the physical device is included in the plurality of idle physical devices; and identifying that said physical device is not available when the physical device is not included in the plurality of idle physical devices.

37. The mechanism as recited in claim 36, wherein the plurality of idle physical devices is included in an idle pool of physical devices.

38. The mechanism as recited in claim 27, wherein the apparatus comprises at least two physical devices, and wherein the apparatus is one selected from the group consisting of: a computer system, a networked computing system, a virtual server farm, and an instant data center.

39. The mechanism as recited in claim 27, wherein the memory further comprises one or more instructions which, when executed by the one or more processors, cause performance of the steps of:

selecting, from among a set of processors of the plurality of physical devices, a first subset of processors;

generating instructions that cause a first switching system to logically couple together each processor in the first subset of processors, wherein the first switching system is not included in the plurality of physical devices;

selecting, from among a set of storage devices of the plurality of physical devices, a second subset of storage devices;

generating instructions that cause a second switching system to logically couple together each storage device in the second subset of storage devices to one another and to the first subset of processors, wherein the second switching system is not included in the plurality of physical devices.

* * * * *